US010871890B2

(12) United States Patent
McLean et al.

(10) Patent No.: US 10,871,890 B2
(45) Date of Patent: Dec. 22, 2020

(54) METHODS AND SYSTEMS FOR PRESENTING A CAMERA HISTORY

(71) Applicant: GOOGLE LLC, Mountain View, CA (US)

(72) Inventors: Melissa McLean, Novato, CA (US); Michael Mizono, Mountain View, CA (US); Lauren Von Dehsen, San Francisco, CA (US); Joe Delone Venters, Alameda, CA (US); Tracy Kuwatani, Mountain View, CA (US); Zachery Kennedy, San Jose, CA (US); James Edward Stewart, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/781,915

(22) Filed: Feb. 4, 2020

(65) Prior Publication Data

US 2020/0201529 A1 Jun. 25, 2020

Related U.S. Application Data

(63) Continuation of application No. 15/174,847, filed on Jun. 6, 2020, now Pat. No. 10,552,020, which is a (Continued)

(51) Int. Cl.
*G06F 3/00* (2006.01)
*G06F 3/0484* (2013.01)
(Continued)

(52) U.S. Cl.
CPC ........ *G06F 3/04847* (2013.01); *G06F 1/1694* (2013.01); *G06F 3/0346* (2013.01);
(Continued)

(58) Field of Classification Search
CPC .................. G06F 3/04847; G06F 16/7328
See application file for complete search history.

(56) References Cited

U.S. PATENT DOCUMENTS

| 5,625,410 A | 4/1997 | Washino et al. |
| 5,765,485 A | 6/1998 | Thoman et al. |

(Continued)

FOREIGN PATENT DOCUMENTS

| WO | WO 2006/120596 | 11/2006 |
| WO | WO 2013/009828 A1 | 1/2013 |
| WO | WO 2014/137372 | 9/2014 |

OTHER PUBLICATIONS

Ahmed, Nafees, "5 Best Video Editing Apps for Android Devices", posted at techbuzzes.com, Mar. 23, 2013, (site visited Jun. 3, 2016), Available from Internet: http://techbuzzes.com/2013/03/best-video-editing-apps-for-android, 7 pgs.
(Continued)

*Primary Examiner* — Nicholas Augustine
(74) *Attorney, Agent, or Firm* — Morgan, Lewis & Bockius LLP

(57) ABSTRACT

A method, in an application executing on a client device, includes: displaying a camera event history provided by a remote server system, where the camera event history is presented as a chronologically-ordered set of event identifiers, each event identifier corresponding to a respective event for which a remote camera has captured an associated video; receiving a user selection of a displayed event identifier; and in response to receiving the user selection of the displayed event identifier: expanding the selected event identifier into a video player window, the video player window consuming a portion of the displayed camera event history; and playing, in the video player window, the captured video; and in response to terminating playback of the captured video or user de-selection of the displayed event
(Continued)

identifier, collapsing the video player window into the selected event identifier thereby stopping the playing of the captured video.

20 Claims, 91 Drawing Sheets
(25 of 91 Drawing Sheet(s) Filed in Color)

Related U.S. Application Data continuation of application No. 14/739,427, filed on Jun. 15, 2015, now Pat. No. 9,361,521, which is a continuation of application No. 14/738,930, filed on Jun. 14, 2015, now Pat. No. 9,361,011.

(51) Int. Cl.
| | |
|---|---|
| G06F 16/71 | (2019.01) |
| G06F 16/738 | (2019.01) |
| G06F 16/74 | (2019.01) |
| G06F 16/732 | (2019.01) |
| G08B 13/196 | (2006.01) |
| G06K 9/00 | (2006.01) |
| G06K 9/20 | (2006.01) |
| G06F 1/16 | (2006.01) |
| G11B 27/10 | (2006.01) |
| G11B 27/28 | (2006.01) |
| G11B 27/34 | (2006.01) |
| H04N 7/18 | (2006.01) |
| G06F 3/14 | (2006.01) |
| G06F 3/0346 | (2013.01) |
| G06F 3/0481 | (2013.01) |
| G06F 3/0488 | (2013.01) |
| G06F 3/16 | (2006.01) |
| H04N 5/262 | (2006.01) |
| G06F 3/0485 | (2013.01) |
| H04N 5/77 | (2006.01) |
| G06F 3/0482 | (2013.01) |
| G06F 3/01 | (2006.01) |

(52) U.S. Cl.
CPC .......... *G06F 3/0481* (2013.01); *G06F 3/0482* (2013.01); *G06F 3/0485* (2013.01); *G06F 3/0488* (2013.01); *G06F 3/04817* (2013.01); *G06F 3/04842* (2013.01); *G06F 3/04845* (2013.01); *G06F 3/04883* (2013.01); *G06F 3/14* (2013.01); *G06F 3/167* (2013.01); *G06F 16/71* (2019.01); *G06F 16/738* (2019.01); *G06F 16/7328* (2019.01); *G06F 16/743* (2019.01); *G06K 9/00718* (2013.01); *G06K 9/00771* (2013.01); *G06K 9/2081* (2013.01); *G08B 13/196* (2013.01); *G08B 13/1966* (2013.01); *G08B 13/19645* (2013.01); *G08B 13/19656* (2013.01); *G08B 13/19682* (2013.01); *G08B 13/19695* (2013.01); *G11B 27/105* (2013.01); *G11B 27/28* (2013.01); *G11B 27/34* (2013.01); *H04N 5/2628* (2013.01); *H04N 5/77* (2013.01); *H04N 7/181* (2013.01); *H04N 7/188* (2013.01); *G06K 2009/00738* (2013.01)

(56) References Cited

U.S. PATENT DOCUMENTS

| | | |
|---|---|---|
| D403,313 S | 12/1998 | Peppel |
| D424,036 S | 5/2000 | Arora et al. |
| D456,293 S | 4/2002 | Tsumura et al. |
| 6,593,956 B1 | 7/2003 | Potts |
| D488,818 S | 4/2004 | Lee et al. |
| D500,047 S | 12/2004 | Sevdermish |
| 6,948,131 B1 | 9/2005 | Neven et al. |
| 6,954,498 B1 | 10/2005 | Lipton |
| D550,227 S | 9/2007 | Sato et al. |
| 7,382,244 B1 | 6/2008 | Donovan et al. |
| D590,416 S | 4/2009 | Kochackis |
| D597,864 S | 8/2009 | Sakuma et al. |
| D607,004 S | 12/2009 | Kordus et al. |
| D619,612 S | 7/2010 | Pueyo et al. |
| D621,730 S | 8/2010 | Driver et al. |
| D626,131 S | 10/2010 | Kruzeniski et al. |
| 7,877,708 B2 | 1/2011 | Zinn et al. |
| 7,884,855 B2 * | 2/2011 | Ortiz .................. H04N 7/18 348/211.8 |
| 7,903,115 B2 | 3/2011 | Platzer et al. |
| 7,996,771 B2 | 8/2011 | Girgensohn et al. |
| D647,809 S | 11/2011 | Driver |
| D656,157 S | 3/2012 | Khan et al. |
| D658,674 S | 5/2012 | Shallcross et al. |
| 8,184,069 B1 | 5/2012 | Rhodes |
| D661,701 S | 6/2012 | Brown et al. |
| D662,508 S | 6/2012 | Kim |
| D664,966 S | 8/2012 | Shallcross et al. |
| D664,978 S | 8/2012 | Tanghe et al. |
| D672,364 S | 12/2012 | Reyna et al. |
| 8,340,654 B2 * | 12/2012 | Bratton .................. H04N 7/185 455/420 |
| D677,269 S | 3/2013 | Scott et al. |
| D678,898 S | 3/2013 | Walsh et al. |
| 8,390,684 B2 | 3/2013 | Piran et al. |
| D681,653 S | 5/2013 | Bitran et al. |
| D681,660 S | 5/2013 | Matas |
| D684,164 S | 6/2013 | Friedlander et al. |
| D686,221 S | 7/2013 | Brinda et al. |
| D686,635 S | 7/2013 | Cranfill et al. |
| D689,892 S | 9/2013 | Perry et al. |
| D689,895 S | 9/2013 | DeLuca |
| D692,450 S | 10/2013 | Convay et al. |
| D694,255 S | 11/2013 | Jones, Jr. |
| 8,589,374 B2 | 11/2013 | Chaudhri |
| D696,677 S | 12/2013 | Corcoran et al. |
| 8,615,511 B2 | 12/2013 | Jones |
| D697,930 S | 1/2014 | Crabtree et al. |
| D697,940 S | 1/2014 | Bitran et al. |
| 8,665,375 B2 | 3/2014 | Moore et al. |
| D702,700 S | 4/2014 | Thompson |
| D702,704 S | 4/2014 | Santos et al. |
| D705,255 S | 5/2014 | Gerssen et al. |
| D707,245 S | 6/2014 | Bruck et al. |
| D708,197 S | 7/2014 | Pasceri et al. |
| D708,204 S | 7/2014 | Pasceri et al. |
| D711,415 S | 8/2014 | Simister et al. |
| D712,928 S | 9/2014 | Brener et al. |
| D714,334 S | 9/2014 | Cojuangco et al. |
| 8,830,193 B2 * | 9/2014 | Shah .................. G06F 3/0488 345/173 |
| 8,843,239 B2 | 9/2014 | Mighdoll et al. |
| D715,835 S | 10/2014 | Montgomery et al. |
| D716,334 S | 10/2014 | Lee et al. |
| D717,809 S | 11/2014 | Tsuru et al. |
| D717,823 S | 11/2014 | Brotman et al. |
| 8,917,274 B2 | 12/2014 | Ma et al. |
| D720,765 S | 1/2015 | Xie et al. |
| D720,766 S | 1/2015 | Mandel et al. |
| D721,382 S | 1/2015 | Brinda et al. |
| D723,576 S | 3/2015 | Jones |
| D724,603 S | 3/2015 | Williams et al. |
| D725,666 S | 3/2015 | Tseng et al. |
| 8,984,436 B1 | 3/2015 | Tseng et al. |
| 8,988,232 B1 | 3/2015 | Sloo et al. |
| D726,735 S | 4/2015 | Asai |
| D727,336 S | 4/2015 | Allison et al. |
| D727,928 S | 4/2015 | Allison et al. |
| D736,223 S | 8/2015 | Park |
| D736,792 S | 8/2015 | Brinda et al. |
| D737,131 S | 8/2015 | Frandsen |
| D737,278 S | 8/2015 | Shin et al. |

(56) References Cited

U.S. PATENT DOCUMENTS

| | | |
|---|---|---|
| D737,283 S | 8/2015 | Scalisi |
| D739,429 S | 9/2015 | Veilleux et al. |
| D739,864 S | 9/2015 | Kang |
| 9,140,572 B2 | 9/2015 | Millington |
| D740,300 S | 10/2015 | Lee et al. |
| 9,158,974 B1 | 10/2015 | Laska et al. |
| 9,170,707 B1 | 10/2015 | Laska et al. |
| D745,527 S | 12/2015 | Wang |
| D746,828 S | 1/2016 | Arai et al. |
| D746,849 S | 1/2016 | Anzures et al. |
| D747,333 S | 1/2016 | Supino et al. |
| D748,666 S | 2/2016 | Heeter et al. |
| D749,620 S | 2/2016 | Jones |
| D751,090 S | 3/2016 | Hu et al. |
| D752,061 S | 3/2016 | Ahn et al. |
| D752,072 S | 3/2016 | Song |
| D752,107 S | 3/2016 | Yun et al. |
| D752,605 S | 3/2016 | Wang et al. |
| D753,132 S | 4/2016 | Cuthbert et al. |
| D753,151 S | 4/2016 | Lee et al. |
| D753,703 S | 4/2016 | Villamor et al. |
| D753,708 S | 4/2016 | Yang et al. |
| D754,713 S | 4/2016 | Zhang et al. |
| D754,714 S | 4/2016 | Zhang et al. |
| D755,193 S | 5/2016 | Sun et al. |
| D756,379 S | 5/2016 | Apodaca et al. |
| D756,401 S | 5/2016 | Soldner et al. |
| D757,090 S | 5/2016 | Myung |
| D757,746 S | 5/2016 | Lee |
| D757,747 S | 5/2016 | Butcher et al. |
| D757,784 S | 5/2016 | Lee et al. |
| D758,386 S | 6/2016 | Zhang |
| D758,422 S | 6/2016 | Zhao |
| D759,688 S | 6/2016 | Wu |
| 9,361,011 B1 | 6/2016 | Burns |
| D760,769 S | 7/2016 | Ishii et al. |
| D760,792 S | 7/2016 | Liu et al. |
| D761,277 S | 7/2016 | Harvell |
| 9,386,230 B1 | 7/2016 | Duran |
| D762,655 S | 8/2016 | Kai |
| D763,271 S | 8/2016 | Everette et al. |
| D763,306 S | 8/2016 | Lee et al. |
| D763,308 S | 8/2016 | Wang et al. |
| D763,869 S | 8/2016 | Wang et al. |
| D763,888 S | 8/2016 | Patel |
| D763,895 S | 8/2016 | Chaudhri et al. |
| 9,417,637 B2 | 8/2016 | Matsuoka et al. |
| D765,674 S | 9/2016 | Kim |
| D765,678 S | 9/2016 | Goux |
| D766,958 S | 9/2016 | Salazar Cardozo et al. |
| 9,454,820 B1 | 9/2016 | Kirmani |
| D768,687 S | 10/2016 | Bae et al. |
| D769,897 S | 10/2016 | Li |
| D769,930 S | 10/2016 | Agrawal |
| 9,471,452 B2 | 10/2016 | McElhinney et al. |
| D770,517 S | 11/2016 | Peng et al. |
| D771,645 S | 11/2016 | Jewitt et al. |
| D772,257 S | 11/2016 | Furutani et al. |
| D772,894 S | 11/2016 | Zhao et al. |
| D773,531 S | 12/2016 | Toth et al. |
| D775,165 S | 12/2016 | Sun et al. |
| 9,513,642 B2 | 12/2016 | Rogers et al. |
| D775,658 S | 1/2017 | Luo et al. |
| D776,126 S | 1/2017 | Lai et al. |
| D776,130 S | 1/2017 | Contreras et al. |
| D776,680 S | 1/2017 | Bae et al. |
| D776,690 S | 1/2017 | Tsujimoto et al. |
| D776,702 S | 1/2017 | Huang et al. |
| D777,744 S | 1/2017 | Wang et al. |
| D779,504 S | 2/2017 | Cabrera, Jr. et al. |
| D779,533 S | 2/2017 | Liu |
| D780,785 S | 3/2017 | Hansen et al. |
| D780,799 S | 3/2017 | Mehring et al. |
| D781,299 S | 3/2017 | Yun et al. |
| D783,641 S | 4/2017 | Elston et al. |
| D783,652 S | 4/2017 | Guan et al. |
| D784,363 S | 4/2017 | Fleming et al. |
| D784,400 S | 4/2017 | Joi |
| 9,619,984 B2 | 4/2017 | Donovan et al. |
| D786,932 S | 5/2017 | Kim et al. |
| D795,927 S | 5/2017 | Bischoff et al. |
| D790,581 S | 6/2017 | Chaudhri et al. |
| D791,806 S | 7/2017 | Brewington et al. |
| D794,047 S | 8/2017 | Gandhi et al. |
| D795,292 S | 8/2017 | Loosli et al. |
| D795,919 S | 8/2017 | Bischoff et al. |
| D796,535 S | 9/2017 | Gaur et al. |
| D796,540 S | 9/2017 | McLean et al. |
| D797,131 S | 9/2017 | Mizono et al. |
| D797,772 S | 9/2017 | Mizono et al. |
| D800,747 S | 10/2017 | Lee et al. |
| D800,752 S | 10/2017 | Hersh et al. |
| 9,778,830 B1 * | 10/2017 | Dubin ............... A63F 13/65 |
| D803,233 S | 11/2017 | Wilberding |
| D803,241 S | 11/2017 | Mizono et al. |
| D803,242 S | 11/2017 | Mizono et al. |
| D805,548 S | 12/2017 | King et al. |
| D806,114 S | 12/2017 | Kim et al. |
| 9,838,602 B2 | 12/2017 | Duran et al. |
| D807,376 S | 1/2018 | Mizono et al. |
| D809,522 S | 2/2018 | Mizono et al. |
| D810,116 S | 2/2018 | McLean et al. |
| 9,898,175 B2 | 2/2018 | Fiedler |
| D815,144 S | 4/2018 | Feng et al. |
| D817,337 S | 5/2018 | Wei |
| D817,357 S | 5/2018 | Barajas et al. |
| D818,000 S | 5/2018 | Lee et al. |
| D819,047 S | 5/2018 | Bates et al. |
| D819,075 S | 5/2018 | Tsuji et al. |
| 9,979,862 B1 | 5/2018 | Xiong et al. |
| D821,407 S | 6/2018 | Wilberding |
| D821,410 S | 6/2018 | Vinna et al. |
| D821,441 S | 6/2018 | Wilberding et al. |
| D821,443 S | 6/2018 | Jang et al. |
| D823,867 S | 7/2018 | Berlow |
| D823,891 S | 7/2018 | Lupei et al. |
| D824,416 S | 7/2018 | Memmelaar, Jr. et al. |
| D824,926 S | 8/2018 | De La Garza |
| D831,673 S | 10/2018 | O'Rourke et al. |
| 10,133,443 B2 | 11/2018 | Von Dehsen et al. |
| 10,145,577 B2 | 12/2018 | Bruck et al. |
| D837,237 S | 1/2019 | Fraser et al. |
| D841,659 S | 2/2019 | Mehta et al. |
| D842,867 S | 3/2019 | Jedrzejowicz et al. |
| D842,874 S | 3/2019 | Tashiro et al. |
| D842,891 S | 3/2019 | MacLean et al. |
| D843,398 S | 3/2019 | Stewart et al. |
| D844,668 S | 4/2019 | Lee et al. |
| D849,030 S | 5/2019 | Shook et al. |
| 10,281,507 B2 | 5/2019 | Schuh et al. |
| 10,386,999 B2 | 8/2019 | Burns et al. |
| D868,797 S | 12/2019 | Blum et al. |
| 2002/0049979 A1 | 4/2002 | White et al. |
| 2002/0116120 A1 | 8/2002 | Ruiz et al. |
| 2004/0113770 A1 | 6/2004 | Falk et al. |
| 2004/0177149 A1 | 9/2004 | Zullo et al. |
| 2004/0260427 A1 | 12/2004 | Wimsatt |
| 2005/0046723 A1 | 3/2005 | Bean et al. |
| 2005/0104958 A1 | 5/2005 | Egnal et al. |
| 2005/0289615 A1 | 12/2005 | Nishitani |
| 2006/0288392 A1 | 12/2006 | Fleming |
| 2007/0024706 A1 | 2/2007 | Brannon |
| 2007/0025688 A1 | 2/2007 | Pejhan |
| 2007/0033632 A1 | 2/2007 | Baynger et al. |
| 2008/0088706 A1 | 4/2008 | Girgensohn et al. |
| 2008/0174570 A1 | 7/2008 | Jobs et al. |
| 2008/0181498 A1 | 7/2008 | Swenson et al. |
| 2008/0263468 A1 | 10/2008 | Cappione et al. |
| 2009/0002157 A1 | 1/2009 | Donovan et al. |
| 2009/0002492 A1 | 1/2009 | Velipasalar et al. |
| 2009/0021583 A1 | 1/2009 | Salgar et al. |
| 2009/0075694 A1 | 3/2009 | Kim et al. |
| 2009/0164439 A1 * | 6/2009 | Nevins ............... G06F 16/2477 |
| 2009/0178007 A1 | 7/2009 | Matas et al. |

(56) References Cited

U.S. PATENT DOCUMENTS

| | | |
|---|---|---|
| 2009/0220206 A1 | 9/2009 | Kisliakov |
| 2009/0284601 A1 | 11/2009 | Eledath |
| 2009/0288011 A1 | 11/2009 | Piran et al. |
| 2010/0061446 A1 | 3/2010 | Hands et al. |
| 2010/0124274 A1 | 5/2010 | Cheok et al. |
| 2010/0131457 A1 | 5/2010 | Heimendinger |
| 2010/0321183 A1 | 12/2010 | Donovan et al. |
| 2011/0040760 A1 | 2/2011 | Fleishman et al. |
| 2011/0185269 A1 | 7/2011 | Finkelstein et al. |
| 2011/0199517 A1 | 8/2011 | Laberge et al. |
| 2011/0316697 A1 | 12/2011 | Krahnstoever et al. |
| 2012/0036480 A1 | 2/2012 | Warner et al. |
| 2012/0066608 A1 | 3/2012 | Sundermeyer et al. |
| 2012/0130513 A1 | 5/2012 | Hao et al. |
| 2012/0317299 A1 | 12/2012 | Sathianathan et al. |
| 2012/0323930 A1 | 12/2012 | Kennberg et al. |
| 2013/0016122 A1 | 1/2013 | Bhatt et al. |
| 2013/0067365 A1 | 3/2013 | Shrufi et al. |
| 2013/0072308 A1 | 3/2013 | Peck et al. |
| 2013/0090767 A1 | 4/2013 | Bruck et al. |
| 2013/0091432 A1* | 4/2013 | Shet ............... G06F 16/532 715/719 |
| 2013/0129307 A1* | 5/2013 | Choe ............... G06F 16/738 386/227 |
| 2013/0132908 A1 | 5/2013 | Lee et al. |
| 2013/0145270 A1 | 6/2013 | Piran et al. |
| 2013/0173064 A1 | 7/2013 | Fadell et al. |
| 2013/0179836 A1 | 7/2013 | Han et al. |
| 2013/0185150 A1 | 7/2013 | Crum |
| 2013/0211783 A1 | 8/2013 | Fisher et al. |
| 2013/0251150 A1 | 9/2013 | Chassagne |
| 2013/0263034 A1 | 10/2013 | Bruck et al. |
| 2013/0268129 A1 | 10/2013 | Fadell et al. |
| 2013/0282421 A1* | 10/2013 | Graff ............... H04L 63/08 705/7.18 |
| 2013/0311909 A1 | 11/2013 | Howard et al. |
| 2013/0325332 A1 | 12/2013 | Rhee et al. |
| 2013/0328997 A1 | 12/2013 | Desai |
| 2013/0332886 A1 | 12/2013 | Cranfill et al. |
| 2014/0012574 A1 | 1/2014 | Pasupalak et al. |
| 2014/0013243 A1 | 1/2014 | Flynn, III et al. |
| 2014/0026061 A1 | 1/2014 | Kim et al. |
| 2014/0033071 A1 | 1/2014 | Gruber et al. |
| 2014/0043485 A1 | 2/2014 | Bateman et al. |
| 2014/0050455 A1 | 2/2014 | Ni et al. |
| 2014/0064738 A1 | 3/2014 | Chen et al. |
| 2014/0098247 A1 | 4/2014 | Rao et al. |
| 2014/0189518 A1 | 7/2014 | Kim et al. |
| 2014/0189586 A1 | 7/2014 | Waldman et al. |
| 2014/0218517 A1 | 8/2014 | Kim et al. |
| 2014/0222424 A1 | 8/2014 | Hartford et al. |
| 2014/0232873 A1* | 8/2014 | Meganathan ......... G07C 1/00 348/152 |
| 2014/0277795 A1 | 9/2014 | Matsuoka et al. |
| 2014/0313377 A1 | 10/2014 | Hampton |
| 2014/0333530 A1 | 11/2014 | Agnetta et al. |
| 2014/0333776 A1 | 11/2014 | Dedeoglu et al. |
| 2014/0365019 A1 | 12/2014 | Gourley et al. |
| 2014/0375819 A1 | 12/2014 | Larsen et al. |
| 2015/0023650 A1 | 1/2015 | Austin et al. |
| 2015/0035987 A1 | 2/2015 | Fernandez |
| 2015/0058709 A1* | 2/2015 | Zaletel ............... H04L 65/604 715/202 |
| 2015/0058730 A1* | 2/2015 | Dubin ............... A63F 13/327 715/719 |
| 2015/0097689 A1 | 4/2015 | Logue et al. |
| 2015/0113432 A1 | 4/2015 | Jung et al. |
| 2015/0113461 A1 | 4/2015 | Kasten et al. |
| 2015/0117513 A1 | 4/2015 | Sarafa et al. |
| 2015/0143239 A1 | 5/2015 | Birkbeck et al. |
| 2015/0173846 A1 | 6/2015 | Schneider et al. |
| 2015/0193127 A1 | 7/2015 | Chai et al. |
| 2015/0208205 A1* | 7/2015 | Chan ............... H04L 67/1095 709/217 |
| 2015/0227196 A1 | 8/2015 | Fujii et al. |
| 2015/0242404 A1 | 8/2015 | Underwood, IV et al. |
| 2015/0248270 A1 | 9/2015 | Lang |
| 2015/0248275 A1 | 9/2015 | Gallo et al. |
| 2015/0269643 A1 | 9/2015 | Riley et al. |
| 2015/0287310 A1 | 10/2015 | Deliuliis et al. |
| 2015/0310280 A1 | 10/2015 | Bentley et al. |
| 2015/0350265 A1 | 12/2015 | O'Brien |
| 2015/0350611 A1 | 12/2015 | Pearson et al. |
| 2016/0004390 A1 | 1/2016 | Laska et al. |
| 2016/0026329 A1 | 1/2016 | Fadell et al. |
| 2016/0034574 A1 | 2/2016 | Kang |
| 2016/0041724 A1 | 2/2016 | Kirkby et al. |
| 2016/0043905 A1 | 2/2016 | Fiedler |
| 2016/0086038 A1 | 3/2016 | Scanlon et al. |
| 2016/0088326 A1 | 3/2016 | Solomon et al. |
| 2016/0105747 A1 | 4/2016 | Cheng et al. |
| 2016/0105847 A1 | 4/2016 | Smith et al. |
| 2016/0110064 A1 | 4/2016 | Shapira |
| 2016/0139671 A1 | 5/2016 | Jun et al. |
| 2016/0139747 A1 | 5/2016 | Kocienda et al. |
| 2016/0147406 A1 | 5/2016 | Yi |
| 2016/0155315 A1 | 6/2016 | McElhinney et al. |
| 2016/0220743 A1 | 8/2016 | Guthrie et al. |
| 2016/0260414 A1 | 9/2016 | Yang |
| 2016/0335139 A1 | 11/2016 | Hurley et al. |
| 2016/0349936 A1 | 12/2016 | Cho et al. |
| 2016/0358436 A1 | 12/2016 | Wautier et al. |
| 2016/0364114 A1 | 12/2016 | Von Dehsen et al. |
| 2017/0003720 A1 | 1/2017 | Robinson et al. |
| 2017/0010790 A1 | 1/2017 | Glover et al. |
| 2017/0017376 A1 | 1/2017 | Han et al. |
| 2017/0017384 A1 | 1/2017 | Lee |
| 2017/0017392 A1 | 1/2017 | Castaneda et al. |
| 2017/0034430 A1 | 2/2017 | Fu et al. |
| 2017/0060399 A1 | 3/2017 | Hough et al. |
| 2017/0089739 A1 | 3/2017 | Gallo |
| 2017/0126975 A1 | 5/2017 | Duran et al. |
| 2017/0186079 A1 | 6/2017 | Kim et al. |
| 2017/0201850 A1 | 7/2017 | Raleigh et al. |
| 2017/0207949 A1 | 7/2017 | Donovan et al. |
| 2017/0286913 A1 | 10/2017 | Liu et al. |
| 2017/0308390 A1 | 10/2017 | Venis et al. |
| 2017/0329511 A1 | 11/2017 | Ueno et al. |
| 2017/0336920 A1 | 11/2017 | Chan et al. |
| 2017/0357439 A1 | 12/2017 | Lemay et al. |
| 2018/0018081 A1 | 1/2018 | Dattilo-Green et al. |
| 2018/0019889 A1 | 1/2018 | Burns et al. |
| 2018/0048819 A1 | 2/2018 | Duran et al. |
| 2018/0101297 A1 | 4/2018 | Yang et al. |
| 2018/0113577 A1 | 4/2018 | Burns et al. |
| 2018/0129380 A1 | 5/2018 | Suh et al. |
| 2018/0136819 A1 | 5/2018 | Lee |
| 2018/0144615 A1 | 5/2018 | Kinney et al. |
| 2018/0187954 A1 | 7/2018 | Yang et al. |
| 2018/0311582 A1 | 11/2018 | Gerhard et al. |

OTHER PUBLICATIONS

Blatner, WiCam: Wireless iPhone Camera, Rochester Institute of Technology, Spring 2010, 1 pg, www.ce/rit/edu/research/projects/2010_spring/WICam/index.html.

TechBitar, Bluetooth-conrolled Pan/Tilt Servo Platform Using Android as Remote, downloaded Jul. 15, 2015, 9 pgs, www.techbitar.com/bluetooth-controlled-pan-tilt-servo.html.

EyeSpyFX, Viewer for D-Link Cams, IOS Version 3.1.2, 2013, 19 pgs, www.eyespyfx.com/dlink.php.

Netgear, Home Security Systems / Security Cameras / Arlo, downloaded Jul. 15, 2015, 6 pgs, arlo.com/en-us.

CNET, Netgear Arlo Smart Home Security review, downloaded Jul. 15, 2015, 5 pgs, www.cnet.com/products/netgear-arlo-smart-home-security-kit.

Arlo on the App Store on iTunes, downloaded Jul. 15, 2015, 2 pgs, itunes.apple.com/us/app/arlo/id925911312?mt=8.

AppCrawlr, ipCam FC—IP camera surveillance (ios), downloaded Jul. 15. 2015, 2 pgs, appcrawlr.com/ios/ipcam-fc-ip-camera-surveillance.

(56) References Cited

OTHER PUBLICATIONS

Siml, ipCamFC—IP camera surveillance, downloaded Jul. 15, 2015, 2 pgs, itunes.apple.com/us/app/ipcam-fc-ip-camera-surveillance/id548480721?mt=8.
D-Link Corporation, mydlink Lite, downloaded Jul. 15, 2015, 2 pgs, itunes.apple.com/us/app/mydlink-lite/id372571229?mt=8.
D-Link Corporation, mydlink+, downloaded Jul. 15, 2015, 2 pgs, itunes.apple.com/us/app/mydlink/id479832296?mt=8.
D-Link Corporation, mydlink App, downloaded Jul. 15, 2015, 4 pgs, www.mydlink.com/apps.
"Dropcam", posted at play.google.com, Aug. 20, 2015, [site visited Jan. 17, 2017]. Available from Internet: <https://play.google.com/store/apps/details?id=com.dropcam.android>.
Wollerton, Turn your old iPod into a security camera for free, CNET, Dec. 17, 2014, 5 pgs, www.cnet.com/how-to/turn-your-old-ipod-into-a-security-camera-for-free.
Nunal, Paul, "Best Android apps for videographers and video editors", posted at androidauthority.com, May 3, 2012, (site visited Jun. 3, 2016), Available from Internet: http://www.androidauthority.com/best-android-apps-videograhers-video-videography-80338, 4 pgs.
Fitzer, Michael, "Editing Effects Software to Make Your Video Sing", posted at videomaker.com, May 3, 2012, (site visited Jun. 3, 2016) Available from Internet: https://www.videomaker.com/article/c3/15366-editing-effects-software-to-make-your-video-sing), 3 pgs.
Features > Button Bars, posted at webbookbinder.com, May 8, 2011, [site visited Sep. 13, 2016]. Available from Internet: <http://www.webbookbinder.com/Website/020New/buttonbars.asp>.
"Foto de archivo", posted at es.123rf.com, Apr. 23, 2015, [site visited Jan. 17, 2017]. Available from Internet: <http://es.123rf.com/photo_37507296_diseno-transparente-plantilla-de-interfaz-de-usuario-movil-disposicion-para-el-movil-o-pagina-web-ii.html>.
Hoang, Le, "YouTube: How to Find Previously Watched Videos", posted at tech-recipes.com, Feb. 15, 2011, [site visited Jan. 17, 2017]. Available from Internet: <http://www.tech-recipes.com/rx/11104/youtube-how-to-find-all-the-previously-watched-videos>.
Stock Vector—Web Site Interface Icons // Button Bar Series, posted at alamy.com, Aug. 2, 2010, [site visited Sep. 13, 2016]. Available from Internet: <http://www.alamy.com/stock-photo-web-site-interface-icons-button-bar-series-64003090.html>.
Visavadia, Jay, "i0S7 Wireframe", posted at dribbble.com, Dec. 19, 2013, [site visited Sep. 14, 2016]. Available from Internet: <https://dribbble.com/shots/1352315-i057-Wireframe>.
"Wireframe toolkit for Keynote and Powerpoint", posted at raiziabs.com, Jun. 29, 2011, [site visited Jan. 17, 2017]. Available from Internet: <https://www.raizlabs.com/blog/2011/06/wireframe-toolkit-for-keynote-and-powerpoint>.
Holly, Russell, "Nest Aware, and why the Nest Cam subscription makes sense", posted at androidcentral.com, Jul. 3, 2015, [site visited Sep. 30, 2016]. Available from Internet: <http://www.androidcentral.com/nest-aware-and-why-nest-cam-subscription-makes-sense>.
Vector Video Player, posted at shutterstock.com, Aug. 21, 2014, [site visited Mar. 17, 2017]. Available from Internet: <https://www.shutterstock.com/fr/image-vector/vector-audio-video-player-web-101573365>.
"Mini UI toolkit PSD Download", posted at freepsds123.com, Jun. 21, 2014, [site visited Mar. 17, 2017]. Available from Internet: <http://www.freepsds123.com/2014/06/21/min i-u i-toolkit-psd-down load>.
"Octopussy (1983)—Cancelled" posted at mi6-hq.com, Oct. 2, 2014, [site visited Mar. 17, 2017]. Available from Internet: <https://www.mi6-hq.com/sections/games/octopussy_I 983>.
Metal fence on a dark background, [online], uploaded on Feb. 28, 2013, retrieved on Aug. 8, 2018. Retrieved from, <URL: https://stockfresh.conn/innage/2626471/nnetal-fence-on-a-dark-background>, 1 page.
Google image search of Nest Icon, [online], images uploaded before Jul. 12, 2016, retrieved on Aug. 8, 2018. Retrieved from, <URL: https://www.google.conn/search?q=nest+icon&rlz=1C1GCEBenUS799US799&biw=1920&bih=1109&source=Int&tbs=cdr%3A1%2Ccdnnin%3A%2Ccd nnax%3A7%2>, 2 pages.
U. A. Lipton, H. Fujiyoshi, and R. S. Patil, "Moving Target Classification and Tracking from Real-Time Video," Proc. IEEE WACV '98 , Princeton, N.J., 1998, pp. 8-14 (Year: 1998).
Google, LLC, ISR/WO, PCT/US2018/020919, Jun. 11, 2018, 26 pgs.
Tenon, Biff. "Abstract background with animation . . . " shutterstock.conn. Date not available. Accessed Sep. 1, 2018. Available online at URL: <https://www.shutterstock.conn/video/clip-24321839-stock-footage-abstract-background-with-aninnation-of-flicker-and-nnoving-patterns-fronn-clear-colorfui-circles.htnnl>.
"Pulsating Animation." dribbble.com. Published Jan. 15, 2017. Accessed Apr. 8, 2019. Available online at URL: <https://dribbble.com/shots /3218158-Pulsating-animation>.(Year: 2017), 1 pg.
Baer, Drake. "Apple Has Reportedly . . . " Published Apr. 12, 2017. Accessed Apr. 8, 2019. Available online at URL: <https://medium.com/ thrive-global/apple-has-reportedly-stopped-banning-this-mindfulness-app-from-the-app-store-e712e83d90e5> (Year: 2017), 2 pgs.
Mooij, Andre. "Tap to Begin." dribbble.com. Published Nov. 22, 2016. Accessed Apr. 8, 2019. Available online at URL: <https://dribbble.conn/shots/3113672-Tap-to-Begin> (Year: 2016), 1 pg.
Paul Viola and Michael Jones, "Rapid Object Detection using a Boosted Cascade of Simple Features", Conference on Computer Vision and Pattern Recognition "CVPR" 2001 (Year: 2001), 9 pgs.
Google Inc., International Search Report and Written Opinion, PCT/US2016/037417, dated Sep. 15, 2016, 11 pgs.
Google LLC, International Preliminary Report on Patentability, PCT/US2016/037417, dated Dec. 19, 2017, 8 pgs.

\* cited by examiner

Client Interface Server 556

Camera Interface Server 558

1400

1402 — In an application executing at a client device having one or more processors and memory storing one or more programs for execution by the one or more processors: receive a plurality of video feeds, each video feed of the plurality of video feeds corresponding to a respective remote camera of a plurality of remote cameras, wherein the video feeds are received concurrently by the device from a server system communicatively coupled to the remote cameras

1404 — Display a first user interface, the first user interface including a plurality of user interface objects, each user interface object of the plurality of user interface objects being associated with a respective remote camera of the remote cameras

1406 — Each respective remote camera of the plurality of remote cameras has a respective field of view, and a user interface object associated with a respective remote camera has a virtual field of view relatively smaller than the respective field of view of the associated respective remote camera

1408 — Display in each user interface object of the plurality of user interface objects the video feed corresponding to the respective remote camera with which the user interface object is associated, wherein at least one of the video feeds is displayed with cropping

1410 — Displaying in each user interface object of the plurality of user interface objects the video feed corresponding to the respective remote camera with which the user interface object is associated comprises: displaying, in a respective user interface object, periodically refreshed still images corresponding to frames from the corresponding video feed

Figure 14A

Responsive to a request from a client device, transmit contents of the history to the client device for display in a desktop browser application at the client device, wherein the contents of the history is formatted for display in the desktop browser application as a camera history timeline ~1526

The camera history timeline comprises: an event bar corresponding to the camera event, wherein a length of the event bar reflects the duration of the camera event; and one or more alert event indicators proximate to the event bar, each of the alert event indicators corresponding to a respective alert event associated with the camera event, wherein each respective alert event indicator has a respective visually distinctive display characteristic associated with the corresponding respective alert event ~1528

The alert event indicators are ordered in accordance with the chronological order of the alert events ~1530

Responsive to a request from a client device, transmit contents of the history to the client device for display in a mobile application at the device, wherein the contents of the history is formatted for display in the mobile application as a scrollable camera history list, the scrollable camera history list including one or more chronologically ordered event identifiers, each event identifier corresponding to a respective camera event ~1532

The scrollable camera history list comprises: an event identifier corresponding to the camera event; and one or more alert event indicators, each of the alert event indicators corresponding to a respective alert event associated with the camera event, wherein each respective alert event indicator has a respective visually distinctive display characteristic associated with the corresponding respective alert event ~1534

The alert event indicators are ordered in accordance with the chronological order of the alert events ~1536

Figure 15B

For the displayed event identifier, display one or more alert event icons, each alert event icon corresponding to a respective alert event triggered in response to a respective event corresponding to the displayed event identifier ⊢1820

Within the displayed event identifier, the alert event icons are visually distinctive from each other based on icon color ⊢1822

Within the displayed event identifier, the alert event icons are visually distinctive from each other based on icon shape ⊢1824

Within the displayed event identifier, the alert event icons are ordered in accordance with a chronological order in which the triggered alert events were triggered in response to the respective event corresponding to the displayed event identifier ⊢1826

Display in the displayed event identifier information regarding a most recently triggered alert event of the triggered alert events ⊢1828

Figure 18B

METHODS AND SYSTEMS FOR PRESENTING A CAMERA HISTORY

RELATED APPLICATIONS

This application is a continuation of U.S. patent application Ser. No. 15/174,847 titled "Methods and Systems for Presenting a Camera History," filed Jun. 6, 2016, which is a continuation of U.S. patent application Ser. No. 14/739,427 titled "Methods and Systems for Presenting a Camera History," filed Jun. 15, 2015 and issued as U.S. Pat. No. 9,361,521 on Jun. 7, 2016, which is a continuation of U.S. patent application Ser. No. 14/738,930 titled "Methods and Systems for Presenting Multiple Live Video Feeds in a User Interface," filed Jun. 14, 2015 and issued as U.S. Pat. No. 9,361,011 on Jun. 7, 2016, each of which is hereby incorporated by reference herein in its entirety.

This application is related to the following applications, which are hereby incorporated by reference herein in their entirety:

U.S. patent application Ser. No. 14/738,928, titled "Methods and Systems for Smart Home Automation Using a Multifunction Status and Entry Point Icon," filed Jun. 14, 2015; and U.S. patent application Ser. No. 14/739,412, titled "Methods and Systems for Presenting Alert Event Indicators," filed Jun. 15, 2015.

TECHNICAL FIELD

The disclosed implementations relate generally to video monitoring, including, but not limited to, monitoring and reviewing video feeds and histories of videos saved from the video feeds.

BACKGROUND

The advancement of internet and mobile technologies has enabled the adoption of remote video surveillance by users. Users can now monitor an area under video surveillance using a website or a mobile application. Such websites or mobile apps typically allow a user to view live video and/or saved video recordings, but otherwise provide little or no additional information regarding the videos. Furthermore, the user interfaces for viewing these live videos or saved video recordings occupy large amounts of display space and have a user control flow that is poor at maintaining context for the user. Thus, more efficient, informative, and user-friendly presentations of live and saved video surveillance are needed.

SUMMARY

Accordingly, there is a need for presentations of live and/or saved video with a more efficient user control flow and more useful information. Such methods optionally complement or replace conventional methods for presenting live and/or saved video from video streams.

In accordance with some implementations, a method includes, in an application executing at a client device having one or more processors and memory storing one or more programs for execution by the one or more processors: receiving a plurality of video feeds, each video feed of the plurality of video feeds corresponding to a respective remote camera of a plurality of remote cameras, where the video feeds are received concurrently by the device from a server system communicatively coupled to the remote cameras; displaying a first user interface, the first user interface including a plurality of user interface objects, each user interface object of the plurality of user interface objects being associated with a respective remote camera of the remote cameras; and displaying in each user interface object of the plurality of user interface objects the video feed corresponding to the respective remote camera with which the user interface object is associated, where at least one of the video feeds is displayed with cropping.

In accordance with some implementations, a method includes, at a server system having one or more processors and memory storing one or more programs for execution by the one or more processors: receiving a video feed from a camera with an associated field of view; receiving one or more alert events; identifying as a camera event a portion of the video feed associated in time with the one or more alert events; determining a start time and a duration of the camera event; determining a chronological order of the alert events; and saving, in a history associated with the camera, information associated with the camera event, including: a video clip and/or a frame from the portion of the video feed, and the chronological order of the alert events.

In accordance with some implementations, a method includes, at a client device having one or more processors and memory storing one or more programs for execution by the one or more processors: displaying a video feed from a camera or a frame from the video feed; and concurrently with displaying the video feed or the frame, displaying a camera history timeline, including: displaying a representation of a camera event associated with one or more alert events in the camera history timeline as a bar overlaid on the event history timeline, the event bar having a length reflecting a duration of the camera event; and displaying, proximate to the event bar, one or more alert event indicators, each of the alert event indicators corresponding to a respective alert event of the alert events associated with the camera event, where each respective alert event indicator has a respective visually distinctive display characteristic associated with the corresponding respective alert event.

In accordance with some implementations, a method includes, at a client device having one or more processors and memory storing one or more programs for execution by the one or more processors: displaying a camera history timeline, including: displaying a chronologically ordered sequence of event identifiers, each event identifier corresponding to a respective camera event, each respective camera event associated with one or more respective alert events; and displaying, for a respective event identifier, one or more alert event indicators, each of the alert event indicators corresponding to an alert event associated with the camera event corresponding to the respective event identifier, each of the alert event indicators displayed with a visually distinctive display characteristic associated with a corresponding alert event.

In accordance with some implementations, a method includes, at a client device having one or more processors and memory storing one or more programs for execution by the one or more processors, in an application executing on the client device: displaying a camera event history provided by a remote server system, where the camera event history is presented as a chronologically-ordered set of event identifiers, each event identifier corresponding to a respective event for which a remote camera has captured an associated video; receiving a user selection of a displayed event identifier; and in response to receiving the user selection of the displayed event identifier: expanding the selected event identifier into a video player window, the video player window consuming a portion of the displayed camera event history; and playing, in the video player window, the captured video associated with the selected event identifier; and in response to terminating playback of the captured video associated with the selected event identifier or user de-selection of the displayed event identifier, collapsing the video player window into the selected event identifier thereby stopping the playing of the captured video associated with the selected event identifier.

In accordance with some implementations, a system includes a plurality of electronic devices, wherein at least one of the plurality of electronic devices has one or more processors and memory storing one or more programs for execution by the processor, the one or more programs including instructions for performing the operations of the method described above. In accordance with some implementations, an electronic device has one or more processors and memory storing one or more programs for execution by the processor, the one or more programs including instructions for performing the operations of the method described above. In accordance with some implementations, a computer readable storage medium has stored therein one or more programs having instructions which, when executed by an electronic device having one or more processors, cause the electronic device to perform the operations of the method described above.

Thus, computing systems are provided with more efficient methods for presenting live and/or saved video and related information, thereby increasing the effectiveness, efficiency, and user satisfaction with such systems. Such methods may complement or replace conventional methods for presenting live and/or saved video.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described implementations, reference should be made to the Description of Implementations below, in conjunction with the following drawings in which like reference numerals refer to corresponding parts throughout the figures.

FIGS. 14A-14E illustrate a flowchart diagram of a method for presenting multiple video feeds in accordance with some implementations.

FIGS. 15A-15B illustrate a flowchart diagram of a method for saving alert events in a camera history in accordance with some implementations.

FIGS. 18A-18B illustrate a flowchart diagram of a method for presenting a camera history in accordance with some implementations.

Like reference numerals refer to corresponding parts throughout the several views of the drawings.

DESCRIPTION OF IMPLEMENTATIONS

Figure 1:
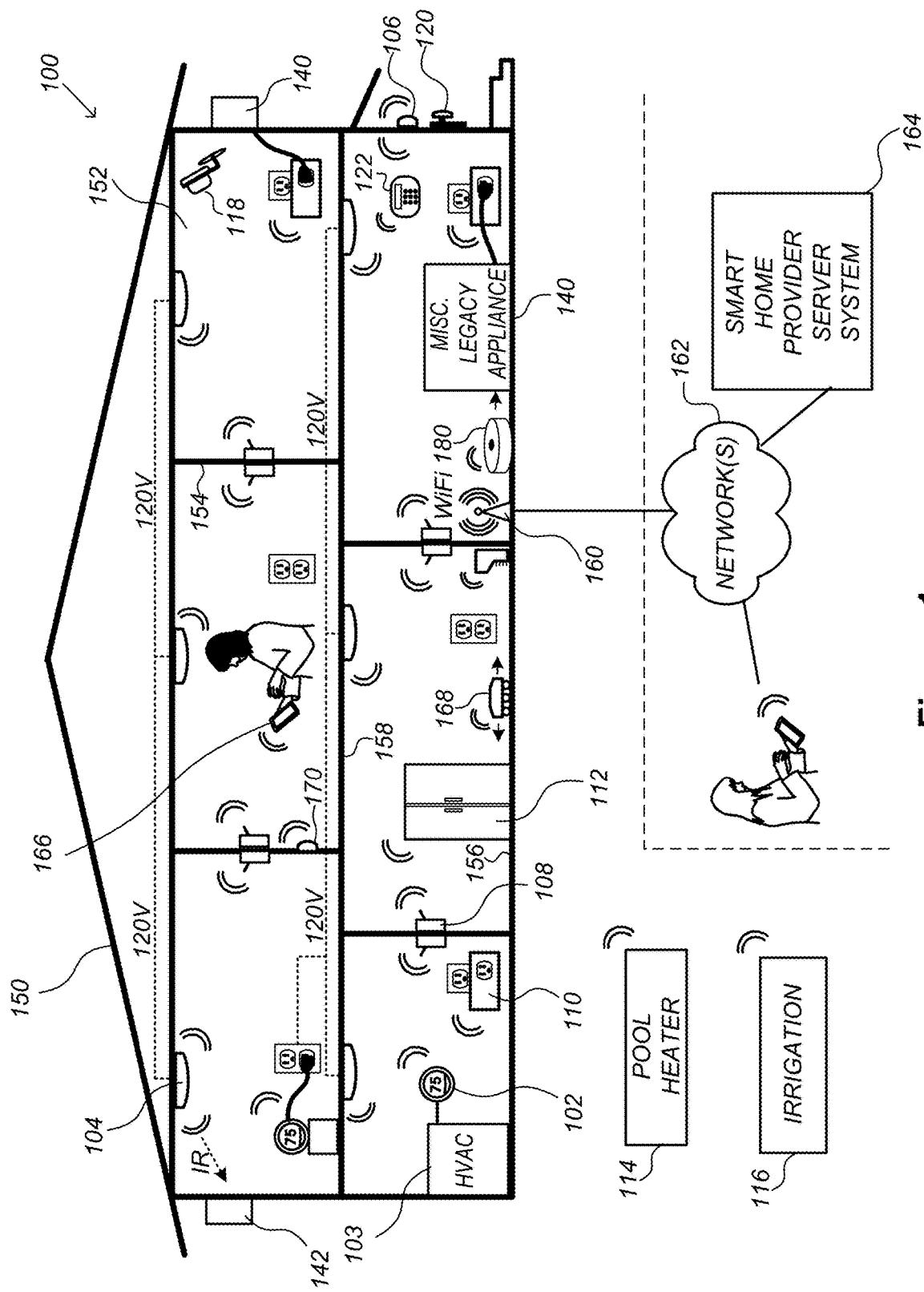
FIG. 1 is an example smart home environment, in accordance with some implementations.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, one or more devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. In some implementations, cameras 118 also capture video when other conditions or hazards are detected, in order to provide visual monitoring of the smart home environment 100 when those conditions or hazards occur. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). For example, cameras 118 may additionally include one or more sensors (e.g., IR sensors, motion detectors), input devices (e.g., microphone for capturing audio), and output devices (e.g., speaker for outputting audio).

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may include one or more sound and/or vibration sensors for detecting abnormal sounds and/or vibrations. These sensors may be integrated with any of the devices described above. The sound sensors detect sound above a decibel threshold. The vibration sensors detect vibration above a threshold directed at a particular area (e.g., vibration on a particular window when a force is applied to break the window).

Conditions detected by the devices described above (e.g., motion, sound, vibrations, hazards) may be referred to collectively as alert events.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, and/or 122 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network(s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device.

Figure 2:
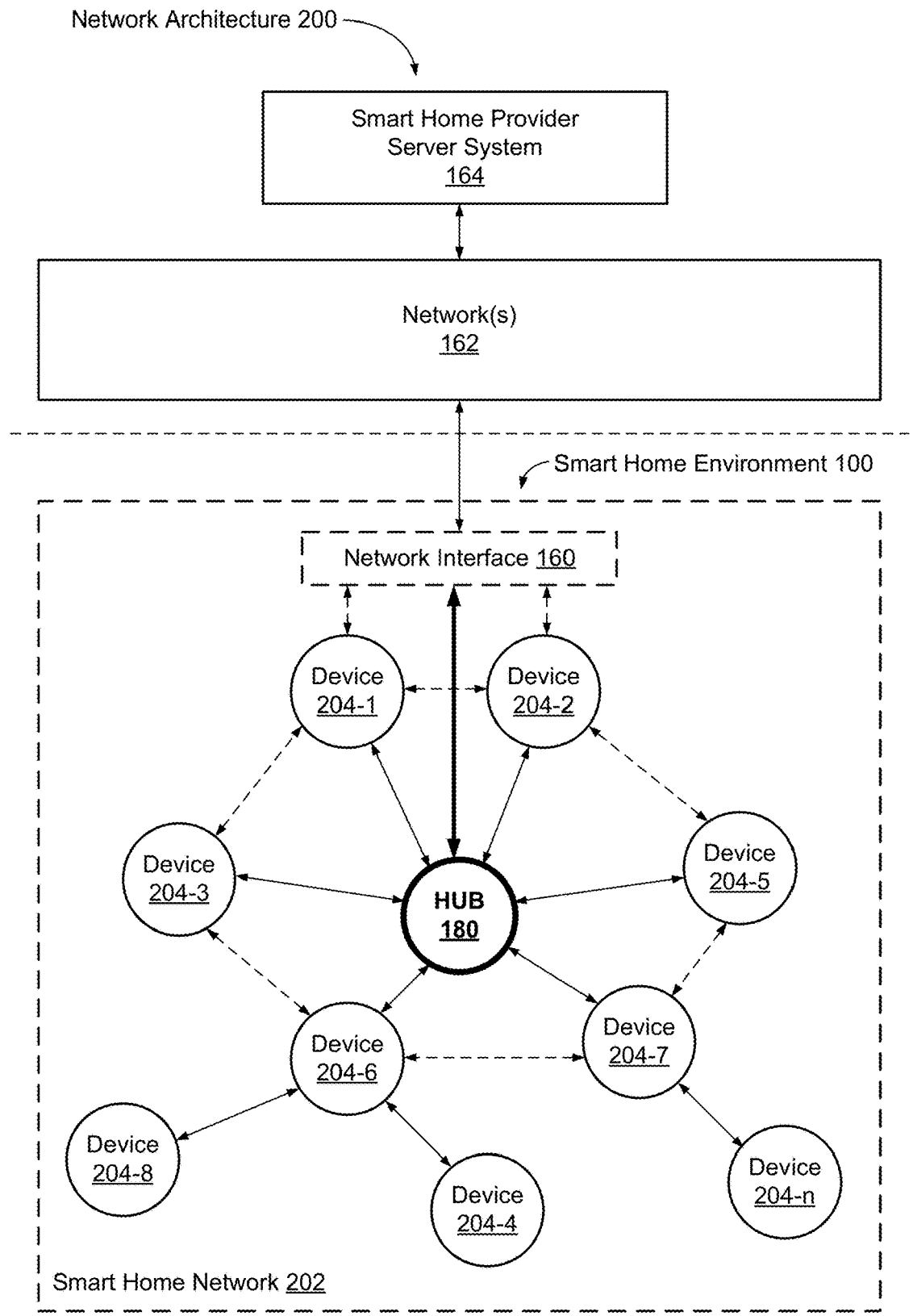
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, and/or 122) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
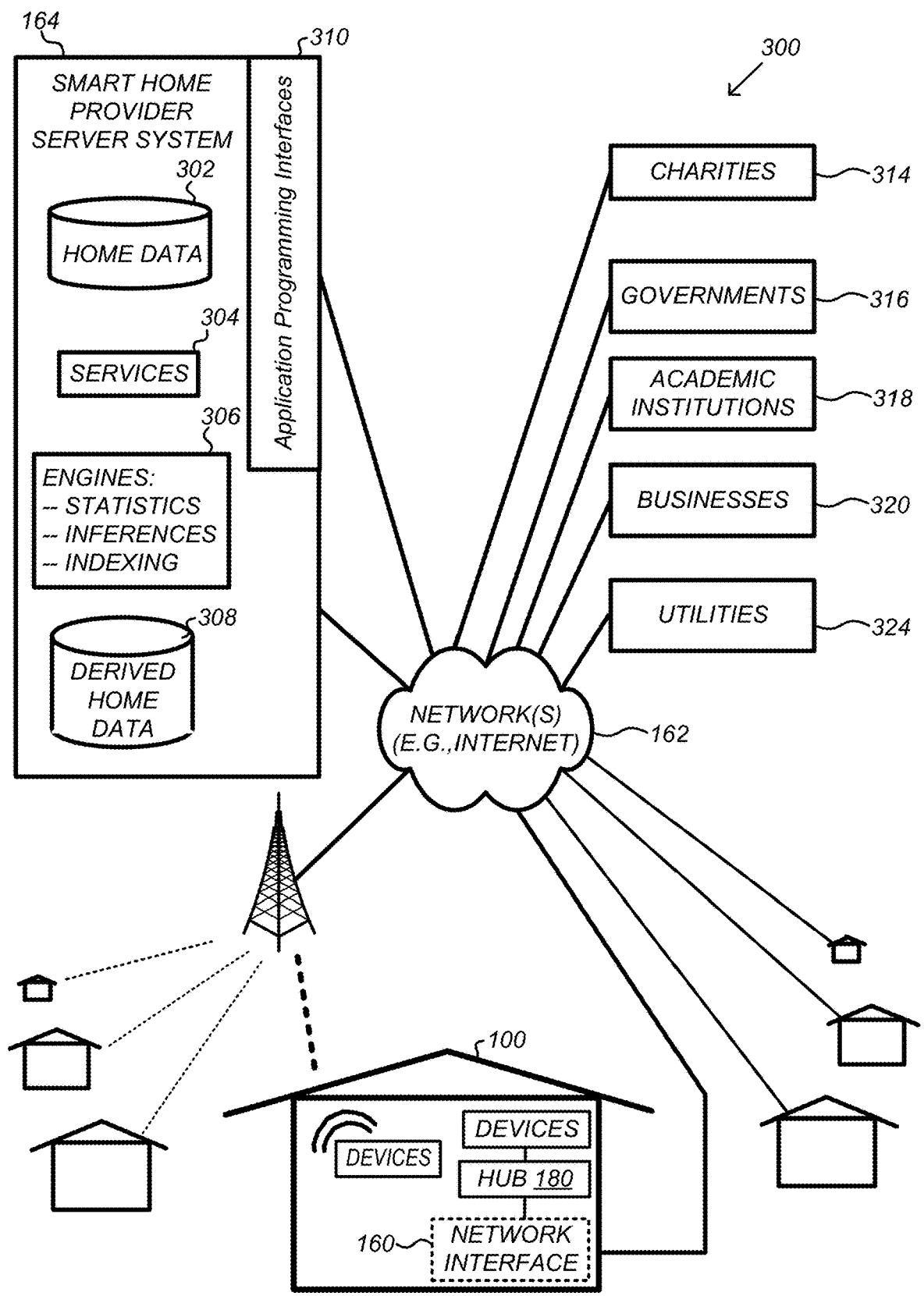
FIG. 3 illustrates a network-level view of an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment, targeting advertisements based on home data), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
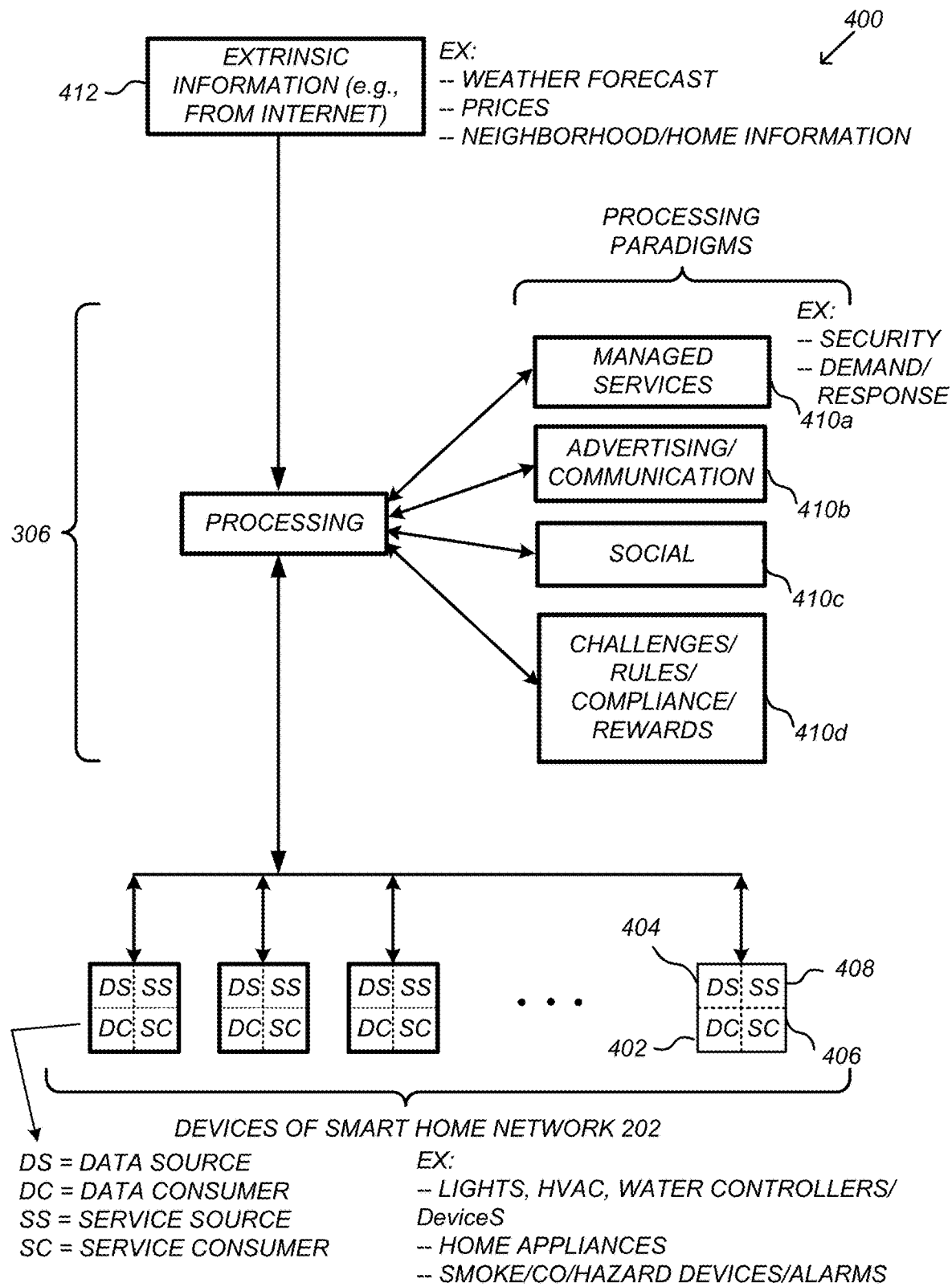
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5A:
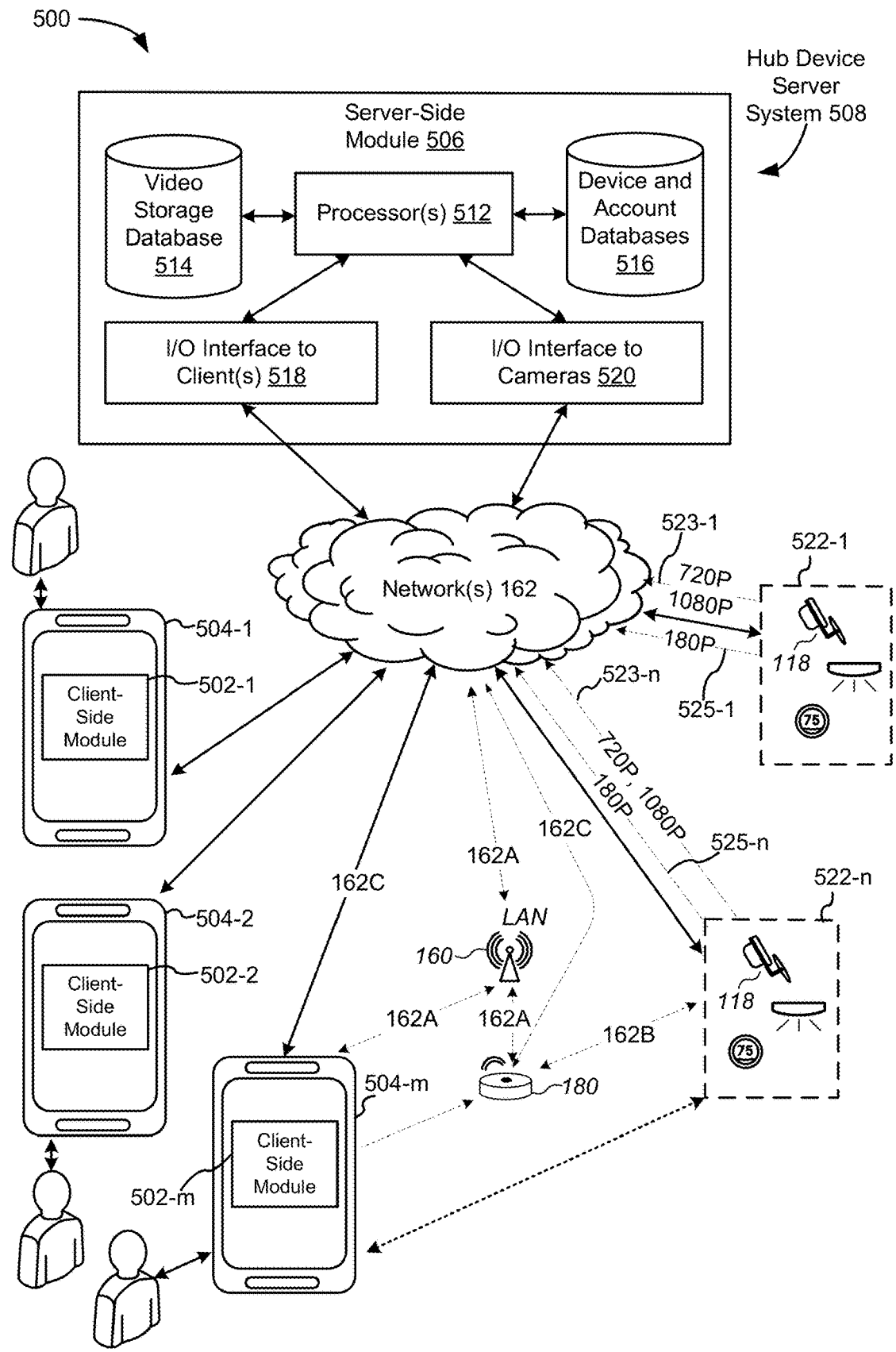
FIG. 5A is a representative operating environment in which a hub device server system interacts with client devices and hub devices communicatively coupled to local smart devices, in accordance with some implementations.

FIG. 5A illustrates a representative operating environment 500 in which a hub device server system 508 provides data processing for monitoring and facilitating review of alert events (e.g., motion events) in video streams captured by video cameras 118. As shown in FIG. 5A, the hub device server system 508 receives video data from video sources 522 (including cameras 118) located at various physical locations (e.g., inside homes, restaurants, stores, streets, parking lots, and/or the smart home environments 100 of FIG. 1). Each video source 522 may be bound to one or more user (e.g., reviewer) accounts, and the hub device server system 508 provides video monitoring data for the video source 522 to client devices 504 associated with the reviewer accounts. For example, the portable electronic device 166 is an example of the client device 504.

In some implementations, the smart home provider server system 164 or a component thereof serves as the hub device server system 508; the hub device server system 508 is a part or component of the smart home provider server system 164. In some implementations, the hub device server system 508 is a dedicated video processing server that provides video processing services to video sources and client devices 504 independent of other services provided by the hub device server system 508. An example of a video processing server is described below with reference to FIG. 5B.

In some implementations, each of the video sources 522 includes one or more video cameras 118 that capture video and send the captured video to the hub device server system 508 substantially in real-time. In some implementations, each of the video sources 522 optionally includes a controller device (not shown) that serves as an intermediary between the one or more cameras 118 and the hub device server system 508. The controller device receives the video data from the one or more cameras 118, optionally performs some preliminary processing on the video data, and sends the video data to the hub device server system 508 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the hub device server system 508.

In some implementations, a camera 118 of a video source 522 captures video at a first resolution (e.g., 720P and/or 1080P) and/or a first frame rate (24 frames per second), and sends the captured video to the hub device server system 508 at both the first resolution (e.g., the original capture resolution(s), the high-quality resolution(s) such as 1080P and/or 720P) and the first frame rate, and at a second, different resolution (e.g., 180P) and/or a second frame rate (e.g., 5 frames per second or 10 frames per second). For example, the camera 118 captures a video 523-1 at 720P and/or 1080P resolution (the camera 118 may capture a video at 1080P and create a downscaled 720P version, or capture at both 720P and 1080P). The video source 522 creates a second (or third), rescaled (and optionally at a different frame rate than the version 523-1) version 525-1 of the captured video at 180P resolution, and transmits both the original captured version 523-1 (i.e., 1080P and/or 720P) and the rescaled version 525-1 (i.e., the 180P version) to the hub device server system 508 for storage. In some implementations, the resealed version has a lower resolution, and optionally a lower frame rate, than the original captured video. The hub device server system 508 transmits the original captured version or the resealed version to a client 504, depending on the context. For example, the hub device server system 508 transmits the resealed version when transmitting multiple videos to the same client device 504 for concurrent monitoring by the user, and transmits the original captured version in other contexts. In some implementations, the hub device server system 508 downscales the original captured version to a lower resolution, and transmits the downscaled version.

In some other implementations, a camera 118 of a video source 522 captures video at a first resolution (e.g., 720P and/or 1080P) and/or a first frame rate, and sends the captured video to the hub device server system 508 at the first resolution (e.g., the original capture resolution(s); the high-quality resolution(s) such as 1080P and/or 720P) and first frame rate for storage. When the hub device server system 508 transmits the video to a client device, the hub device server system 508 may downscale the video to a second, lower resolution (e.g., 180P) and/or second, lower frame rate for the transmission, depending on the context. For example, the hub device server system 508 transmits the downscaled version when transmitting multiple videos to the same client device 504 for concurrent monitoring by the user, and transmits the original captured version in other contexts.

As shown in FIG. 5A, in accordance with some implementations, each of the client devices 504 includes a client-side module 502. The client-side module 502 communicates with a server-side module 506 executed on the hub device server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and camera control for any number of the video sources 522, including any number of control devices and the cameras 118.

In some implementations, the server-side module 506 includes one or more processors 512, a video storage database 514, device and account databases 516, an I/O interface to one or more client devices 518, and an I/O interface to one or more video sources 520. The I/O interface to one or more clients 518 facilitates the client-facing input and output processing for the server-side module 506. In some implementations, the I/O interface to clients 518 or a transcoding proxy computer (not shown) rescales (e.g., downscales) and/or changes the frame rate of video for transmission to a client 504. The databases 516 store a plurality of profiles for reviewer accounts registered with the video processing server, where a respective user profile includes account credentials for a respective reviewer account, and one or more video sources linked to the respective reviewer account. The I/O interface to one or more video sources 520 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, and event masks, for use in data processing for event monitoring and review for each reviewer account.

In some implementations, the server-side module 506 receives information regarding alert events detected by other smart devices 204 (e.g., hazards, sound, vibration, motion). In accordance with the alert event information, the server-side module 506 instructs one or more video sources 522 in the smart home environment 100 where the alert event is detected to capture video and/or associate with the alert event video, received from the video sources 522 in the same smart home environment 100, that is contemporaneous or proximate in time with the alert event.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices. For example, client devices 504-1, 504-2, and 504-m are a smart phone, a tablet computer, and a laptop computer, respectively.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the hub device server system 508 is implemented on one or more standalone data processing apparatuses or a distributed network of computers. In some implementations, the hub device server system 508 also employs various virtual devices and/or services of third party service providers (e.g., third-party cloud service providers) to provide the underlying computing resources and/or infrastructure resources of the hub device server system 508. In some implementations, the hub device server system 508 includes, but is not limited to, a handheld computer, a tablet computer, a laptop computer, a desktop computer, or a combination of any two or more of these data processing devices or other data processing devices.

The server-client environment 500 shown in FIG. 5A includes both a client-side portion (e.g., the client-side module 502) and a server-side portion (e.g., the server-side module 506). The division of functionalities between the client and server portions of operating environment 500 can vary in different implementations. Similarly, the division of functionalities between the video source 522 and the hub device server system 508 can vary in different implementations. For example, in some implementations, client-side module 502 is a thin-client that provides only user-facing input and output processing functions, and delegates all other data processing functionalities to a backend server (e.g., the hub device server system 508). Similarly, in some implementations, a respective one of the video sources 522 is a simple video capturing device that continuously captures and streams video data to the hub device server system 508 with no or limited local preliminary processing on the video data. Although many aspects of the present technology are described from the perspective of the hub device server system 508, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the hub device server system 508, the client device 504, and the video sources 522 cooperatively.

It should be understood that operating environment 500 that involves the hub device server system 508, the video sources 522 and the video cameras 118 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-m) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-n exchange data with the hub device 180. Alternatively, in some situations, some of the electronic devices of the video sources 522-n communicate with the network interface device 160 directly via the same sub-network 162A that couples devices 160, 180 and 504-m. In some implementations (e.g., in the network 162C), both the client device 504-m and the electronic devices of the video sources 522-n communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-n. As explained above, the network interface device 160 and the hub device 180 optionally communicate with each other via a sub-network 162A.

In some implementations, the hub device 180 is omitted, and the functionality of the hub device 180 is performed by the hub device server system 508, video server system 552, or smart home provider server system 164.

Figure 5B:
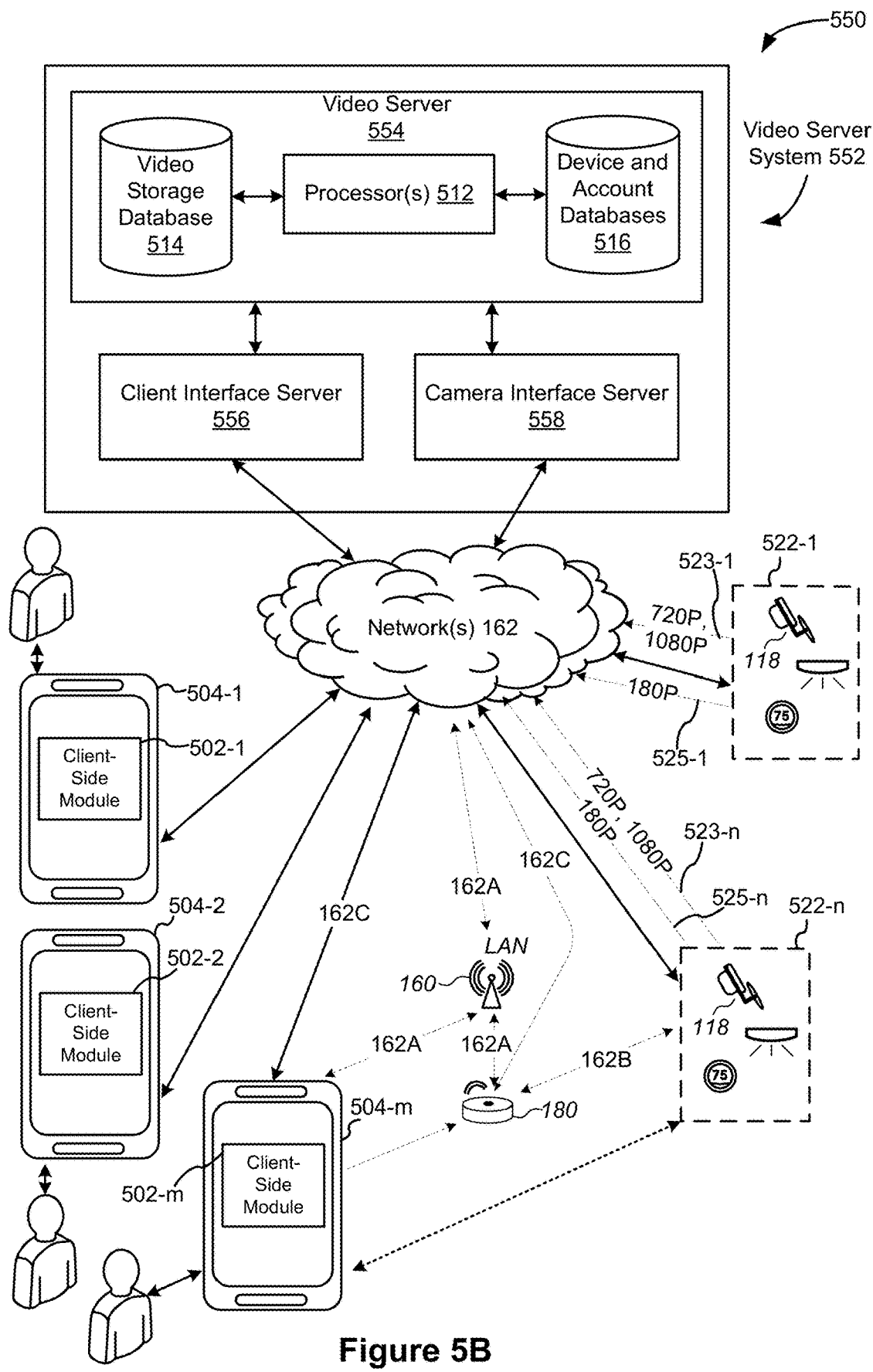
FIG. 5B is a representative operating environment in which a video server system interacts with client devices and hub devices communicatively coupled to local smart devices, in accordance with some implementations.

In some implementations, the hub device server system 508 is, or includes, a dedicated video processing server. FIG. 5B illustrates a representative operating environment 550 in which a video server system 552 serves as a dedicated video processing server and provides data processing for monitoring and facilitating review of alert events (e.g., motion events) in video streams captured by video cameras 118. As shown in FIG. 5B, the video server system 552 receives video data from video sources 522 (including cameras 118) located at various physical locations (e.g., inside homes, restaurants, stores, streets, parking lots, and/or the smart home environments 100 of FIG. 1). Each video source 522 may be bound to one or more user (e.g., reviewer) accounts, and the video server system 552 provides video monitoring data for the video source 522 to client devices 504 associated with the reviewer accounts. For example, the portable electronic device 166 is an example of the client device 504.

In some implementations, the smart home provider server system 164 or a component thereof serves as the video server system 552; the video server system 552 is a part or component of the smart home provider server system 164. In some implementations, the video server system 552 is separate from the smart home provider server system 164, and provides video processing services to video sources 522 and client devices 504 independent of other services provided by the smart home provider server system 164. In some implementations, the smart home provider server system 164 and the video server system 552 are separate but communicate information with each other to provide functionality to users. For example, a detection of a hazard may be communicated by the smart home provider server system 164 to the video server system 552, and the video server system 552, in accordance with the communication regarding the detection of the hazard, records, processes, and/or provides video associated with the detected hazard.

In some implementations, each of the video sources 522 includes one or more video cameras 118 that capture video and send the captured video to the video server system 552 substantially in real-time. In some implementations, each of the video sources 522 optionally includes a controller device (not shown) that serves as an intermediary between the one or more cameras 118 and the video server system 552. The controller device receives the video data from the one or more cameras 118, optionally, performs some preliminary processing on the video data, and sends the video data to the video server system 552 on behalf of the one or more cameras 118 substantially in real-time. In some implementations, each camera has its own on-board processing capabilities to perform some preliminary processing on the captured video data before sending the processed video data (along with metadata obtained through the preliminary processing) to the controller device and/or the video server system 552.

In some implementations, a camera 118 of a video source 522 captures video at a first resolution (e.g., 720P and/or 1080P) and/or a first frame rate (24 frames per second), and sends the captured video to the video server system 552 at both the first resolution (e.g., the original capture resolution(s), the high-quality resolution(s)) and the first frame rate, and a second, different resolution (e.g., 180P) and/or a second frame rate (e.g., 5 frames per second or 10 frames per second). For example, the camera 118 captures a video 523-1 at 720P and/or 1080P resolution (the camera 118 may capture a video at 1080P and create a downscaled 720P version, or capture at both 720P and 1080P). The video source 522 creates a second (or third), rescaled (and optionally at a different frame rate than the version 523-1) version 525-1 of the captured video at 180P resolution, and transmits both the original captured version 523-1 (i.e., 1080P and/or 720P) and the rescaled version 525-1 (i.e., the 180P version) to the video server system 552 for storage. In some implementations, the rescaled version has a lower resolution, and optionally a lower frame rate, than the original captured video. The video server system 552 transmits the original captured version or the rescaled version to a client 504, depending on the context. For example, the video server system 552 transmits the rescaled version when transmitting multiple videos to the same client device 504 for concurrent monitoring by the user, and transmits the original captured version in other contexts. In some implementations, the video server system 552 downscales the original captured version to a lower resolution, and transmits the downscaled version.

In some other implementations, a camera 118 of a video source 522 captures video at a first resolution (e.g., 720P and/or 1080P)) and/or a first frame rate, and sends the captured video to the video server system 552 at the first resolution (e.g., the original capture resolution(s), the high-quality resolution(s) such as 1080P and/or 720P) and the first fame rate for storage. When the video server system 552 transmits the video to a client device, the video server system 552 may downscale the video to a second, lower resolution (e.g., 180P) and/or second, lower frame rate for the transmission, depending on the context. For example, the video server system 552 transmits the downscaled version when transmitting multiple videos to the same client device 504 for concurrent monitoring by the user, and transmits the original captured version in other contexts.

As shown in FIG. 5B, in accordance with some implementations, each of the client devices 504 includes a client-side module 502. The client-side module 502 communicates with the video server system 552 through the one or more networks 162. In some implementations, the video server system 552 includes a video server 552, a client interface server 556, and a camera interface server 558. In some implementations, the video server 552 includes the server-side module 506 and its components and modules (FIG. 5A) or one or more respective components and/or modules of the server-side module 506. The client-side module 502 provides client-side functionalities for the event monitoring and review processing and communications with the video server system 552. The video server system 552 provides server-side functionalities for event monitoring and review processing for any number of client-side modules 502 each residing on a respective client device 504. The video server system 556 also provides server-side functionalities for video processing and camera control for any number of the video sources 522, including any number of control devices and the cameras 118.

In some implementations, the video server 554 includes one or more processors 512, a video storage database 514, and device and account databases 516. In some implementations, the video server system 552 also includes a client interface server 556 and a camera interface server 558. The client interface server 556 provides an I/O interface to one or more client devices 504, and the camera interface server 558 provides an I/O interface to one or more video sources 520. The client interface server 556 facilitates the client-facing input and output processing for the video server system 552. For example, the client interface server 556 generates web pages for reviewing and monitoring video captured by the video sources 522 in a web browser application at a client 504. In some implementations, the client interface server 556 or a transcoding proxy computer rescales (e.g., downscales) and/or changes the frame rate of video for transmission to a client 504. In some implementations, the client interface server 504 also serves as the transcoding proxy. The databases 516 store a plurality of profiles for reviewer accounts registered with the video processing server, where a respective user profile includes account credentials for a respective reviewer account, and one or more video sources linked to the respective reviewer account. The camera interface server 558 facilitates communications with one or more video sources 522 (e.g., groups of one or more cameras 118 and associated controller devices). The video storage database 514 stores raw video data received from the video sources 522, as well as various types of metadata, such as motion events, event categories, event category models, event filters, event masks, alert events, and camera histories, for use in data processing for event monitoring and review for each reviewer account.

In some implementations, the video server system 552 receives information regarding alert events detected by other smart devices 204 (e.g., hazards, sound, vibration, motion. In accordance with the alert event information, the video server system 552 instructs one or more video sources 522 in the smart home environment 100 where the alert event is detected to capture video and/or associate with the alert event video, received from the video sources 522 in the same smart home environment 100, that is contemporaneous or proximate in time with the alert event.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices. For example, client devices 504-1, 504-2, and 504-m are a smart phone, a tablet computer, and a laptop computer, respectively.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the video server system 552 is implemented on one or more standalone data processing apparatuses or a distributed network of computers. In some implementations, the video server 554, the client interface server 556, and the camera interface server 558 are each respectively implemented on one or more standalone data processing apparatuses or a distributed network of computers. In some implementations, the video server system 552 also employs various virtual devices and/or services of third party service providers (e.g., third-party cloud service providers) to provide the underlying computing resources and/or infrastructure resources of the video server system 552. In some implementations, the video server system 552 includes, but is not limited to, a handheld computer, a tablet computer, a laptop computer, a desktop computer, or a combination of any two or more of these data processing devices or other data processing devices.

The server-client environment 550 shown in FIG. 5B includes both a client-side portion (e.g., the client-side module 502) and a server-side portion (e.g., the components and modules in the video server system 552). The division of functionalities between the client and server portions of operating environment 550 can vary in different implementations. Similarly, the division of functionalities between the video source 522 and the video server system 552 can vary in different implementations. For example, in some implementations, client-side module 502 is a thin-client that provides only user-facing input and output processing functions, and delegates all other data processing functionalities to a backend server (e.g., the video server system 552). Similarly, in some implementations, a respective one of the video sources 522 is a simple video capturing device that continuously captures and streams video data to the video server system 552 with no or limited local preliminary processing on the video data. Although many aspects of the present technology are described from the perspective of the video server system 552, the corresponding actions performed by the client device 504 and/or the video sources 522 would be apparent to ones skilled in the art without any creative efforts. Similarly, some aspects of the present technology may be described from the perspective of the client device or the video source, and the corresponding actions performed by the video server would be apparent to ones skilled in the art without any creative efforts. Furthermore, some aspects of the present technology may be performed by the video server system 552, the client device 504, and the video sources 522 cooperatively.

It should be understood that operating environment 550 that involves the video server system 552, the video sources 522 and the video cameras 118 is merely an example. Many aspects of operating environment 550 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, and the client devices 504-*m*) are located in close proximity to each other, such that they could be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. This smart home environment further includes one or more other radio communication networks 162B through which at least some of the electronic devices of the video sources 522-*n* exchange data with the hub device 180. Alternatively, in some situations, some of the electronic devices of the video sources 522-*n* communicate with the network interface device 160 directly via the same sub-network 162A that couples devices 160, 180 and 504-*m*. In some implementations (e.g., in the network 162C), both the client device 504-*m* and the electronic devices of the video sources 522-*n* communicate directly via the network(s) 162 without passing the network interface device 160 or the hub device 180.

In some implementations, during normal operation, the network interface device 160 and the hub device 180 communicate with each other to form a network gateway through which data are exchanged with the electronic device of the video sources 522-*n*. As explained above, the network interface device 160 and the hub device 180 optionally communicate with each other via a sub-network 162A.

In some implementations, a video source 522 may be private (e.g., its captured videos and history are accessible only to the associated user/account), public (e.g., its captured videos and history are accessible by anyone), or shared (e.g., its captured videos and history are accessible only to the associated user/account and other specific users/accounts with whom the associated user has authorized access (e.g., by sharing with the other specific users)). Whether a video source 522 is private, public, or shared is configurable by the associated user.

In some implementations, the camera 118 also performs preliminary motion detection on video captured by the camera 118. For example, the camera 118 analyzes the captured video for significant changes in pixels. When motion is detected by the preliminary motion detection, the camera 118 transmits information to the hub device server system 508 or video server system 552 informing the server system of the preliminary detected motion. The hub device server system 508 or video server system 552, in accordance with the information of the detected motion, may activate sending of a motion detection notification to a client device 504, log the preliminary detected motion as an alert event, and/or perform additional analysis of the captured video to confirm and/or classify the preliminary detected motion.

Figure 6:
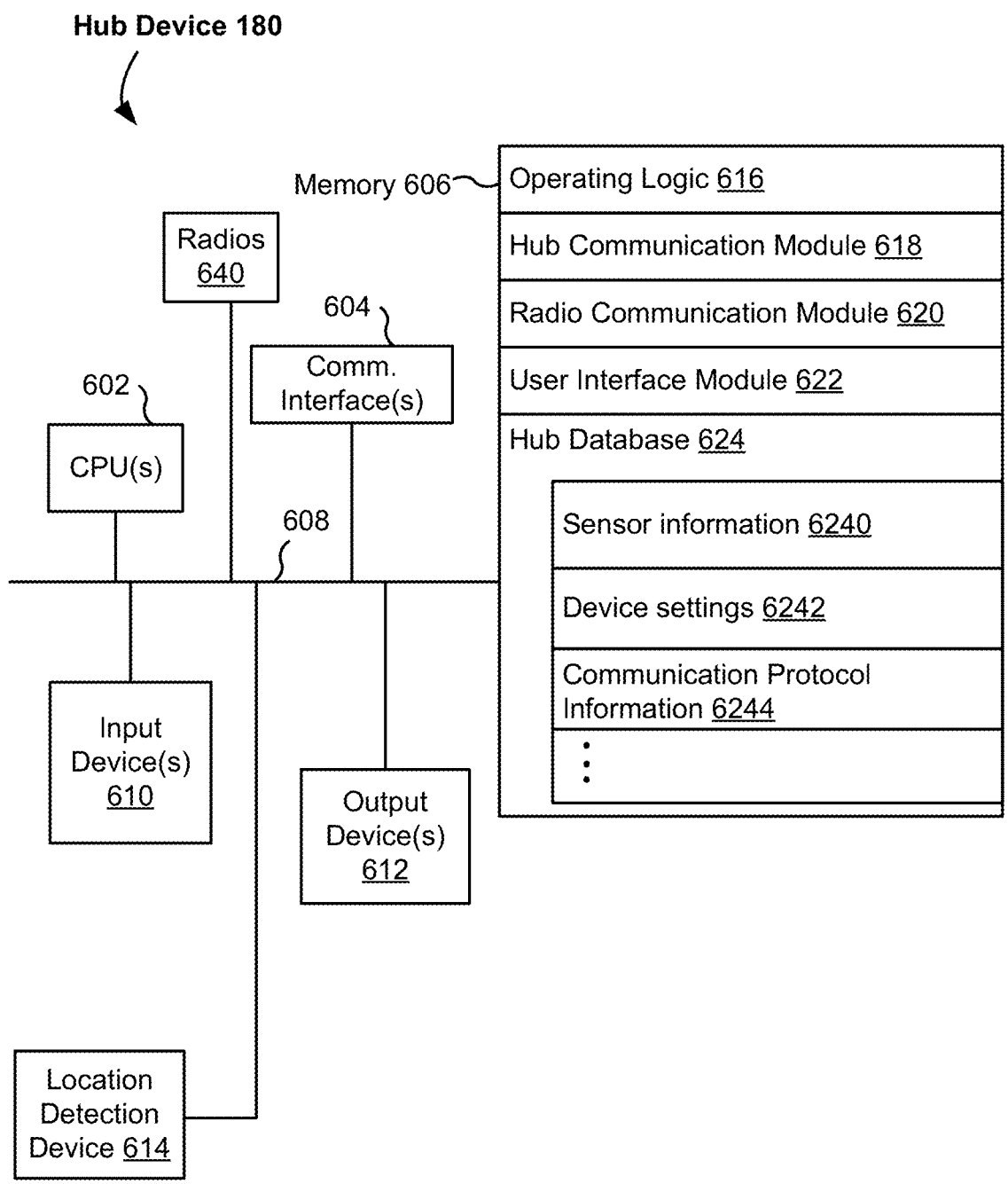
FIG. 6 is a block diagram illustrating a representative hub device, in accordance with some implementations.

FIG. 6 is a block diagram illustrating a representative hub device 180 in accordance with some implementations. In some implementations, the hub device 180 includes one or more processing units (e.g., CPUs, ASICs, FPGAs, microprocessors, and the like) 602, one or more communication interfaces 604, memory 606, radios 640, and one or more communication buses 608 for interconnecting these components (sometimes called a chipset). In some implementations, the hub device 180 includes one or more input devices 610 such as one or more buttons for receiving input. In some implementations, the hub device 180 includes one or more output devices 612 such as one or more indicator lights, a sound card, a speaker, a small display for displaying textual information and error codes, etc. Furthermore, in some implementations, the hub device 180 uses a microphone and voice recognition or a camera and gesture recognition to supplement or replace the keyboard. In some implementations, the hub device 180 includes a location detection device 614, such as a GPS (global positioning satellite) or other geo-location receiver, for determining the location of the hub device 180.

The hub device 180 optionally includes one or more built-in sensors (not shown), including, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 640 enables one or more radio communication networks in the smart home environments, and allows a hub device to communicate with smart devices. In some implementations, the radios 640 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 604 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 606, or alternatively the non-volatile memory within memory 606, includes a non-transitory computer readable storage medium. In some implementations, memory 606, or the non-transitory computer readable storage medium of memory 606, stores the following programs, modules, and data structures, or a subset or superset thereof:

- Operating logic 616 including procedures for handling various basic system services and for performing hardware dependent tasks;
- Hub device communication module 618 for connecting to and communicating with other network devices (e.g., network interface 160, such as a router that provides Internet connectivity, networked storage devices, network routing devices, server system 508, etc.) connected to one or more networks 162 via one or more communication interfaces 604 (wired or wireless);
- Radio Communication Module 620 for connecting the hub device 180 to other devices (e.g., controller devices, smart devices 204 in smart home environment 100, client devices 504) via one or more radio communication devices (e.g., radios 640);
- User interface module 622 for providing and displaying a user interface in which settings, captured data, and/or other data for one or more devices (e.g., smart devices 204 in smart home environment 100) can be configured and/or viewed; and
- Hub device database 624, including but not limited to:
  - Sensor information 6240 for storing and managing data received, detected, and/or transmitted by one or more sensors of the hub device 180 and/or one or more other devices (e.g., smart devices 204 in smart home environment 100);
  - Device settings 6242 for storing operational settings for one or more devices (e.g., coupled smart devices 204 in smart home environment 100); and
  - Communication protocol information 6244 for storing and managing protocol information for one or more protocols (e.g., standard wireless protocols, such as ZigBee, Z-Wave, etc., and/or custom or standard wired protocols, such as Ethernet).

Each of the above identified elements (e.g., modules stored in memory 206 of hub device 180) may be stored in one or more of the previously mentioned memory devices (e.g., the memory of any of the smart devices in smart home environment 100, FIG. 1), and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7A:
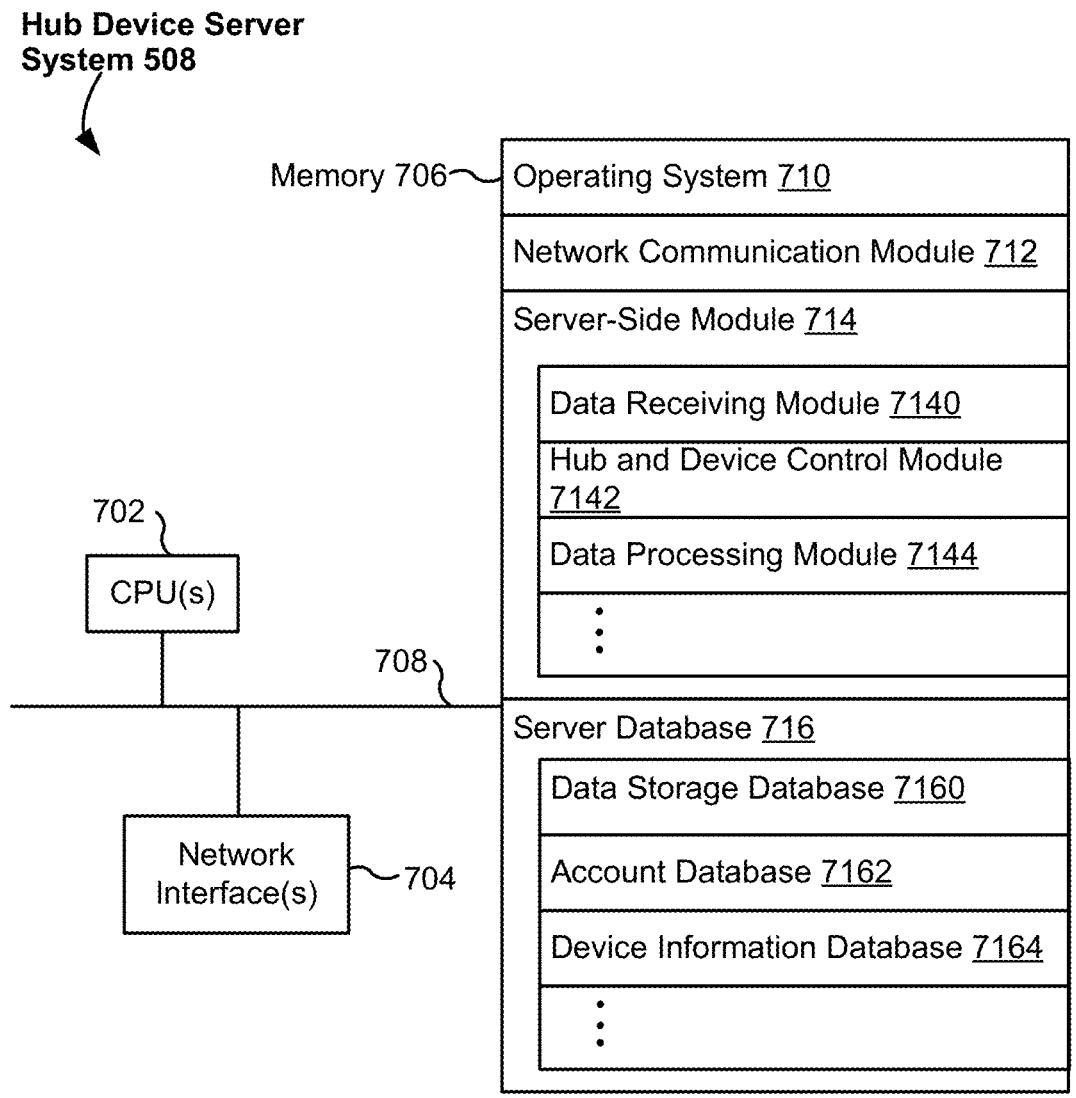
FIG. 7A is a block diagram illustrating a representative hub device server system, in accordance with some implementations.

FIG. 7A is a block diagram illustrating the hub device server system 508 in accordance with some implementations. The hub device server system 508, typically, includes one or more processing units (CPUs) 702, one or more network interfaces 704 (e.g., including an I/O interface to one or more client devices and an I/O interface to one or more electronic devices), memory 706, and one or more communication buses 708 for interconnecting these components (sometimes called a chipset). Memory 706 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

- Operating system 710 including procedures for handling various basic system services and for performing hardware dependent tasks;
- Network communication module 712 for connecting the hub device server system 508 to other systems and devices (e.g., client devices, electronic devices, and systems connected to one or more networks 162, FIGS. 1-5B) via one or more network interfaces 704 (wired or wireless);
- Server-side module 714, which provides server-side functionalities for device control, data processing and data review, including but not limited to:
  - Data receiving module 7140 for receiving data from electronic devices (e.g., video data from a camera 118, FIG. 1) via the hub device 180, and preparing the received data for further processing and storage in the data storage database 7160;
  - Hub and device control module 7142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;
  - Data processing module 7144 for processing the data provided by the electronic devices, and/or preparing and sending processed data to a device for review (e.g., client devices 504 for review by a user); and
- Server database 716, including but not limited to:
  - Data storage database 7160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the hub device 180 or smart devices are stored securely;
  - Account database 7162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles; and
  - Device Information Database 7164 for storing device information related to one or more hub devices, e.g., device identifiers and hub device specific secrets, independently of whether the corresponding hub devices have been associated with any user account.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 7B:
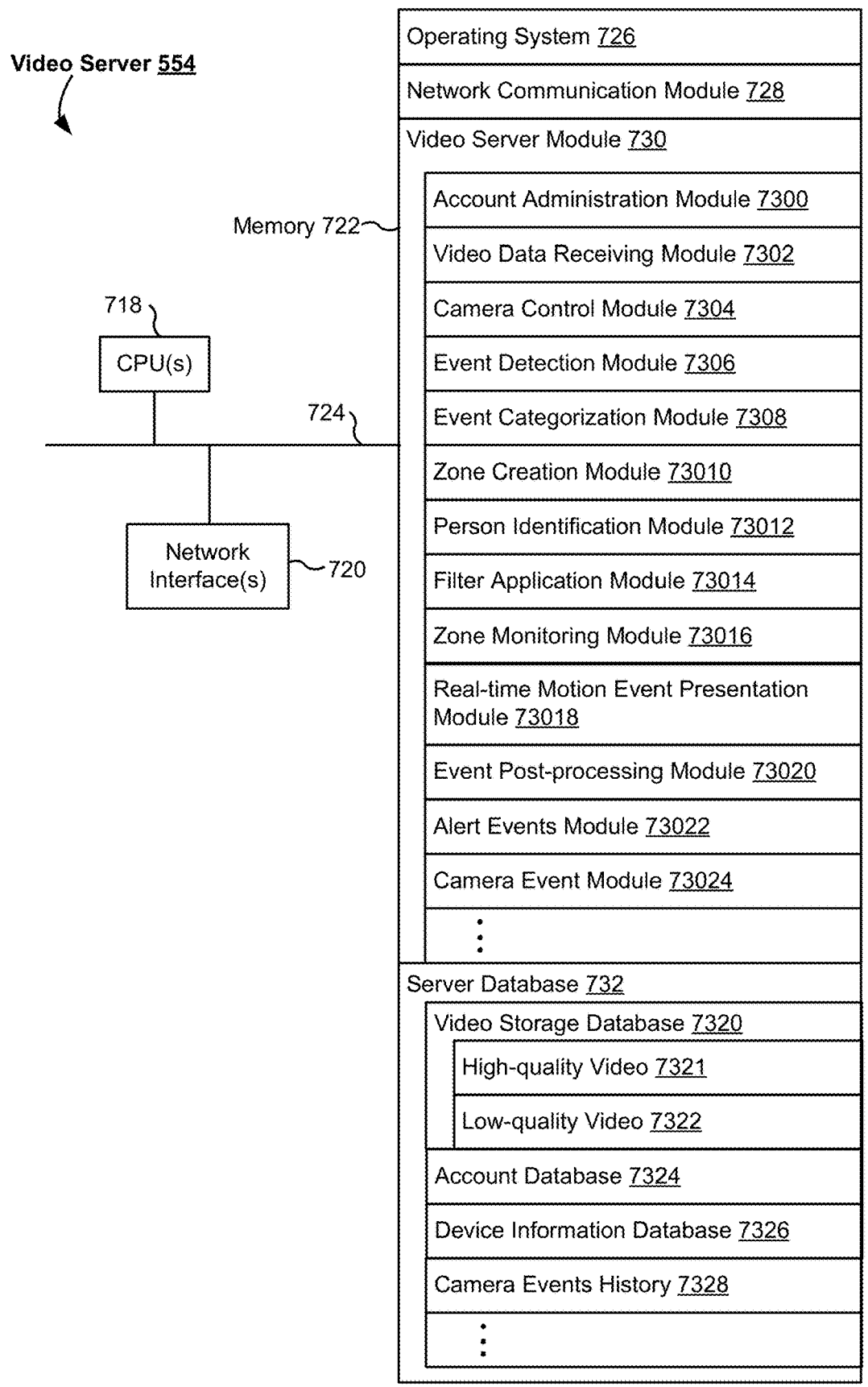
FIG. 7B is a block diagram illustrating a representative video server system, in accordance with some implementations.

FIG. 7B is a block diagram illustrating the video server 554 in accordance with some implementations. The video server 554, typically, includes one or more processing units (CPUs) 718, one or more network interfaces 720, memory 722, and one or more communication buses 724 for interconnecting these components (sometimes called a chipset). Memory 722 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 722, optionally, includes one or more storage devices remotely located from one or more processing units 718. Memory 722, or alternatively the non-volatile memory within memory 722, includes a non-transitory computer readable storage medium. In some implementations, memory 722, or the non-transitory computer readable storage medium of memory 722, stores the following programs, modules, and data structures, or a subset or superset thereof:

- Operating system 726 including procedures for handling various basic system services and for performing hardware dependent tasks;
- Network communication module 728 for connecting the video server 554 to other systems and devices (e.g., client devices, electronic devices, and systems connected to one or more networks 162, FIGS. 1-5B) via one or more network interfaces 720 (wired or wireless);
- Video server module 730, which provides server-side data processing and functionalities for video and event monitoring and review, including but not limited to:
  - Account administration module 7300 for creating reviewer accounts, performing camera registration processing to establish associations between video sources to their respective reviewer accounts, and providing account login-services to the client devices 504;
  - Video data receiving module 7302 for receiving raw video data from the video sources 522, and preparing the received video data for event processing and long-term storage in the video storage database 514;
  - Camera control module 7304 for generating and sending server-initiated control commands to modify the operation modes of the video sources, and/or receiving and forwarding user-initiated control commands to modify the operation modes of the video sources 522;
  - Event detection module 7306 for detecting motion event candidates in video streams from each of the video sources 522, including motion track identification, false positive suppression, and event mask generation and caching;
  - Event categorization module 7308 for categorizing motion events detected in received video streams;
  - Zone creation module 73010 for generating zones of interest in accordance with user input;
  - Person identification module 73012 for identifying characteristics associated with presence of humans in the received video streams;
  - Filter application module 73014 for selecting event filters (e.g., event categories, zones of interest, a human filter, etc.) and applying the selected event filter to past and new motion events detected in the video streams;
  - Zone monitoring module 73016 for monitoring motions within selected zones of interest and generating notifications for new motion events detected within the selected zones of interest, where the zone monitoring takes into account changes in surrounding context of the zones and is not confined within the selected zones of interest;
  - Real-time motion event presentation module 73018 for dynamically changing characteristics of event indicators displayed in user interfaces as new event filters, such as new event categories or new zones of interest, are created, and for providing real-time notifications as new motion events are detected in the video streams; and
  - Event post-processing module 3020 for providing summary time-lapse for past motion events detected in video streams, and providing event and category editing functions to user for revising past event categorization results;
  - Alert events module 73022 for receiving information on alert events (e.g., detected hazards, detected sounds, etc.), instructing cameras 118 to capture video in accordance with alert event information, and determining chronologies of alert events; and
  - Camera events module 73024 for associating captured video with alert events, from the same smart home environment 100, that are proximate or contemporaneous in time, and logging camera histories of camera events; and
- Server database 732, including but not limited to:
  - Video storage database 7320 storing raw video data associated with each of the video sources 522 (each including one or more cameras 118) of each reviewer account, as well as event categorization models (e.g., event clusters, categorization criteria, etc.), event categorization results (e.g., recognized event categories, and assignment of past motion events to the recognized event categories, representative events for each recognized event category, etc.), event masks for past motion events, video segments for each past motion event, preview video (e.g., sprites) of past motion events, and other relevant metadata (e.g., names of event categories, location of the cameras 118, creation time, duration, etc.) associated with the motion events;
  - Account database 7324 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles;
  - Device Information Database 7326 for storing device information related to one or more hub devices, e.g., device identifiers and hub device specific secrets, independently of whether the corresponding hub devices have been associated with any user account; and Camera events history 7328 for storing per-camera histories of camera events, including alert events, chronologies of alert events, and references to associated videos in the video storage database 7320.

Video data stored in the video storage database 7320 includes high-quality versions 7321 and low-quality versions 7322 of videos associated with each of the video sources 522. High-quality video 7321 includes video in relatively high resolutions (e.g., 720P and/or 1080P) and relatively high frame rates (e.g., 24 frames per second). Low-quality video 7322 includes video in relatively low resolutions (e.g., 180P) and relatively low frame rates (e.g., 5 frames per second, 10 frames per second).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 722, optionally, stores a subset of the modules and data structures identified above. Furthermore, memory 722, optionally, stores additional modules and data structures not described above.

Figure 7C:
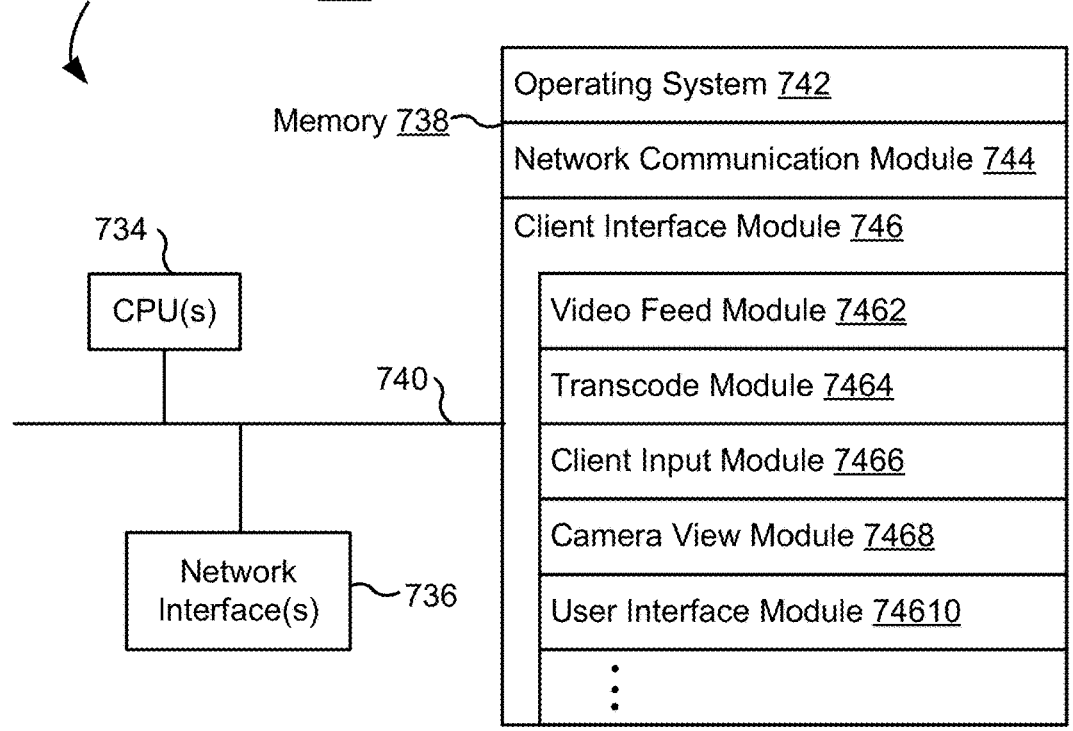
FIG. 7C is a block diagram illustrating a representative client interface server, in accordance with some implementations.

FIG. 7C is a block diagram illustrating the client interface server 556 in accordance with some implementations. The client interface server 556, typically, includes one or more processing units (CPUs) 734, one or more network interfaces 736, memory 738, and one or more communication buses 740 for interconnecting these components (sometimes called a chipset). Memory 738 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 738, optionally, includes one or more storage devices remotely located from one or more processing units 734. Memory 738, or alternatively the non-volatile memory within memory 738, includes a non-transitory computer readable storage medium. In some implementations, memory 738, or the non-transitory computer readable storage medium of memory 738, stores the following programs, modules, and data structures, or a subset or superset thereof:

Operating system 742 including procedures for handling various basic system services and for performing hardware dependent tasks;

Network communication module 744 for connecting the client interface server 556 to other systems and devices (e.g., client devices, video server 554, and systems connected to one or more networks 162, FIGS. 1-5B) via one or more network interfaces 740 (wired or wireless);

Client interface module 746, which provides an I/O interface between client devices 504 and the video server 554, including but not limited to:

Video feed module 7462 for transmitting videos from the video server system, or images extracted from same videos, to client devices as video streams or periodically refreshed images, and optionally transmitting particular views of videos or images from videos;

Transcode module 7464 for rescaling (e.g., downscaling from 720P to 180P) video for transmission to client devices 504;

Client input module 7466 for receiving and processing input commands from client devices (e.g., client device 504) 504 to change the video view being transmitted or controlling a video source 522;

Camera view module 7468 for determining which views of videos or images from videos are to be transmitted to client devices; and User interface module 74610 for generating user interfaces (e.g., web pages), transmitted to client devices 504, for viewing video feeds and corresponding event histories.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 738, optionally, stores a subset of the modules and data structures identified above. Furthermore, memory 738, optionally, stores additional modules and data structures not described above.

Figure 7D:
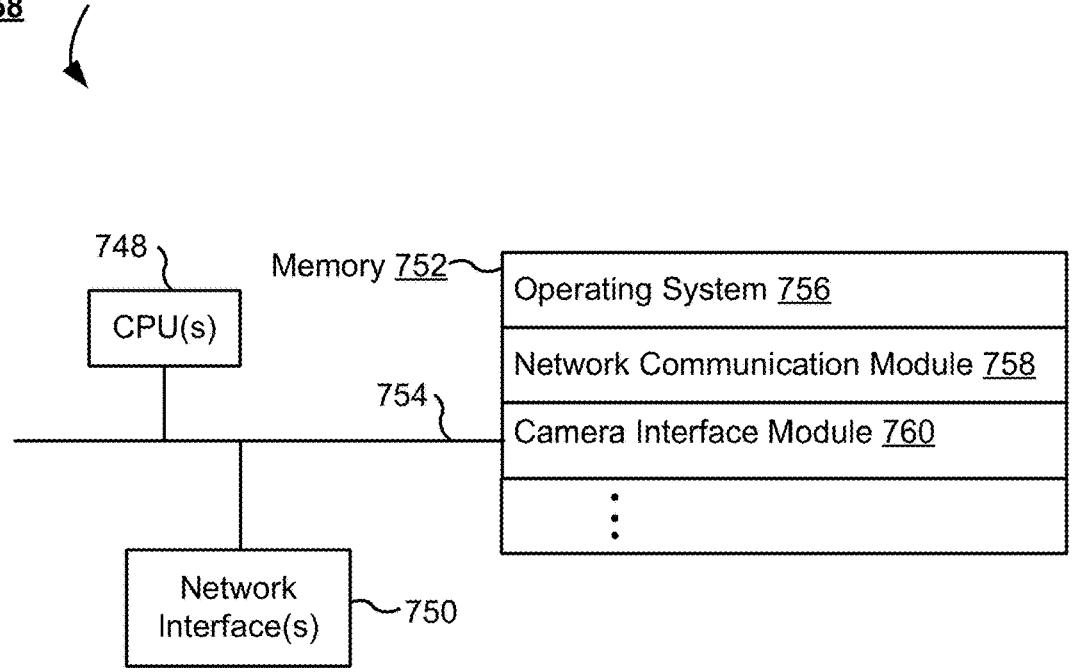
FIG. 7D is a block diagram illustrating a representative camera interface server, in accordance with some implementations.

FIG. 7D is a block diagram illustrating the camera interface server 558 in accordance with some implementations. The camera interface server 558, typically, includes one or more processing units (CPUs) 748, one or more network interfaces 750, memory 752, and one or more communication buses 754 for interconnecting these components (sometimes called a chipset). Memory 752 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 752, optionally, includes one or more storage devices remotely located from one or more processing units 748. Memory 752, or alternatively the non-volatile memory within memory 752, includes a non-transitory computer readable storage medium. In some implementations, memory 752, or the non-transitory computer readable storage medium of memory 752, stores the following programs, modules, and data structures, or a subset or superset thereof:

Operating system 756 including procedures for handling various basic system services and for performing hardware dependent tasks;

Network communication module 758 for connecting the camera interface server 558 to other systems and devices (e.g., client devices, video server 554, and systems connected to one or more networks 162, FIGS. 1-5B) via one or more network interfaces 754 (wired or wireless); and Camera interface module 760 for providing an I/O interface between video sources 522 and the video server 554.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 752, optionally, stores a subset of the modules and data structures identified above. Furthermore, memory 752, optionally, stores additional modules and data structures not described above.

In some implementations, at least some of the functions of the video server 554, client interface server 556, and camera interface server 558 are performed by the hub device server system 508, and the corresponding modules and sub-modules of these functions may be included in the hub device server system 508. In some implementations, at least some of the functions of the hub device server system 508 are performed by the video server 554, client interface server 556, and/or camera interface server 558, and the corresponding modules and sub-modules of these functions may be included in the video server 554, client interface server 556, and/or camera interface server 558.

Figure 8A:
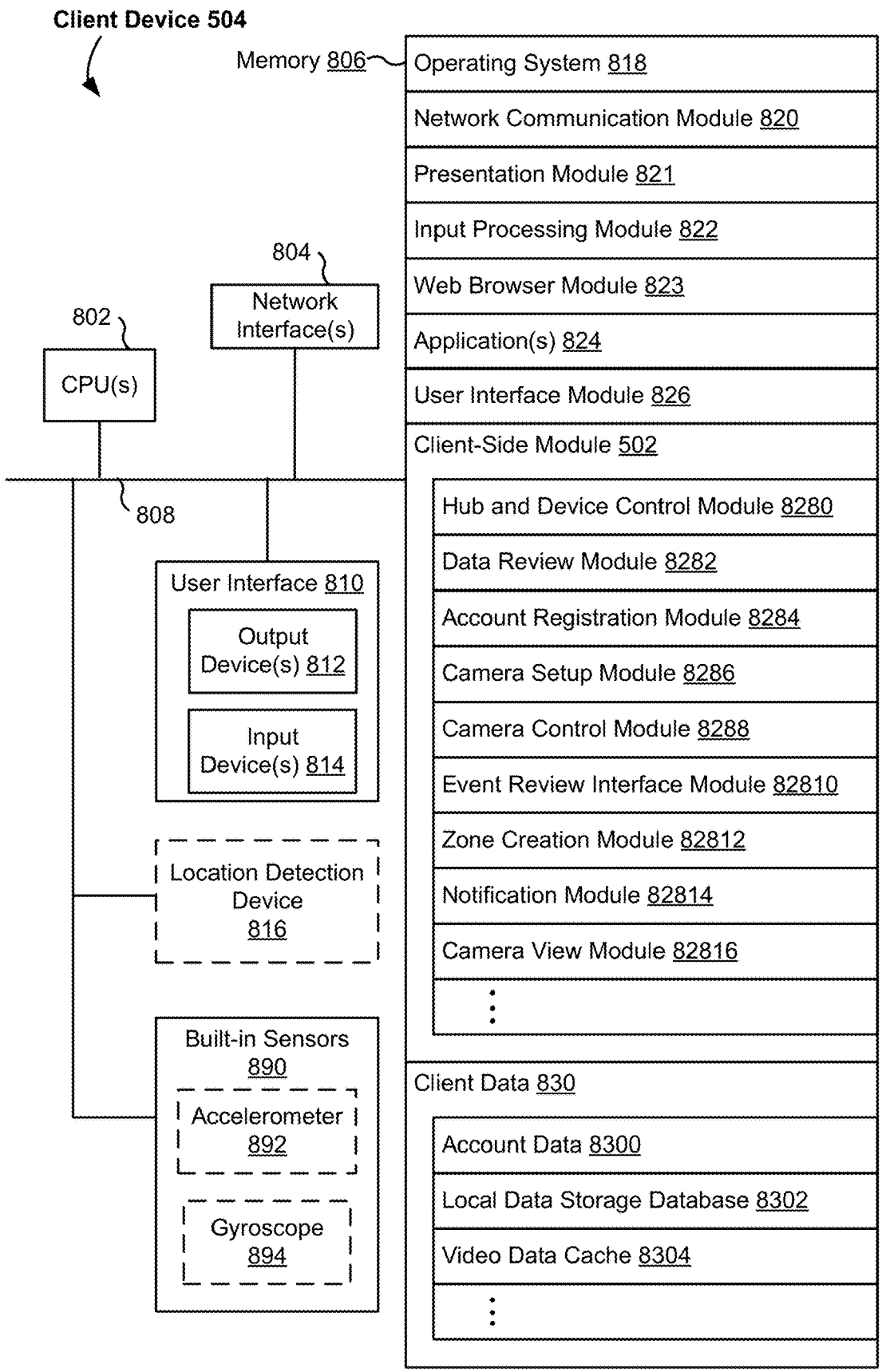
FIG. 8A-8B are block diagrams illustrating a representative client device associated with a user account, in accordance with some implementations.
Figure 8B:
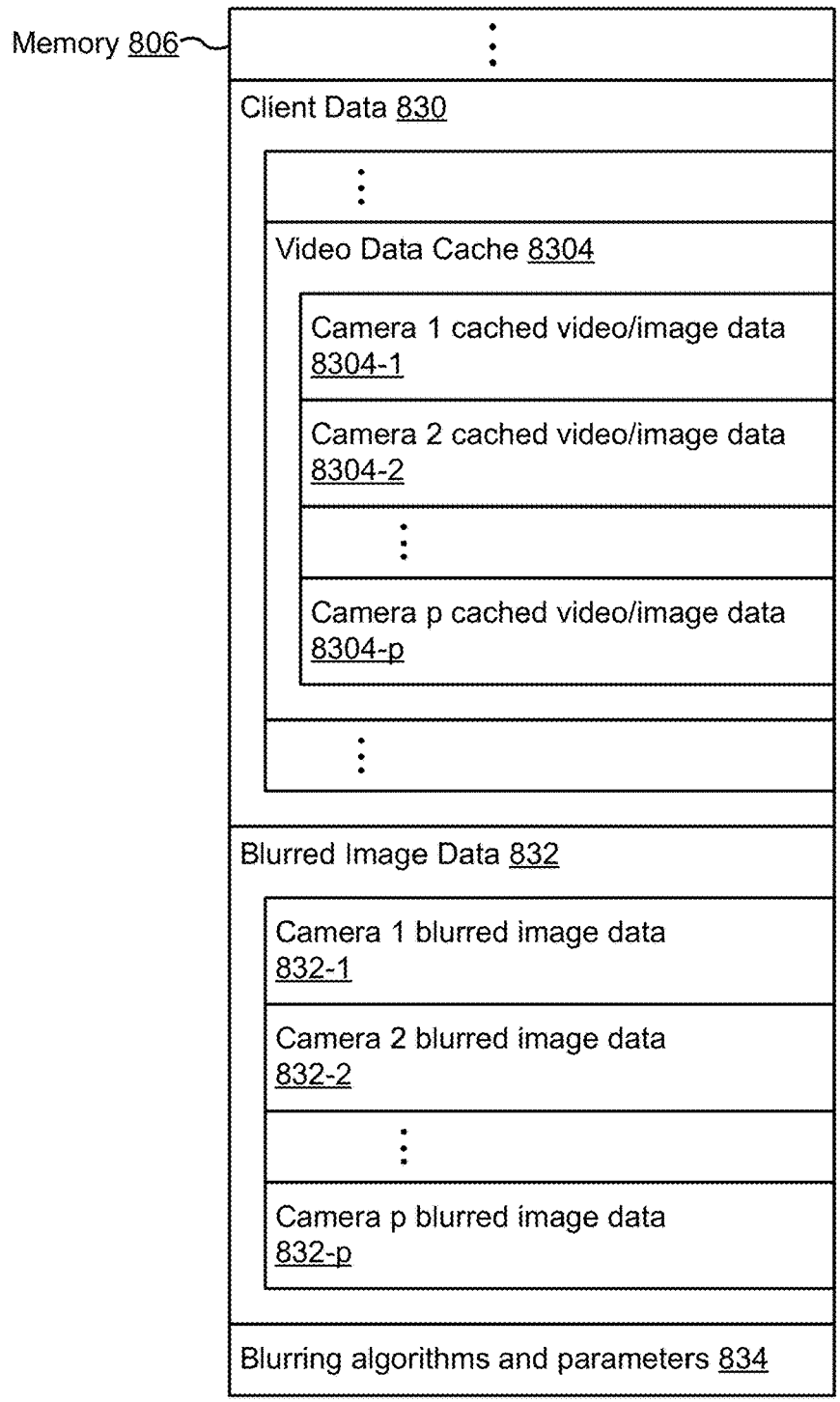

FIGS. 8A-8B are block diagrams illustrating a representative client device 504 associated with a user (e.g., reviewer) account in accordance with some implementations. The client device 504, typically, includes one or more processing units (CPUs) 802, one or more network interfaces 804, memory 806, and one or more communication buses 808 for interconnecting these components (sometimes called a chipset). The client device also includes a user interface 810 and one or more built-in sensors 890 (e.g., accelerometer 892 and gyroscope 894). User interface 810 includes one or more output devices 812 that enable presentation of media content, including one or more speakers and/or one or more visual displays. User interface 810 also includes one or more input devices 814, including user interface components that facilitate user input such as a keyboard, a mouse, a voice-command input unit or microphone, a touch screen display, a touch-sensitive input pad, a gesture capturing camera, or other input buttons or controls. Furthermore, the client device 504 optionally uses a microphone and voice recognition or a camera and gesture recognition to supplement or replace the keyboard. Further, the client device 504 optionally uses the accelerometer to detect changes in the orientation of the client device 504, and in particular applications and contexts interpret the change in orientation detected by the accelerometer as user input. In some implementations, the client device 504 includes one or more cameras, scanners, or photo sensor units for capturing images (not shown). In some implementations, the client device 504 optionally includes a location detection device 816, such as a GPS (global positioning satellite) or other geo-location receiver, for determining the location of the client device 504.

Memory 806 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

Operating system 818 including procedures for handling various basic system services and for performing hardware dependent tasks;

Network communication module 820 for connecting the client device 504 to other systems and devices (e.g., hub device server system 508, video server system 552, video sources 522) connected to one or more networks 162 via one or more network interfaces 804 (wired or wireless);

Presentation module 821 for enabling presentation of information (e.g., user interfaces for application(s) 824 and web browser module 823 or the client-side module 502, widgets, websites and web pages thereof, and/or games, audio and/or video content, text, etc.) at the client device 504 via the one or more output devices 812 (e.g., displays, speakers, etc.) associated with the user interface 810;

Input processing module 822 for detecting one or more user inputs or interactions from one of the one or more input devices 814 and optionally the accelerometer 892 and interpreting the detected input or interaction;

Web browser module 823 for navigating, requesting (e.g., via HTTP), and displaying web sites and web pages thereof, including a web interface for logging into a reviewer account, controlling the video sources associated with the reviewer account, establishing and selecting event filters, and editing and reviewing motion events detected in the video streams of the video sources;

One or more applications 824 for execution by the client device 504 (e.g., games, social network applications, smart home applications, and/or other web or non-web based applications), for controlling devices (e.g., sending commands, configuring settings, etc. to hub devices and/or other client or electronic devices), and for reviewing data captured by the devices (e.g., device status and settings, captured data, or other information regarding the hub device or other connected devices);

User interface module 826 for providing and displaying a user interface in which settings, captured data, and/or other data for one or more devices (e.g., smart devices 204 in smart home environment 100) can be configured and/or viewed;

Client-side module 502, which provides client-side data processing and functionalities for device control, data processing, data review, and monitoring and reviewing videos from one or more video sources and camera events, including but not limited to:
  Hub device and device control module 8280 for generating control commands for modifying an operating mode of the hub device or the electronic devices in accordance with user inputs; and
  Data review module 8282 for providing user interfaces for reviewing data processed by the hub device server system 508 or video server system 552;
  Account registration module 8284 for establishing a reviewer account and registering one or more video sources with the hub device server system 508 or video server system 552;
  Camera setup module 8286 for setting up one or more video sources within a local area network, and enabling the one or more video sources to access the hub device server system 508 or video server system 552 on the Internet through the local area network;

Camera control module 8288 for generating control commands for modifying an operating mode of the one or more video sources in accordance with user input;

Event review interface module 82810 for providing user interfaces for reviewing event timelines, camera histories with camera events, editing event categorization results, selecting event filters, presenting real-time filtered motion events based on existing and newly created event filters (e.g., event categories, zones of interest, a human filter, etc.), presenting real-time notifications (e.g., pop-ups) for newly detected motion events, and presenting smart time-lapse of selected motion events;

Zone creation module 82814 for providing a user interface for creating zones of interest for each video stream in accordance with user input, and sending the definitions of the zones of interest to the hub device server system 508 or video server system 552;

Notification module 82814 for generating real-time notifications for all or selected alert events or motion events on the client device 504 outside of the event review user interface; and Camera view module 82816 for generating control commands for modifying a view of a video transmitted to the client device 504 in accordance with user input; and Client data 830 storing data associated with the user account, electronic devices, and video sources 522, including, but is not limited to:

Account data 8300 storing information related to both user accounts loaded on the client device 504 and electronic devices (e.g., of the video sources 522) associated with the user accounts, wherein such information includes cached login credentials, hub device identifiers (e.g., MAC addresses and UUIDs), electronic device identifiers (e.g., MAC addresses and UUIDs), user interface settings, display preferences, authentication tokens and tags, password keys, etc., Local data storage database 8302 for selectively storing raw or processed data associated with electronic devices (e.g., of the video sources 522, such as a camera 118); and Video data cache 8304 for caching video and image data from video feeds;

Blurred image data 832; and

Blurring algorithms and parameters 834; for generating blurred image data 832 from video/image data in video data cache 8304.

Video data cache 8304 includes cached video/image data for respective cameras associated with a user of the client device 804. For example, as shown in FIG. 8B, the video data cache 8304 includes cached video/image data 8304-1 for a first camera, cached video/image data 8304-2 for a second camera, up to cached video/image data 8304-$p$ for a p-th camera. At a given moment, video data cache 8304 may not have cached video/image data for a given camera (e.g., due to the camera being newly associated with the user, due to the cache being cleared, due to the cached video/image data being expired and removed from the cache).

Blurred image data 832 includes sets of progressively blurred images for respective cameras. For example, as shown in FIG. 8B, the blurred image data 832 includes blurred image data (e.g., a set of progressively blurred images) 832-1 for the first camera, blurred image data 832-2 for the second camera, up to blurred image data 832-$p$ for the p-th camera.

In some implementations, the client device 504 caches camera history as well as video data 8304. For example, whenever the client device 504 receives camera events history 7328 data from the video server 554, the most recent camera events history (e.g., history from the past two hours, the most recent 20 events) is cached at the client device (e.g., in client data 830). This cached history data may be accessed for quick display of camera history information (e.g., in user interface 1304 (FIG. 13A)).

In some implementations, the client-side module 502 and user interface module 826 are parts, modules, or components of a particular application 824 (e.g., a smart home management application).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

In some implementations, at least some of the functions of the hub device server system 508 or the video server system 552 are performed by the client device 504, and the corresponding sub-modules of these functions may be located within the client device 504 rather than the hub device server system 508 or video server system 552. In some implementations, at least some of the functions of the client device 504 are performed by the hub device server system 508 or video server system 552, and the corresponding sub-modules of these functions may be located within the hub device server system 508 or video server system 552 rather than the client device 504. The client device 504 and the hub device server system 508 or video server system 552 shown in FIGS. 7A-8, respectively, are merely illustrative, and different configurations of the modules for implementing the functions described herein are possible in various implementations.

Figure 9A:
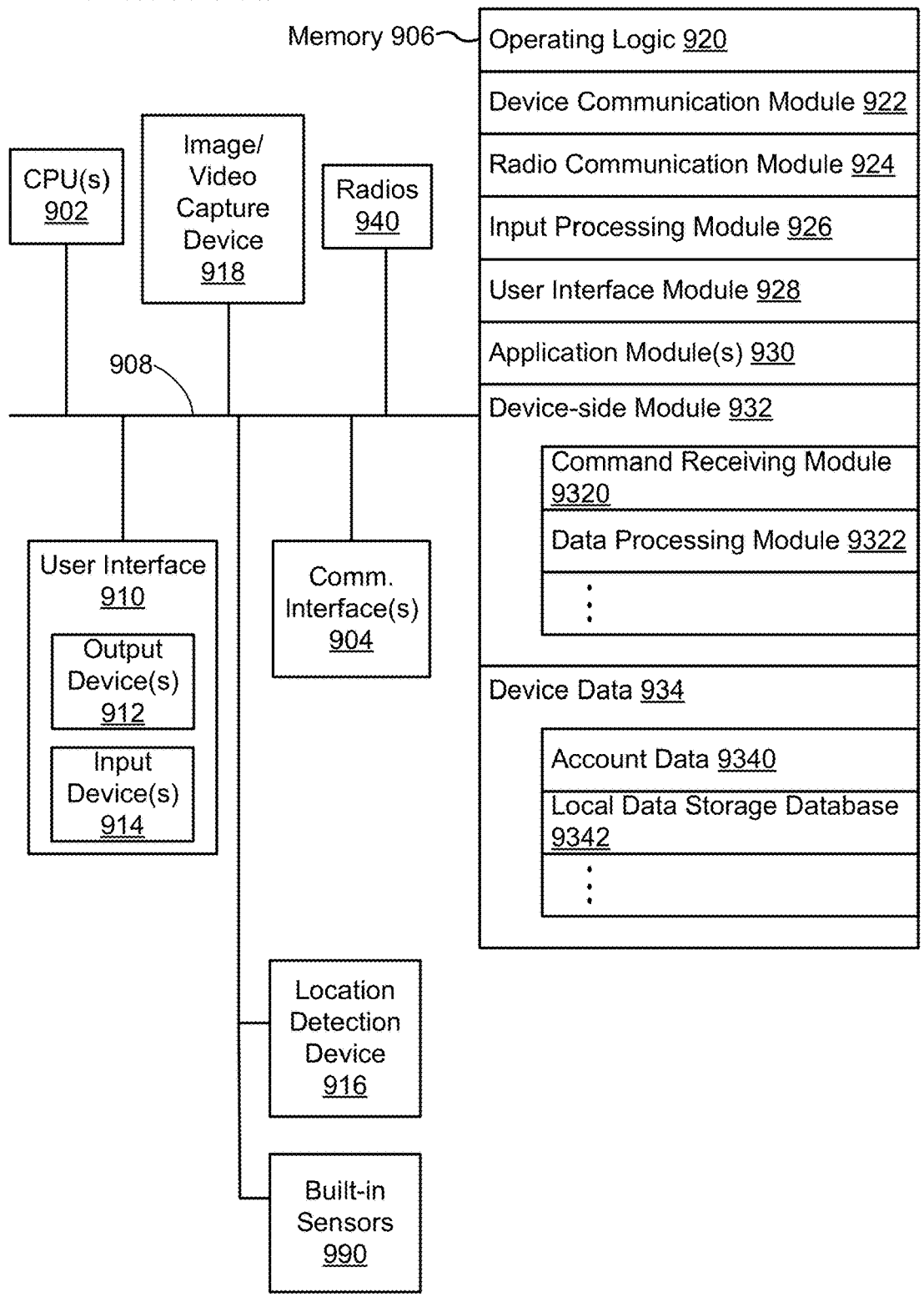
FIG. 9A is a block diagram illustrating a representative smart device, in accordance with some implementations.

FIG. 9A is a block diagram illustrating a representative smart device 204 in accordance with some implementations. In some implementations, the smart device 204 (e.g., any devices of a smart home environment 100, FIGS. 1 and 2) includes one or more processing units (e.g., CPUs, ASICs, FPGAs, microprocessors, and the like) 902, one or more communication interfaces 904, memory 906, radios 940, and one or more communication buses 908 for interconnecting these components (sometimes called a chipset). In some implementations, user interface 910 includes one or more output devices 912 that enable presentation of media content, including one or more speakers and/or one or more visual displays. In some implementations, user interface 910 also includes one or more input devices 914, including user interface components that facilitate user input such as a keyboard, a mouse, a voice-command input unit or microphone, a touch screen display, a touch-sensitive input pad, a gesture capturing camera, or other input buttons or controls. Furthermore, some smart devices 204 use a microphone and voice recognition or a camera and gesture recognition to supplement or replace the keyboard. In some implementations, the smart device 204 includes one or more image/ video capture devices 918 (e.g., cameras, video cameras, scanners, photo sensor units). Optionally, the client device includes a location detection device 916, such as a GPS (global positioning satellite) or other geo-location receiver, for determining the location of the smart device 204.

The built-in sensors 990 include, for example, one or more thermal radiation sensors, ambient temperature sensors, humidity sensors, IR sensors, occupancy sensors (e.g., using RFID sensors), ambient light sensors, motion detectors, accelerometers, and/or gyroscopes.

The radios 940 enable one or more radio communication networks in the smart home environments, and allow a smart device 204 to communicate with other devices. In some implementations, the radios 940 are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document.

Communication interfaces 904 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 906 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 906, or alternatively the non-volatile memory within memory 906, includes a non-transitory computer readable storage medium. In some implementations, memory 906, or the non-transitory computer readable storage medium of memory 906, stores the following programs, modules, and data structures, or a subset or superset thereof:

- Operating logic 920 including procedures for handling various basic system services and for performing hardware dependent tasks;
- Device communication module 922 for connecting to and communicating with other network devices (e.g., network interface 160, such as a router that provides Internet connectivity, networked storage devices, network routing devices, server system 508, etc.) connected to one or more networks 162 via one or more communication interfaces 904 (wired or wireless);
- Radio Communication Module 924 for connecting the smart device 204 to other devices (e.g., controller devices, smart devices 204 in smart home environment 100, client devices 504) via one or more radio communication devices (e.g., radios 940)
- Input processing module 926 for detecting one or more user inputs or interactions from the one or more input devices 914 and interpreting the detected inputs or interactions;
- User interface module 928 for providing and displaying a user interface in which settings, captured data, and/or other data for one or more devices (e.g., the smart device 204, and/or other devices in smart home environment 100) can be configured and/or viewed;
- One or more applications 930 for execution by the smart device 930 (e.g., games, social network applications, smart home applications, and/or other web or non-web based applications) for controlling devices (e.g., executing commands, sending commands, and/or configuring settings of the smart device 204 and/or other client/electronic devices), and for reviewing data captured by devices (e.g., device status and settings, captured data, or other information regarding the smart device 204 and/or other client/electronic devices);
- Device-side module 932, which provides device-side functionalities for device control, data processing and data review, including but not limited to:
  - Command receiving module 9320 for receiving, forwarding, and/or executing instructions and control commands (e.g., from a client device 504, from a smart home provider server system 164, from user inputs detected on the user interface 910, etc.) for operating the smart device 204;
  - Data processing module 9322 for processing data captured or received by one or more inputs (e.g., input devices 914, image/video capture devices 918, location detection device 916), sensors (e.g., built-in sensors 990), interfaces (e.g., communication interfaces 904, radios 940), and/or other components of the smart device 204, and for preparing and sending processed data to a device for review (e.g., client devices 504 for review by a user); and
- Device data 934 storing data associated with devices (e.g., the smart device 204), including, but is not limited to:
  - Account data 9340 storing information related to user accounts loaded on the smart device 204, wherein such information includes cached login credentials, smart device identifiers (e.g., MAC addresses and UUIDs), user interface settings, display preferences, authentication tokens and tags, password keys, etc.; and
  - Local data storage database 9342 for selectively storing raw or processed data associated with the smart device 204 (e.g., video surveillance footage captured by a camera 118).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 906, optionally, stores a subset of the modules and data structures identified above. Furthermore, memory 906, optionally, stores additional modules and data structures not described above.

Figure 9B:
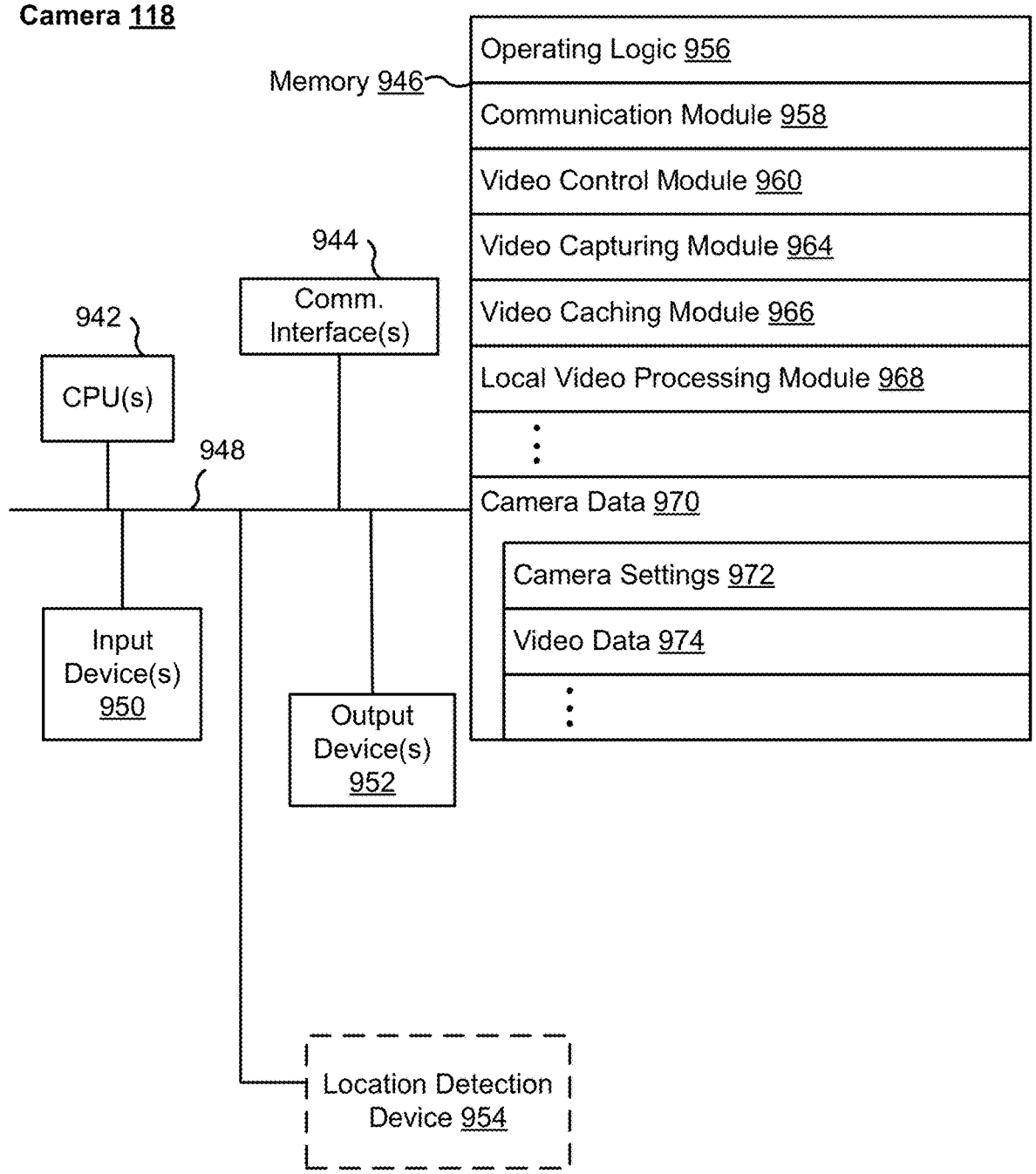
FIG. 9B is a block diagram illustrating a representative video capturing device (e.g., a camera) in accordance with some implementations.

FIG. 9B is a block diagram illustrating a representative camera 118 in accordance with some implementations. In some implementations, the camera 118 includes one or more processing units (e.g., CPUs, ASICs, FPGAs, microprocessors, and the like) 942, one or more communication interfaces 944, memory 946, and one or more communication buses 948 for interconnecting these components (sometimes called a chipset). In some implementations, the camera 118 includes one or more input devices 950 such as one or more buttons for receiving input and one or more microphones. In some implementations, the camera 118 includes one or more output devices 952 such as one or more indicator lights, a sound card, a speaker, a small display for displaying textual information and error codes, playing audio, etc. In some implementations, the camera 118 optionally includes a location detection device 954, such as a GPS (global positioning satellite) or other geo-location receiver, for determining the location of the camera 118.

Communication interfaces 944 include, for example, hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Memory 946 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 946, or alternatively the non-volatile memory within memory 946, includes a non-transitory computer readable storage medium. In some implementations, memory 946, or the non-transitory computer readable storage medium of memory 946, stores the following programs, modules, and data structures, or a subset or superset thereof:

Operating system 956 including procedures for handling various basic system services and for performing hardware dependent tasks;

Network communication module 958 for connecting the camera 118 to other computing devices (e.g., hub device server system 508, video server system 552, the client device 504, network routing devices, one or more controller devices, and networked storage devices) connected to the one or more networks 162 via the one or more communication interfaces 944 (wired or wireless);

Video control module 960 for modifying the operation mode (e.g., zoom level, resolution, frame rate, recording and playback volume, lighting adjustment, AE and IR modes, etc.) of the camera 118, enabling/disabling the audio and/or video recording functions of the camera 118, changing the pan and tilt angles of the camera 118, resetting the camera 118, and/or the like;

Video capturing module 964 for capturing and generating a video stream and sending the video stream to the hub device server system 508 or video server system 552 as a continuous feed or in short bursts, and optionally generating a rescaled version of the video stream and sending the video stream at the original captured resolution and the rescaled resolution;

Video caching module 966 for storing some or all captured video data locally at one or more local storage devices (e.g., memory, flash drives, internal hard disks, portable disks, etc.);

Local video processing module 968 for performing preliminary processing of the captured video data locally at the camera 118, including for example, compressing and encrypting the captured video data for network transmission, preliminary motion event detection, preliminary false positive suppression for motion event detection, preliminary motion vector generation, etc.; and Camera data 970 storing data, including but not limited to:
Camera settings 972, including network settings, camera operation settings, camera storage settings, etc.; and
Video data 974, including video segments and motion vectors for detected motion event candidates to be sent to the hub device server system 508 or video server system 552.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 946, optionally, stores a subset of the modules and data structures identified above. Furthermore, memory 946, optionally, stores additional modules and data structures not described above. Additionally, camera 118, being an example of a smart device 204, optionally includes components and modules included in smart device 204 as shown in FIG. 9A that are not shown in FIG. 9B.

Figure 10:
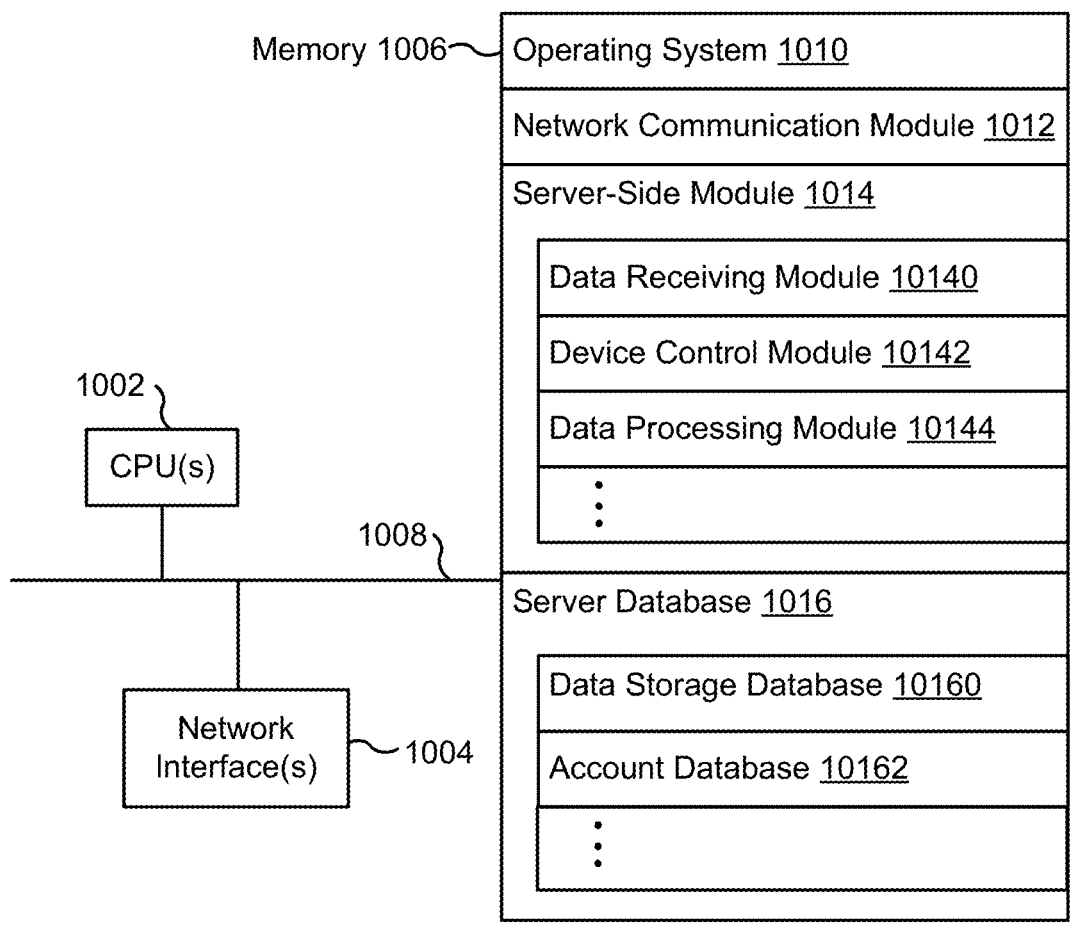
FIG. 10 is a block diagram illustrating a representative smart home provider server system, in accordance with some implementations.

FIG. 10 is a block diagram illustrating the smart home provider server system 164 in accordance with some implementations. The smart home provider server system 164, typically, includes one or more processing units (CPUs) 1002, one or more network interfaces 1004 (e.g., including an I/O interface to one or more client devices and an I/O interface to one or more electronic devices), memory 1006, and one or more communication buses 1008 for interconnecting these components (sometimes called a chipset). Memory 1006 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1006, optionally, includes one or more storage devices remotely located from one or more processing units 1002. Memory 1006, or alternatively the non-volatile memory within memory 1006, includes a non-transitory computer readable storage medium. In some implementations, memory 1006, or the non-transitory computer readable storage medium of memory 1006, stores the following programs, modules, and data structures, or a subset or superset thereof:

Operating system 1010 including procedures for handling various basic system services and for performing hardware dependent tasks;

Network communication module 1012 for connecting the smart home provider server system 164 to other systems and devices (e.g., client devices, electronic devices, hub device server system 508, video server system 552, and systems connected to one or more networks 162, FIGS. 1-5B) via one or more network interfaces 1004 (wired or wireless);

Server-side module 1014, which provides server-side functionalities for device control, data processing and data review, including but not limited to:
Data receiving module 10140 for receiving data from electronic devices (e.g., video data from a camera 118, FIG. 1), and preparing the received data for further processing and storage in the data storage database 10160;
Device control module 10142 for generating and sending server-initiated control commands to modify operation modes of electronic devices (e.g., devices of a smart home environment 100), and/or receiving (e.g., from client devices 504) and forwarding user-initiated control commands to modify operation modes of the electronic devices;

Data processing module 10144 for processing the data provided by the electronic devices, and/or preparing and sending processed data to a device for review (e.g., client devices 504 for review by a user); and Server database 1016, including but not limited to:

Data storage database 10160 for storing data associated with each electronic device (e.g., each camera) of each user account, as well as data processing models, processed data results, and other relevant metadata (e.g., names of data results, location of electronic device, creation time, duration, settings of the electronic device, etc.) associated with the data, wherein (optionally) all or a portion of the data and/or processing associated with the electronic devices are stored securely; and Account database 10162 for storing account information for user accounts, including user account information, information and settings for linked hub devices and electronic devices (e.g., hub device identifications), hub device specific secrets, relevant user and hardware characteristics (e.g., service tier, device model, storage capacity, processing capabilities, etc.), user interface settings, data review preferences, etc., where the information for associated electronic devices includes, but is not limited to, one or more device identifiers (e.g., MAC address and UUID), device specific secrets, and displayed titles.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1006, optionally, stores a subset of the modules and data structures identified above. Furthermore, memory 1006, optionally, stores additional modules and data structures not described above.

Furthermore, in some implementations, the functions of any of the devices and systems described herein (e.g., hub device 180, hub device server system 508, video server system 552, client device 504, smart device 204, camera 118, smart home provider server system 164) are interchangeable with one another and may be performed by any other devices or systems, where the corresponding sub-modules of these functions may additionally and/or alternatively be located within and executed by any of the devices and systems. As one example, generating of user interfaces may be performed by the user interface module 74610 (which may be located at the client interface server 556 or at the video server 554) or by the user interface module 826, depending on whether the user is accessing the video feeds and corresponding histories through a web browser 823 or an application 824 (e.g., a dedicated smart home management application) at the client device 504. The devices and systems shown in and described with respect to FIGS. 6-10 are merely illustrative, and different configurations of the modules for implementing the functions described herein are possible in various implementations.

Exemplary User Interfaces

Figure 11A:
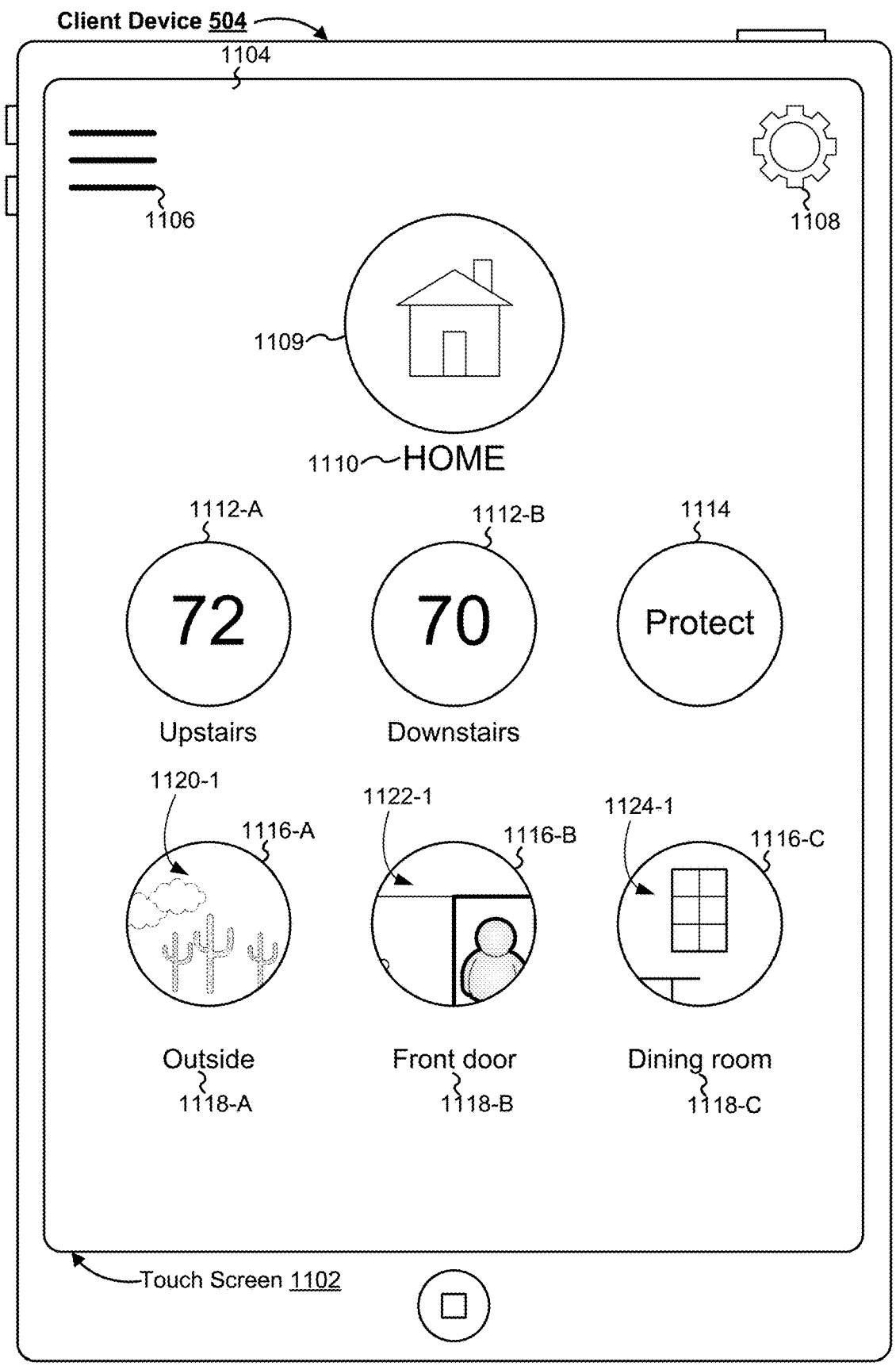
FIGS. 11A-11V illustrate example user interfaces on a client device for monitoring and reviewing video feeds in accordance with some implementations.
Figure 11B:
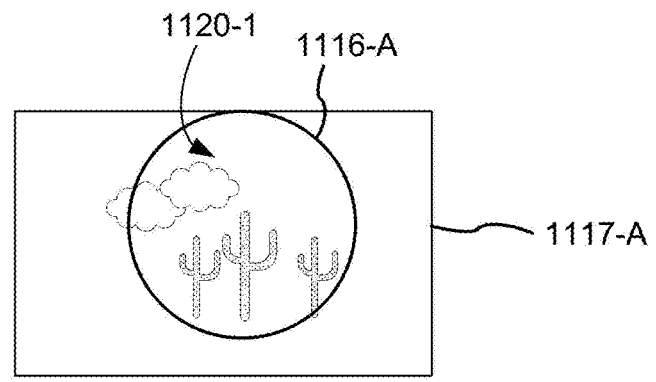
Figure 11B:
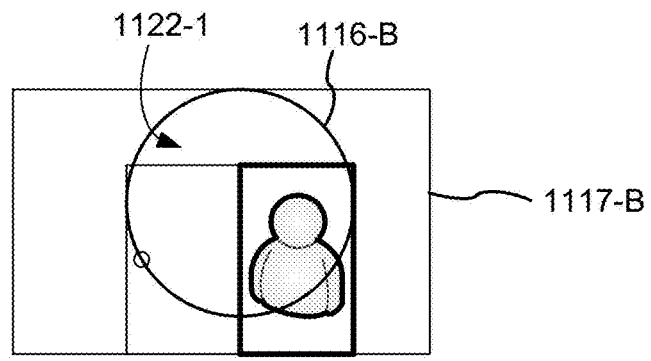
Figure 11B:
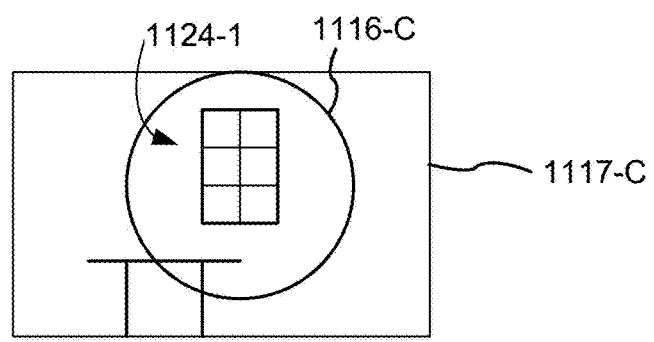
Figure 11C:
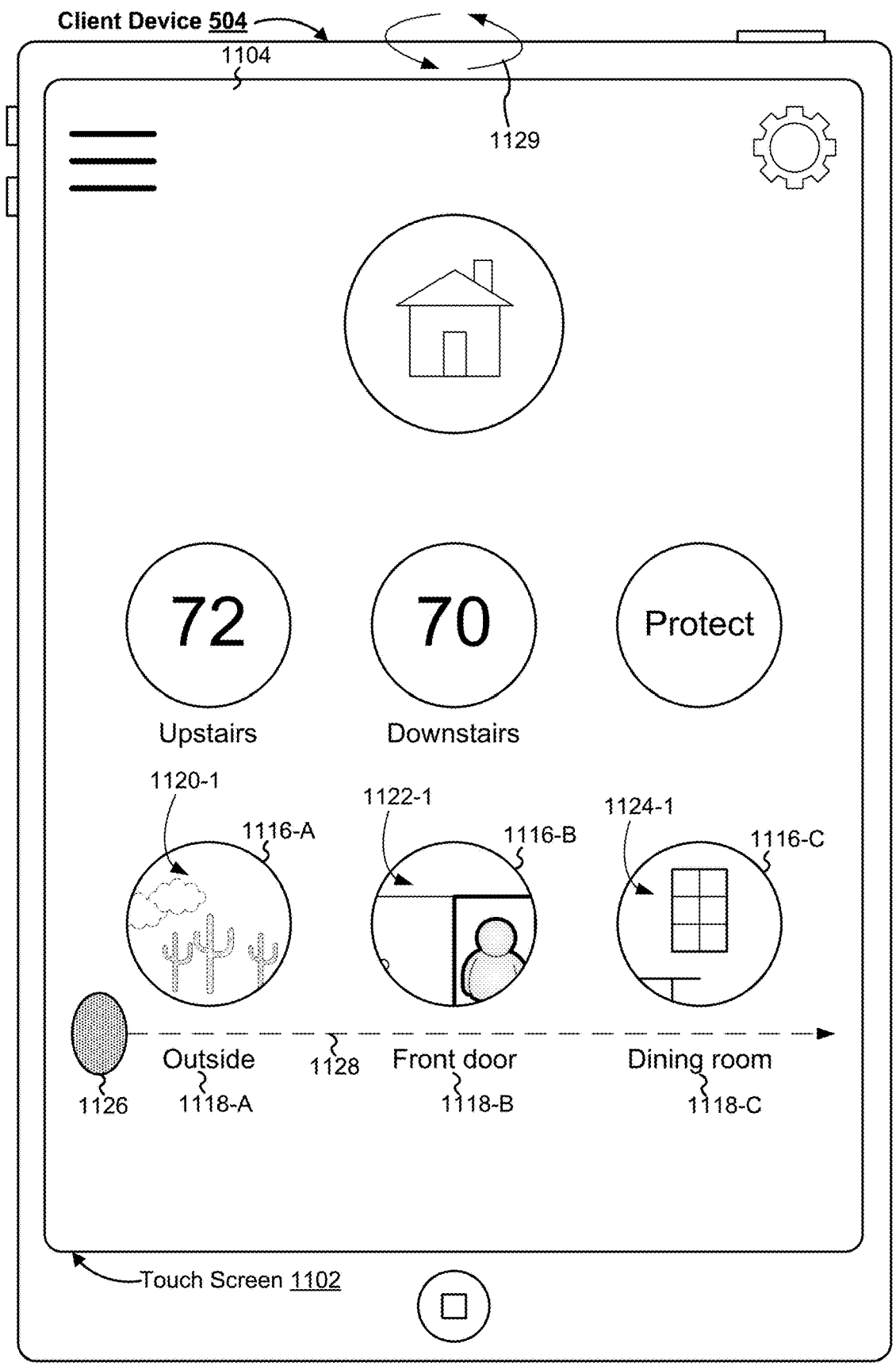
Figure 11D:
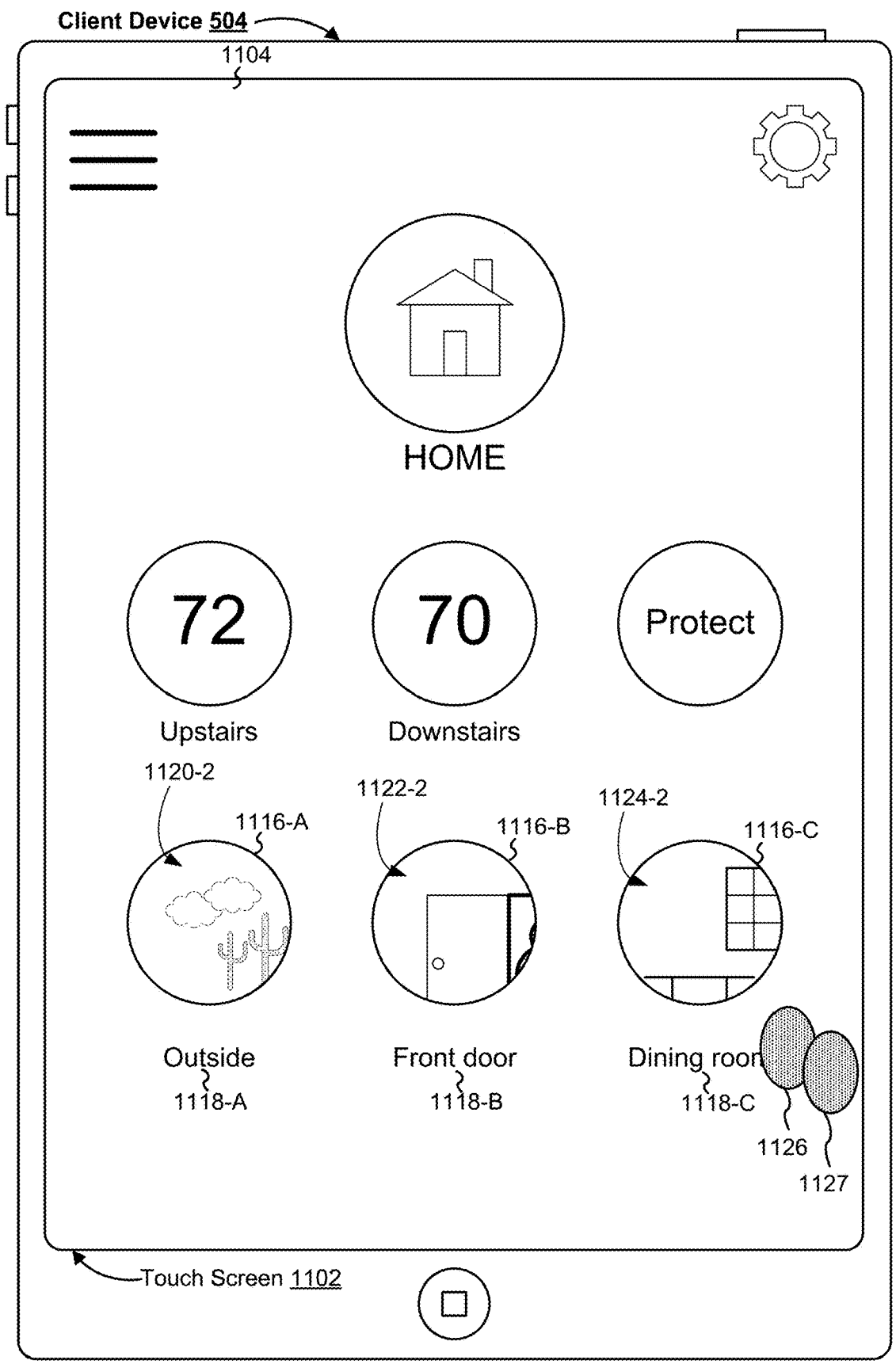
Figure 11E:
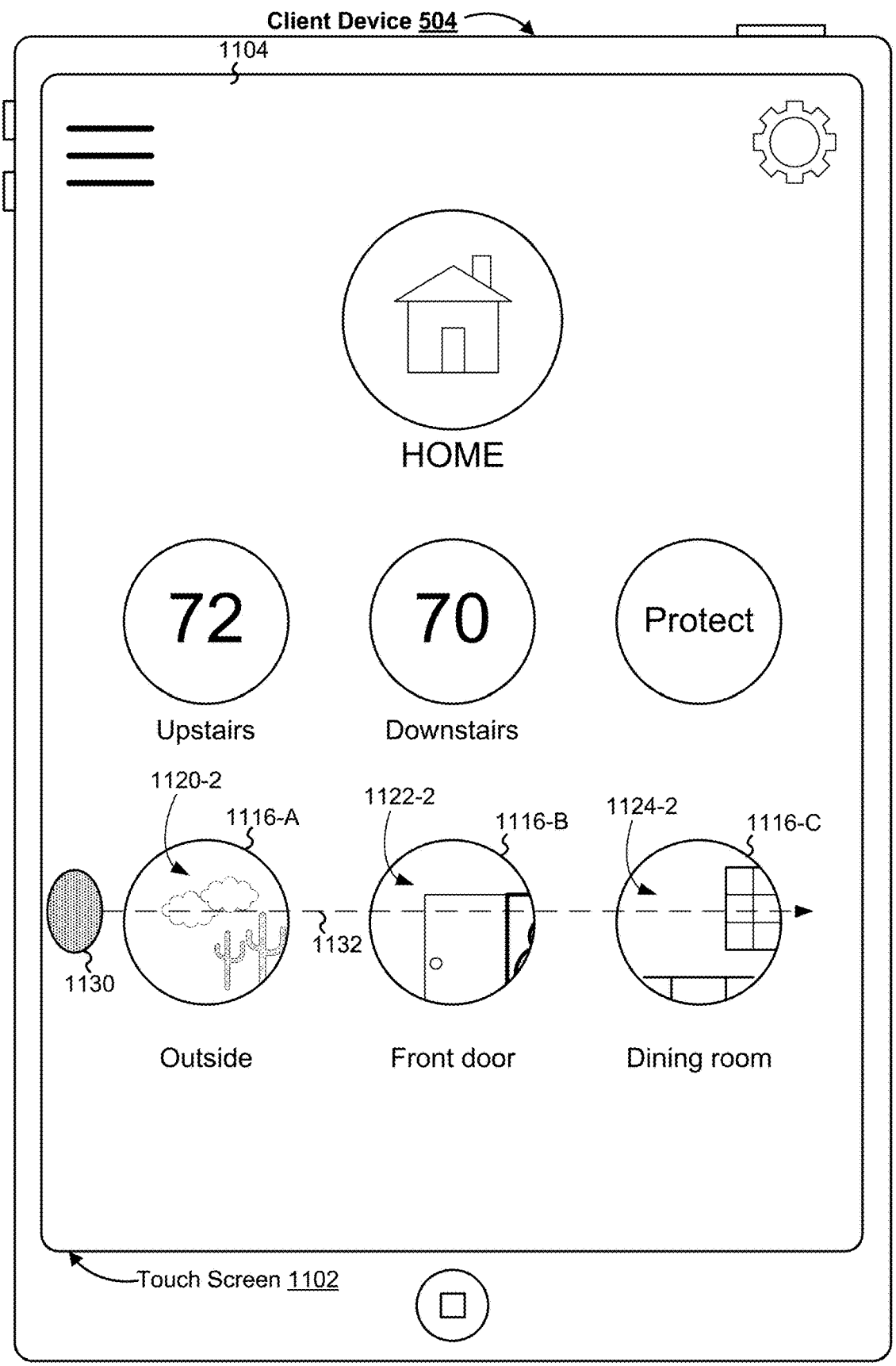
Figure 11F:
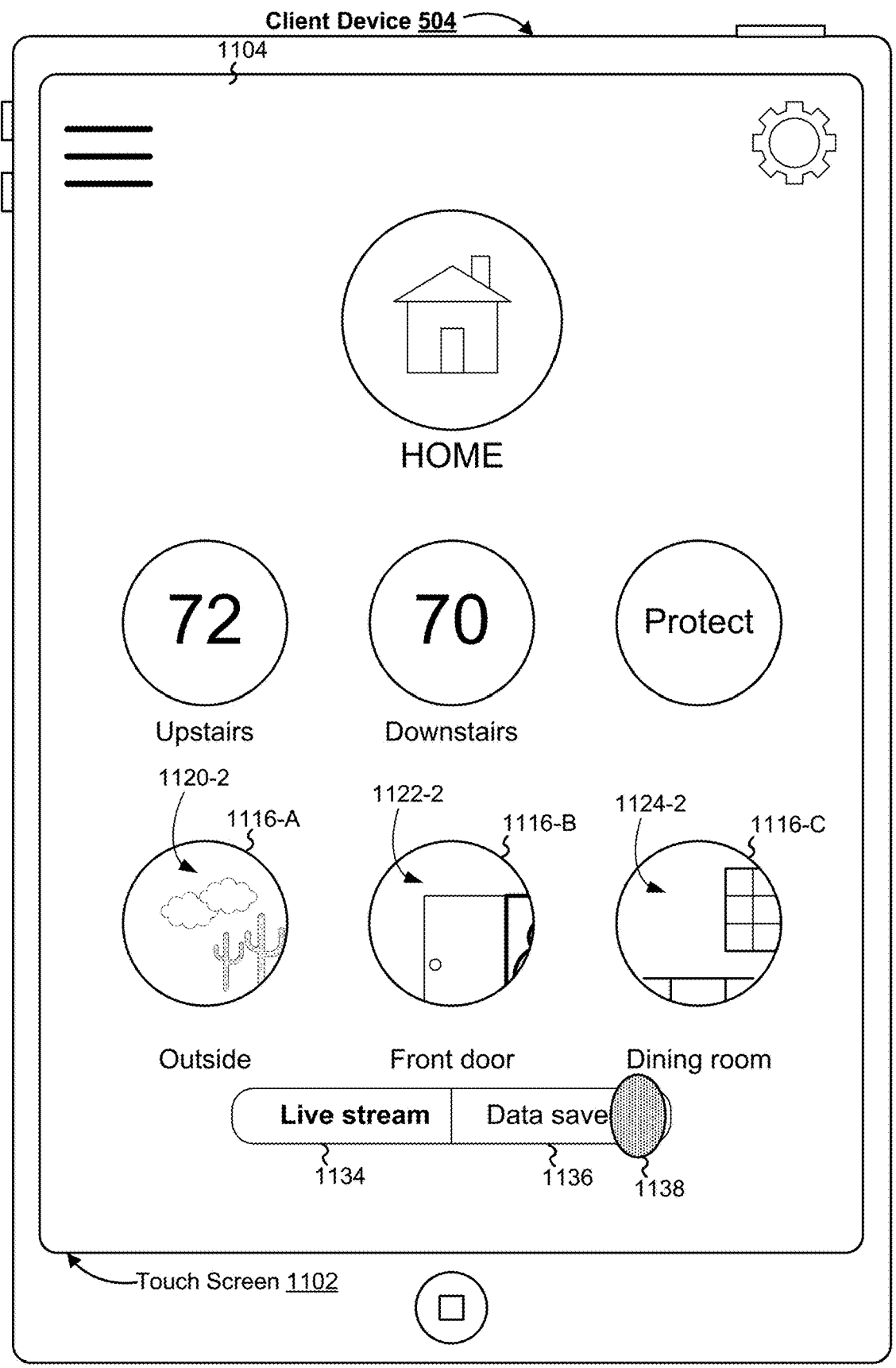
Figure 11G:
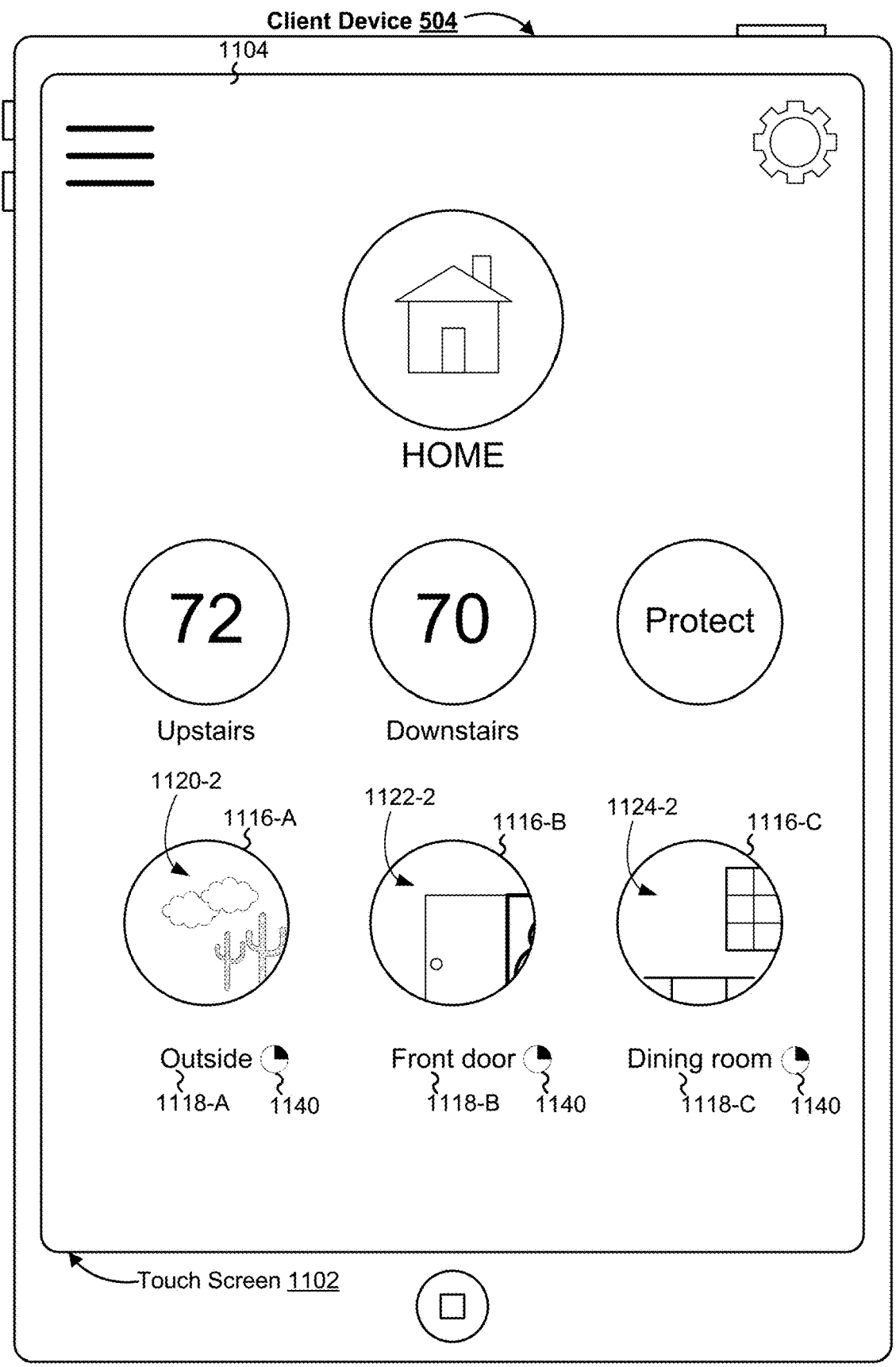
Figure 11H:
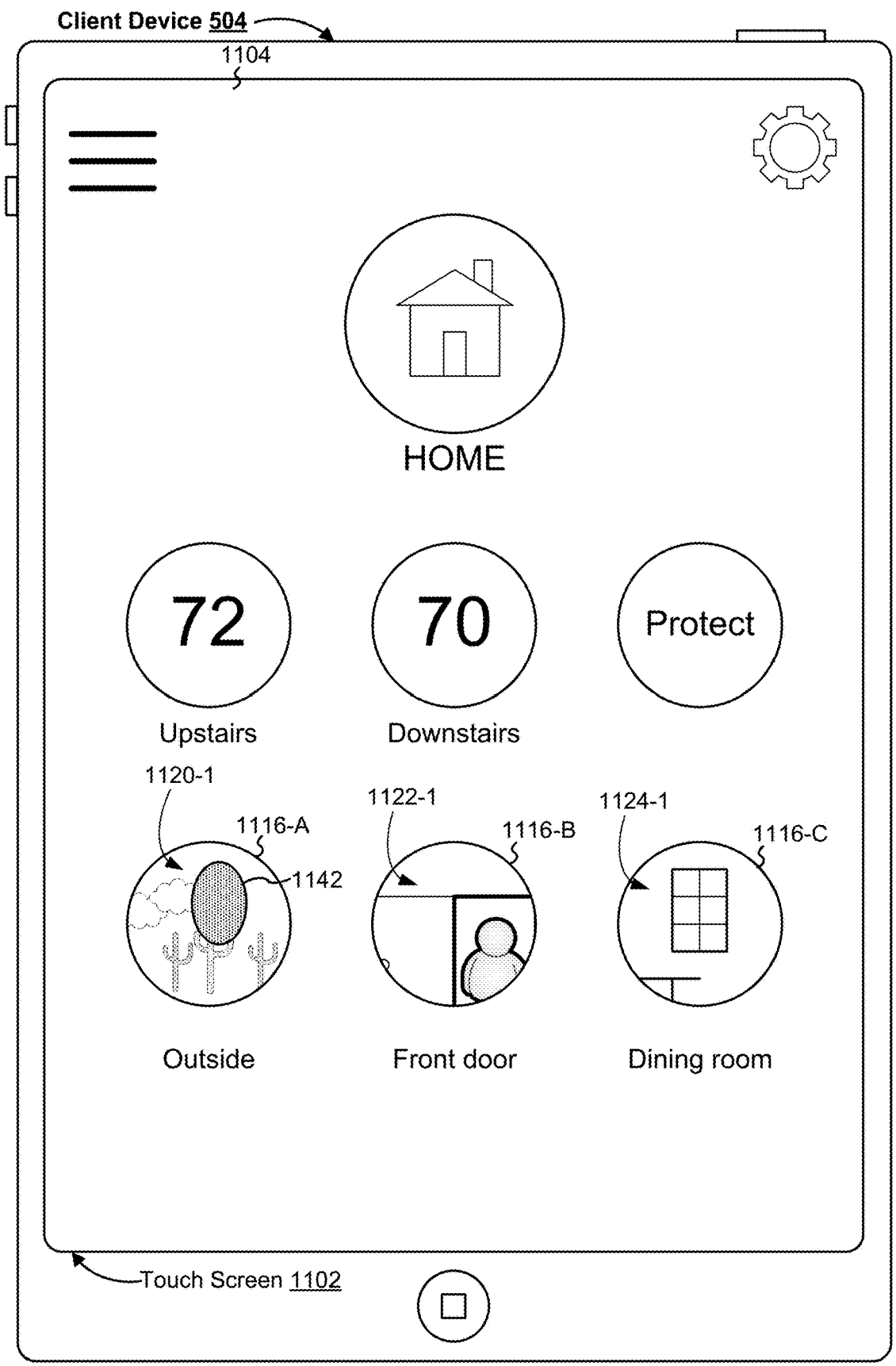
Figure 11I:
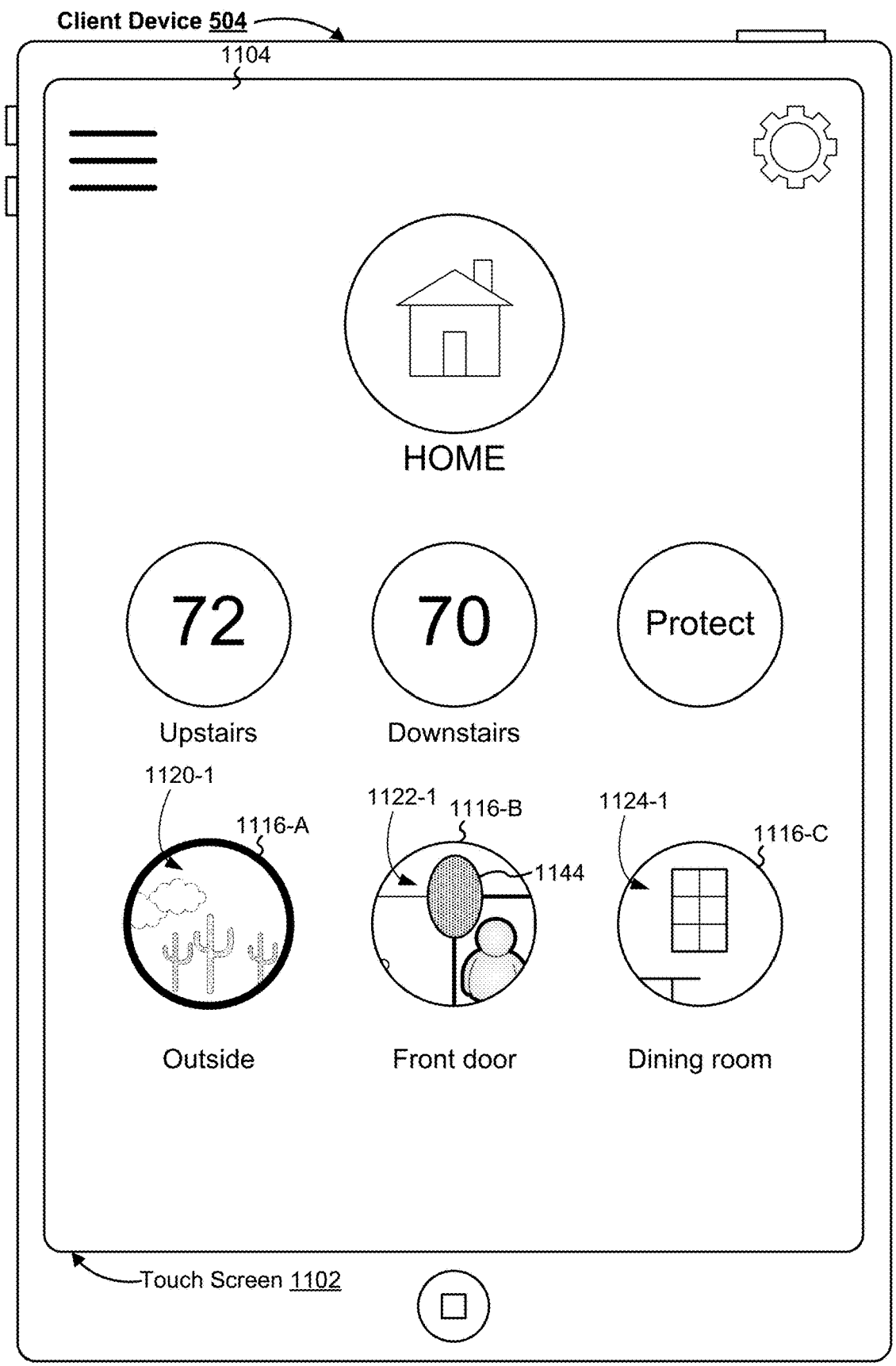
Figure 11J:
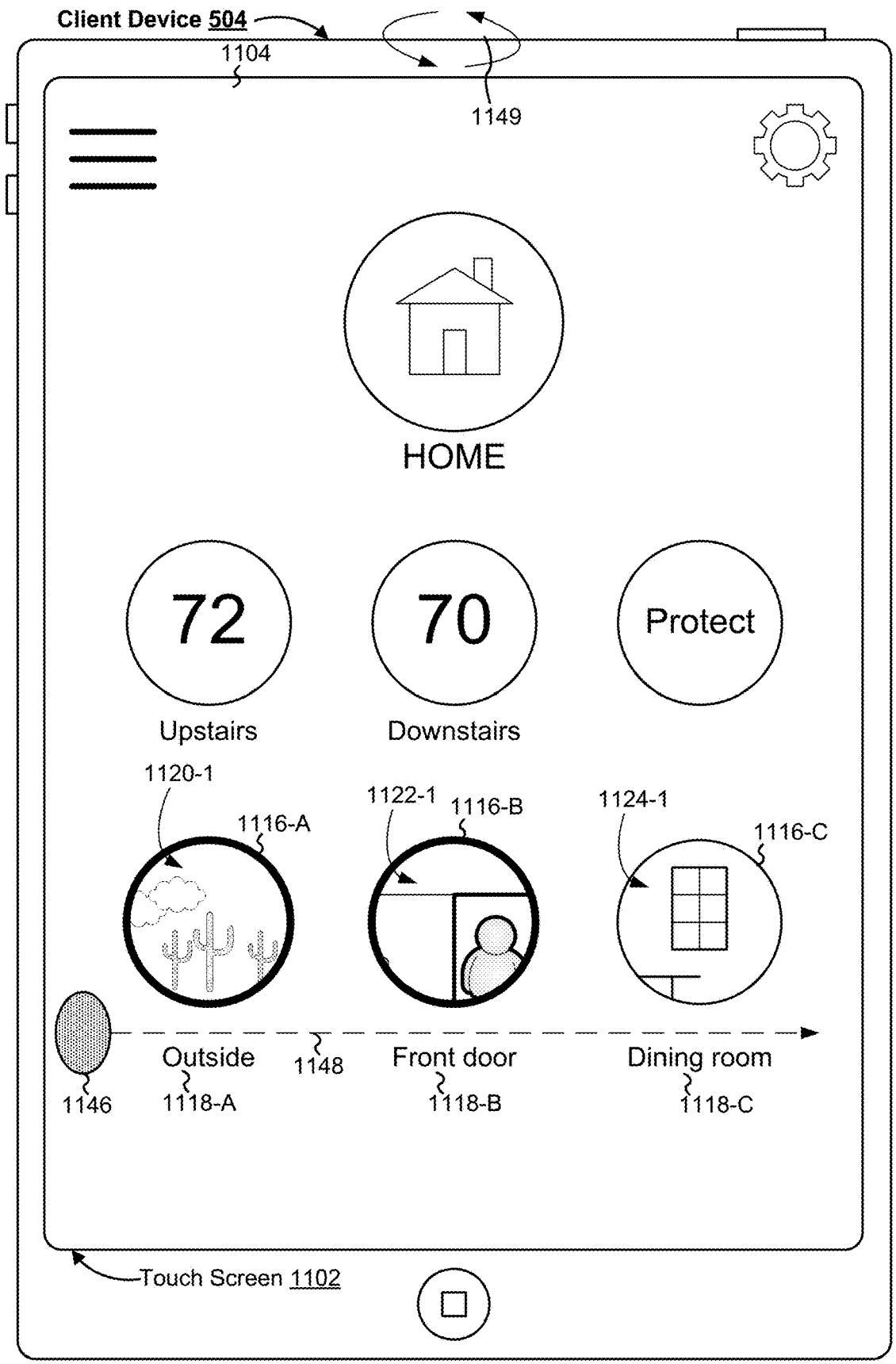
Figure 11K:
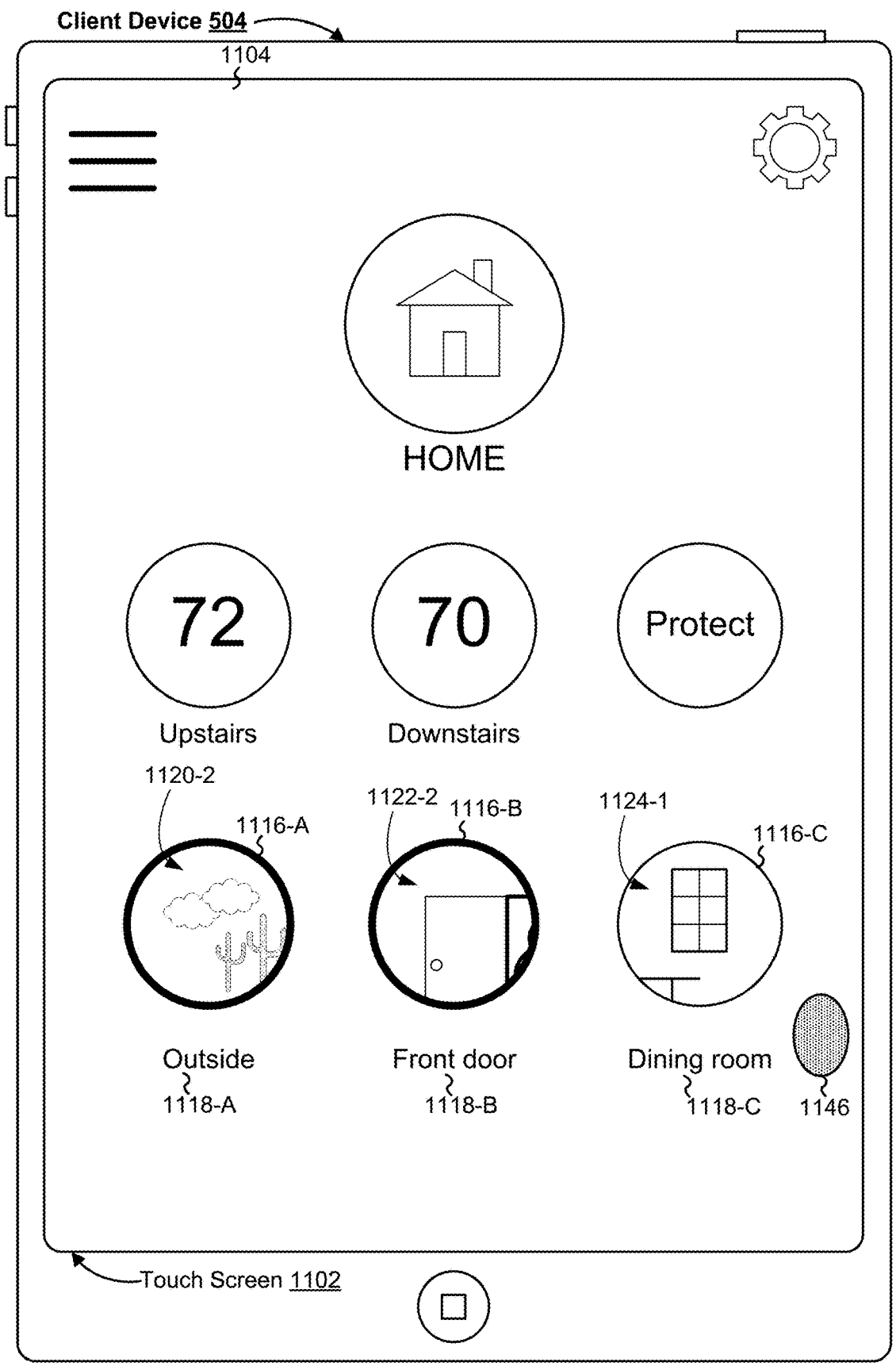
Figure 11L:
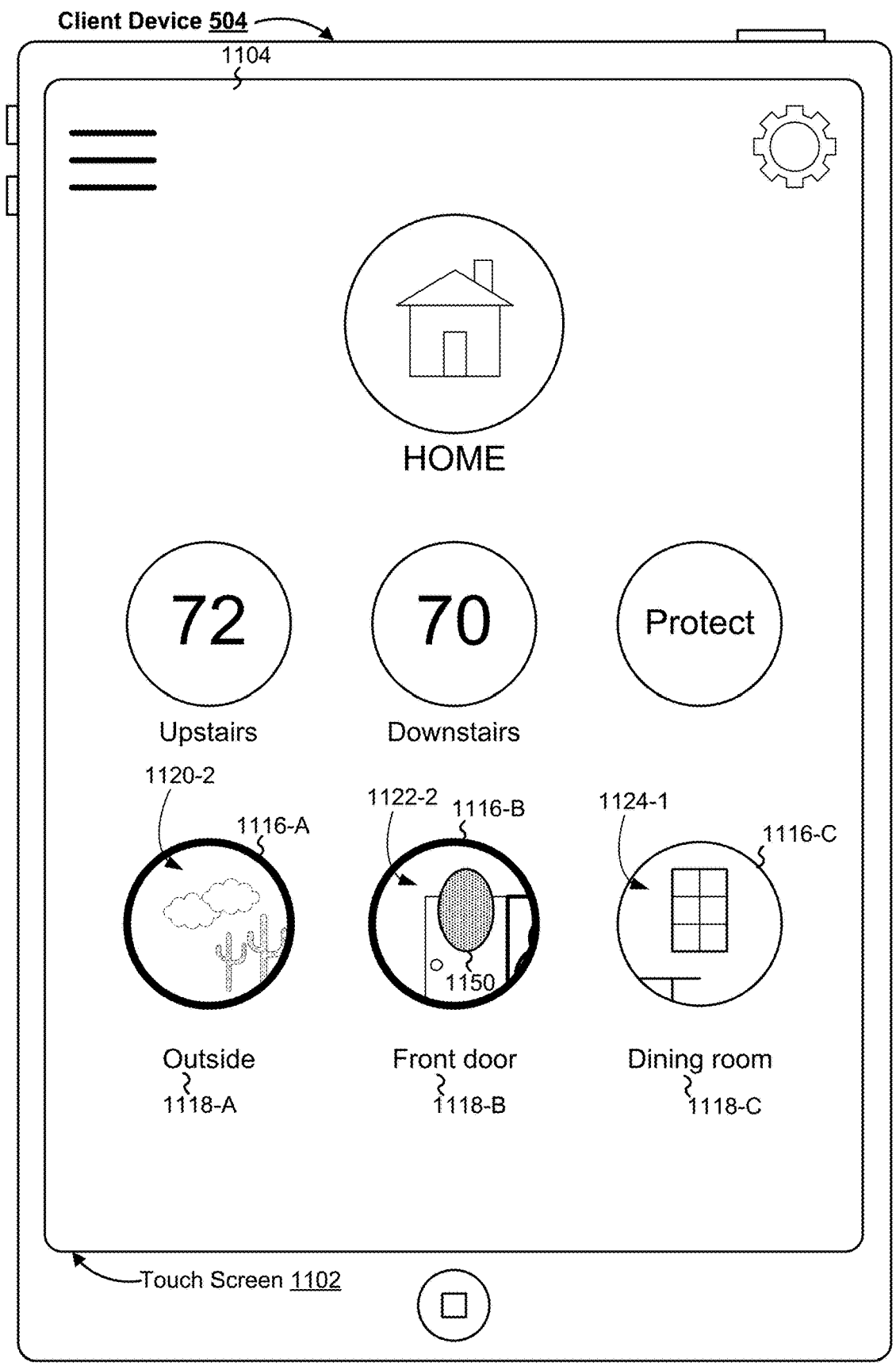
Figure 11M:
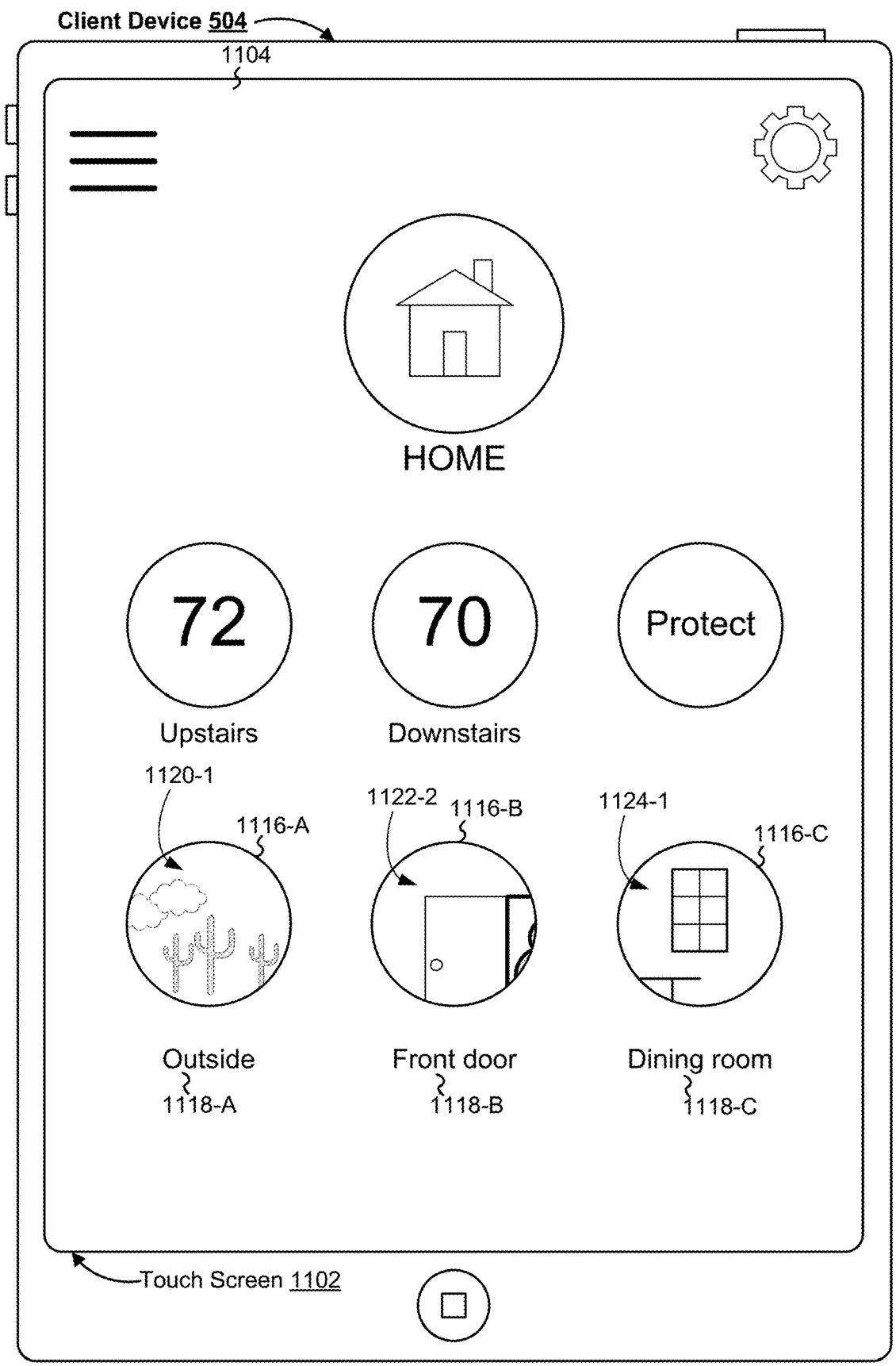
Figure 11N:
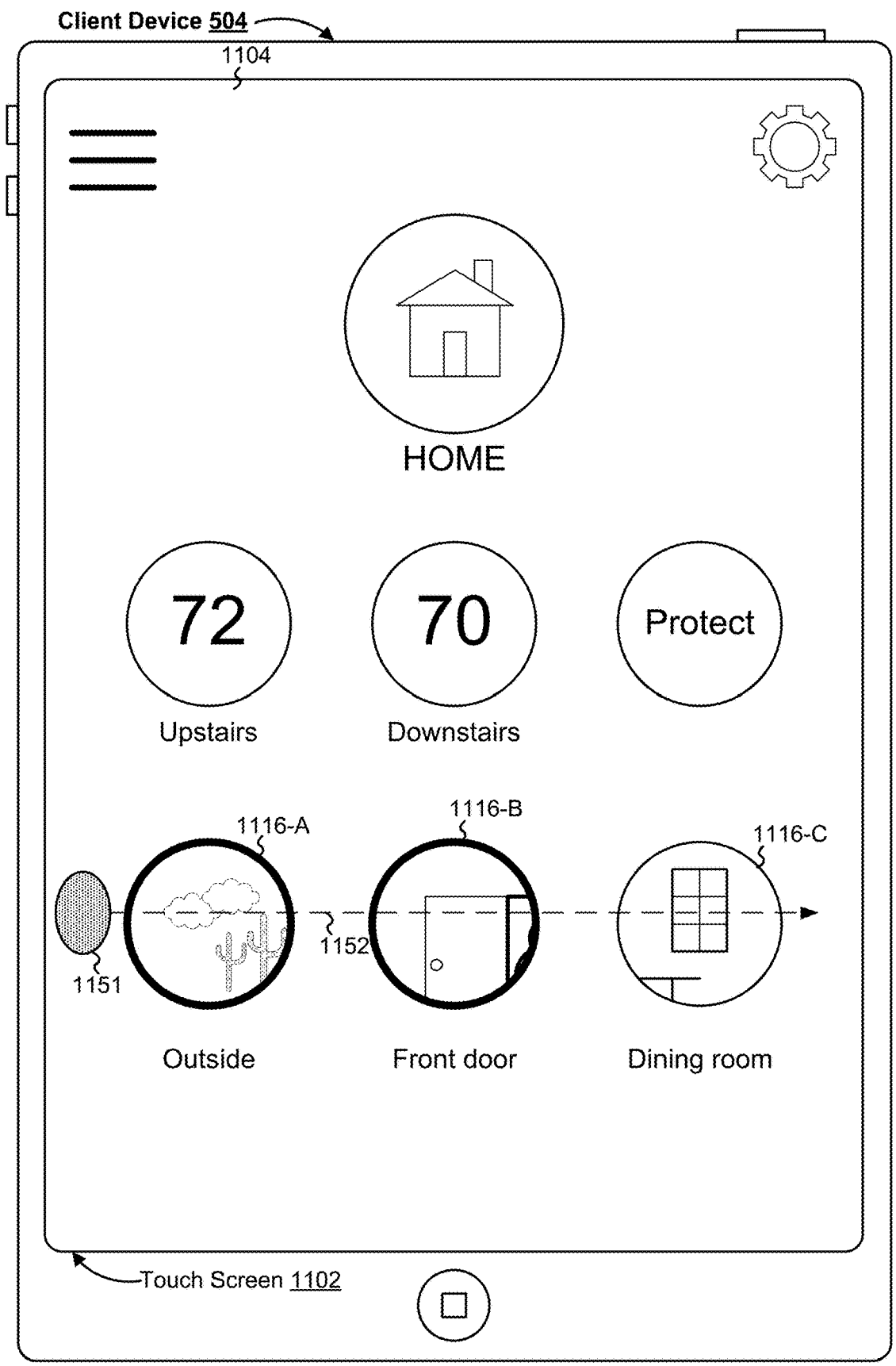
Figure 11O:
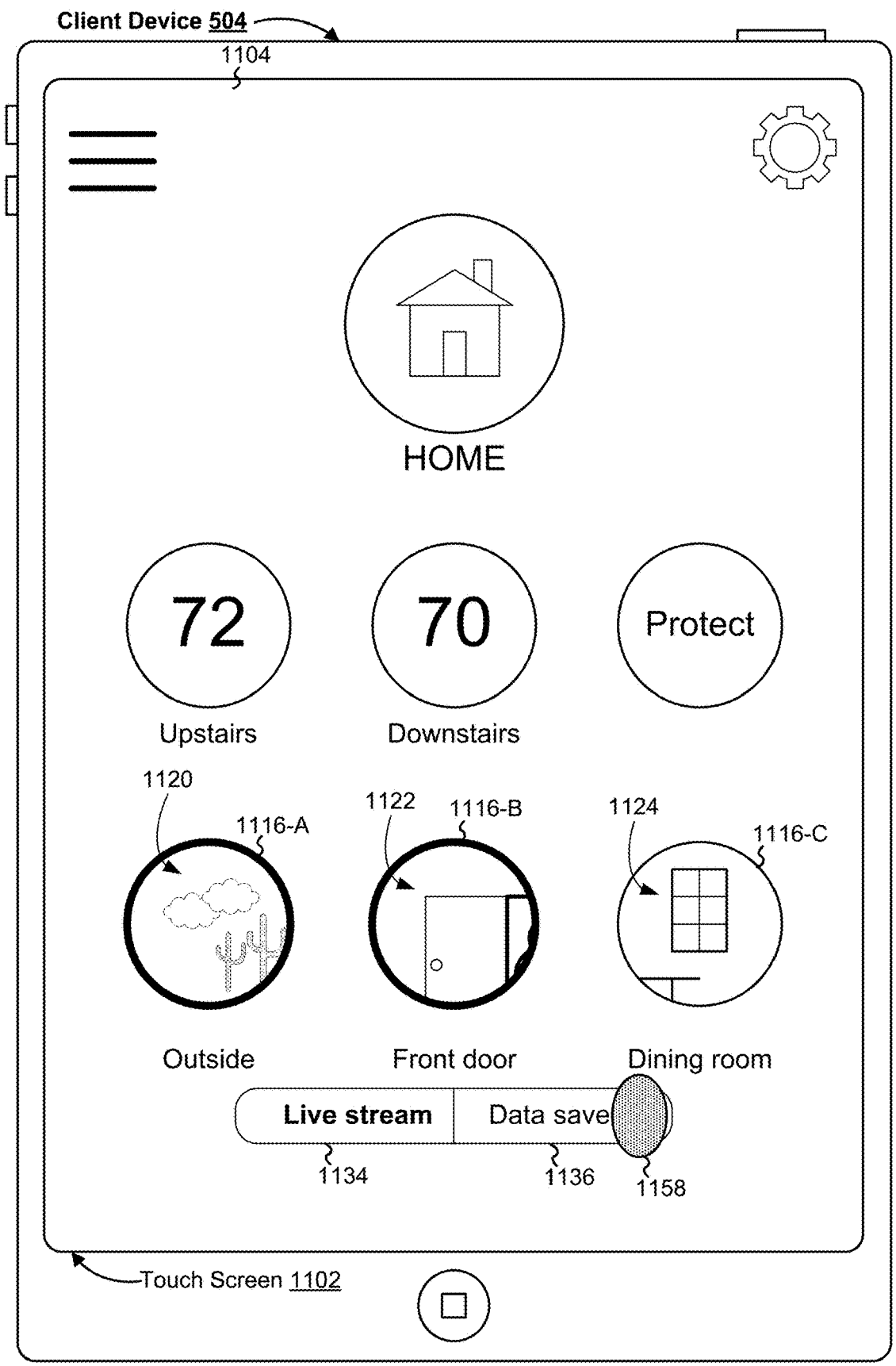
Figure 11P:
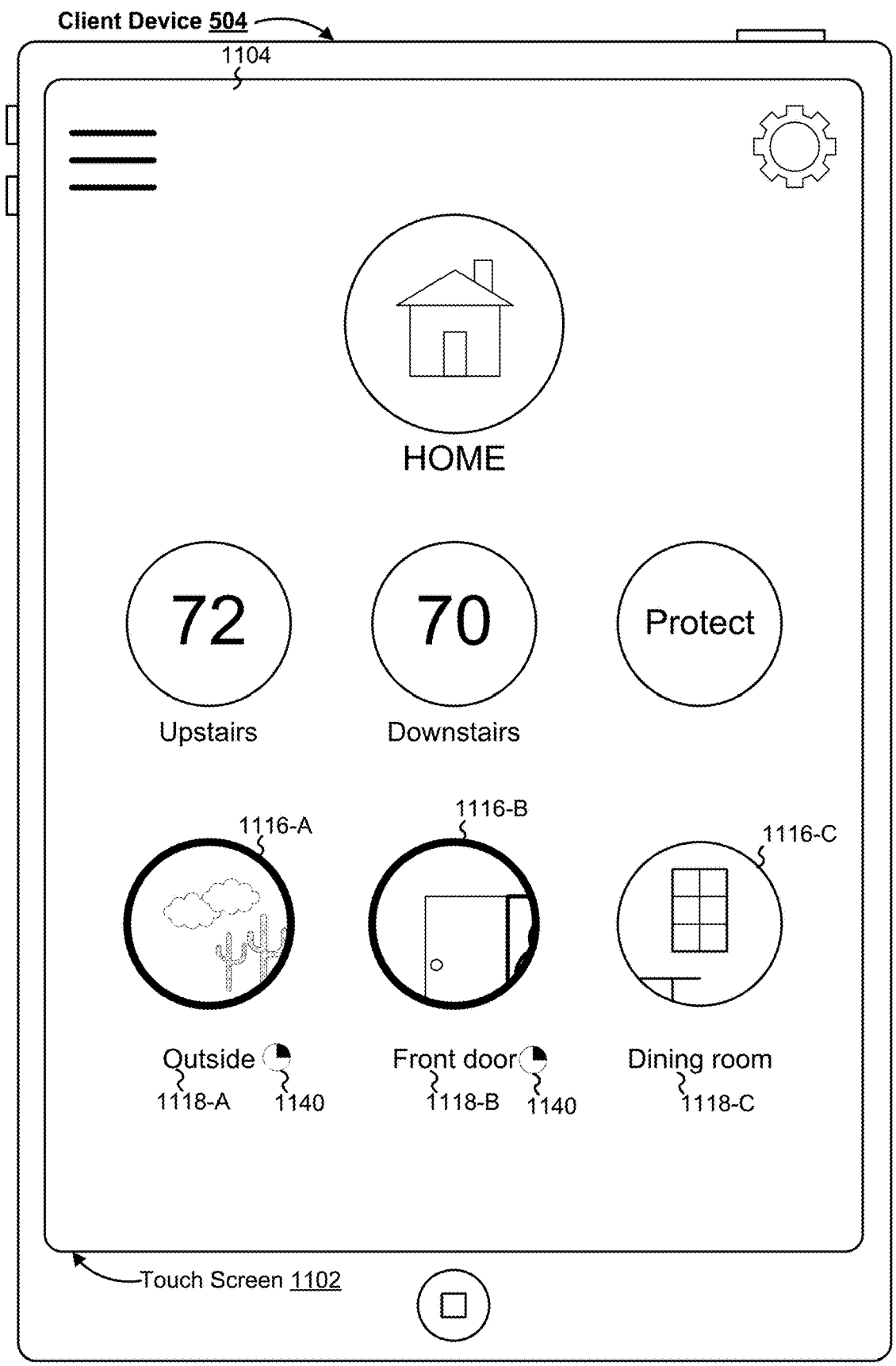
Figure 11Q:
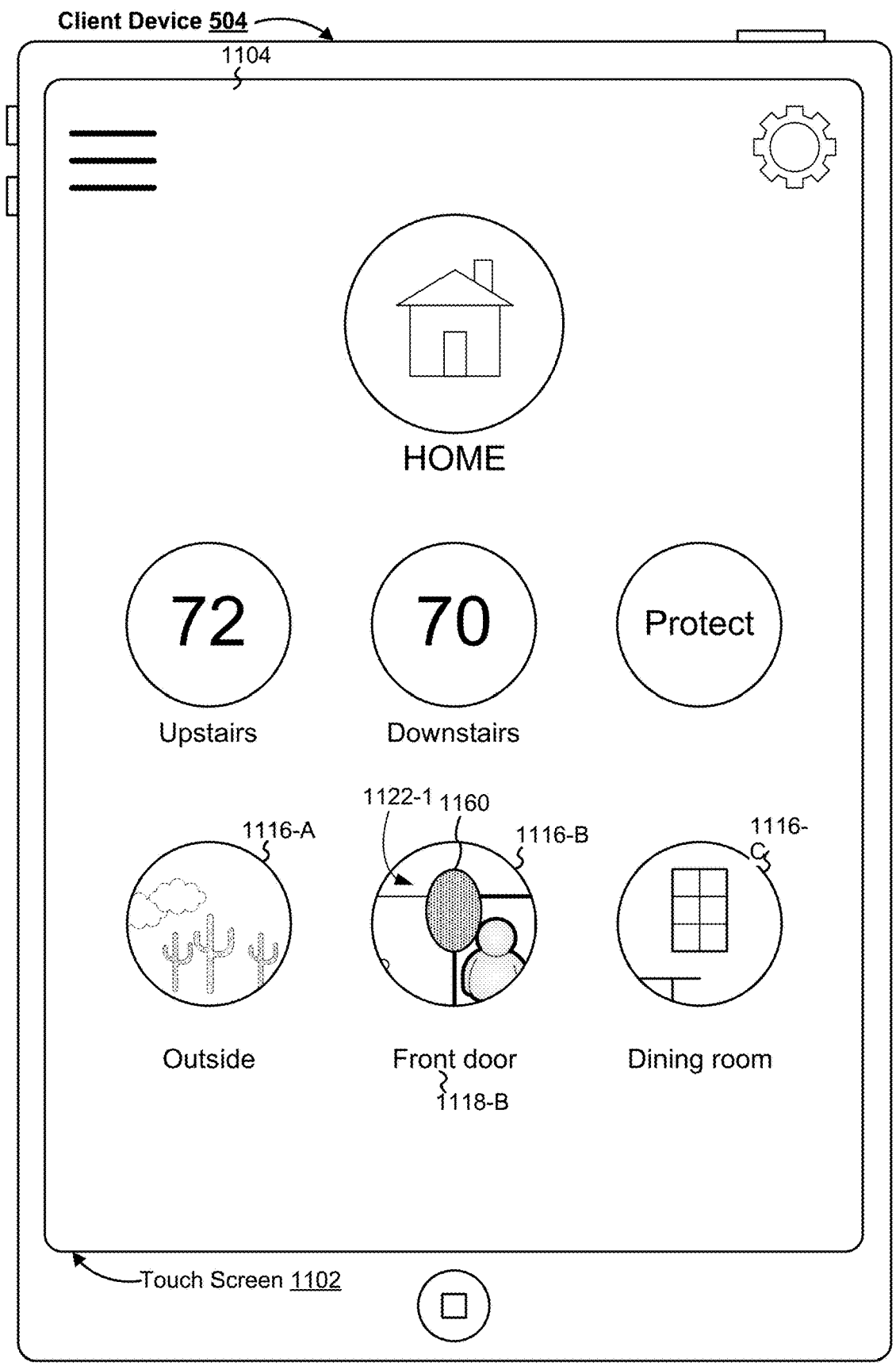
Figure 11R:
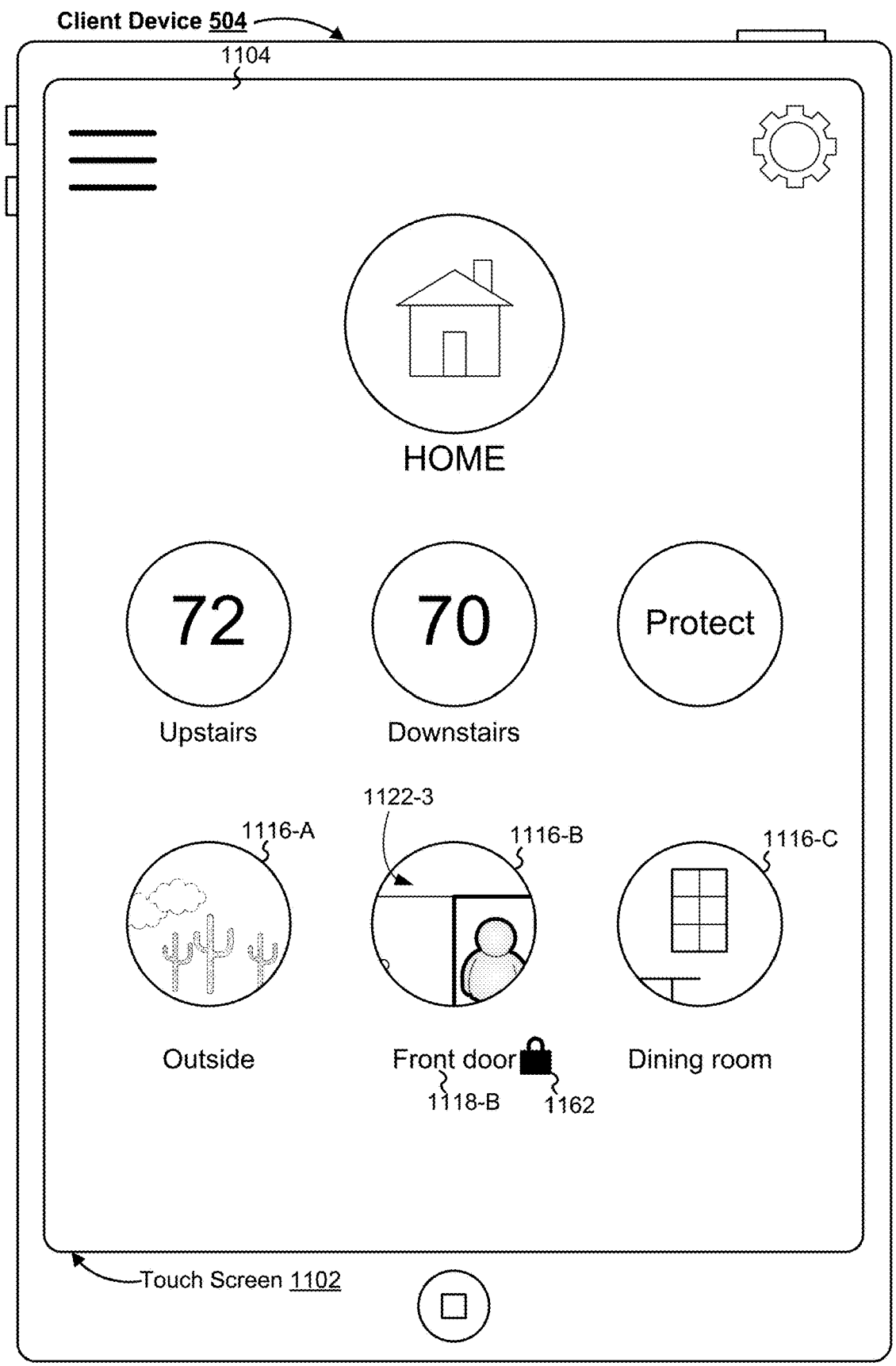
Figure 11S:
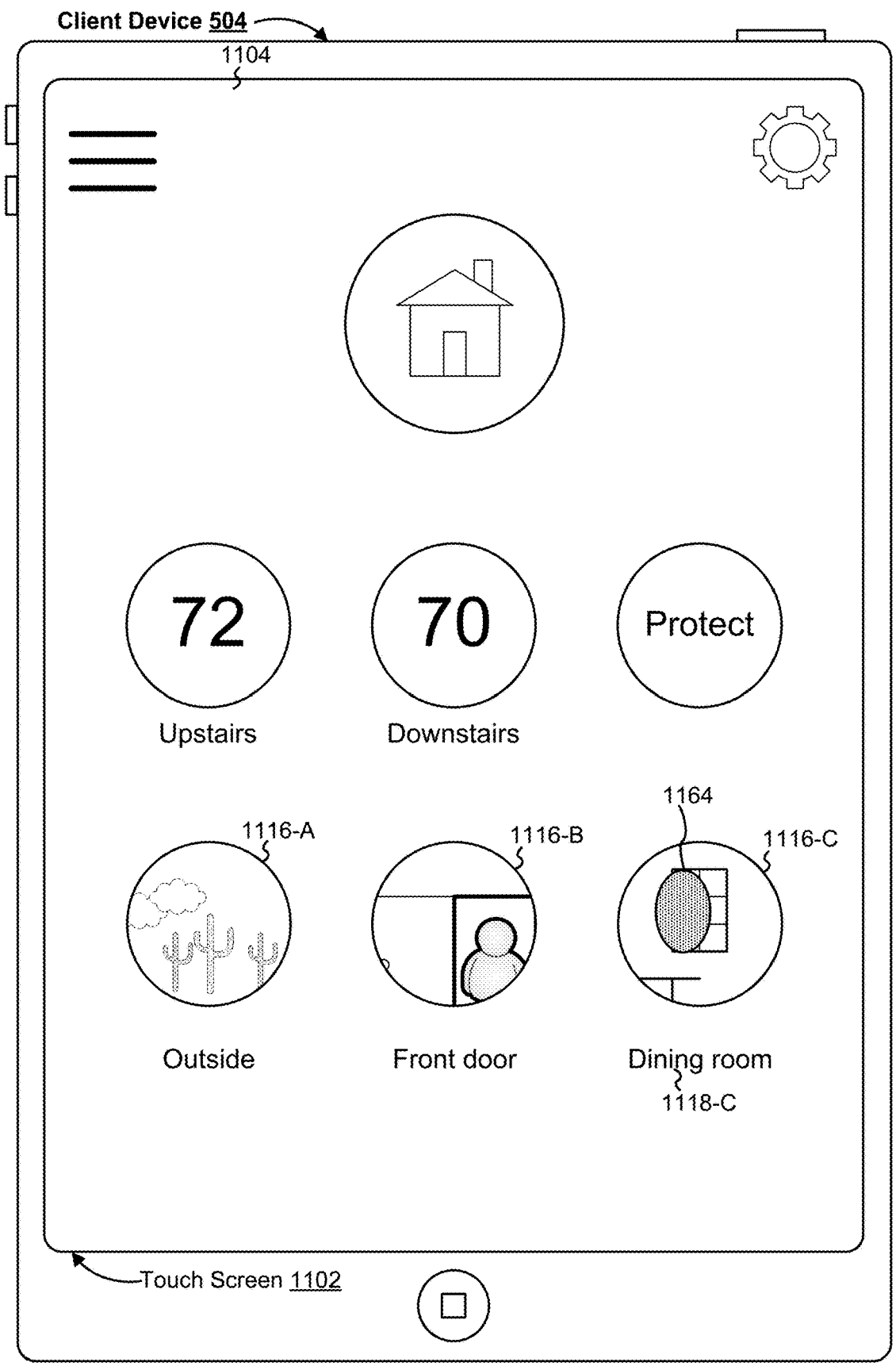
Figure 11T:
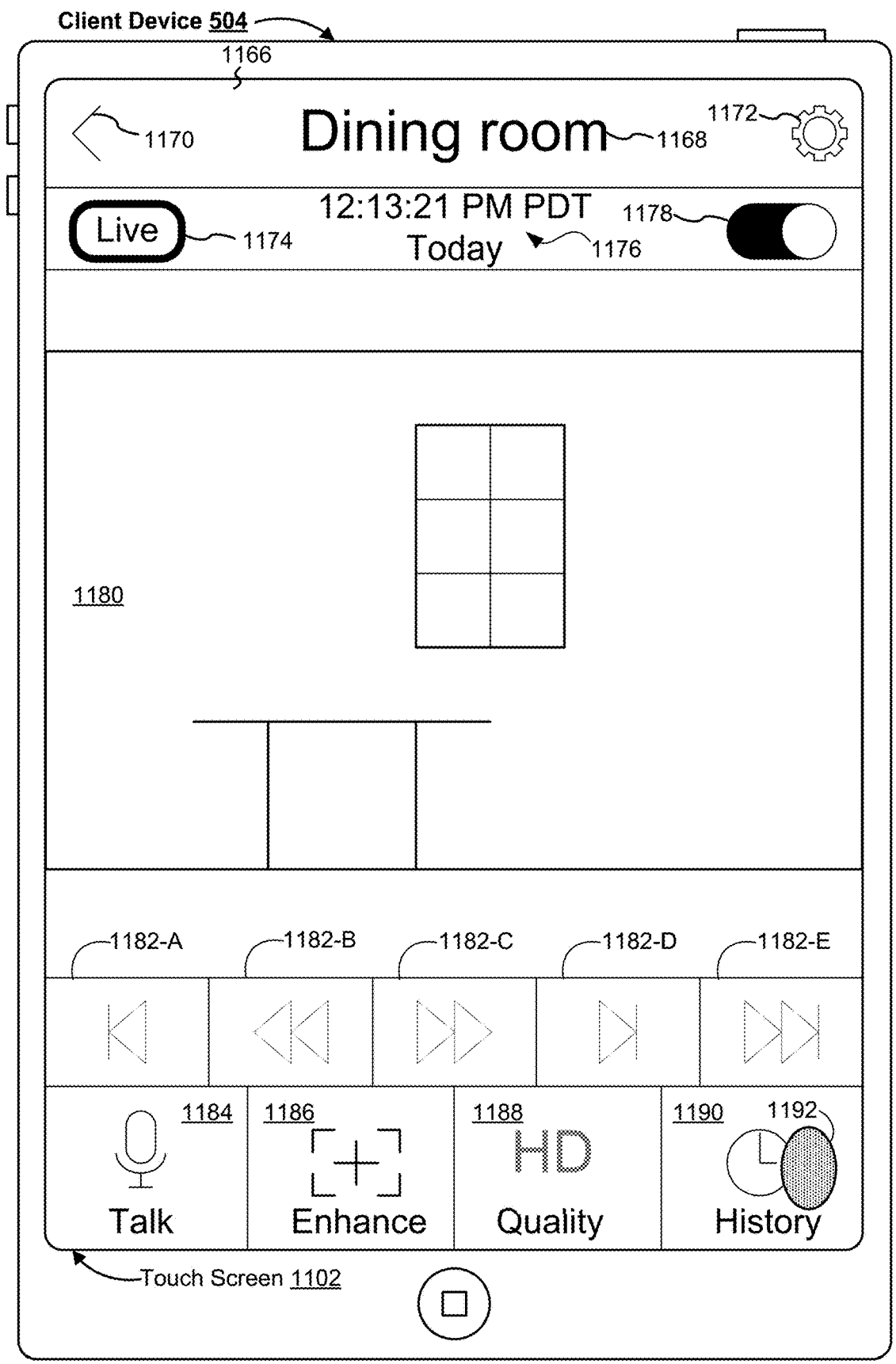
Figure 11U:
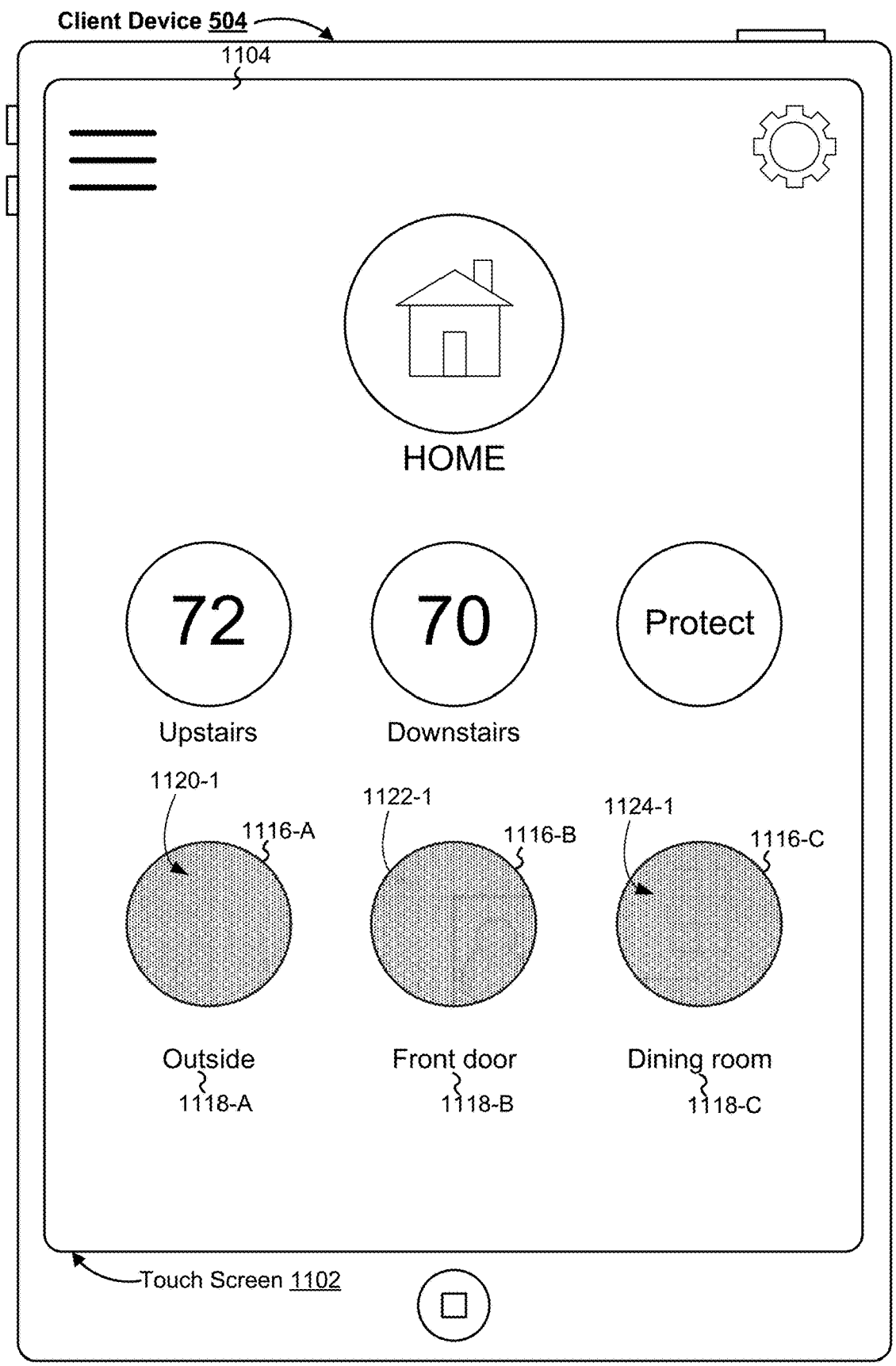
Figure 11V:
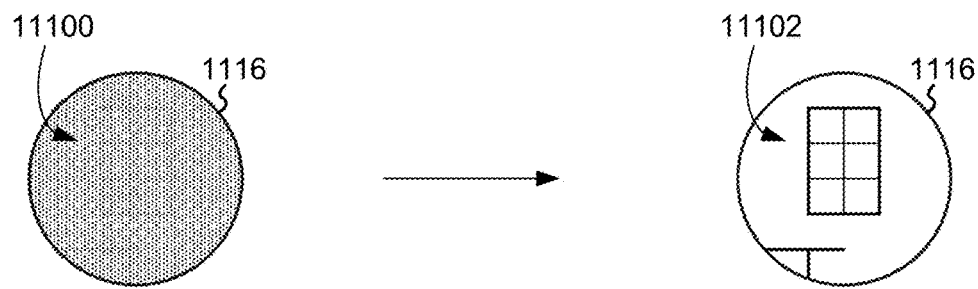
Figure 11V:
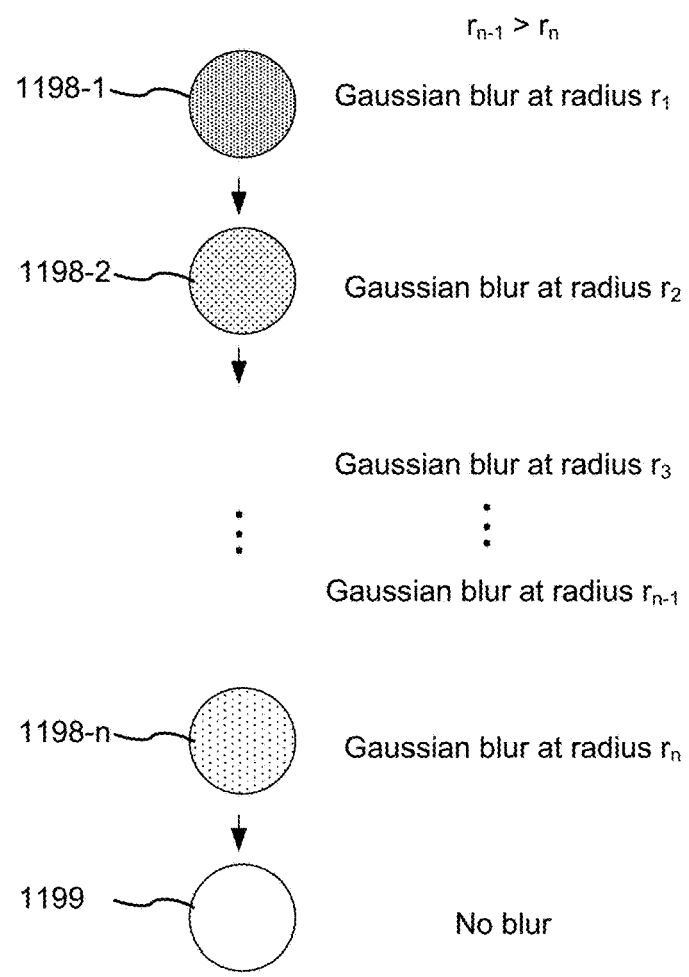

FIGS. 11A-11V illustrate example user interfaces on a client device for monitoring and reviewing video feeds in accordance with some implementations. FIG. 11A illustrates a client device 504 (e.g., a mobile device, such as a smart phone) with a touch screen 1102 and optionally an accelerometer 892 and/or a gyroscope 894 (FIG. 8A). A user interface 1104 of an application 824 is displayed on the touch screen 1102. In some implementations, the application is a dedicated smart home management application (also referred to below as a "smart home application"), and the user interface 1104 is a home page or screen of the smart home management application. The user interface 1104 includes multiple user interface objects (e.g., buttons, icons, etc.) that display information associated with a smart home environment 100 associated with the user and/or serve as affordances with which a user may interact to access functionalities associated with the smart home application. For example, the user interface 1104 includes a menu object 1106, a settings object 1108, a mode icon 1109 and corresponding label 1110, one or more thermostat objects 1112, a "Protect" object 1114, and one or more camera objects 1116 with respective corresponding labels 1118.

The menu and settings objects 1106 and 1108, when activated by the user, provides access to an options menu or interface and a settings menu or interface for the smart home application, respectively. In some implementations, the menu object 1106 is displayed as a 3-line "hamburger menu" icon (e.g., as shown in FIG. 11A), and the settings icon is displayed as a gear icon (e.g., as shown in FIG. 11A). The mode icon 1109 and label 1110 indicates the operating mode of the smart home environment 100 with which the information displayed in user interface 1104 is associated (e.g., the user's home). For example, the smart home environment 100 may operate in a "Home" mode and an "Away" mode. In the "Home" mode, the user is presumed to be in the smart home environment 100 (e.g., within the structure 150). In the "Away" mode, the user is presumed to be remote from the smart home environment 100. Smart devices 204 may operate differently in the "Home" mode than in the "Away" mode, and certain notifications of events may be elided when in "Home" mode. The user may access a menu to change the mode by activating the mode icon 1109 (e.g., by tapping on the mode icon 1109 with a single tap gesture).

Thermostat objects 1112-A and 1112-B correspond to respective smart thermostats 102 in the smart home environment 100 and display the current detected temperatures and/or the set temperatures at the corresponding smart thermostats 102. "Protect" object 1114 provides access to a history of alert events (e.g., detected hazards, detected sounds, detected vibrations, operation of smart door lock 120, etc.) associated with the smart home environment 100. The user accesses the "Protect" history by activating the "Protect" object 1114 (e.g., by tapping on the "Protect" object 1114 on the touch screen 1102).

The camera objects 1116-A, 1116-B, and 1116-C correspond to respective video sources 522 (or, more particularly, respective cameras 118) within the smart home environment 100. The labels 1118-A, 1118-B, and 1118-C indicate the respective video sources 522 to which the respective camera objects 1116 correspond. For example, the camera object 1116-A corresponds to a camera 118 labeled "Outside" 1118-A.

Within a respective camera object 1116, a view of a video feed or stream from the corresponding camera is displayed. For example, a view 1120 of the video feed from the "Outside" 1118-A camera is displayed in camera object 1116-A, a view 1122 of the video feed from the "Front door" 1118-B camera is displayed in camera object 1116-B, and a view 1124 of the video feed from the "Dining room" 1118-C camera is displayed in camera object 1116-C. In some implementations, the view of a video feed is displayed in a camera object 1116 as a real-time (or near real-time), live video stream from the corresponding camera or as periodically refreshed (e.g., at a rate less than typical frame rates for video) still images. In some implementations, the view is displayed at a resolution different from the original resolution and/or frame rate in which the video was captured. For example, the video views displayed in the camera objects 1116 are displayed at an 180P (180 horizontal lines progressive scan) resolution and at a frame rate of 5 or 10 frames per second, which is different from the original capture resolution (e.g., 720P or 1080P) and the original frame rate.

In some implementations, the view displayed in a camera object 1116 is cropped from the original video to fit the size and shape of the camera object 1116, and the cropping is positioned to focus on a particular portion of the video for display. For example, view 1120 is cropped to view 1120-1 to fit into circle-shaped object 1116-A, view 1122 is cropped to view 1122-1 to fit into circle-shaped object 1116-B, and view 1124 is cropped to view 1124-1 to fit into circle-shaped object 1116-C. The cropping and focus is further illustrated in FIG. 11B. FIG. 11B illustrates the camera objects 1116 and the frame widths and heights, scaled relative to the camera objects 1116, of the videos from the corresponding to cameras 118 corresponding to the camera objects 1116. As shown, frame 1117-A, corresponding to the video from the "Outside" 1118-A camera, is relatively larger than camera object 1116-A; frame 1117-B, corresponding to the video from the "Front door" 1118-B camera, is relatively larger than camera object 1116-B; and frame 1117-C, corresponding to the video from the "Dining room" 1118-C camera, is relatively larger than camera object 1116-C. Frame 1117-A is cropped to view 1120-1 for display in 1116-A. Frame 1117-B is cropped to view 1122-1 for display in 1116-B. Frame 1117-C is cropped to view 1120-3 for display in 1116-C. The cropping may be adjusted by the smart home application (e.g., the camera view module 82816) or by the hub device server system 508 or video server system 552 to a different position along the span of the video frame, which puts a different portion of the frame into display. In some implementations, the video frame 1117 is zoomed so that the height of the zoomed frame 1117 matches the height of the object 1116, and the object 1116 is centered relative to the frame 1117 (i.e., the cropping is centered to display the center portion of the frame 1117).

It should be appreciated that while the camera objects 1116 are shown as circular in the drawings, the camera objects 1116 may be in other shapes (e.g., square, rectangle, etc.) or each camera object 1116 may have a distinct shape (e.g., one camera object 1116 has a circular shape, another camera object 1116 has a square shape, and so on).

Additionally, as shown in FIG. 11B, views 1120, 1122, and 1124 do not include the entirety of the respective frames, but respective portions thereof. For example, view 1120-1 includes an upper portion of the frame 1117-A. As will be described below, the user may change the view to include a different portion of the corresponding frame. In some other implementations, a video feed is displayed without cropping in a camera object 1116; the camera object is shaped and sized accordingly.

Continuing in FIG. 11C, a user may adjust the views 1120, 1122, and 1124 displayed in the camera objects 1116 by performing a user input, such as a gesture on the touch screen 1102 (e.g., a swipe gesture 1128 with contact (e.g., finger contact) 1126 across the touch screen 1102 just below the camera objects 1116) or a change in the orientation of the client device 504 (e.g., rotating 1129 the client device 504 about a vertical axis). In response to the gesture 1128 with contact 1126 or to the orientation change 1129, the views 1120, 1122, and 1124 in camera objects 1116 change to views 1120-2, 1122-2, and 1124-2, respectively, as shown in FIG. 11D. In some implementations, changing the view includes shifting the cropped area(s) displayed in the camera object(s) 1116 to different portion(s) of the corresponding frame(s); the view change pans the cropped area to another portion of the frame. For example, view 1120-1 showed three cacti from the frame 1117-A. With the view change, the view 1120 has shifted left relative to frame 1117-A to become view 1120-2, which shows just two cacti. It should be appreciated that, while FIGS. 11C-11D show a horizontal view change in response to a horizontal gesture or horizontal orientation change, vertical and/or diagonal view changes in response to other particular gestures or orientation changes are possible.

In some implementations, after the view change in response to the gesture or orientation change, the views stay in their post-change states (i.e., as 1120-2, 1122-2, and 1124-2, respectively) even when the user input triggering the change is terminated (e.g., the contact 1126 is no longer detected on the touch screen 1102, the orientation of client device 504 stops changing) (e.g., as shown in FIG. 11E). In some implementations, the user may perform an input (e.g., shaking the client device 504 (detected by the accelerometer 892), a predefined gesture (e.g., double tap or a tap and hold in an area in user interface 1104 near and away from the camera objects 1116), a voice command) to force the smart home application to reset the changed views back to views 1120-1, 1122-1, and 1124-1. In some implementations, the user may perform an input (e.g., single tap gesture, a voice command) on a camera object 1116 to selectively reset the view displayed in that camera object 1116 back to the pre-change state, while the remainder of the views remain in their post-change states.

In some other implementations, after the view change in response to the gesture or orientation change, the views 1120, 1122, and 1124 automatically return or reset to their pre-change states (i.e., return to 1120-1, 1122-1, and 1124-1, respectively) even when the user input triggering the change is terminated (e.g., the contact 1126 is no longer detected on the touch screen 1102, the orientation of client device 504 stops changing). For example, the views 1120, 1122, and 1124 automatically return to views 1120-1, 1122-1, and 1124-1, respectively, after a delay (e.g., 3 seconds) after the contact 1126 is lifted off the touch screen 1102 to complete the gesture 1128. In some implementations, to prevent the automatic return to the pre-change views, the user may perform another user input during the delay period (e.g., a single tap gesture with contact 1127 near where contact 1126 was last detected). In accordance with the another user input, the views 1120-2, 1122-2, and 1124-2 are maintained. In some implementations, the user may perform an input (e.g., single tap gesture, a voice command) on a camera object 1116 to selectively maintain the view displayed in that camera object 1116 in the post-change state, while the remainder of the views return or reset to their pre-change states.

Continuing in FIG. 11E, a user may change the data usage of the views 1120, 1122, and 1124 displayed in the camera objects 1116. In FIG. 11E, a gesture 1132 on the touch screen 1102 (e.g., a swipe gesture 1132 with contact 1130 across the touch screen 1102 over the camera objects 1116). In response to the gesture 1132, the smart home application displays user interface objects (e.g., button, icon, etc.) 1134 and 1136 in the user interface 1104. User interface object 1134 is an affordance corresponding to a live stream mode, and user interface object 1136 is an affordance corresponding to a data save mode. In live stream mode, the views 1120, 1122, and 1124 are displayed in the camera objects 1116 as live video streams. In data save mode, the views 1120, 1122, and 1124 are displayed in the camera objects 1116 as still images (e.g., frames extracted from the corresponding videos) refreshing periodically at rates less than the refresh rate or frame rate for the live stream video (e.g., if refresh/frame rate in live stream mode is 5 or 10 frames per second, the refresh/frame rate in data save mode may be, for example, 1 frame per second, 1 frame per two seconds, or 1 frame per 30 seconds). As shown in FIG. 11F, the live stream mode is active, as indicated by the user interface object 1134 with "Live stream" in bold. In some implementations, a user interface object corresponding to a toggle affordance for toggling between live stream mode and data save mode is displayed in lieu of displaying a user interface object for each mode.

While the user interface objects 1134 and 1136 are displayed, the user may select the user interface object corresponding to the non-active mode to change the views 1120, 1122, and 1124 to that mode. For example, in FIG. 11F, a gesture (e.g., a tap gesture with contact 1138) is detected on user interface object 1136 corresponding to the data save mode. In response to the selection of the user interface object 1136, the views 1120, 1122, and 1124 are displayed in camera objects 1116 in data save mode, i.e., as periodically refreshed images. In some implementations, when a view is displayed in data save mode, a timer icon 1140 is displayed near the corresponding label to indicate that the view is in data save mode and also indicate a time until the next image refresh. For example, a timer icon 1140 is displayed next to the "Outside" 1118-A label corresponding to view 1120, as shown in FIG. 11G, indicating that the view 1120 is displayed as periodically refreshed images. Similarly, as shown in FIG. 11G, a timer icon 1140 is displayed next to the "Front door" 1118-B label corresponding to view 1122 and next to the "Dining room" 1118-C label corresponding to view 1124, indicating that views 1122 and 1124 are displayed in data save mode.

The user may want to adjust the view(s) displayed in particular camera objects 1116, rather than adjusting all of the views. In some implementations, the smart home application facilitates selection of particular camera objects 1116 by the user. FIG. 11H illustrates a selection input (e.g., a single tap gesture with contact 1142) detected on object 1116-A. In response to the selection gesture, camera object 1116-A is selected, as illustrated in FIG. 11I by the thick border around camera object 1116-A.

Multiple camera objects 1116 may be selected, as shown in FIGS. 11I-11J. After camera object 1116-A is selected, a selection input (e.g., a single tap gesture with contact 1144) is detected on camera object 1116-B. In response to that selection gesture, camera object 1116-B is selected and camera object 1116-A remains selected, as illustrated in FIG. 11J.

After one or more camera objects 1116 are selected, a user input to adjust the views in the selected camera objects 1116 may be performed. For example, a swipe gesture (e.g., swipe gesture 1148 just below the camera objects 1116 with contact 1146) or a change 1149 in the orientation of the client device 504 may be detected. In response to the user input, the views 1120-1 and 1122-1 in camera objects 1116-A and 1116-B, respectively, are changed to views 1120-2 and 1122-2, respectively. View 1124-1, displayed in the not-selected camera object 1116-C, is maintained.

In some implementations, after the view change in response to the gesture or orientation change, the selected camera objects 1116 are deselected and the changed views stay in their post-change states (i.e., as 1120-2 and 1122-2, respectively) even when the user input triggering the change is terminated (e.g., the contact 1146 is no longer detected on the touch screen 1102, the orientation of client device 504 stops changing). In some implementations, the user may perform an input (e.g., shaking the client device 504 (detected by the accelerometer 892), a predefined gesture (e.g., double tap or a tap and hold in an area in user interface 1104 near and away from the camera objects 1116), a voice command) to force the smart home application to reset the changed views back to views 1120-1 and 1122-1. In some implementations, the user may perform an input (e.g., single tap gesture, a voice command) on a camera object 1116 to selectively reset the changed view displayed in that camera object 1116 back to the pre-change state, while the remainder of the changed views remain in their post-change states.

In some other implementations, after the view change in response to the gesture or orientation change, the selected camera objects 1116 are deselected and the views 1120 and 1122 automatically return or reset to their pre-change states (i.e., return to 1120-1 and 1122-1, respectively) even when the user input triggering the change is terminated (e.g., the contact 1146 is no longer detected on the touch screen 1102, the orientation of client device 504 stops changing). For example, the views 1120 and 1122 automatically return to views 1120-1 and 1122-1, respectively, after a delay (e.g., 3 seconds) after the contact 1146 is lifted off the touch screen 1102 to complete the gesture 1148. In some implementations, to prevent the automatic return to the pre-change views for particular ones of the selected camera objects 1116, the user may perform one or more user inputs during the delay period on the camera object(s) 1116 with the views the user wishes to maintain in the post-change state. For example, in FIG. 11L, a single tap gesture is detected on camera object 1116-B with contact 1150. In accordance with one or more user inputs during the delay period, the selected camera objects 1116 are deselected, the view 1122-2 is maintained, and the view 1120-2 resets to view 1122-1, as shown in FIG. 11M.

While one or more of the camera objects 1116 are selected, the display mode of the views in the selected camera objects 1116 may be changed. FIG. 11N shows camera objects 1116-A and 1116-B selected. A gesture (e.g., a swipe gesture 1152 over the camera objects 1116 with contact 1151) is detected on the touch screen 1102. In response to the gesture 1152, the smart home application displays user interface objects (e.g., button, icon, etc.) 1134 and 1136 in the user interface 1104. As shown in FIG. 11O, live stream mode is active, as indicated by the user interface object 1134 with "Live stream" in bold; the views displayed in selected camera objects 1116-A and 1116-B are displayed in live stream mode.

While the user interface objects 1134 and 1136 are displayed, the user may select the user interface object corresponding to the non-active mode to change the views displayed in the selected camera objects 1116-A and 1116-B to that mode. For example, in FIG. 11O, a gesture (e.g., a tap gesture with contact 1158) is detected on user interface object 1136 corresponding to the data save mode. In response to the selection of the user interface object 1136, the views 1120 and 1122 are displayed in camera objects 1116-A and 1116-B, respectively, in data save mode, i.e., as periodically refreshed images. A timer icon 1140 is displayed next to the "Outside" 1118-A label corresponding to view 1120 and next to the "Front door" label 1118-B corresponding to view 1122, as shown in FIG. 11P, indicating that the views 1120 and 1122 are displayed as periodically refreshed images.

In some implementations, a user may freeze a video feed displayed in a camera object 1116. FIG. 11Q illustrates a freeze gesture (e.g., a touch-and-hold gesture with contact 1160) detected on camera object 1116-B. In response to the freeze gesture, the view 1122 is frozen or locked to a frozen view 1122-3 corresponding to a frame of the corresponding video; view 1122 stops streaming or refreshing. A lock icon 1162 is displayed next to the "Front door" 1118-B label corresponding to the camera object 1116-B, indicating that the view 1122 is frozen, as shown in FIG. 11R. To end the view freezing, the user can perform a tap-and-hold gesture on the camera object 1116-B (i.e., repeating the gesture shown in FIG. 11Q).

Each of the camera objects 1116 are associated with a respective camera and its corresponding video feed. A user may perform a gesture on one of the camera objects 1116 to access a user interface that shows the video corresponding to that camera object uncropped. For example, in FIG. 11S a single tap gesture is detected on the camera object 1116-C with the contact 1164. In response to the gesture, user interface 1166 is displayed on the touch screen 1102, replacing user interface 1104, as shown in FIG. 11T. User interface 1166 includes a camera name 1168 (e.g., indicating the camera 118 for which a video feed is shown in the interface 1166), backtracking affordance 1170 to backtrack to a previous user interface (e.g., back to user interface 1104), settings affordance 1172, a live video indicator 1174, camera on/off switch 1178, and video region 1180. Within the video region 1180, the video feed from the "Dining room" 1118-C camera corresponding to the tapped-upon camera object 1116-C is displayed without cropping and at a higher resolution and/or higher frame rate than the resolution the video is displayed at within the camera object 1116-C (e.g., at the original capture resolution of 720P or 1080P at 24 frames per second rather than the 180P at 5 or 10 frames per second used for display in the camera object 1116-C).

The user interface 1166 also includes various controls, such as previous clip affordance 1182-A for skipping to a chronologically preceding video clip captured by the "Dining room" 1118-C camera, rewind affordance 1182-B for rewinding back in the video shown in the video region 1180, fast forward affordance 1182-C for fast forwarding in the video shown in the video region 1180, next clip affordance 1182-D for skipping to a chronologically succeeding video clip captured by the "Dining room" 1118-C camera, and live affordance 1182-E for jumping directly to the live video stream from the captured by the "Dining room" 1118-C camera. The user interface 1166 also includes a talk affordance 1184 for initiating voice functionality that includes voice input from the user that will be output by the "Dining room" 1118-C camera, an enhance affordance 1186 for initiating enhancement of the video displayed in the video region 1180, a quality indicator/affordance 1188 for switching or toggling the video quality (e.g., resolution and/or frame rate) of the video displayed in the video region 1180, and history affordance 1190 for accessing a history of camera events for the "Dining room" 1118-C camera. In response to a gesture on the history affordance (e.g., a single tap gesture on history affordance 1190 with contact 1192), a camera history user interface 1304 (FIG. 13A) is displayed.

Further details regarding the camera history user interface 1304 are described below in relation to FIGS. 13A-13M.

In some implementations, the views in the camera objects 1116 are displayed with blurring transitions. For example, when the smart home application is opened, the views in the camera objects 1116 are shown with a blurring transition, as shown in FIG. 11U. The views 1120, 1122, and 1124 gradually "de-blur" or "un-blur." For example, blurred views become progressively less blurry (the blurred views that are shown in FIG. 11U being one stage in the progressive de-blurring) toward the views shown in FIG. 11A. Additionally, when a camera corresponding to a camera object 1116 goes offline (e.g., that camera lost its Wi-Fi connection), the view for that camera may progressively blur to a blurry image, and then black out.

In some implementations, the blurring/de-blurring includes displaying a set of progressively blurred images (e.g., 16 or 24 blurred images) from cached video/image data 8304 for the pertinent camera, and displaying these images sequentially. For example, when the smart home application is opened and a camera is connected, a de-blurring transition from a blurred view 11100 to an unblurred view 11102 involves starting from a blurred cached image from the camera and then displaying, in sequence, progressively less blurry images in the set of blurred images. Meanwhile, as the blurred images are displayed in sequence, the client device 504 receives the video feed from the camera and inserts images from the video feed under (e.g., in a lower z-layer) the blurred image. After the last blurred image is displayed, the blurred image is removed, revealing the updated images from the video feed. The set of progressively blurred images are generated from cached video/image data 8304 for the camera (in some implementations, the smart home application caches the most recent (e.g., in the last hour) video/image data from each associated camera at the client device 504 as cached video/image data 8304) using well-known blurring techniques (e.g., Gaussian blur, bokeh). For example, as shown in FIG. 11V, a set of n (e.g., 16, 24) blurred images 1198 is generated using Gaussian blur techniques. Each blurred image 1198 is blurred at a respective blur radius rn. As n increases, rn decreases. To "de-blur," images 1198-1 thru 1198-$n$ are displayed in sequence in order of decreasing blur radius, and then image 1198-$n$ is removed, revealing updated image 1199 from the video feed. To blur, the set of blurred images are displayed in order of increasing blur radius. If cached video/image data 8304 is not available, a default image (e.g., an image of a shutter) is displayed in the camera object and then removed to reveal updated image 1199 from the video feed.

In some implementations, one or more of the views displayed within the camera objects 1116 may be zoomed in or out. The zooming in or out includes zooming in or out the frames of the video feed from which the view is derived, and cropping the zoomed in/out frames if needed, thus deriving the zoomed in/out view. A view may be zoomed out to fit the video frames entirely within the camera object 1116 without cropping, or zoomed in to further focus on a particular portion of the frames.

In some implementations, the sizes of the camera objects 1116 are static; the camera objects 1116 have a fixed size. In some other implementations, the camera objects 1116 have sizes that may change. For example, the hub device server system 508 or video server system 552 analyzes the video feeds from the cameras 118 to detect motion activity occurring in the video feeds. The camera object 1116 corresponding to the video feed with the most detected activity (e.g., currently detected activity, historically detected activity over predefined period of time (e.g., within the last hour, within the last 12 hours, within the last 24 hours, etc.)) is displayed at a larger size than the other camera objects 1116. In some implementations, the sizes of camera objects 1116 are individually configurable by the user (e.g., in a settings interface accessible from the settings affordance 1108). For example, the user can configure the camera objects 1116 corresponding to cameras 118 whose video feeds he wishes to give more attention to be larger. In some implementations, the size of a camera object 1116 is automatically configured by the smart home application based on, for example, how many times the user has accessed the video feed corresponding to the camera object 1116 (e.g., by tapping on the camera object 1116 and opening the interface 1166 for the corresponding video feed, as in FIGS. 11S-11T) or if a new alert event has been detected for the corresponding camera 118). For example, a camera object 1116 may be enlarged when an alert event associated with the corresponding camera 1118 has been detected, and the camera object 1116 remains enlarged until the user views the video associated with the alert event or after a predefined amount of time elapsing after the alert event detection.

In some implementations, the user interfaces illustrated in FIGS. 11A-11U, or variations thereof, may be displayed on other devices (e.g., on a smart home application running on a tablet computer) and applications (e.g., in a web browser running on a desktop or laptop computer).

Figure 12A:
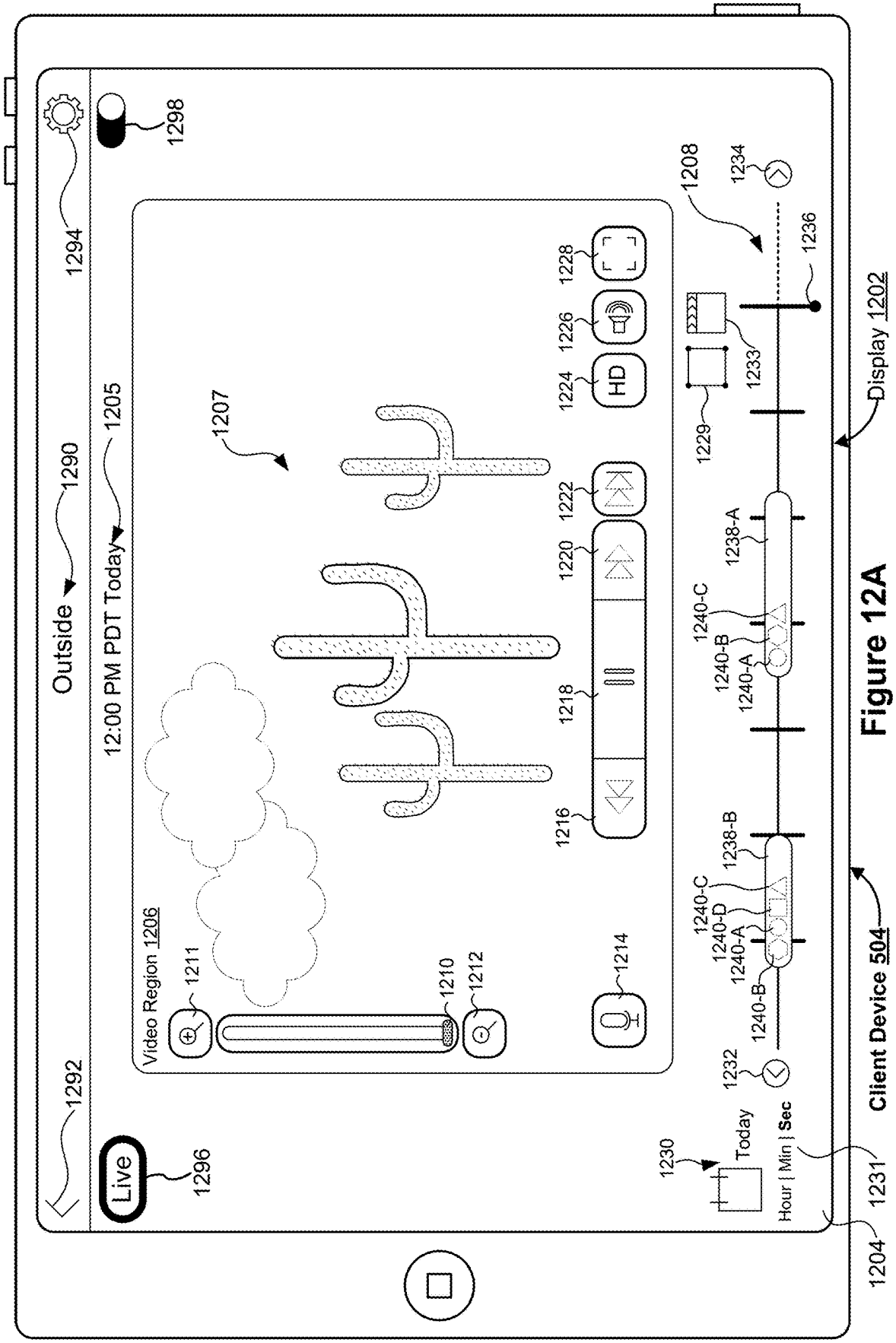
FIGS. 12A-12E illustrate example user interfaces on a client device for monitoring and reviewing a video feed in accordance with some implementations.
Figure 12B:
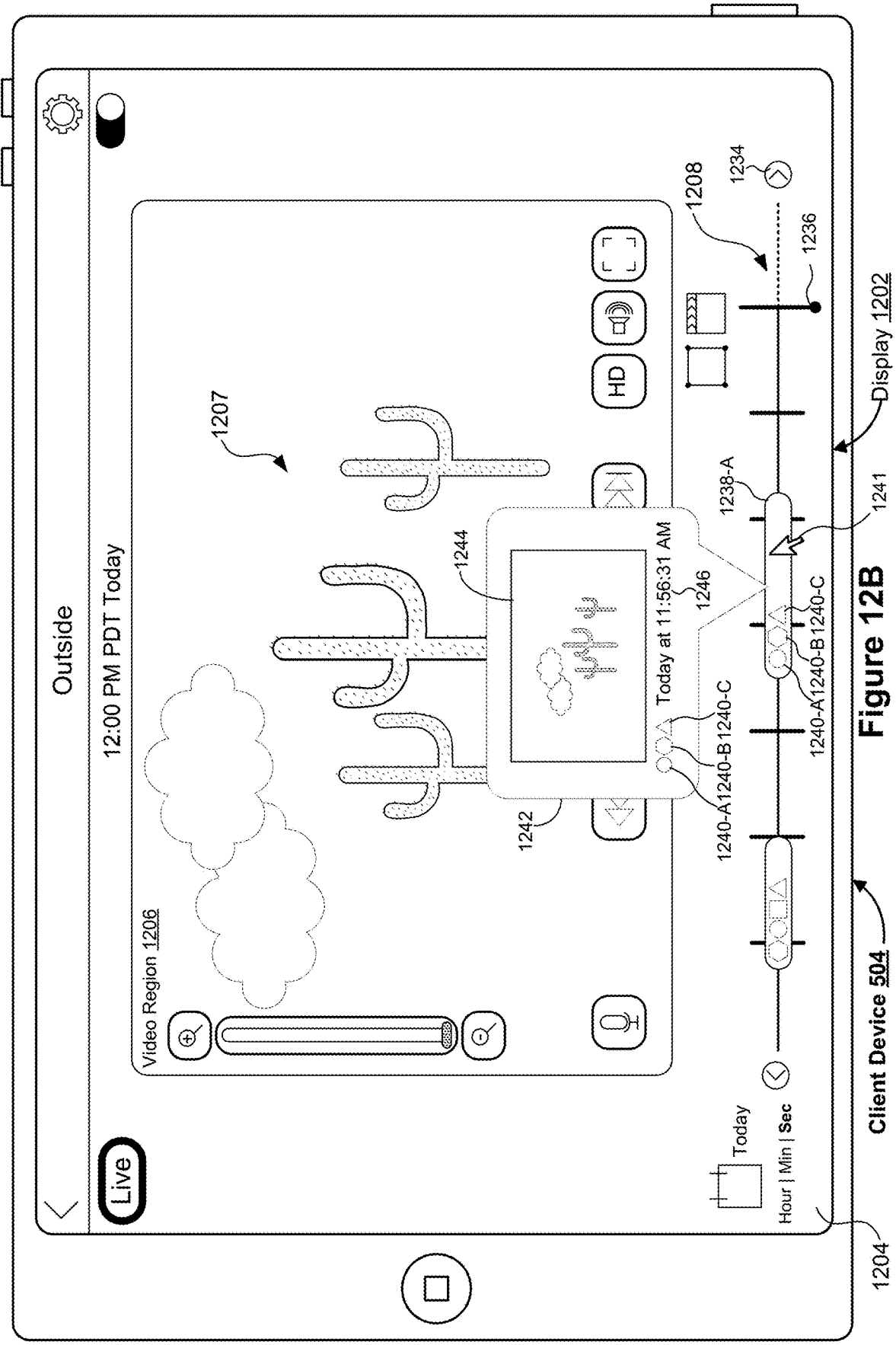

FIGS. 12A-12E illustrate example user interfaces on a client device for monitoring and reviewing a video feed in accordance with some implementations. FIG. 12A illustrates a client device 504 (e.g., a desktop computer, a laptop computer) with a display 1202. A user interface 1204 rendered in a web browser 823 is displayed on the display 1202. In some implementations, the user interface 1204 is a web page associated with a smart home environment 100, and particularly, with a camera 118 in the smart home environment 100. The user interface 1204 includes multiple user interface objects (e.g., buttons, icons, etc.) that display information associated with the associated camera 118 and/or serve as affordances with which a user may interact to access functionalities associated with the associated camera 118. The user interface 1204 includes a video region 1206 in which a video feed 1207 (e.g., a live video stream, a saved video clip) from the associated camera is displayed. A camera label 1290 and time indicator 1205 identifies the associated camera 118 (in this case, the "Outside" 1118-A (FIG. 11A) camera) as well as the timestamp on the video feed 1207 displayed in the video region 1206. A FIG. 12A illustrates the client device 504 displaying video controls for accessing various functionalities related to the video feed 1207 displayed in the video region 1206 and the associated camera. In FIG. 12A, the video region 1206 of the user interface 1204 includes: an elevator bar with a handle 1210 for adjusting the zoom magnification of the video feed 1207 displayed in the video region 1206, affordance 1212 for reducing the zoom magnification of the video feed 1207, and affordance 1211 for increasing the zoom magnification of the video feed 1207. In FIG. 12A, the video region 1206 of the user interface 1204 also includes: affordance 1214 for enabling/disabling the microphone of the associated camera; affordance 1216 for rewinding the video feed 1207 by 10 seconds; affordance 1218 for pausing the video feed 1207; affordance 1220 for forwarding the video feed 1207 by 10 seconds; affordance 122 for jumping the video feed 1207 to the live video stream for the associated camera; optionally affordance 1224 for adjusting the playback quality of the video feed 1207; affordance 1226 for adjusting the playback volume of the video feed 1207, including muting the playback volume; and affordance 1228 for displaying the video feed 1207 in full screen mode (e.g., the video region 1206 expanded to fit the width of the display 1202). The user interface 1204 also includes backtracking affordance 1292 to backtrack to a previous user interface, settings affordance 1294, a live video indicator 1296, and camera on/off switch 1298.

Outside of the video region 1206, the user interface 1204 includes additional user interface objects and information. For example, the user interface 1204 includes a timeline 1208 for displaying camera events and their corresponding times and durations; a calendar affordance 1230 to jump to a particular calendar day in the timeline 1208; a time scale selector 1231 for selecting a level of detail in the timeline 1208; arrows 1232 and 1234 for scrolling backward and forward in the timeline, respectively; an activity zone affordance 1229 for accessing a list of alert event types and user-defined zones of interest for filtering the timeline by alert event type and/or zone of interest, as well as options to create or edit a zone of interest in the area monitored by the associated camera; and video clip affordance 1233 for accessing a user interface for creating user-custom video clips from video captured by the associated camera. The defining of zones of interest is described in the following U.S. patent applications filed on Oct. 8, 2014, which are incorporated by reference herein in their entirety: Ser. Nos. 14/509,999; 14/510,050; 14/510,015; 14/510,029; 14/510,007; 14/510,040; 14/510,030; 14/510,042; and Ser. No. 14/510,059.

The timeline 1208 shows a chronology of camera events associated with the associated camera. A camera event includes a corresponding video, one or more alert events that are associated with the video, and the chronology of the associated alert events. The alert events may be any event detected in the smart home environment 100 by a smart device 204 (e.g., detected hazard, detected sound, detected vibration, operation of a smart door lock 120, detected motion, etc.); the smart home environment 100 is configured to log and/or alert the user of detection of such events. In some implementations, alert events include motion events detected non-visually (e.g., detected by motion detectors) as well as motion events detected through video captured by a camera 118 (e.g., motion through or in a user-defined zone of interest). Detection of motion activity in a zone of interest is described in the following U.S. patent applications filed on Oct. 8, 2014, which were incorporated by reference above: Ser. Nos. 14/509,999; 14/510,050; 14/510,015; 14/510,029; 14/510,007; 14/510,040; 14/510,030; 14/510,042; and Ser. No. 14/510,059. In some implementations, each zone of interest is its own type of alert event; motion detected in one zone of interest and motion detected in another zone of interest are considered different types of alert events.

In some implementations, when an alert event is detected, one or more cameras 118 proximate to the detected event or proximate to the smart devices 204 that detected the event are instructed to capture video, so as to capture a visual state of one or more areas proximate in location to, and contemporaneous (or otherwise proximate in time) with, the detected alert event. The alert event is associated with the captured video.

The smart devices 204 may detect concurrent, overlapping, or sequenced alert events. Any two alert events that are in sequence with a less than a threshold amount of time (e.g., 2 seconds) between them, concurrent, or overlapping are associated with the same camera event. Thus, a camera event and its corresponding video may be associated with multiple alert events (e.g., detected sound and vibration at same time, motion detected across multiple zones of interest in sequence).

A time marker 1236 is displayed on the timeline 1208. The time marker 1236 indicates the time in focus on the timeline 1208 and in the video region 1206. In FIG. 12A, the time marker 1236 is displayed at the rightmost end of the timeline 1208, at a position between the solid portion and the dotted portion. The dotted portion indicates future time, and the solid portion includes past time up to the present. In some implementations, past time on the timeline 1208 in which the camera was off may also be represented as a dotted portion on the timeline 1208. Thus, the time marker 1236, positioned as shown in FIG. 12A, is marking the current time.

Camera events are represented on the timeline by bars 1238 displayed over (e.g., overlaid on) the timeline 1208. Each bar 1238 has a length reflecting the duration of the camera event. For example, the camera event 1238-A is longer than the camera event 1238-B. In some implementations, the duration of a camera event is from the start of the earliest alert event in the camera event to the end of the last alert event in the camera event.

It should be appreciated that camera events may or may not be displayed as bars 1238, depending on the fineness of the time scale of the timeline 1208. For example, camera events that are too short in duration to be displayed as bars for a particular time scale (e.g., a 5 second camera event at the hours scale) may be displayed as a shaped dot on the timeline 1208.

In some implementations, one or more icons 1240 corresponding to types of alert events are displayed in or near respective camera event bars 1238 to indicate the alert events associated with the respective alert events. For example, icons 1240-A, 1240-B, and 1240-C are displayed in camera event bar 1238-A; and icons 1240-A, 1240-B, and 1240-C, and 1240-D are displayed in camera event bar 1238-B. Each icon corresponds to a respective type of alert event, and visually distinct from each other. In some implementations, the visual distinction is based on shape. For example, as shown in FIG. 12A, icon 1240-A is a circle, icon 1240-B is a hexagon, icon 1240-C is a triangle, and icon 1240-D is a square. In some other implementations, the visual distinction is based on color. For example, the icons 1240 may be circles of different colors.

In some implementations, the shape or color definitions for the icons 1240 may be automatically defined and/or user-defined. For example, shapes or colors for icons 1240 corresponding to predefined alert event types (e.g., hazard, sound, vibration, non-visual motion) are defined according to a default scheme, and shapes or colors for icons 1240 corresponding to user-defined zones of interest are defined according to the default scheme or user definition.

In some implementations, if multiple instances of a particular type of alert event were detected during a camera event, the icon 1240 corresponding to that particular type is displayed just once within the camera event bar 1238.

In some implementations, the icons 1240 displayed within a camera event bar 1238 are ordered within the camera event bar 1238. In some implementations, the ordering is based on the chronological order of the alert events in the camera event. For example, in FIG. 12A, the icons 1240 within a camera event bar are ordered from left to right, with the further right icons within the camera event bar 1238 corresponding to alert events more recent in time. In camera event 1238-A, there may be one or more multiple instances of the alert type of the type corresponding to icon 1240-C detected, but the most recent instance of that type is also the most recent alert event detected within the corresponding camera event, and thus the icon 1240-C is displayed in the rightmost position. In some other implementations, the icons 1240 displayed within a camera event 1238 are randomly ordered.

In some implementations, the icons 1240 within a camera event bar 1238 are ordered based on the chronological order of the most recent instances of each detected type of alert event, as just one icon is displayed for each type of alert event detected. Within the camera event bar 1238-A, an instance of the alert event of the type corresponding to icon 1240-C is the most recent alert event for the corresponding camera event and is more recent than the most recent instance of the alert event type corresponding to icon 1240-B detected for the corresponding camera event. As another example, within the camera event bar 1238-B, the most recent instance of the alert event type corresponding to icon 1240-D is more recent than the most recent instance of the alert event type corresponding to icon 1240-A, and thus icon 1240-D is displayed to the right of icon 1240-A.

In some implementations, if alert event type icons 1240 are distinguished based on color, and a camera event includes just one alert event type, then the corresponding camera event bar 1238 may be displayed with the color corresponding to the alert event type.

A user may click on (e.g., with a mouse) or tap on (e.g., with a contact on a touch screen) or hover over (e.g., with a mouse pointer) a camera event 1238 to view additional information about the camera event. For example, in FIG. 12B, a mouse pointer 1241 is hovered over camera event bar 1238-A. In response to the hovering mouse pointer, an information pop-up 1242 for the camera event 1238-A is displayed. The information pop-up 1242 includes a thumbnail 1244 of the video associated with the camera event 1238-A; date and time information 1246 for the camera event; and icons 1240, ordered chronologically in same manner as the icons 1240 within camera event bar 1238-A, corresponding to alert event types detected for the camera event 1238-A. In some implementations, the thumbnail 1244 is the video corresponding to the camera event 1238-A played back at the thumbnail size. In some other implementations, the thumbnail 1244 is a still image (e.g., a frame) from the video corresponding to the camera event 1238-A.

Figure 12C:
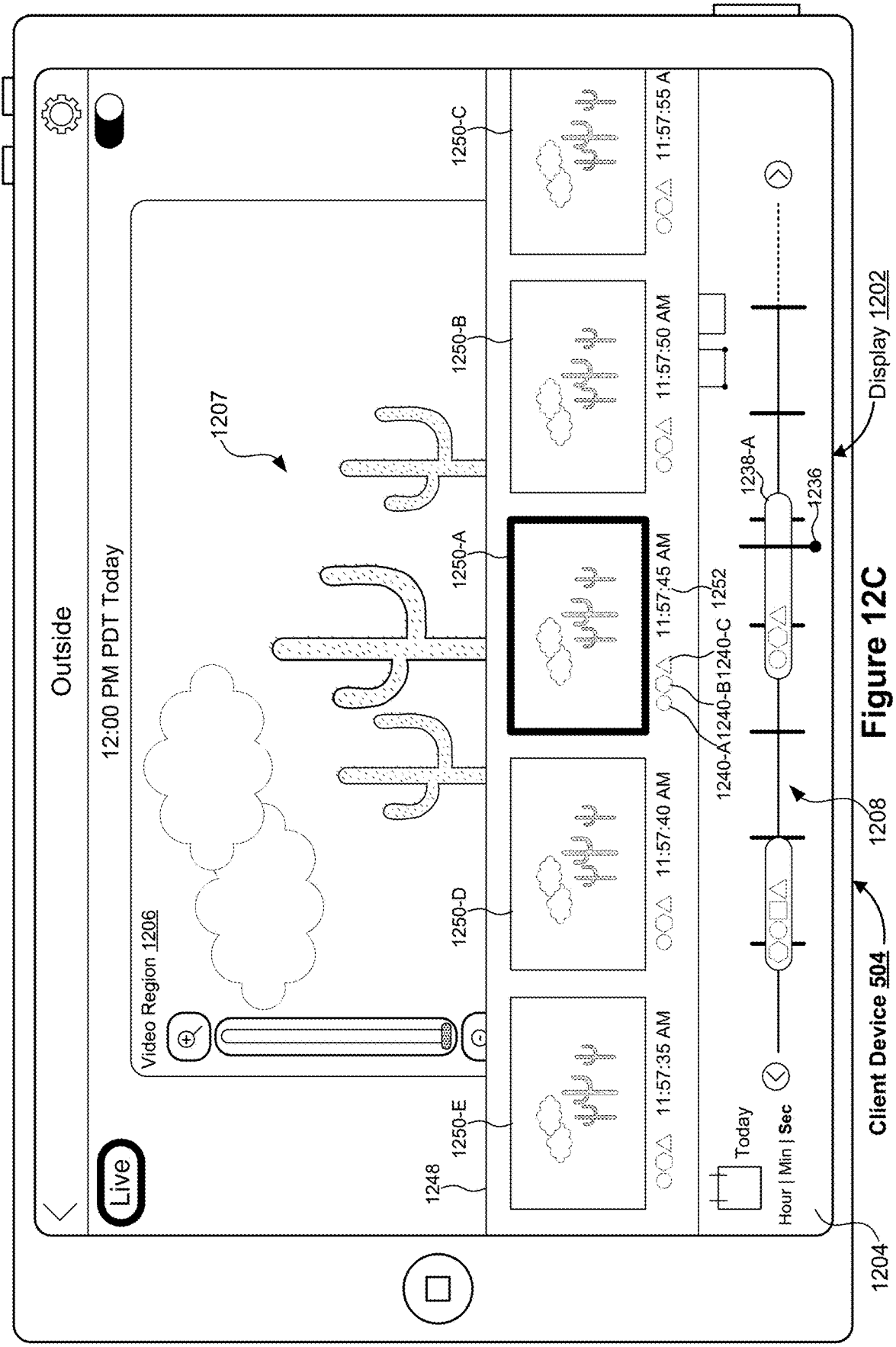

In some implementations, the time marker 1236 may be moved (e.g., dragged) along the timeline 1208 by the user to "scrub" the timeline 1208 and manually jump to a desired time in the timeline 1208. FIG. 12C illustrates an example of "scrubbing" the timeline 1208, where the time marker 1236 has been moved to a position over the camera event bar 1238-A. In response to the time marker 1236 being positioned over the camera bar 1238-A, a preview bar 1248 is displayed. The preview bar 1248 includes a chronological sequence of thumbnails 1250 of still frames of the video associated with the camera event 1238-A. The thumbnail 1250-A is the thumbnail of the still frame closest in time to the time corresponding to the timeline 1208 position where time marker 1236 is positioned. Thumbnails 1250-B and 1250-C are the next thumbnails after thumbnail 1250-A in the chronological sequence. Thumbnails 1250-D and 1250-E are the previous thumbnails before thumbnail 1250-A in the chronological sequence. With each thumbnail 1250, the time of the frame corresponding to the thumbnail 1252 and icons 1240 are displayed. In some implementations, the icons 1240 displayed for each thumbnail include just the icons corresponding to alert event types for which instances are detected at the same time as the time of the frame corresponding to the thumbnail.

Figure 12D:
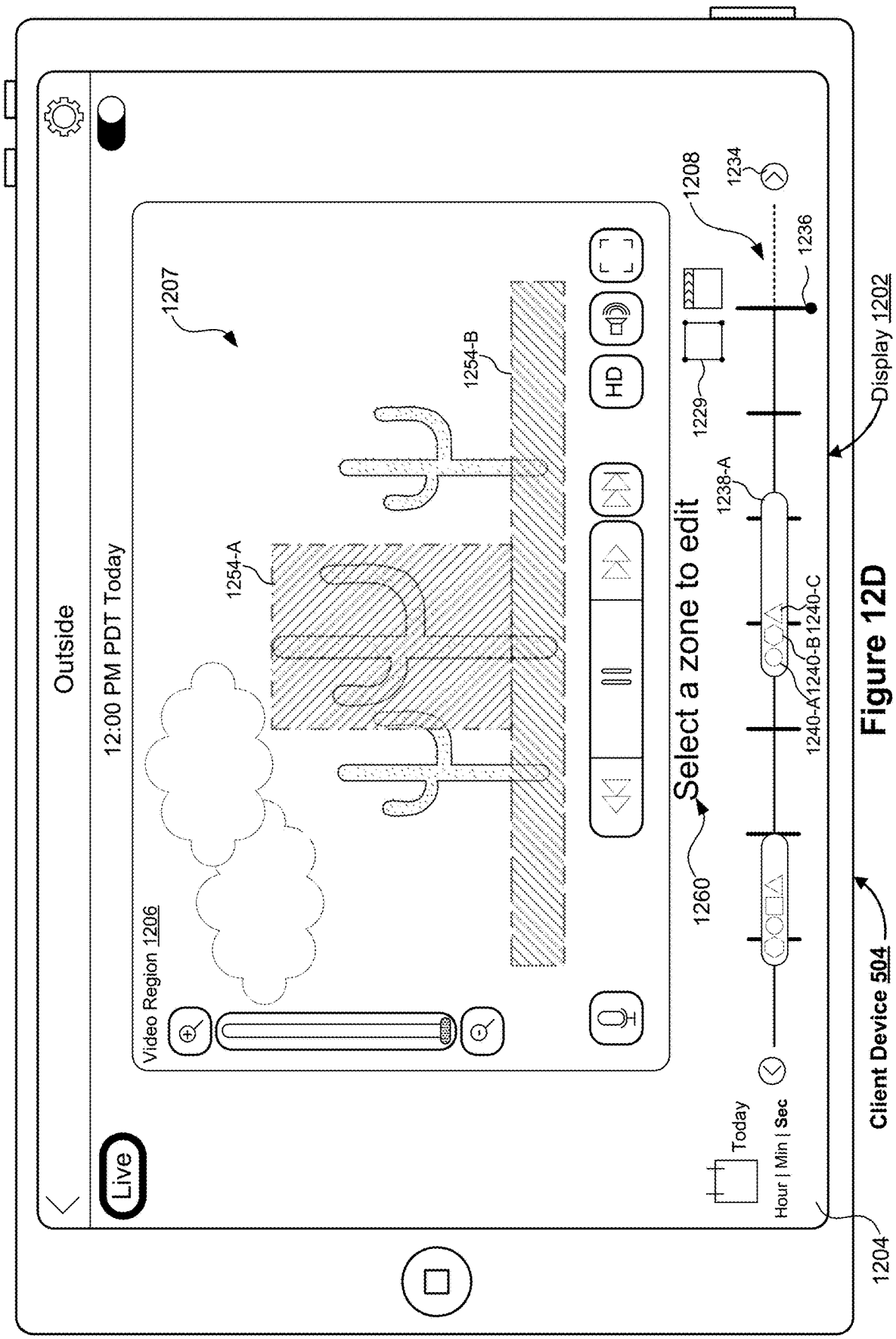

In some implementations, the user-defined zones of interest may be displayed in the video region 1206 over the video feed 1207. For example, when affordance 1229 is activated, a filtering list of user-defined zones of interest and alert event types is displayed, as well as options to edit and create, respectively, a zone of interest (not shown). The user may select one or more of the zones and alert event types for filtering of the timeline 1208 and the camera events therein by the selected zones and alert event types. The user may also select the option to edit a zone. In response to the user selecting the option to edit a zone, the defined zones are displayed in the video region 1206 while the video feed 1207 continues to be played in video region 1206, along with a prompt for the user to select a zone for editing. For example, FIG. 12D shows zones 1254-A and 1254-B displayed in the video region 1206 over the video feed 1207 while the video feed 1207 continues to play, and a prompt 1260 for a user to select one of the displayed zones 1254 for editing. If zones are associated with respective colors, the zones 1254-A and 1254-B are displayed in their respective associated colors. Zones of interest are described in the following U.S. patent applications filed on Oct. 8, 2014, which were incorporated by reference above: Ser. Nos. 14/509,999; 14/510,050; 14/510,015; 14/510,029; 14/510,007; 14/510,040; 14/510,030; 14/510,042; and Ser. No. 14/510,059.

In some other implementations, instead of being an affordance for opening a user interface for filtering zones of interest and alert event types, the affordance 1229 is an affordance for toggling between showing and not showing zones of interest in the video region 1206, aside from any filtering of the timeline 1208 or any option edit or create a zone of interest.

Figure 12E:
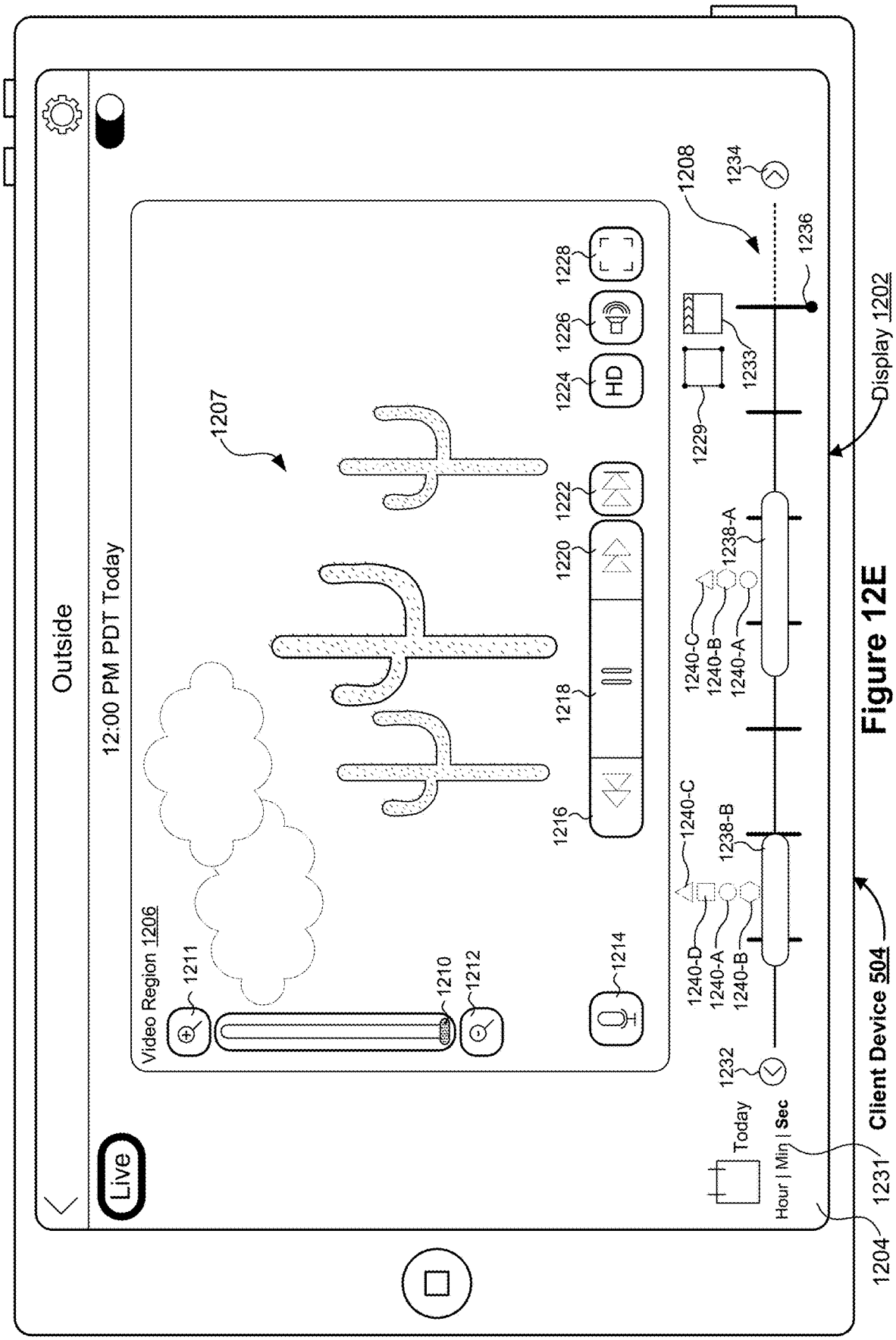

As described above, icons 1240 may be displayed within or near a camera event bar 1238. FIG. 12E illustrates an example of icons 1240 displayed near (e.g., above) camera event bars 1238. For example, icons 1240-A, 1240-B, and 1240-C are displayed above camera event bar 1238-A; and icons 1240-B, 1240-A, 1240-D, and 1240-C are displayed above camera event bar 1238-B. The icons for a respective camera event bar 1238 are ordered in accordance with the same criteria as those described above in relation to FIG. 12A. Thus, for example, for camera event 1238-A, icon 1240-C corresponding to the alert event type with the most recently detected instance.

Figure 13A:
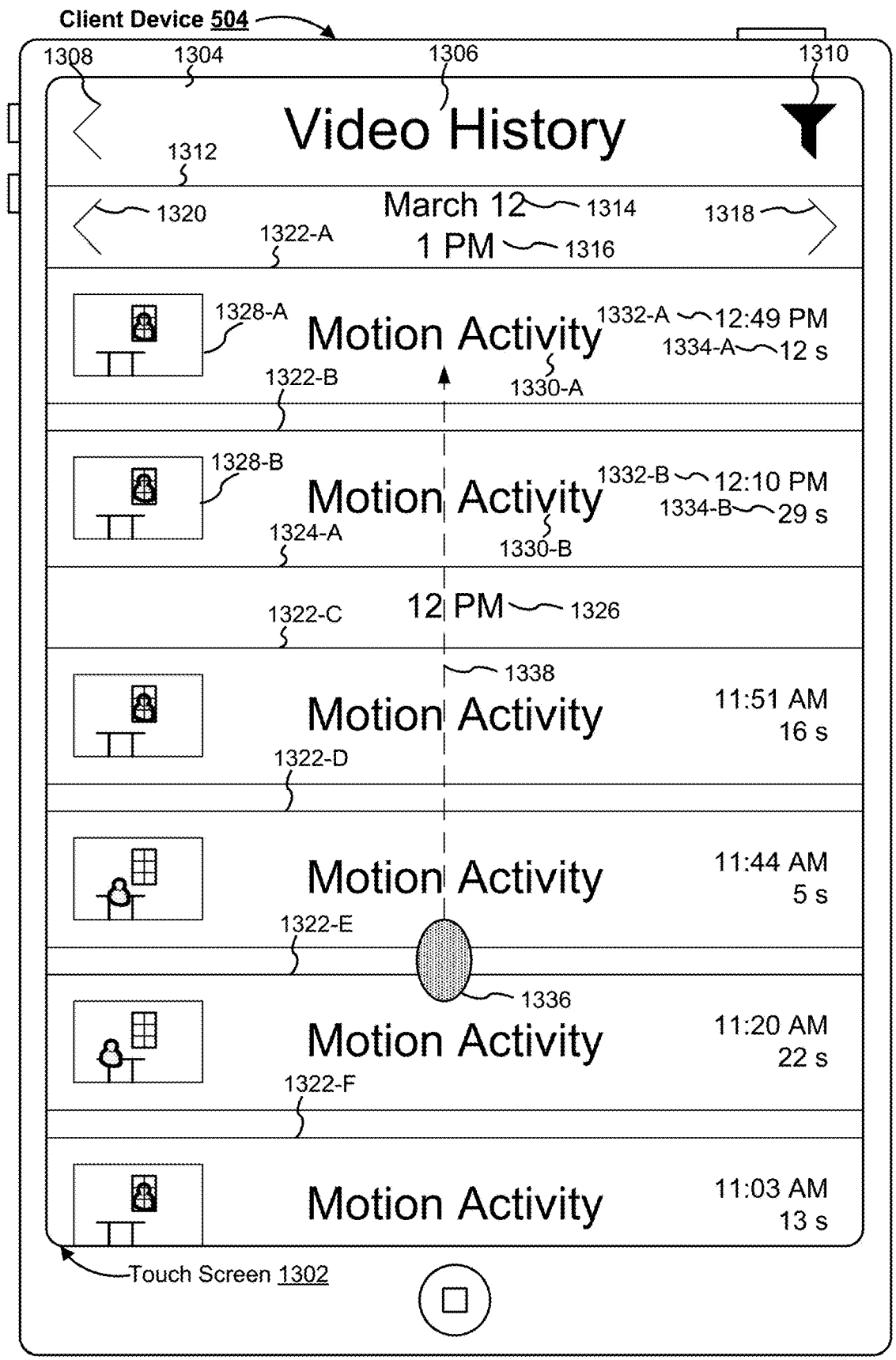
FIGS. 13A-13M illustrate example user interfaces on a client device for reviewing a camera history in accordance with some implementations.

FIGS. 13A-13M illustrate example user interfaces on a client device for reviewing a camera history in accordance with some implementations. FIG. 13A illustrates a camera history user interface 1304 for a respective camera 118 (in FIG. 13A et al., the associated camera 118 is the "Dining room" 1118-C (FIG. 11A) camera 118), displayed by a client device 504 (e.g., a mobile device such as a smart phone) on a touch screen 1302. In some implementations, the camera history user interface 1304 is a part of the same smart home application as user interface 1104 (FIG. 11A et al). User interface 1304 includes an interface title 1306 (e.g., indicating that the interface corresponds to a camera history); backtracking affordance 1308 to backtrack to a previous user interface (e.g., to user interface 1166 (FIG. 11T)); filtering affordance 1310; a separator bar 1312 with date indicator 1314, hour indicator 1326, and day forward affordance 1318 and day backward affordance 1320 for jumping to the next day or the previous day in the camera history, respectively; and a scrollable list of chronologically ordered camera event entries 1322-A, 1322-B, 1322-C, 1322-D, 1322-E, and 1322-F.

Each camera event entry 1322, which corresponds to a respective camera event associated with the respective camera 118, includes a thumbnail 1328 (e.g., a still frame from the video associated with the camera event), an activity type identifier 1330, a timestamp 1332 and a duration indicator 1334. For example, the camera event entry 1332-A has the thumbnail 1328-A. The corresponding camera event includes motion activity (as indicated by activity type identifier 1330-A), started at 12:49 PM (as indicated by timestamp 1332-A), and lasted 12 seconds (as indicated by duration indicator 1334-A). As another example, the camera event entry 1332-B has the thumbnail 1328-B. The corresponding camera event includes motion activity (as indicated by activity type identifier 1330-B), started at 12:10 PM (as indicated by timestamp 1332-B), and lasted 29 seconds (as indicated by duration indicator 1334-B).

The activity type identifier 1330 for a camera event identifies the type of the only or primary alert event detected for the camera event. For example, in FIGS. 13A-13B, each of the camera events corresponding to entries 1322-A thru 1322-I have detected motion activity (e.g., detection of motion in a zone of interest or detection of motion through non-visual sensors) as the only or primary alert event. In some implementations, the primary alert event among alert events associated with a respective camera event is the most recent among the alert events. In some other implementations, the primary alert event among alert events associated with a respective camera event is the one among the alert events with the longest duration.

In the separator bar 1312, the hour indicator 1316 identifies the hour of the day identified by date indicator 1314 in which the camera events corresponding to the camera event entries 1322 displayed highest (i.e., closet to the separator bar 1312) in the scrollable list at the moment are detected. Hour separator bars 1324, each of which includes an hour indicator 1326, are displayed to separate camera event entries 1322 by hour. For example, camera event entries 1322-A and 1322-B correspond to camera events that occur in the 12 PM hour, and camera event entries 1322-C, 1322-D, 1322-E, and 1322-F correspond to camera events that occur in the 11 AM hour.

Figure 13B:
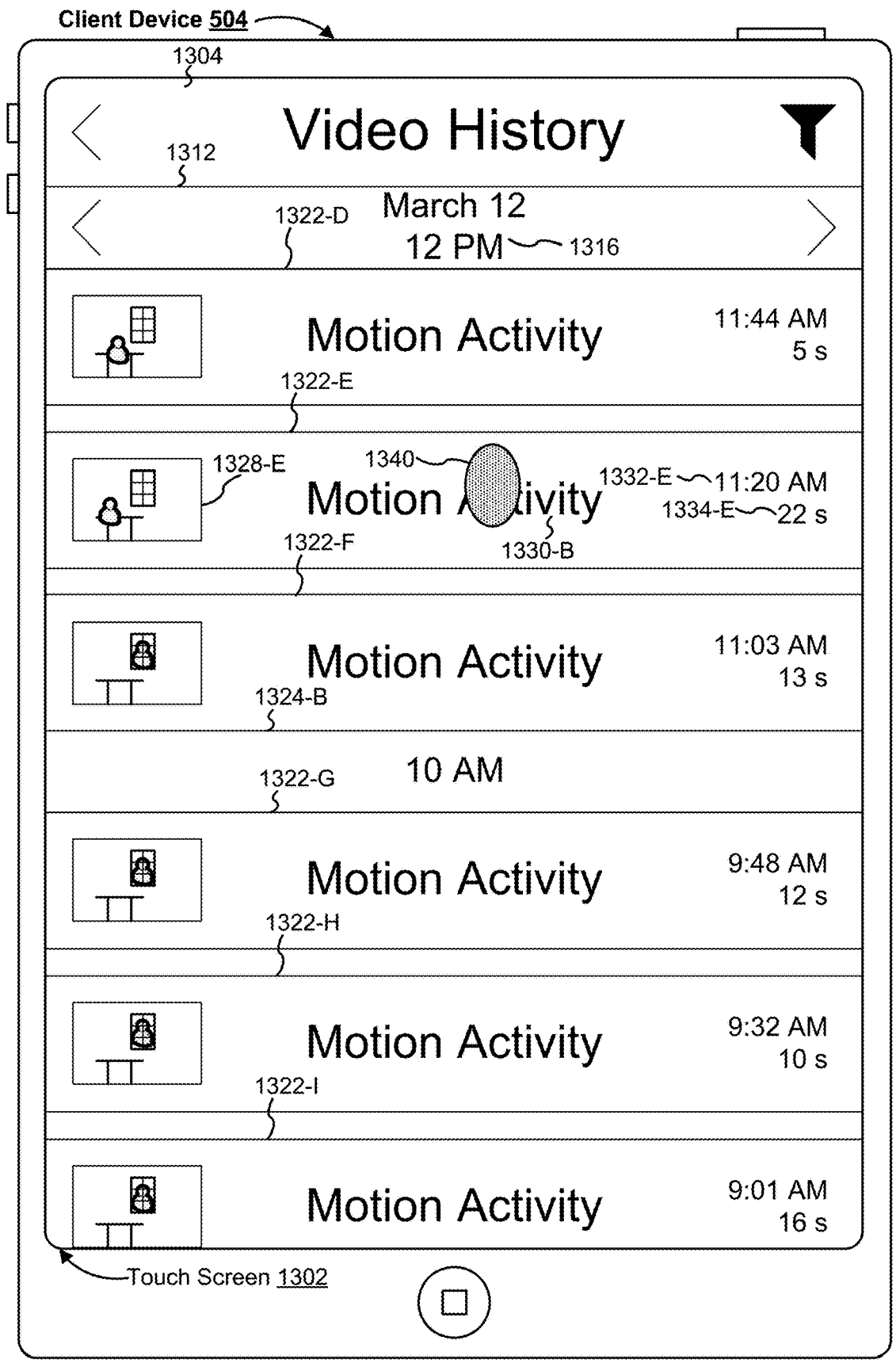

As described above, the list of camera event entries 1322 is scrollable. For example, in FIG. 13A, upward swipe gesture 1338 with contact 1336 is detected on the touch screen 1302. In response to the swipe gesture, the list of camera event entries 1322 is scrolled upward, the result of which is illustrated in FIG. 13B. Entries 1322-D, 1322-E, and 1322-F have moved upward; entries 1322-A, 1322-B, and 1322-C have scrolled out of view; and entries 1322-G, 1322-H, and 1322-I have scrolled into view. The hour indicator 1316 in separator bar 1312 is updated to reflect the hour of day when the camera events corresponding to scrolled-up entries 1322-D, 1322-E, and 1322-F occurred. Hour separator bar 1324-A is scrolled out of view, and hour separator bar 1324-B is scrolled into view. Hour separator bar 1324-B identifies the hour day when the camera events corresponding to entries 1322-G, 1322-H, and 1322-I occurred.

Figure 13C:
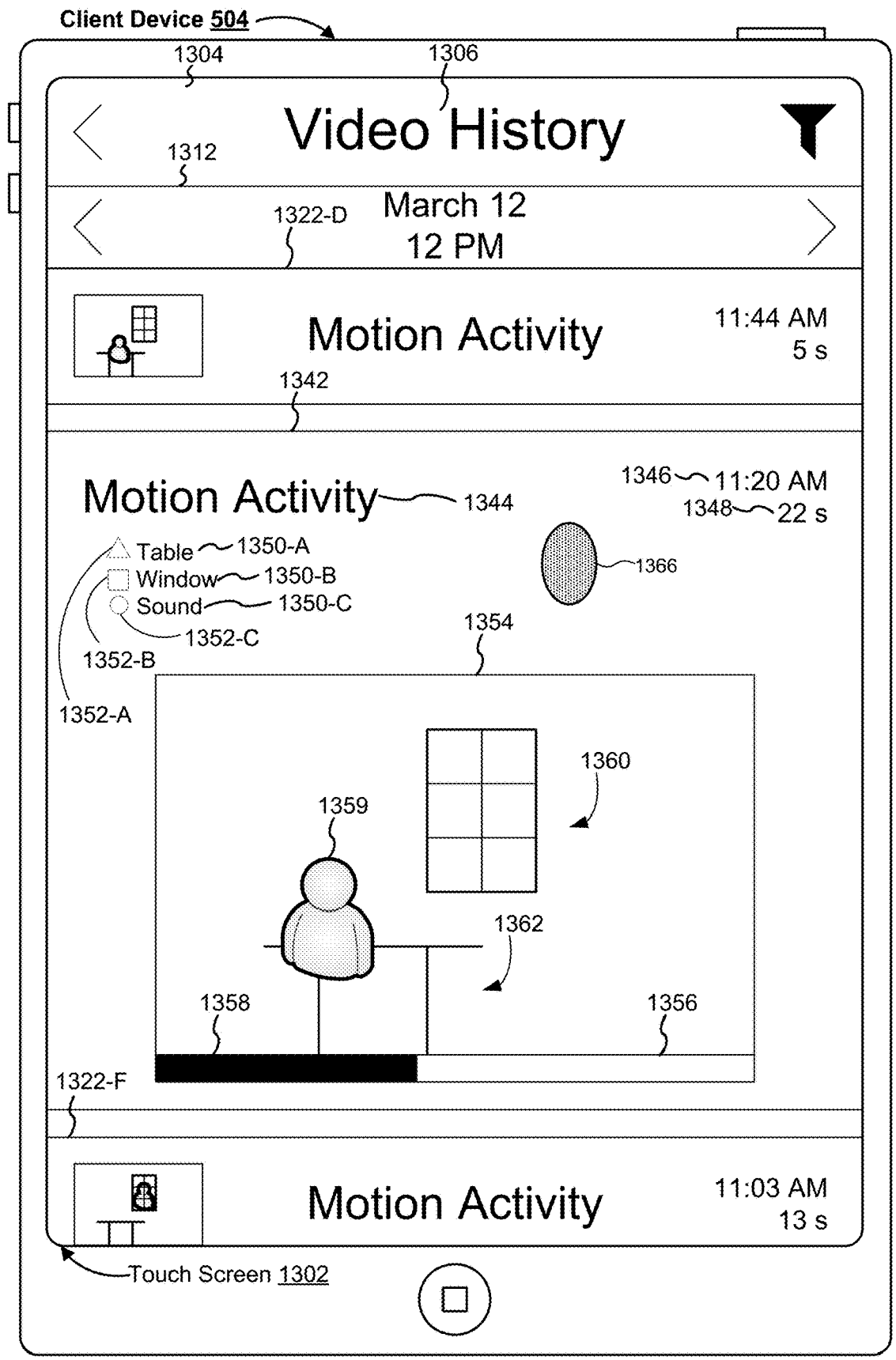

An individual camera event entry 1322 may be expanded to display further information about the corresponding camera event. For example, FIG. 13B illustrates a gesture (e.g., a single tap gesture with contact 1340) detected on camera event entry 1322-E. In response to detecting the gesture on camera event entry 1322-E, camera event entry 1322-E is expanded inline into a video player interface 1342, as shown in FIG. 13C. The video player interface 1342 includes an activity type identifier 1344, a timestamp 1346 and a duration indicator 1348. The activity type identifier 1344, timestamp 1346 and duration indicator 1348 repeats the information shown in the activity type identifier 1330-E, timestamp 1332-E, and duration indicator 1334-E (FIG. 13B) for camera event entry 1322-E, respectively.

The video player interface 1342 also displays information on the types of alert events associated with the corresponding camera event, i.e., types of alert events (including zones of interest) detected and associated with the camera event. The alert event type information includes alert event type identifiers 1350 and corresponding icons 1352. For example, in the video player interface 1342, alert event types (including zones of interest) "Table," "Window," and "Sound" are associated with the camera event corresponding to camera event entry 1322-E; alert events of the types "Table," "Window," and "Sound" were detected and associated with the corresponding video 1354 and the corresponding camera event. As with icons 1240, icons 1352 may be distinguished by shape or color associated with respective alert event types and zones. If the icons 1352 are distinguished based on color, the corresponding labels 1350 may also be displayed in the corresponding associated colors as well.

The video player interface 1342 includes the video 1354 associated with the corresponding camera event. In FIG. 13C, the scene in the video 1354 includes a person 1359, a window 1360, and a table 1362. A playback progress bar 1356 represents the full length of the video 1354, with the shaded portion 1358 representing the playback progress of the video 1354 so far.

Figure 13D:
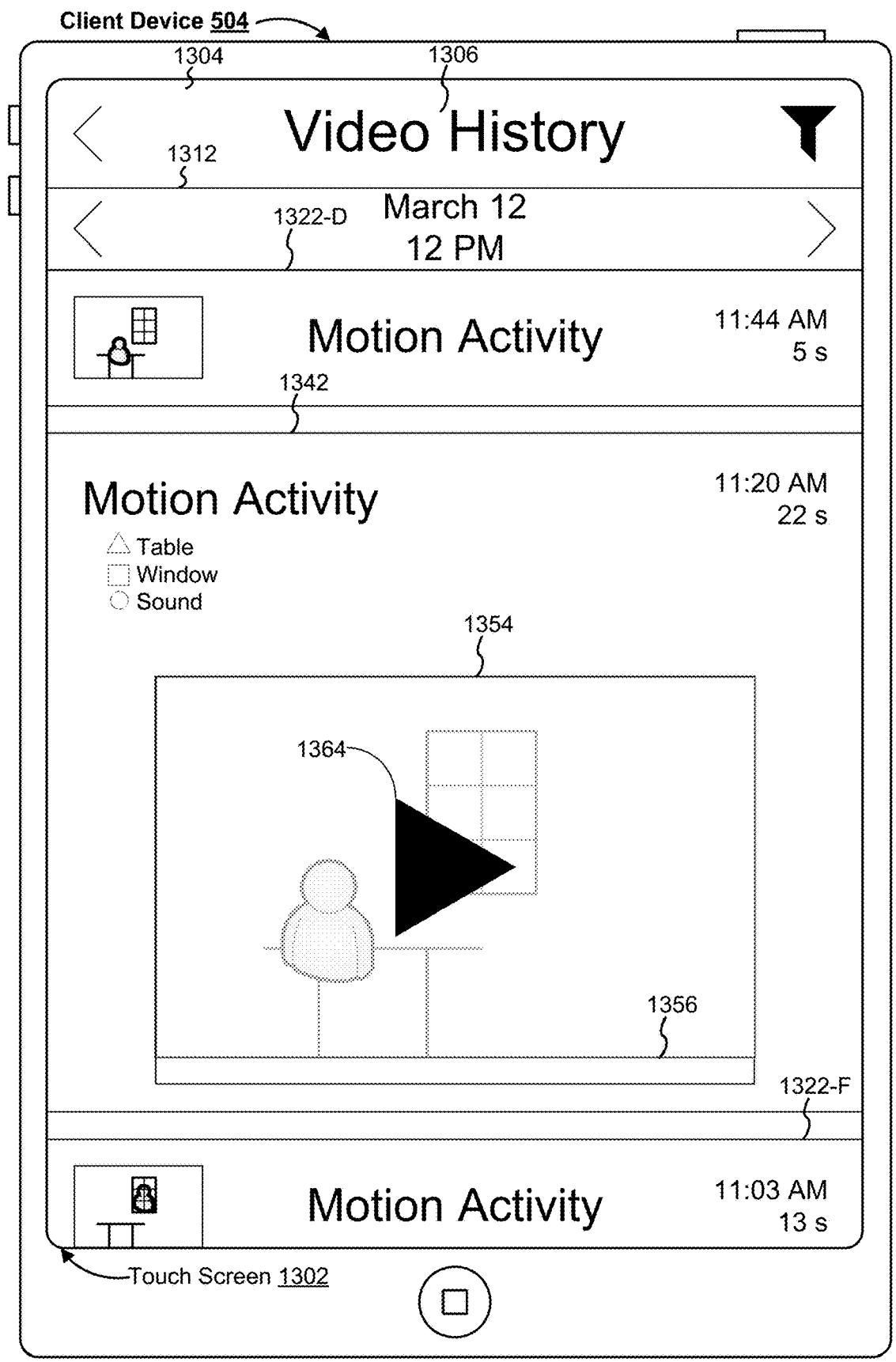

In some implementations, playback of the video 1354 is automatically started when the camera event entry 1322-E is expanded into the video player interface 1342. In some other implementations, playback is manually started; playback affordance 1364 is displayed over the video 1354, as shown in FIG. 13D, and playback is started by the user performing a gesture (e.g., a single tap) on the playback affordance 1364. Before the video 1354 finishes playback, the user may toggle between playing the video 1354 and pausing the video 1354 by performing a gesture (e.g., a single tap) on the video 1354. While the video 1354 is playing or paused, the user may collapse the video player interface 1342 back to the camera event entry 1322-E by performing a gesture (e.g., a single tap) on an area in the video player interface 1342 outside of the video 1354 (e.g., single tap gesture with contact 1366 outside of video 1354, as shown in FIG. 13C).

When playback of the video 1354 is complete (as indicated by the playback progress bar 1356 being completely filled 1358; in some other implementations the playback progress bar 1356 is omitted from display when the playback is complete), replay affordance 1370 and continue affordance 1372 are displayed over the video 1354. The user may perform a gesture (e.g., a single tap) on the replay affordance 1370 to have the video 1354 replayed from the start.

In some implementations, the user may perform a gesture (e.g., a single tap) on the continue affordance 1372 to replace the user interface 1304 with user interface 1166 for the associated camera 118 and play the next video from the associated camera 118 in the user interface 1166 from where the video 1354 left off.

Figure 13E:
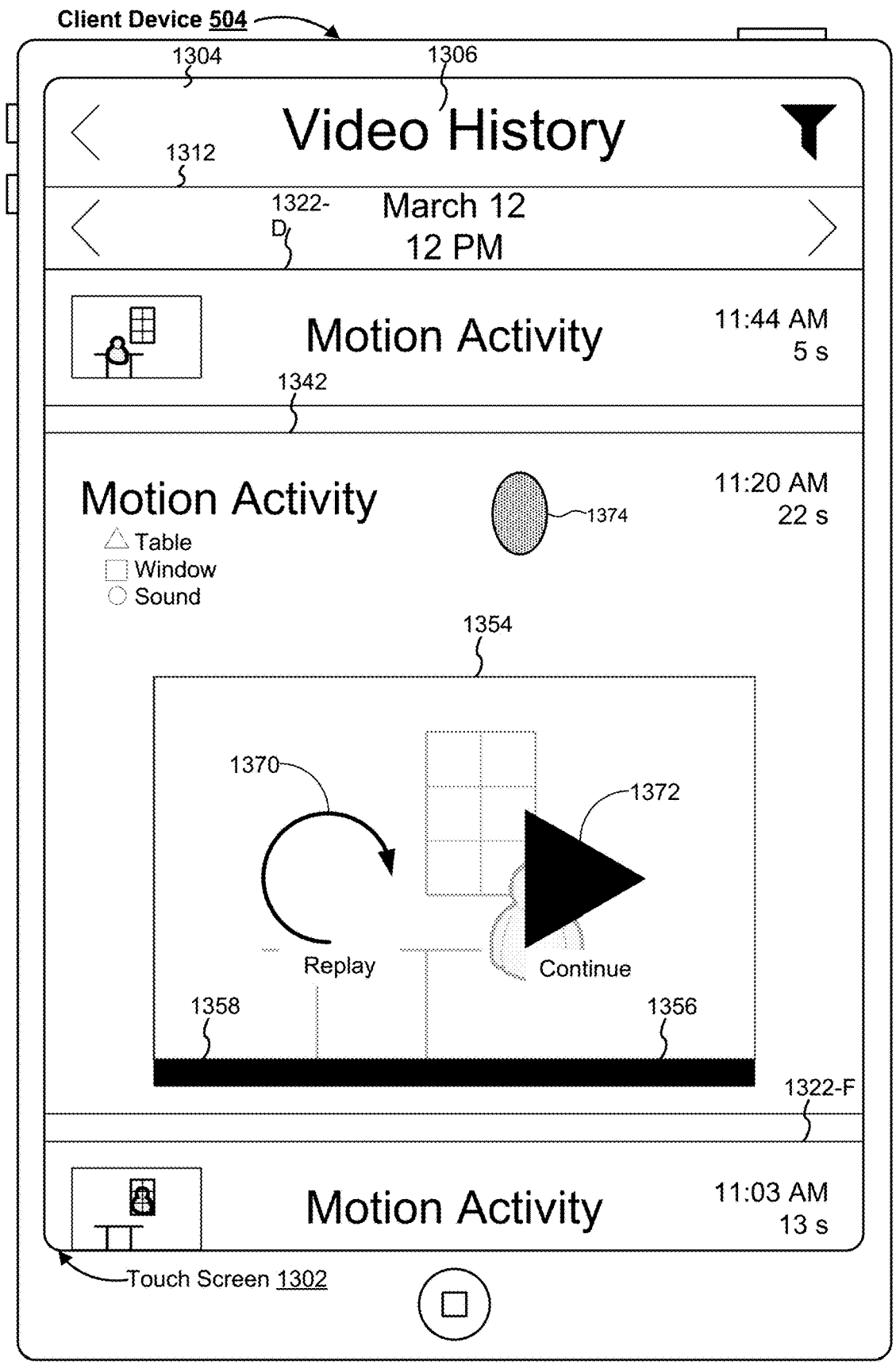

The user may collapse the video player interface 1342 back to the camera event entry 1322-E by performing a gesture (e.g., a single tap) on an area in the video player interface 1342 outside of the video 1354 (e.g., single tap gesture with contact 1374 outside of video 1354, as shown in FIG. 13E).

Figure 13F:
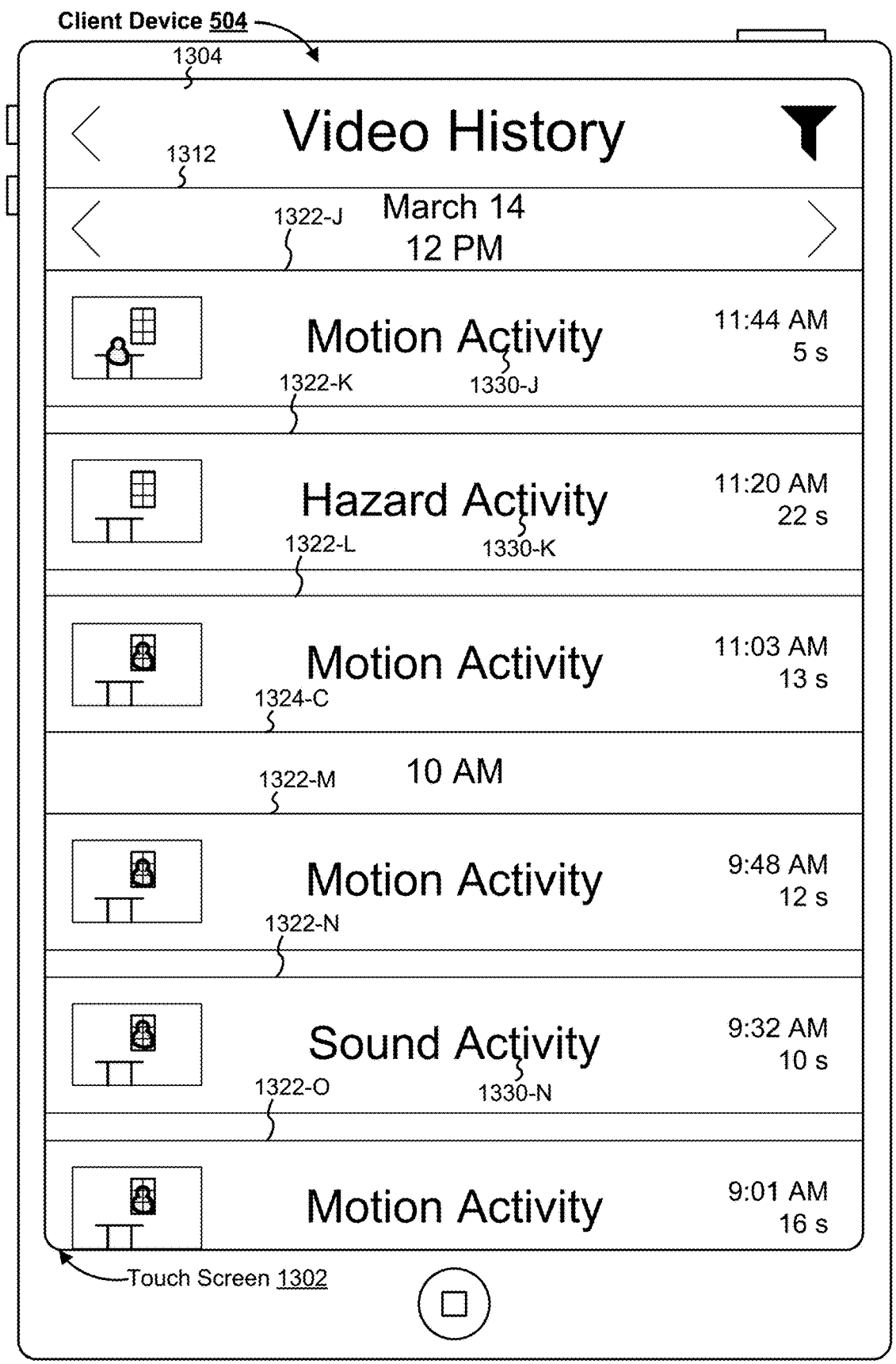

FIGS. 13A-13B illustrates a scrollable list of camera event entries 1322 in which each of the entries 1322 in the list correspond to camera events in which the only or primary alert event is detected motion activity. FIG. 13F illustrates an example of a list of camera event entries 1322 with different types of only or primary alert event types. For example, the only or primary alert event for the camera event corresponding to entry 1322-J is detected motion (as indicated by identifier 1330-J). The only or primary alert event for the camera event corresponding to entry 1322-K is a detected hazard (as indicated by identifier 1330-K). The only or primary alert event for the camera event corresponding to entry 1322-N is detected sound (as indicated by identifier 1330-N).

Figure 13G:
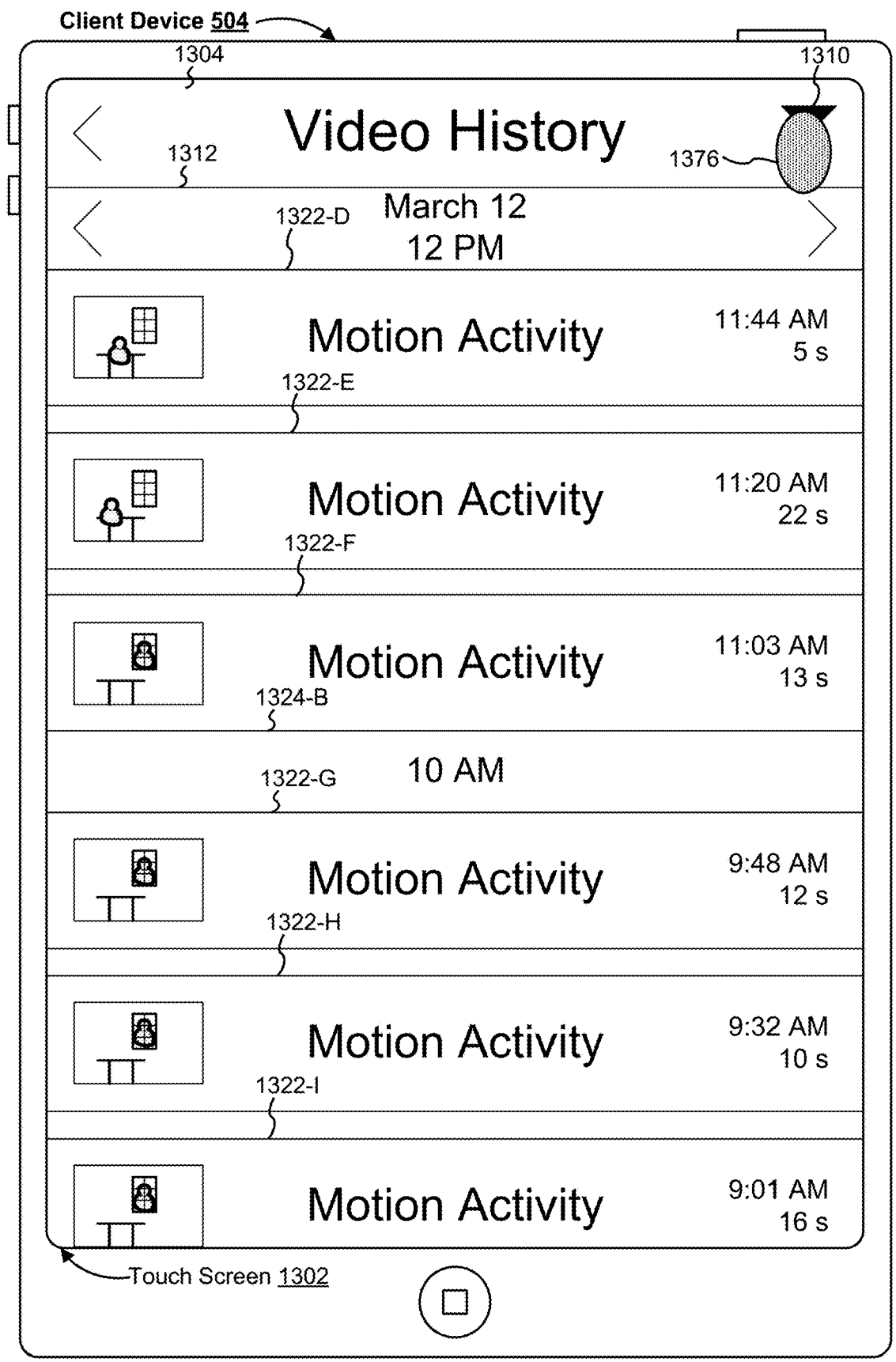
Figure 13H:
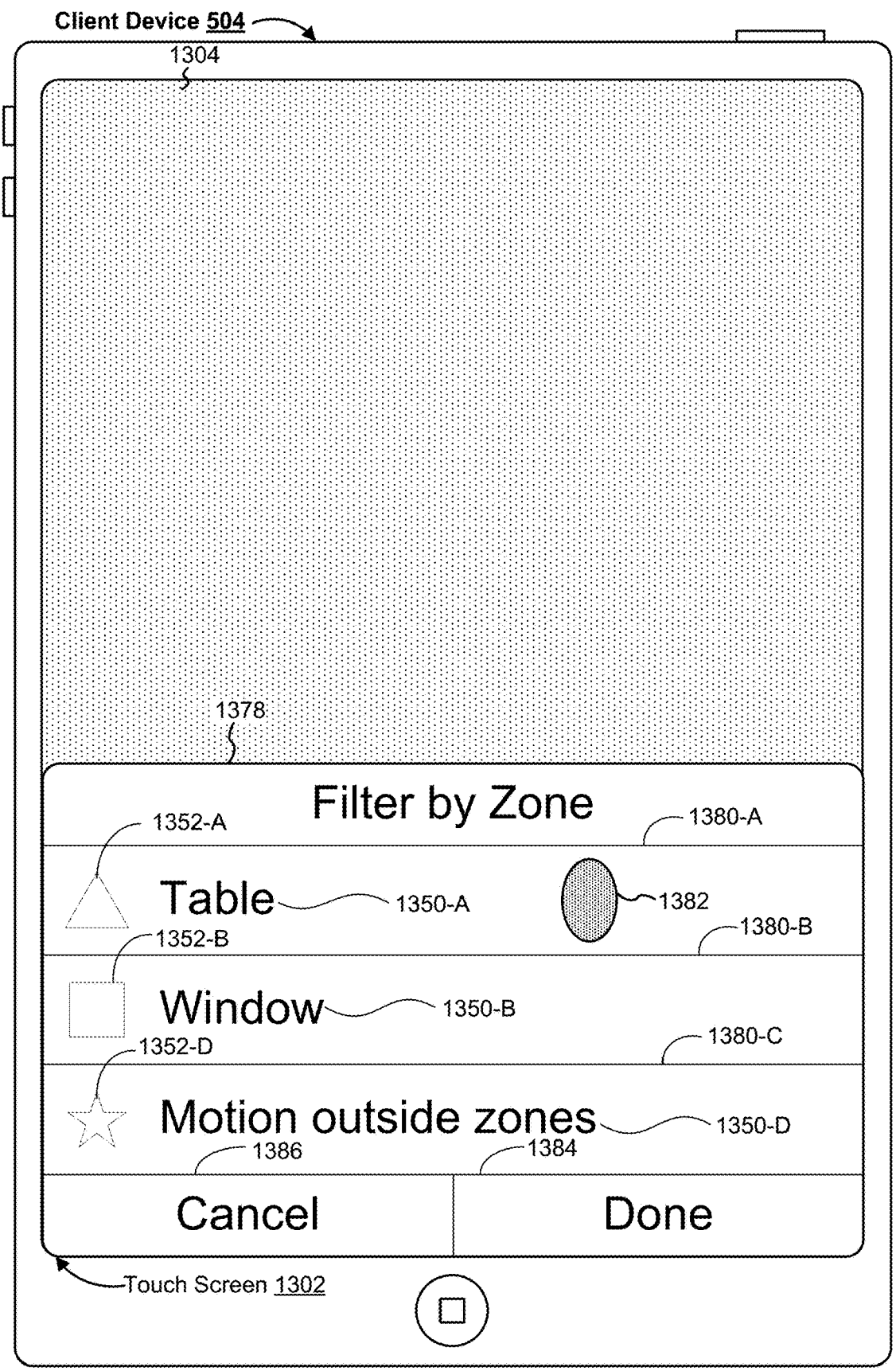

In some implementations, the list of camera event entries 1322 may be filtered to highlight particular alert event types (e.g., particular zones of interest). FIG. 13G illustrates a gesture being detected on the filtering affordance 1310. In response to detecting the filtering affordance 1310, a filtering menu 1378 is displayed over an obscured user interface 1304, as shown in FIG. 13H. The filtering menu 1378 includes one or more filtering criteria 1380, a cancel affordance 1386 for cancelling filtering, and "Done" affordance 1384 for confirming selected filtering criteria and proceeding with filtering.

Each filtering criterion 1380 includes an identifier of the corresponding alert event type 1350 and icon 1352. In FIG. 13H, the filtering criteria 1380 presented are zones of interest ("Filter by Zone"), including the "Table" 1350-A criterion 1380-A, accompanied by icon 1352-A; "Window" 1350-B criterion 1380-B, accompanied by icon 1352-B; and "Motion outside zones" 1350-D criterion 1380-C, accompanied by icon 1352-C. "Motion outside zones" corresponds to motion detected outside any of the user-defined zones of interest, such as "Table" 1350-A and "Window" 1350-B.

Figure 13I:
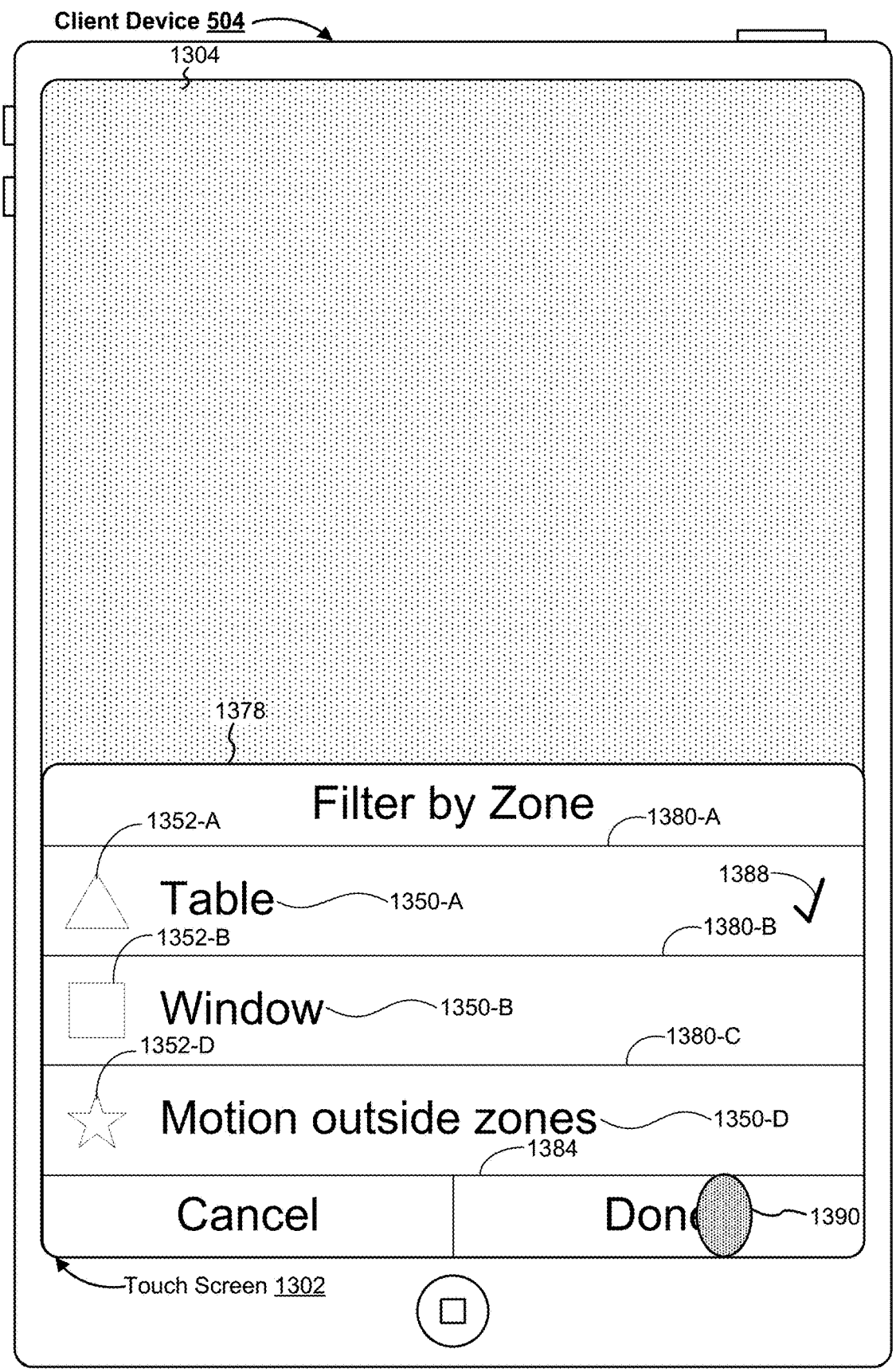

In some implementations, a user selects a filtering criterion by performing a gesture (e.g., a single tap) over the desired criterion. For example, a single tap gesture with contact 1382 is detected over criterion 1380-A. In response to detecting the gesture, criterion 1380-A is checked, indicating selection, as shown in FIG. 13I. The same gesture may be repeated on criterion 1380-A to deselect the criterion. The gesture may be performed on other criteria in the menu 1378 to select or deselect them as desired. When the user has completed selecting the filtering criteria, the user performs a gesture on the "Done" affordance 1384. For example, a single tap gesture with contact 1390 is detected on the "Done" affordance 1384.

In response to detecting the gesture on the "Done" affordance 1384, the selected filtering criteria are applied. For example, in FIG. 13J, the "Table" 1350-A criterion is applied to the camera event entries 1322. When filtering is active, the criterion being applied (e.g., as identified by alert event type identifier(s) 1350 and/or icon(s) 1352) is displayed under the interface title 1306. When filtering is applied, camera event entries 1322 corresponding to camera events that have the alert event type for which filtering is applied includes indicators of the alert even types being applied. For example, entries 1322-D, 1322-E, and 1322-F include the "Table" identifier 1350-A and corresponding icon 1352-A, indicating that the camera events corresponding to these entries have motion detected in the "Table" 1350-A zone of interest.

Figure 13J:
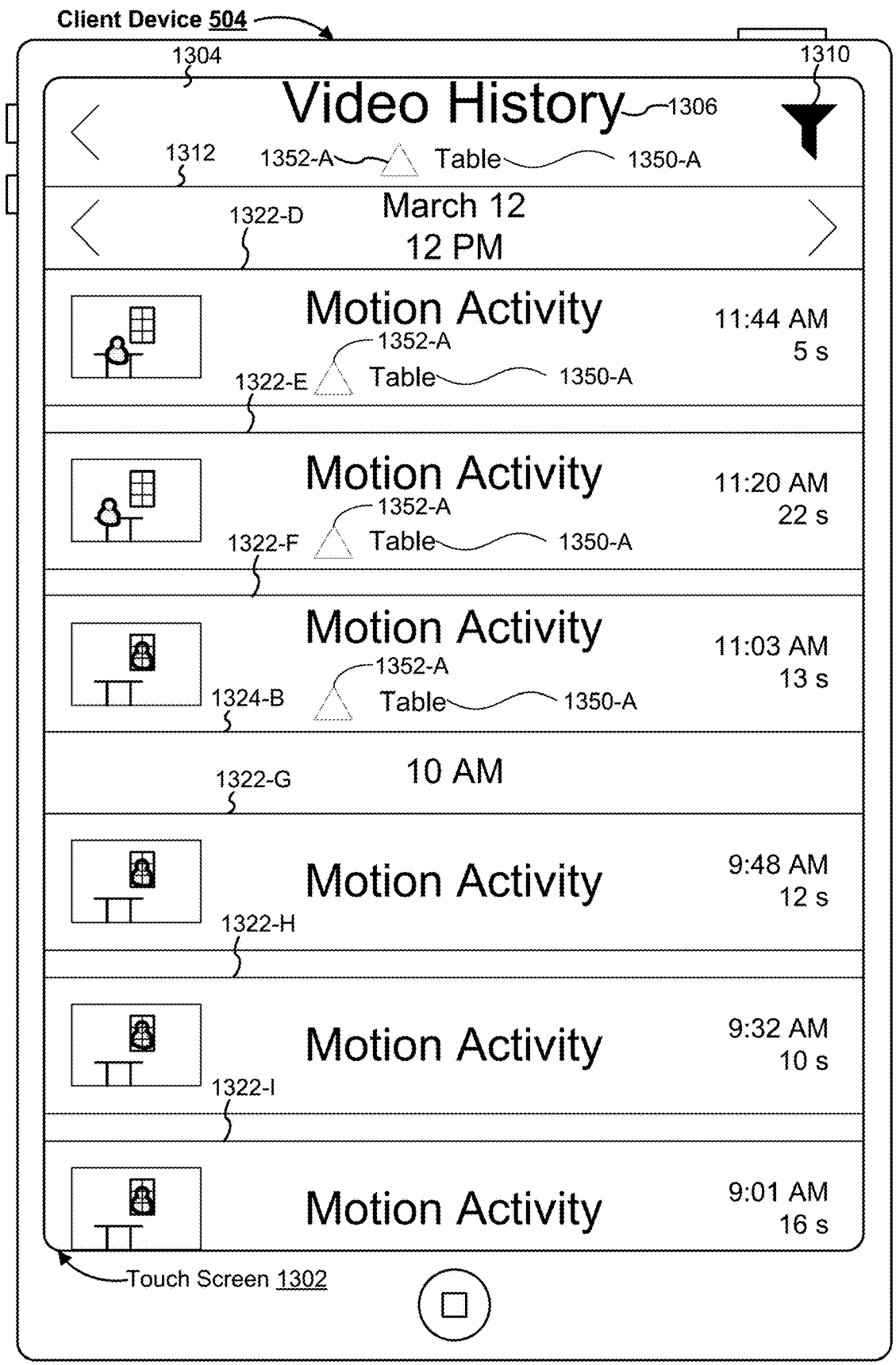
Figure 13K:
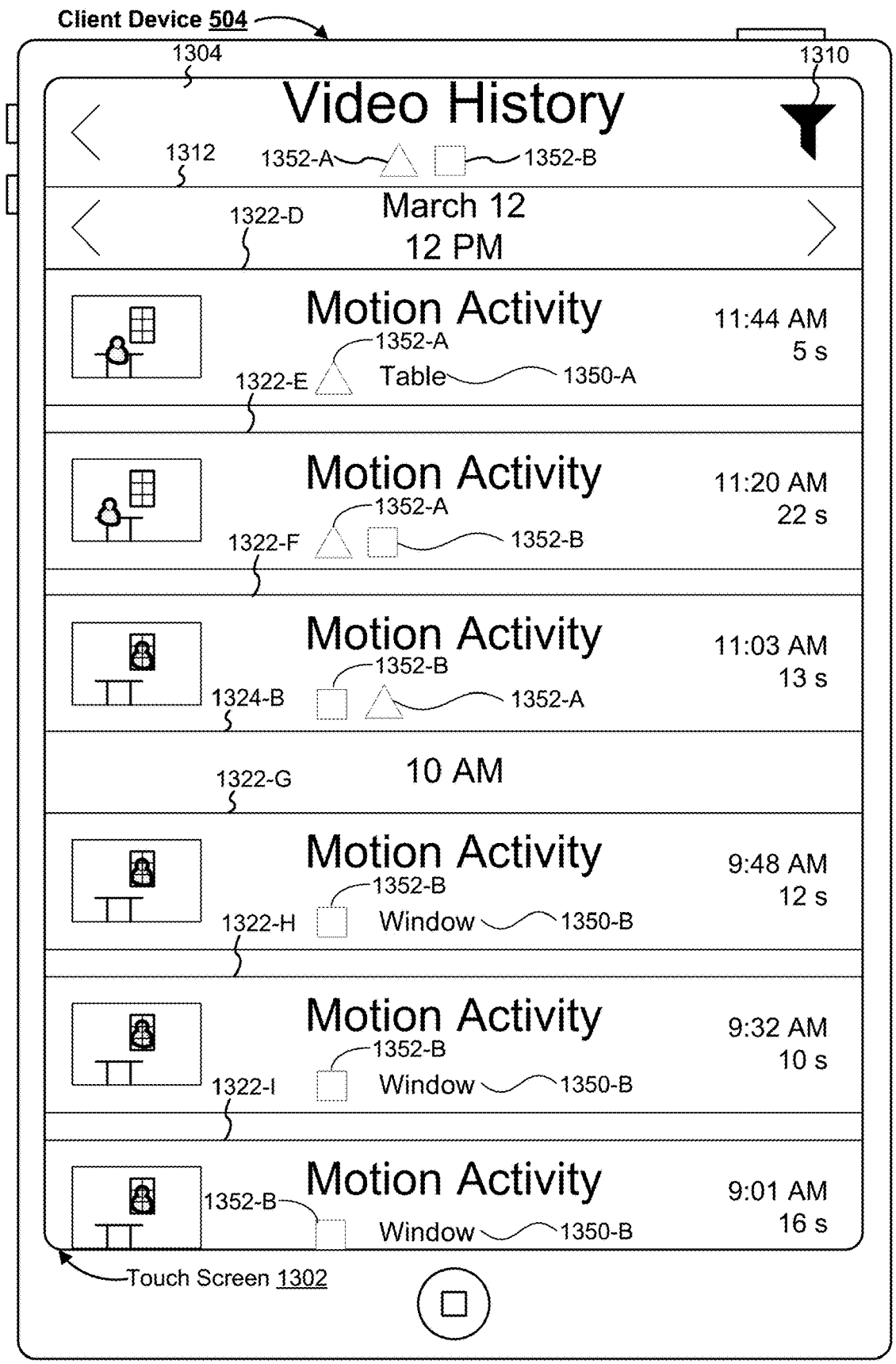

Multiple criteria may be selected for filtering. For example, FIG. 13K illustrates multiple filtering criteria being applied. These multiple criteria are identified by icons 1352-A (corresponding to "Table" 1350-A) and 1352-B (corresponding to "Window" 1352-B). Camera event entries 1322 corresponding to camera events that have the alert event type for which filtering is applied includes indicators of the alert even types being applied. For example, entries 1322-D, 1322-E, and 1322-F include the "Table" identifier 1350-A and/or corresponding icon 1352-A, indicating that the camera events corresponding to these entries have motion detected in the "Table" 1350-A zone of interest. Entries 1322-E, 1322-F, 1322-G, 1322-H, and 1322-I include the "Window" identifier 1350-B and/or corresponding icon 1352-B, indicating that the camera events corresponding to these entries have motion detected in the "Window" 1350-B zone of interest.

Entries 1322-E and 1322-F include both icons 1352-A and 1352-B, indicating that the camera events corresponding to these entries have motion detected in the "Table" 1350-A zone of interest and in the "Window" 1350-B zone of interest. In some implementations, when multiple filtering criteria are applied and an entry 1322 meets more than one of the filtering criteria, the icons 1352 corresponding to the met criteria are displayed in an order. The order is a chronological order similar to that used for icons 1240 (FIG. 12A)—chronological order of the most recent instances of each alert event type in question. For example, for entry 1322-E, the most recent instance of motion in the "Window" 1350-B zone (corresponding to icon 1352-B displayed more to the right), is more recent than the most recent instance of motion in the "Table" 1350-A zone (corresponding to icon 1352-A). For entry 1322-F, the most recent instance of motion in the "Table" 1350-A zone (corresponding to icon 1352-A displayed more the right) is more recent than the most recent instance of motion in the "Window" 1350-B zone (corresponding to icon 1352-B).

Figure 13L:
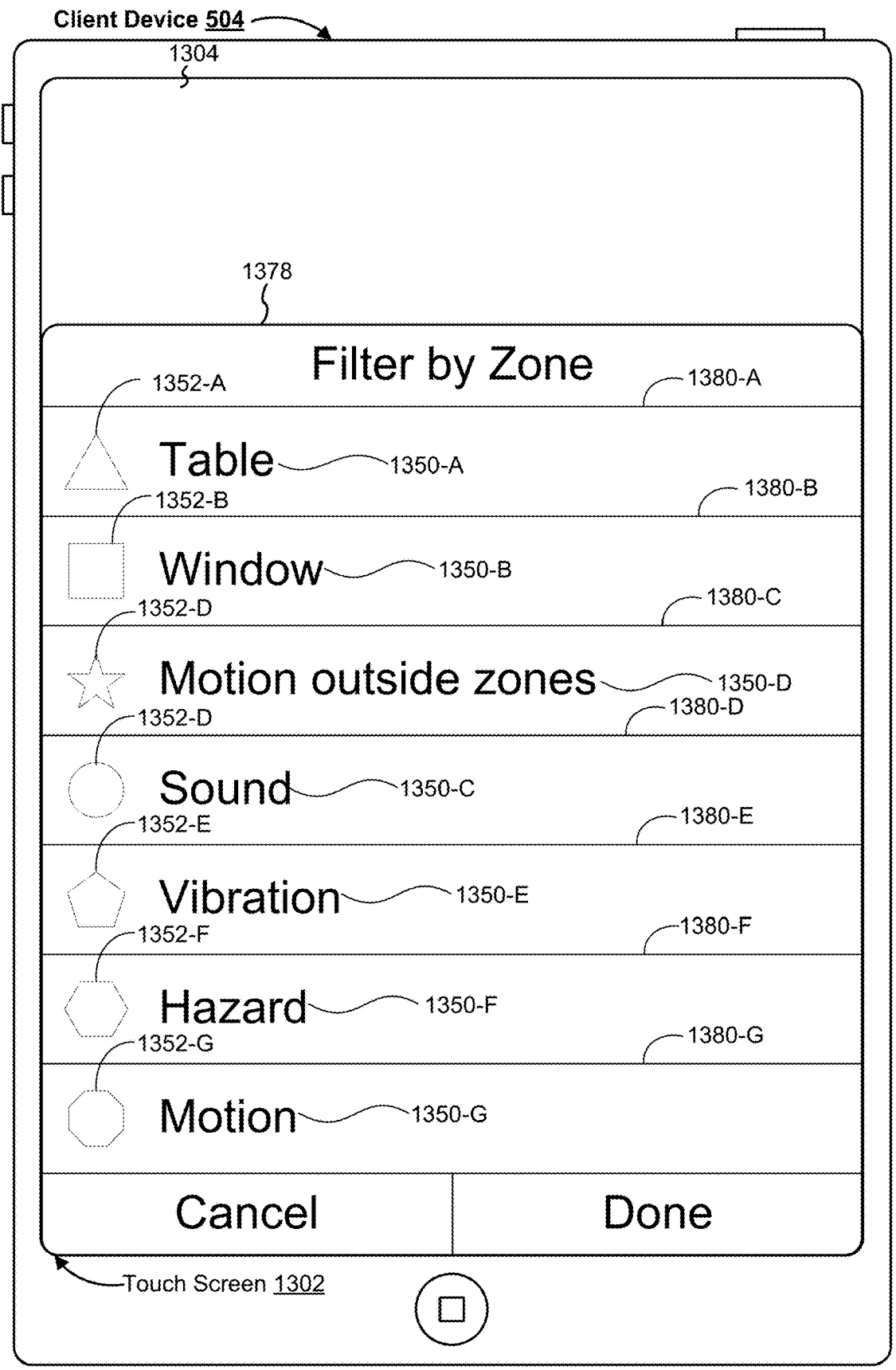

As described above, the filtering criteria 1380 are alert even types, where respective zones of interest are considered as distinct alert event types. FIG. 13L illustrates a filtering menu 1378 that includes filtering criteria 1380 that includes zones of interest and other types of alert events. In addition to criteria 1380-A, 1380-B, and 1380-C, described above in relation to FIG. 13I, the filtering menu 1378 also includes criteria 1380-D, 1380-E, 1380-F, and 1380-G. Criterion 1380-D corresponds to the "Sound" 1350-C alert event type. Criterion 1380-E corresponds to the "Vibration" 1350-E alert event type. Criterion 1380-F corresponds to the "Hazard" 1350-F alert event type. Criterion 1380-G corresponds to the "Motion" 1350-G (or more particularly, motion detected by sensors other than cameras 118, e.g., motion sensors) alert event type. The criteria 1380 may be selected and applied as described above in relation to FIGS. 13I-13K.

In some other implementations, alert event type and/or zone labels 1350 and icons 1352 are displayed for each entry 1322 by default, even before any filtering. In other words, by default, each entry 1322 is displayed with its associated alert event types and zones information displayed as well. When filtering, entries that satisfy the filtering criteria are displayed with all of their associated alert event types and zones (i.e., none are omitted and none are specifically highlighted), and entries that do not meet the filtering criteria 1322 (i.e., not associated with at least one alert event type or zone selected for the filtering criteria) are not displayed. Thus for example, in FIG. 13J entries 1322-G, 1322-H, and 1322-I would not be displayed when filtering by the "Table" zone.

Figure 13M:
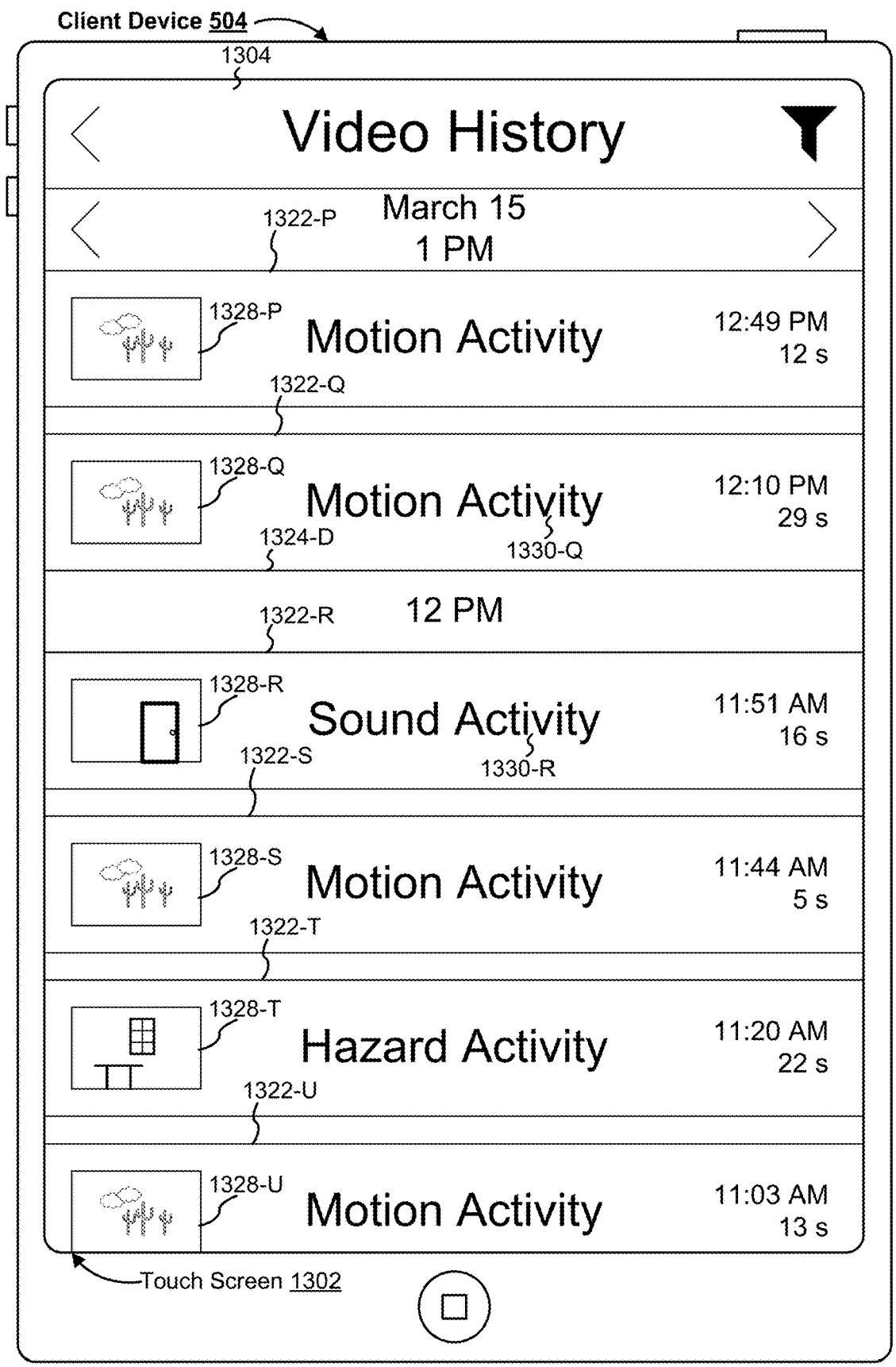
Figure 14B:
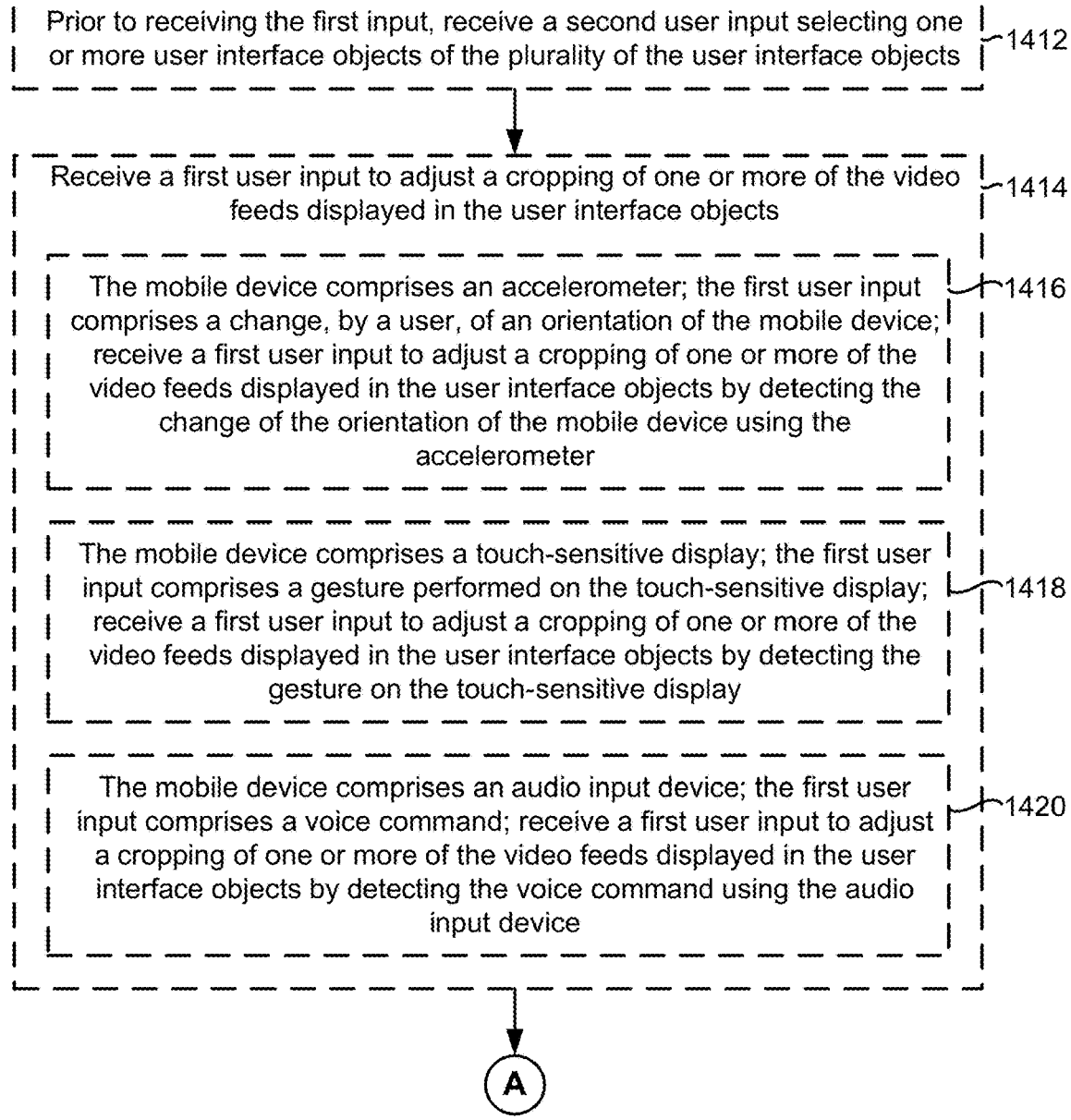
Figure 14C:
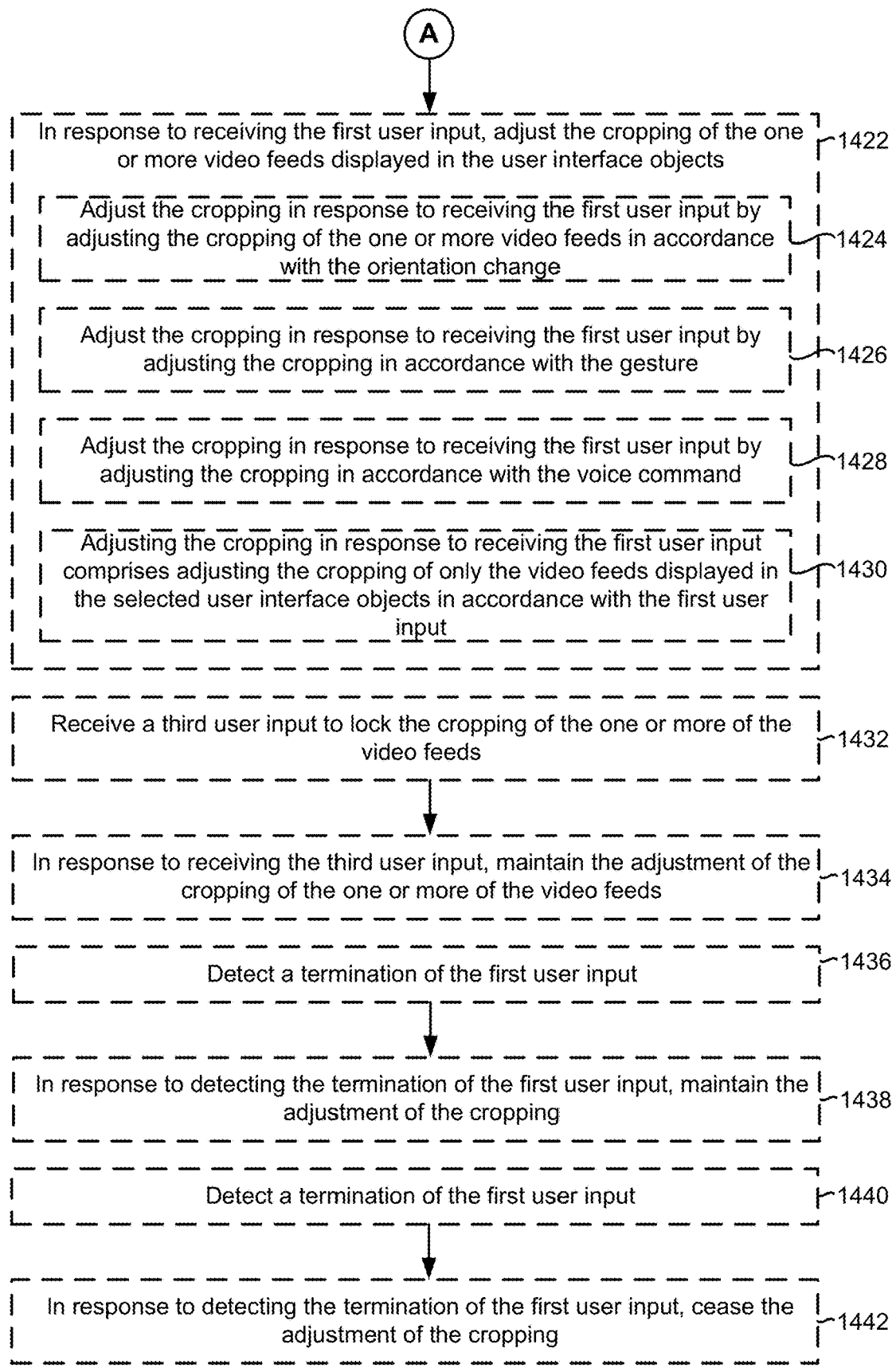
Figure 14D:
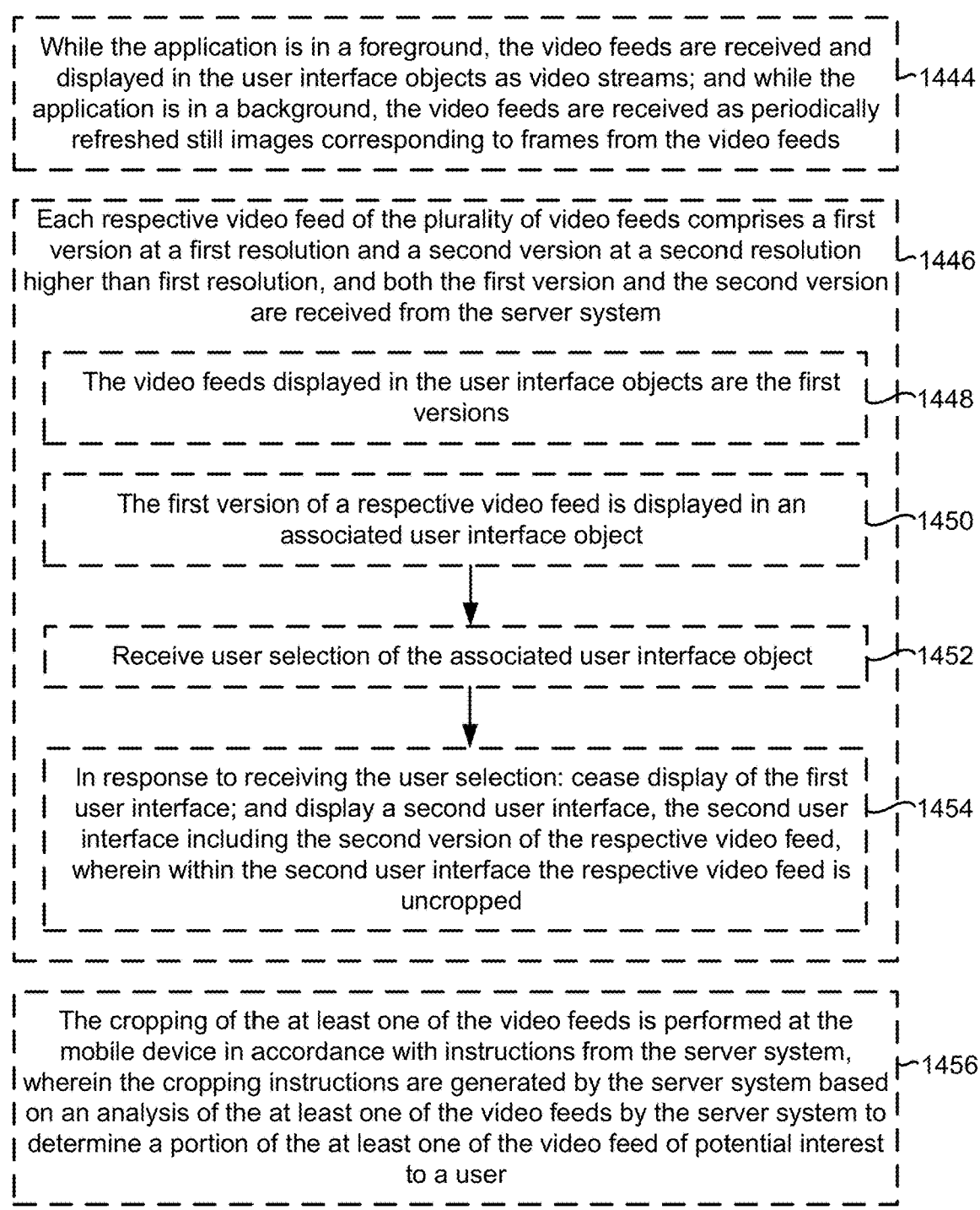
Figure 14E:
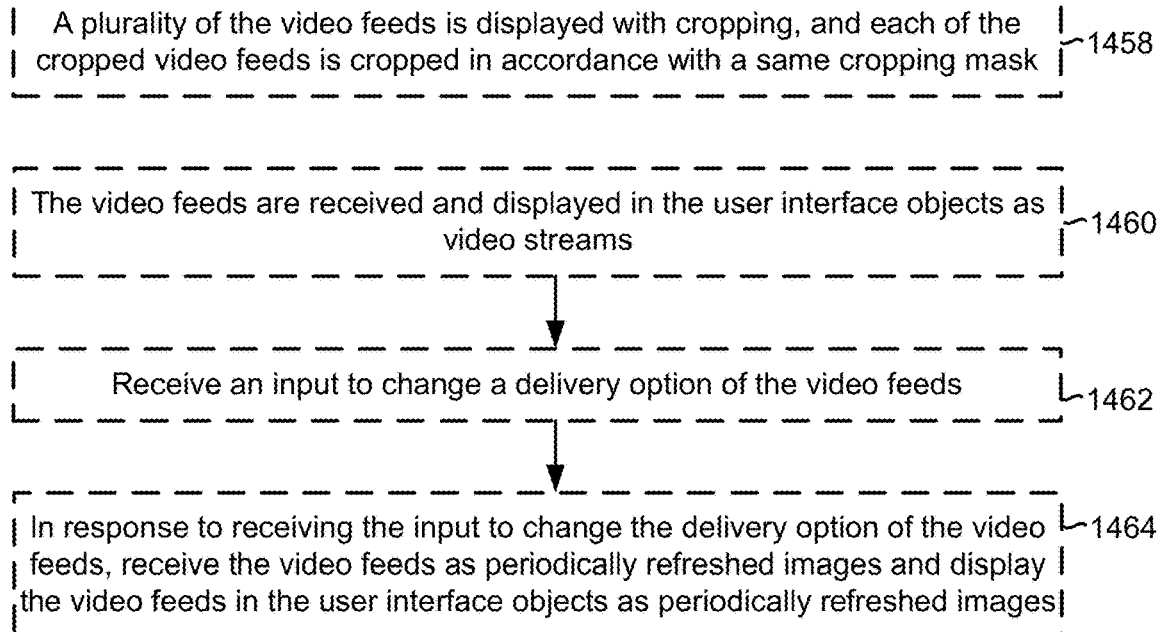

FIGS. 13A-13L illustrate a camera history for one camera 118. FIG. 13M illustrates an example of a camera history for multiple cameras 118. The scrollable list of entries 1322 include entries 1322-P, 1322-Q, 1322-S, and 1322-U corresponding to camera events associated with a first camera (e.g., "Outside" 1118-A camera), entry 1322-R corresponding to a camera event associated with a second camera (e.g., "Front door" 1118-B camera), and entry 1322-T corresponding to a camera event associated with a third camera (e.g., "Dining room" 1118-C camera).

In some implementations, one or more of the functionalities described above in relation to FIGS. 11A-13M (e.g., changing view displayed in camera object 1116, accessing camera history user interface 1304, etc.) may be activated by respective predefined voice inputs or commands.

Exemplary Processes

FIGS. 14A-14E illustrate a flowchart diagram of a method 1400 for presenting multiple video feeds in accordance with some implementations. In some implementations, the method 1400 is performed by an electronic device with one or more processors, memory, a display, and optionally a touch screen, an accelerometer, and/or an audio input device. For example, in some implementations, the method 1400 is performed by client device 504 (FIGS. 5A-5B and 8) or one or more components thereof (e.g., client-side module 502, presentation module 821, input processing module 822, web browser module 823, application 824, user interface module 826). In some implementations, the method 1400 is governed by instructions that are stored in a non-transitory computer readable storage medium (e.g., the memory 806) and the instructions are executed by one or more processors of the electronic device (e.g., the CPUs 802). Optional operations are indicated by dashed lines (e.g., boxes with dashed-line borders).

In an application executing at the electronic device (e.g., client device 504), the electronic device receives a plurality of video feeds, each video feed of the plurality of video feeds corresponding to a respective remote camera of a plurality of remote cameras, wherein the video feeds are received concurrently by the device from a server system communicatively coupled to the remote cameras (1402). The client device 504, for example, receives respective video feeds from multiple cameras 118 through the hub device server system 508 or video server system 552. Each of the received video feeds corresponds to a respective camera 118.

The electronic device displays a first user interface, the first user interface including a plurality of user interface objects, each user interface object of the plurality of user interface objects being associated with a respective remote camera of the remote cameras (1404). The client device 504 displays a user interface 1104 that includes one or more camera objects 1116 (FIG. 11A). Each camera object 1116 is associated with a respective camera 118. For example, camera object 1116-A is associated with the "Outside" 1118-A camera, camera object 1116-B is associated with the "Front door" 1118-B camera, and camera object 1116-C is associated with the "Dining room" 1118-C camera.

The electronic device displays in each user interface object of the plurality of user interface objects the video feed corresponding to the respective remote camera with which the user interface object is associated, wherein at least one of the video feeds is displayed with cropping (1408). The client device 504 displays in each camera object 1116 the video feed from the respective associated camera 118. For example, the video feed from the "Outside" 1118-A camera is displayed in the camera object 1116-A as view 1120, the video feed from the "Front door" 1118-B camera is displayed in the camera object 1116-B as view 1122, and the video feed from the "Dining room" 1118-C camera is displayed in the camera object 1116-C as view 1124. Each of the video feeds is displayed with cropping (e.g., as described above in relation to FIG. 11B), as opposed to, for example, zooming out (i.e., de-magnifying) the video feed to fit the frames of the feed into the camera object 1116.

In some implementations, each respective remote camera of the plurality of remote cameras has a respective field of view, and a user interface object associated with a respective remote camera has a virtual field of view relatively smaller than the respective field of view of the associated respective remote camera (1406). As shown in FIG. 11B, each respective camera 118 has a field of view represented by the full frame size 1117. The camera object 1116 is relatively smaller than the full frame size 1117.

In some implementations, displaying in each user interface object of the plurality of user interface objects the video feed corresponding to the respective remote camera with which the user interface object is associated comprises displaying, in a respective user interface object, periodically refreshed still images corresponding to frames from the corresponding video feed (1410). One or more of the video feeds may be displayed in their respective camera objects 1116 as periodically refreshed (e.g., at 1 image per second, 1 image per two seconds, etc.) images (e.g., still frames from the video feed).

In some implementations, the electronic device receives a first user input to adjust a cropping of one or more of the video feeds displayed in the user interface objects (1414). In response to receiving the first user input, the electronic device adjusts the cropping of the one or more video feeds displayed in the user interface objects (1422). The client device 504, for example, while displaying the video feeds in the camera objects 1116, receives an input to adjust the views 1120, 1122, and 1124 of the video feeds (e.g., gesture 1138, orientation change 1129, a predefined voice input (not shown)). In response to the input, the views 1120, 1122, and 1124 of the video feeds are adjusted, as shown in FIG. 11D; a respective view is panned so that a different area of the video feed is cropped.

In some implementations, the views displayed in the camera objects 1116 are selectively adjustable. For example, FIGS. 11H-11K illustrate camera objects 1116-A and 1116-B selected, and then a gesture 1148 to activate view adjustment is detected. In response to the gesture 1148, the croppings of the views 1120 and 1122, corresponding to the selected camera objects 1116-A and 1116-B are adjusted, with the results being views 1120-2 and 1122-2. View 1124 is not adjusted as camera object was not selected prior to the gesture 1148.

In some implementations, the mobile device comprises an accelerometer, and the first user input comprises a change, by a user, of an orientation of the mobile device. The electronic device receives a first user input to adjust a cropping of one or more of the video feeds displayed in the user interface objects by detecting the change of the orientation of the mobile device using the accelerometer (1416). The electronic device adjusts the cropping in response to receiving the first user input by adjusting the cropping of the one or more video feeds in accordance with the orientation change (1424). For example, as shown in FIG. 11C, the client device 504 may be rotated 1129 to change its orientation. The orientation change is detected by the accelerometer 892. In response to the orientation change, the views 1120, 1122, and 1124 in the camera objects 1116 are changed in accordance with the orientation change. For example, a clockwise rotation 1129 of the client device 504 causes the views 1120, 1122, and 1124 to respectively shift rightward relative to the associated camera objects 1116.

In some implementations, the mobile device comprises a touch-sensitive display, and the first user input comprises a gesture performed on the touch-sensitive display. The electronic device receives a first user input to adjust a cropping of one or more of the video feeds displayed in the user interface objects by detecting the gesture on the touch-sensitive display (1418). The electronic device adjusts the cropping in response to receiving the first user input by adjusting the cropping in accordance with the gesture (1426). For example, as shown in FIG. 11C, gesture 1128 may be performed by a user on the touch screen 1102. In response to detecting the gesture, the views 1120, 1122, and 1124 in the camera objects 1116 are changed in accordance with the gesture. For example, a rightward gesture 1128 on the touch screen 1102 causes the views 1120, 1122, and 1124 to respectively shift rightward relative to the associated camera objects 1116.

In some implementations, the mobile device comprises an audio input device, and the first user input comprises a voice command. The electronic device receives a first user input to adjust a cropping of one or more of the video feeds displayed in the user interface objects by detecting the voice command using the audio input device (1420). The electronic device adjusts the cropping in response to receiving the first user input by adjusting the cropping in accordance with the voice command (1428). For example, the user may issue a predefined voice command instructing the smart home application running on the client device 504 to adjust the views displayed in the camera objects 1116. In response to detecting the voice command, the views 1120, 1122, and 1124 in the camera objects 1116 are changed in accordance with the voice command.

In some implementations, prior to receiving the first input, the electronic device receive a second user input selecting one or more user interface objects of the plurality of the user interface objects (1412). Adjusting the cropping in response to receiving the first user input comprises adjusting the cropping of only the video feeds displayed in the selected user interface objects in accordance with the first user input (1430). For example, the client device 504 may receive one or more inputs (e.g., gestures with contacts 1142 and 1144, FIGS. 11H-11I). In response to these inputs, one or more camera objects 1116 (e.g., camera objects 1116-A and 1116-B) are selected, as shown in FIG. 11J. With camera objects 1116-A and 1116-B selected, in response to detecting user input to change the views displayed in the camera objects (e.g., gesture 1148, orientation change 1149, predefined voice input), just the views 1120 and 1122 in camera objects 1116-A and 1116-B are adjusted.

In some implementations, the electronic device receives a third user input to lock the cropping of the one or more of the video feeds (1432). In response to receiving the third user input, the electronic device maintains the adjustment of the cropping of the one or more of the video feeds (1434). In FIG. 11D, for example, after the views 1120, 1122, and 1124 are adjusted in response to detecting the gesture 1128, the user may perform a gesture (e.g., a single tap) with contact 1127 before the views reset to their previous states. In response to that gesture, the views 1120-2, and 1122-2, and 1124-2 are maintained instead of resetting to views 1120-1, and 1122-1, and 1124-1.

In some implementations, the electronic device detects a termination of the first user input (1436), and in response to detecting the termination of the first user input, maintains the adjustment of the cropping (1438). In FIG. 11D, for example, after the views 1120, 1122, and 1124 are adjusted to views 1120-2, and 1122-2, and 1124-2 in response to detecting the gesture 1128, the user may terminate the gesture 1128 by lifting the contact 1126 off the touch screen 1102. In some implementations, in response to the termination of the gesture 1128, the views 1120-2, and 1122-2, and 1124-2 are maintained.

In some implementations, the electronic device detects a termination of the first user input (1440), and in response to detecting the termination of the first user input, ceases the adjustment of the cropping (1442). In FIG. 11D, for example, after the views 1120, 1122, and 1124 are adjusted to views 1120-2, and 1122-2, and 1124-2 in response to detecting the gesture 1128, the user may terminate the gesture 1128 by lifting the contact 1126 off the touch screen 1102. In some implementations, in response to the termination of the gesture 1128, the views 1120-2, and 1122-2, and 1124-2 are automatically reset to views 1120-1, 1122-2, and 1122-4.

In some implementations, while the application is in a foreground, the video feeds are received and displayed in the user interface objects as video streams; and while the application is in a background, the video feeds are received as periodically refreshed still images corresponding to frames from the video feeds (1444). The smart home application may be in the foreground (and its user interface displayed) or in the background (and not displayed) at any given moment. When the smart home application is in the foreground, the smart home application may receive the video feeds for the camera objects 1116 as video streams. When the smart home application is in the background, the smart home application may receive the video feeds for the camera objects 1116 in the background as periodically refreshed images instead of video streams.

In some implementations, each respective video feed of the plurality of video feeds comprises a first version at a first resolution and a second version at a second resolution higher than first resolution, and both the first version and the second version are received from the server system (1446). In some implementations, the client device 504 receives each video feed from the hub device server system 508 or the video server system 552 in both an original capture resolution (e.g., 720P or 1080P) version and a lower-resolution version (e.g., 180P).

In some implementations, the video feeds displayed in the user interface objects are the first versions (1448). The lower-resolution version (e.g., the 180P version) is displayed in the camera objects 1116.

In some implementations, the first version of a respective video feed is displayed in an associated user interface object (1450). The electronic device receives user selection of the associated user interface object (1452), and in response to receiving the user selection, ceases display of the first user interface and displays a second user interface, the second user interface including the second version of the respective video feed, wherein within the second user interface the respective video feed is uncropped (1454). As described above, the lower-resolution version of a video feed is displayed in the corresponding camera object 1116. For example, the 180P version of the "Dining room" 1118-C camera video feed is displayed in the camera object 1116-C. As shown in FIG. 11S, while the "Dining room" 1118-C camera video feed is displayed in a camera object 1116-C, a single tap gesture with contact 1164 is detected on the camera object 1116-C. In response to detecting the gesture, user interface 1166 (FIG. 11T) is displayed on the touch screen 1102, replacing user interface 1104. The "Dining room" 1118-C camera video feed is displayed in video region 1180 without cropping and at a higher resolution than that for the camera object 1116-C (e.g., at the original capture resolution).

In some implementations, the cropping of the at least one of the video feeds is performed at the mobile device in accordance with instructions from the server system, wherein the cropping instructions are generated by the server system based on an analysis of the at least one of the video feeds by the server system to determine a portion of the at least one of the video feed of potential interest to a user (1456). The cropping may be performed by the hub device server system 508 or the video server system 552. The hub device server system 508 or the video server system 552 crops a video feed before transmitting the video feed to a client device 504. In some implementations, the cropping by the server system 508 or 552 is based on an analysis by the server system 508 or 552 of a video feed to be cropped to determine which portion of the video feed (e.g., which portion of the frame) is of potential interest to the user. For example, the servers system 508 or 522 may, based on an analysis of the video feed, determine that there is motion occurring in the video, and crops the video feed to focus on that motion (e.g., crop the video feed to focus on the area where the motion occurred).

In some implementations, a plurality of the video feeds is displayed with cropping, and each of the cropped video feeds is cropped in accordance with a same cropping mask (1458). For example, in FIG. 11A the video feeds displayed in the camera objects 1116-A, 1116-B, and 1116-C are cropped. As the camera objects camera objects 1116-A, 1116-B, and 1116-C all have the same circular shape and size, the video feeds are cropped with the same cropping mask that fits the video feeds into the same circular shape and size. In some implementations, all of the video feeds displayed in the camera objects 1116 are cropped. In some other implementations, some of the video feeds displayed in the camera objects 1116 are cropped; one or more of the feeds are instead zoomed out within the camera object 1116 to fit the entire frame 1117 into the camera object. In some implementations, each video feed is cropped to same mask or mask shape; the mask or mask shape is based on the shape and size of the camera objects 1116. In some other implementations, each camera object 1116 has a distinct shape, and the corresponding masks/mask shapes differ in accordance with the distinct shapes of the camera objects 1116.

Figure 15A:
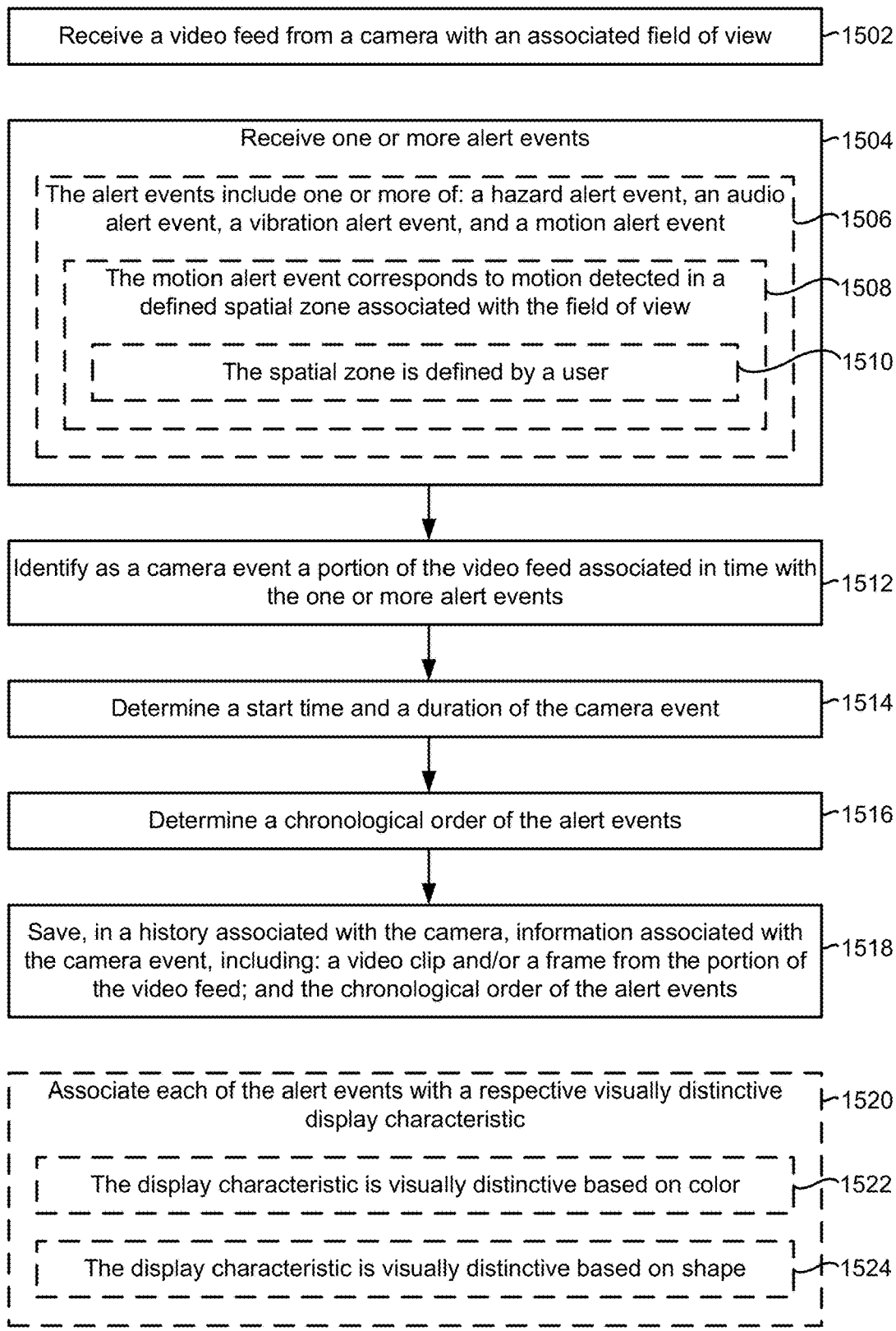

FIGS. 15A-15B illustrate a flowchart diagram of a method 1500 for saving alert events in a camera history in accordance with some implementations. In some implementations, the method 1500 is performed by a server system (of one or more server computers) with one or more processors and memory. For example, in some implementations, the method 1500 is performed by hub device server system 508 or video server system 552 (FIGS. 5A-5B and 7A-7D) or one or more components thereof (e.g., server-side module 714, FIG. 7A; video server module 730, FIG. 7B). In some implementations, the method 1500 is governed by instructions that are stored in a non-transitory computer readable storage medium (e.g., the memory 706, 722) and the instructions are executed by one or more processors of the electronic device (e.g., the CPUs 702, 718). Optional operations are indicated by dashed lines (e.g., boxes with dashed-line borders).

The server system receives a video feed from a camera with an associated field of view (1502). The hub device server system 508 or video server system 552 (e.g., the video data receiving module 7302) receives video feeds from one or more cameras 118. Each camera 118 has a respective field of view.

The server system receives one or more alert events (1504). The hub device server system 508 or video server system 552 (e.g., the alert events module 73022) receives detected alert events from smart devices 204. For example, whenever a smart device 204 detects an alert event (e.g., a hazard, sound, etc.), the hub device server system 508 or video server system 552 receives information corresponding to the detected alert event (e.g., start time and end time of the alert event, alert event type).

The server system identifies as a camera event a portion of the video feed associated in time with the one or more alert events (1512). For example, the hub device server system 508 or video server system 552 (e.g., the camera events module 73024) correlates alert events or sequences of alert events with portions of the video feed based on when the alert events start and end, and from the correlation identify camera events, which include a portion of the video feed (e.g., captured video from the video feed from a start date/time to an end date/time) and an associated set of one or more alert events; the alert events are proximate in time (e.g., contemporaneous) with the associated video. In some implementations, two alert events are associated with the same camera event if the alert events overlap or occur in succession with a time gap (i.e., time elapsed between one alert event ending and the next alert event starting) between the two consecutive alert events being less than a threshold amount.

The server system determines a start time and duration of the camera event (1514). The hub device server system 508 or video server system 552 (e.g., the camera events module 73024) determines the start time and duration of the camera event based on the times of the associated alert events. For example, the start time of the earliest alert event of the associated alert events is determined to be the start time of the camera event, and the end time of the alert event of the associated alert events that ends latest is determined to be the end time of the camera event. With these start and end times, the duration o the camera event may be determined. Also, the video that is associated with the camera event has these start and end times (and optionally plus some slack time in either direction (e.g., 1-5 seconds before the start time and/or 1-5 seconds after the end time)).

The server system determines a chronological order of the alert events (1516). The hub device server system 508 or video server system 552 (e.g., the alert events module 73022) determines the chronological sequence of the alert events associated with the camera event. In some implementations, the chronological order is determined based on the start times of the alert events (i.e., when the respective alert events are first detected). In some implementations, the chronological order is determined based on the end times of the alert events (i.e., when the respective alert events are last detected).

The server system saves, in a history associated with the camera, information associated with the camera event, including a video clip and/or a frame from the portion of the video feed, and the chronological order of the alert events (1518). The hub device server system 508 or video server system 552 saves, in the server database 732 (e.g., in camera events history 7328 and video storage database 7320), the information associated with the camera event. The camera events information (e.g., the associated alert events and corresponding chronology, camera event times and durations, etc.) is stored in the camera events history 7328, and the camera events information references video stored in the video storage database 7320.

In some implementations, the alert events include one or more of: a hazard alert event, an audio alert event, a vibration alert event, and a motion alert event (1506). The alert events may be detected hazards (e.g., detected by smart hazard detectors 104), detected sound above a minimum decibel threshold (e.g., detected by any smart device 204 with audio input), detected vibrations above a minimum threshold (e.g., detected by any smart device 204 with vibration sensors), and detected motion (e.g., detected in video captured by a camera 118 or detected by non-camera sensors, such as motion sensors).

In some implementations, the motion alert event corresponds to motion detected in a defined spatial zone associated with the field of view (1508). The motion alert event may correspond to motion detected in video by the camera 118, where the motion is occurring in a defined zone of interest in the scene or area monitored by the camera 118. The zone of interest is a zone designating a space in the scene or area monitored by the camera 118 for which detected motion is treated as a distinct alert event type in addition to being treated as detected motion generally.

In some implementations, the spatial zone is defined by a user (1510). The spatial zone may be defined by a user. The user may enter into a user interface which shows video captured by the camera 118 and mark off a portion in the video as the zone of interest. For example, if the camera is monitoring a scene that includes a door, the user may mark off the door as the zone of interest (e.g., by marking a zone boundary around the door); motion detected in the door zone is treated as a distinct alert event type. In some implementations, the user is associated with the camera 118; the camera 118 is tied to the user's account (e.g., in account database 7324 and device information database 7326).

In some implementations, the server system associates each of the alert events with a respective visually distinctive display characteristic (1520). The hub device server system 508 or video server system 552 associates each alert event type with a visually distinctive display characteristic, so that, when indicators (e.g., icons) of alert events are displayed, the user can identify and differentiate between alert event types based on the distinctive display characteristics, which the indicators adopt. In some implementations, these associations are made per user. Multiple users may have the same mappings of alert event types to display characteristics, but it is sufficient that for any one respective user each alert event type is mapped to a distinct display characteristic. For example, FIGS. 12A and 13C illustrate icons indicating alert event types 1240 and 1350, respectively, with distinct shapes.

In some implementations, the display characteristic is visually distinctive based on color (1522). In some implementations, the display characteristic is visually distinctive based on shape (1524). The alert event types may be distinct based on the color or shape of their corresponding indicators. For example, for a respective user, the hazard alert event type is assigned red, the sound alert event type is assigned blue, the vibration alert event type is assigned orange, the general motion event type is assigned brown, and motion in a particular user-defined zone of interest is assigned green. Then, for that user, icons indicating hazard alert events are red, icons indicating sound alert events are blue, icons indicating vibration alert events are orange, etc.

Similarly, icons indicating different alert event types may have different shapes. For example, FIGS. 12A and 13C illustrate icons indicating alert event types 1240 and 1350, respectively, with distinct shapes.

In some implementations, the server system, responsive to a request from a client device, transmits contents of the history to the client device for display in a desktop browser application at the client device, where the contents of the history is formatted for display in the desktop browser application as a camera history timeline (1526). For example, when interface 1204 or 1304 is accessed, a request is made to the hub device server system 508 or video server system 552 for the history of the camera 118. In response to the request, the hub device server system 508 or video server system 552 transmits camera history information to the client device 504 for display. The camera history information may be displayed differently depending on the interface (e.g., displayed differently in interface 1204 than in 1304). For example, in interface 1204, the camera history information is displayed in a linear timeline 1208.

In some implementations, the camera history timeline comprises an event bar corresponding to the camera event, where a length of the event bar reflects the duration of the camera event; and one or more alert event indicators proximate to the event bar, each of the alert event indicators corresponding to a respective alert event associated with the camera event, wherein each respective alert event indicator has a respective visually distinctive display characteristic associated with the corresponding respective alert event (1528). The timeline 1208 may include an event bar 1238 for each camera event. The length of the event bar 1238, which is to scale relative to timeline 1208, indicates a duration of the camera event. One or more alert event icons 1240 are displayed in proximity to the event bar 1238 (e.g., within the event bar 1238 (FIG. 12A), near the event bar 1238 (FIG. 12E). The icons 1240 have distinctive shapes and/or colors mapped to alert event types; the user can identify the alert event types indicated by the icons 1240 based on the shapes and/or colors.

In some implementations, the alert event indicators are ordered in accordance with the chronological order of the alert events (1530). The icons 1240 are ordered, while displayed, based on the chronological order of the alert events indicated. In some implementations, the icons 1240 are ordered based on the chronological order of the most recent instance of each alert event type for that camera event.

In some implementations, responsive to a request from a client device, the serve system transmits contents of the history to the client device for display in a mobile application at the device, where the contents of the history is formatted for display in the mobile application as a scrollable camera history list, the scrollable camera history list including one or more chronologically ordered event identifiers, each event identifier corresponding to a respective camera event (1532). For example, when interface 1204 or 1304 is accessed, a request is made to the hub device server system 508 or video server system 552 for the history of the camera 118. In response to the request, the hub device server system 508 or video server system 552 transmits camera history information to the client device 504 for display. The camera history information may be displayed differently depending on the interface (e.g., displayed differently in interface 1204 than in 1304). For example, in interface 1304, the camera history information is displayed as a scrollable list of event identifiers 1322 (which may still be viewed as a timeline, because the event identifiers are chronologically ordered and separated by hour).

In some implementations, the scrollable camera history list comprises an event identifier corresponding to the camera event; and one or more alert event indicators, each of the alert event indicators corresponding to a respective alert event associated with the camera event, where each respective alert event indicator has a respective visually distinctive display characteristic associated with the corresponding respective alert event (1534). The scrollable list of event identifiers 1322 displayed in interface 1304 includes event identifiers 1322 corresponding to respective camera events. Alert event icons 1350 may be displayed in the event identifiers when a filter is applied (e.g., as in FIG. 13J-13K) or by default. The icons 1350 have distinctive shapes and/or colors mapped to alert event types; the user can identify the alert event types indicated by the icons 1350 based on the shapes and/or colors.

In some implementations, the alert event indicators are ordered in accordance with the chronological order of the alert events (1536). The icons 1350 are ordered, while displayed, based on the chronological order of the alert events indicated. In some implementations, the icons 1350 are ordered based on the chronological order of the most recent instance of each alert event type for that camera event.

Figure 16:
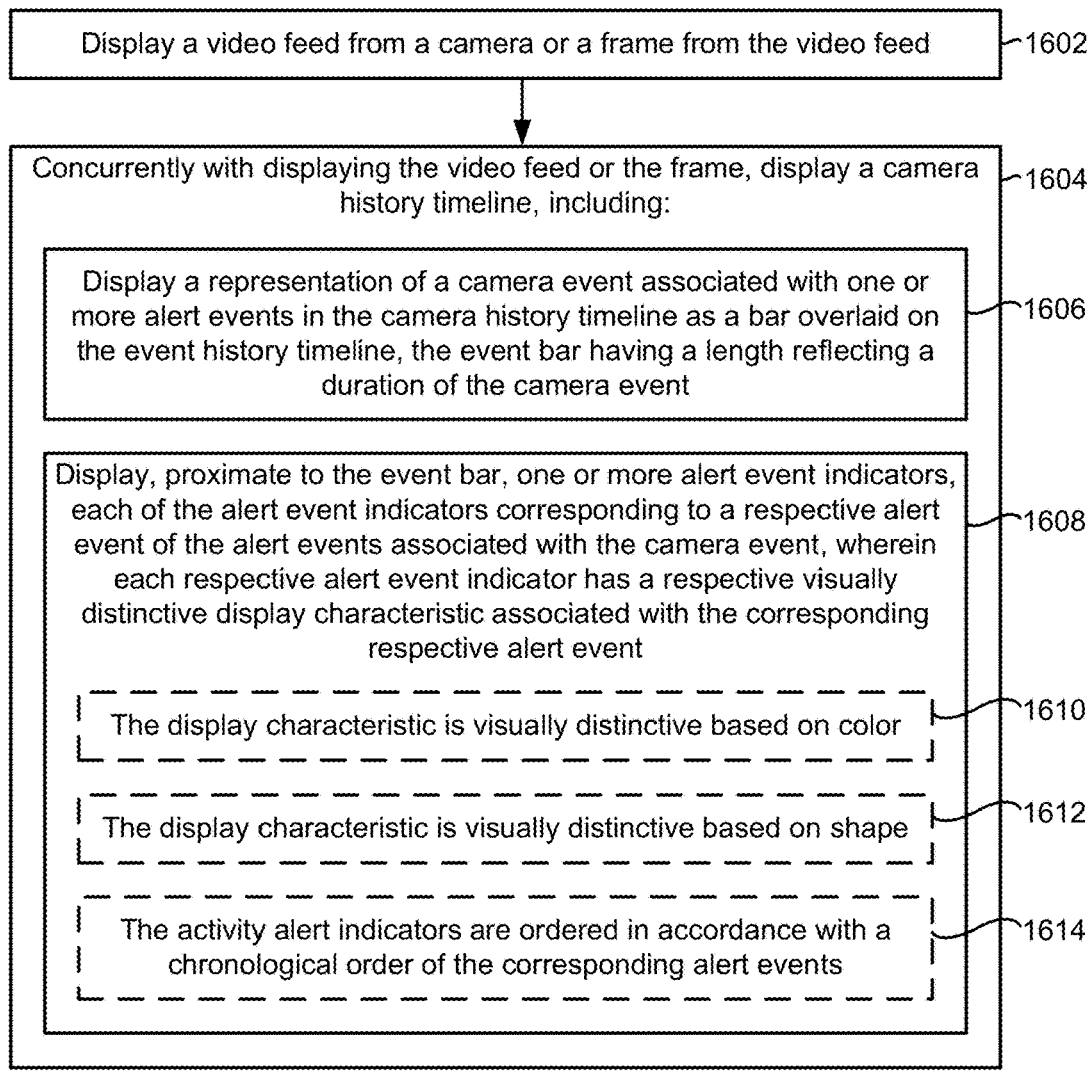
FIGS. 16-17 illustrate flowchart diagrams of methods for presenting alert event indicators in accordance with some implementations.

FIG. 16 illustrate a flowchart diagram of a method 1600 for presenting a camera history in accordance with some implementations. In some implementations, the method 1600 is performed by an electronic device with one or more processors, memory, a display, and optionally a touch screen, an accelerometer, and/or an audio input device. For example, in some implementations, the method 1600 is performed by client device 504 (FIGS. 5A-5B and 8) or one or more components thereof (e.g., client-side module 502, presentation module 821, input processing module 822, web browser module 823, application 824, user interface module 826). In some implementations, the method 1600 is governed by instructions that are stored in a non-transitory computer readable storage medium (e.g., the memory 806) and the instructions are executed by one or more processors of the electronic device (e.g., the CPUs 802). Optional operations are indicated by dashed lines (e.g., boxes with dashed-line borders).

The client device displays a video feed from a camera or a frame from the video feed (1602). For example, in interface 1204, the client device 504 displays a video feed 1207 (or a frame from the video feed 1207 (e.g., if the video is paused)) in the video region 1206.

The client device, concurrently with displaying the video feed or the frame, displays a camera history timeline (1604), including: displaying a representation of a camera event associated with one or more alert events in the camera history timeline as a bar overlaid on the event history timeline, the event bar having a length reflecting a duration of the camera event (1606); and displaying, proximate to the event bar, one or more alert event indicators, each of the alert event indicators corresponding to a respective alert event of the alert events associated with the camera event, wherein each respective alert event indicator has a respective visually distinctive display characteristic associated with the corresponding respective alert event (1608). In interface 1204, the client device 504 displays, concurrently with the video 1207, a timeline 1208 with camera event bars 1238 corresponding to respective camera events and icons 1240 indicating alert events associated with the camera events 1238. The length of a camera event bar 1238 indicates a duration of the corresponding camera event. The icons 1240 are displayed in the camera event bars 1238 (as in FIG. 12A) or near the camera event bars 1238 (as in FIG. 12E).

In some implementations, the display characteristic is visually distinctive based on color (1610). In some implementations, the display characteristic is visually distinctive based on shape (1612). The icons 1240 have distinctive shapes and/or colors mapped to alert event types; the user can identify the alert event types indicated by the icons 1240 based on the shapes and/or colors.

In some implementations, the activity alert indicators are ordered in accordance with a chronological order of the corresponding alert events (1614). The icons 1240 are ordered, while displayed, based on the chronological order of the alert events indicated. In some implementations, the icons 1240 are ordered based on the chronological order of the most recent instance of each alert event type for that camera event.

Figure 17:
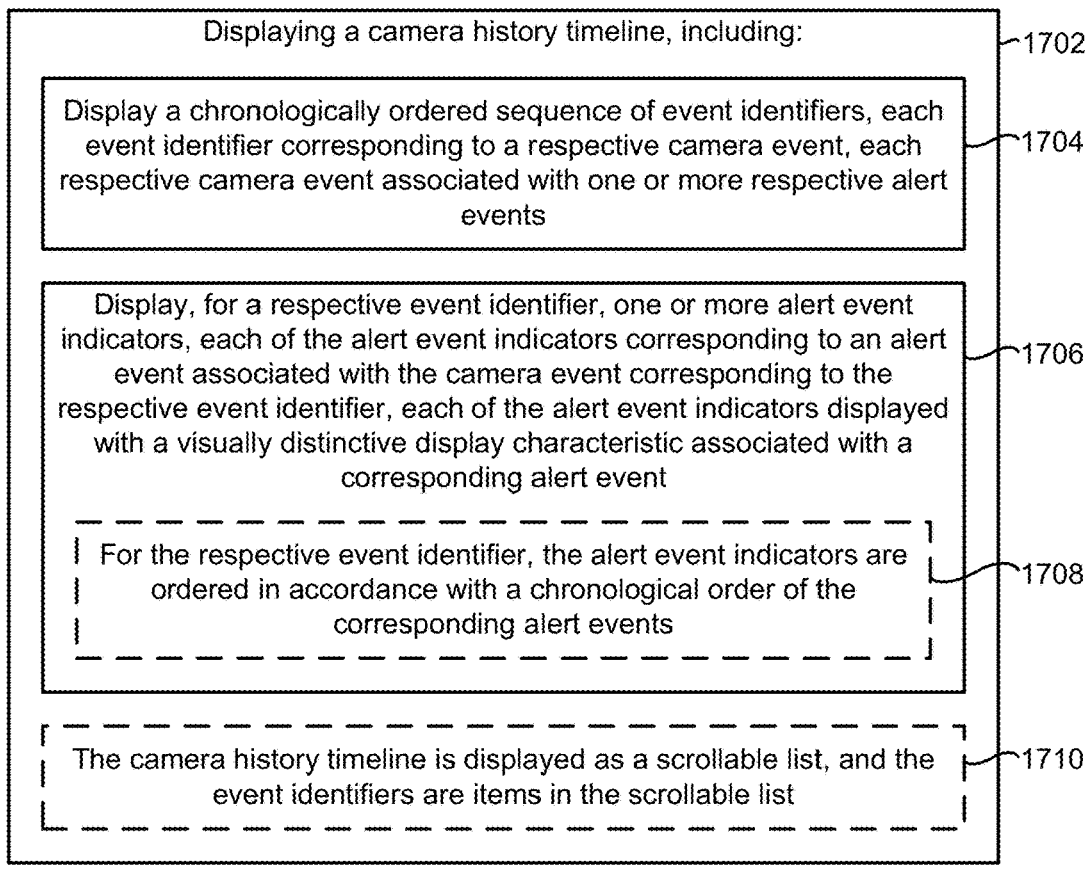

FIG. 17 illustrate a flowchart diagram of a method 1700 for presenting a camera history in accordance with some implementations. In some implementations, the method 1700 is performed by an electronic device with one or more processors, memory, a display, and optionally a touch screen, an accelerometer, and/or an audio input device. For example, in some implementations, the method 1700 is performed by client device 504 (FIGS. 5A-5B and 8) or one or more components thereof (e.g., client-side module 502, presentation module 821, input processing module 822, web browser module 823, application 824, user interface module 826). In some implementations, the method 1700 is governed by instructions that are stored in a non-transitory computer readable storage medium (e.g., the memory 806) and the instructions are executed by one or more processors of the electronic device (e.g., the CPUs 802). Optional operations are indicated by dashed lines (e.g., boxes with dashed-line borders).

The client device displays a camera history timeline (1702), including: displaying a chronologically ordered sequence of event identifiers, each event identifier corresponding to a respective camera event, each respective camera event associated with one or more respective alert events (1704); and displaying, for a respective event identifier, one or more alert event indicators, each of the alert event indicators corresponding to an alert event associated with the camera event corresponding to the respective event identifier, each of the alert event indicators displayed with a visually distinctive display characteristic associated with a corresponding alert event (1706). For example, in interface 1304, camera history information is displayed as a scrollable list of event identifiers 1322 (which may still be viewed as a timeline, because the event identifiers are chronologically ordered and separated by hour). The scrollable list of event identifiers 1322 displayed in interface 1304 includes event identifiers 1322 corresponding to respective camera events. Alert event icons 1350 may be displayed in the event identifiers when a filter is applied (e.g., as in FIG. 13J-13K) or by default. The icons 1350 have distinctive shapes and/or colors mapped to alert event types; the user can identify the alert event types indicated by the icons 1350 based on the shapes and/or colors.

In some implementations, the camera history timeline is displayed as a scrollable list, and the event identifiers are items in the scrollable list (1708). The event identifiers 1322 are displayed in a scrollable list (FIGS. 13A-13M).

In some implementations, for the respective event identifier, the alert event indicators are ordered in accordance with a chronological order of the corresponding alert events (1710). The icons 1350 are ordered, while displayed, based on the chronological order of the alert events indicated. In some implementations, the icons 1350 are ordered based on the chronological order of the most recent instance of each alert event type for that camera event.

Figure 18A:
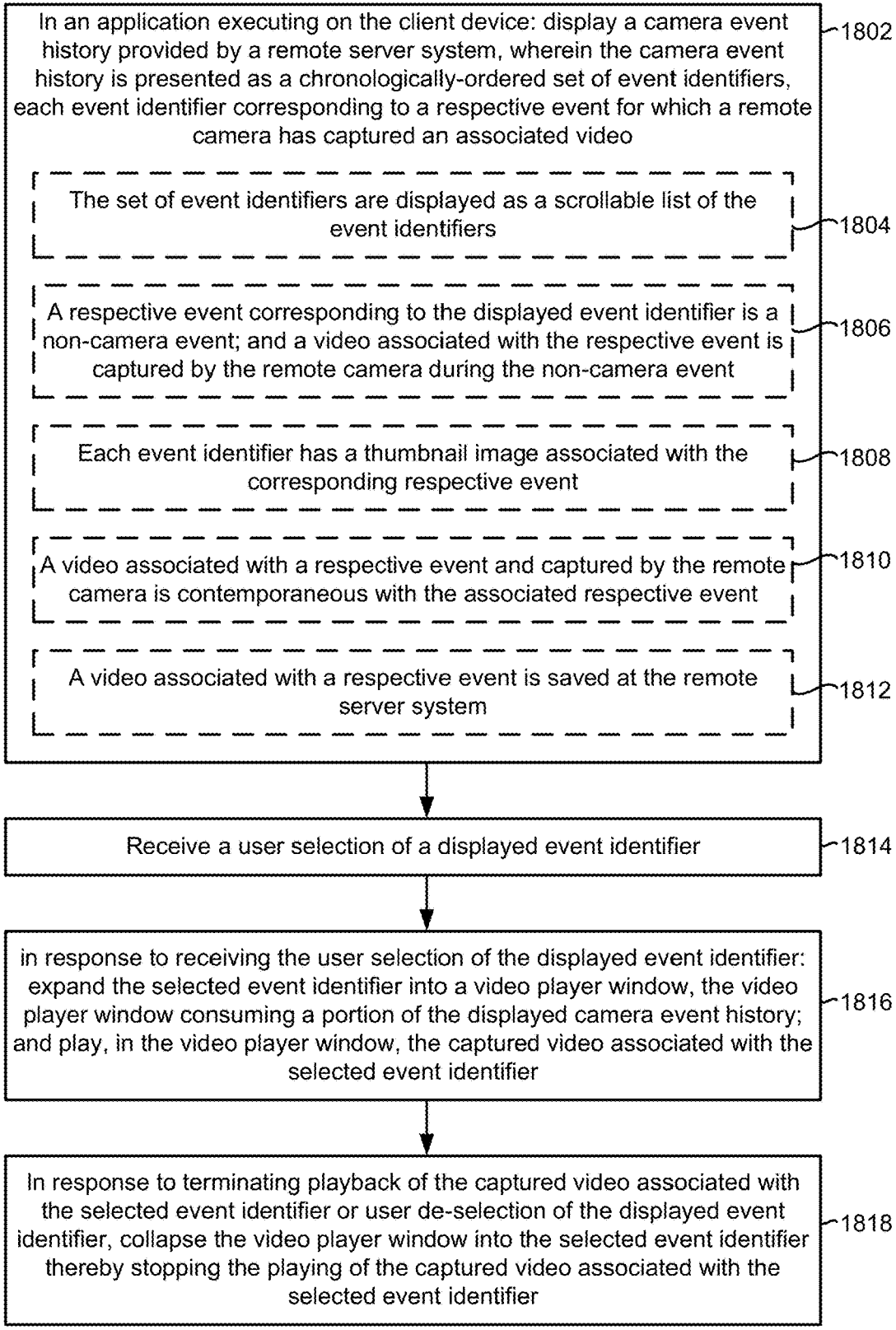

FIGS. 18A-18B illustrate a flowchart diagram of a method 1800 for presenting a camera history in accordance with some implementations. In some implementations, the method 1800 is performed by an electronic device with one or more processors, memory, a display, and optionally a touch screen, an accelerometer, and/or an audio input device. For example, in some implementations, the method 1800 is performed by client device 504 (FIGS. 5A-5B and 8) or one or more components thereof (e.g., client-side module 502, presentation module 821, input processing module 822, web browser module 823, application 824, user interface module 826). In some implementations, the method 1800 is governed by instructions that are stored in a non-transitory computer readable storage medium (e.g., the memory 806) and the instructions are executed by one or more processors of the electronic device (e.g., the CPUs 802). Optional operations are indicated by dashed lines (e.g., boxes with dashed-line borders).

The client device, in an application executing on the client device, displays a camera event history provided by a remote server system, where the camera event history is presented as a chronologically-ordered set of event identifiers, each event identifier corresponding to a respective event for which a remote camera has captured an associated video (1802). For example, the smart home application displays, in interface 1304, camera history information as a scrollable list of chronologically-ordered event identifiers 1322 (which may still be viewed as a timeline, because the event identifiers are chronologically ordered and separated by hour). The scrollable list of event identifiers 1322 displayed in interface 1304 includes event identifiers 1322 corresponding to respective camera events with associated video from a camera 118.

The client device receives a user selection of a displayed event identifier (1814). As shown in FIG. 13B, for example, the user may perform a gesture (e.g., a single tap gesture with contact 1340) on an event identifier 1322-E.

The client device, in response to receiving the user selection of the displayed event identifier, expands the selected event identifier into a video player window, the video player window consuming a portion of the displayed camera event history; and plays, in the video player window, the captured video associated with the selected event identifier (1816). In response to detecting the gesture on the event identifier 1322-E, the smart home application expands the event identifier 1322 inline into a video player interface 1342 (FIG. 13C). The video player interface 1342 consumes space in the scrollable list. The video player interface 1342 includes, and plays, the video 1354 associated with the corresponding camera event.

In some implementations, the video player window consumes only a portion of the displayed camera event history. The video player interface 1342, for example, consumes a portion of the scrollable list; other event identifiers (e.g., identifiers 1322-D and 1322-F, FIG. 13C) are still displayed.

In some implementations, the playback of video 1354 is automatically initiated when the event identifier 1322 expands into the video player interface 1342. In some implementations, the playback of video 1354 needs to be manually initiated after the event identifier 1322 expands into the video player interface 1342. For example, the user manually activates playback by performing a gesture on the playback affordance 1364 (FIG. 13D) displayed after the event identifier 1322 expands into the video player interface 1342.

In response to terminating playback of the captured video associated with the selected event identifier or user de-selection of the displayed event identifier, the client device collapses the video player window into the selected event identifier thereby stopping the playing of the captured video associated with the selected event identifier (1818). The user may de-select the event identifier 1322-E by performing a gesture in the video player interface 1342 away from the video 1354 (e.g., gesture with contact 1374 in an empty area in video player interface 1342, FIG. 13E). In response to the gesture, the video player interface 1342 collapses back into event identifier 1322-E and stops playback of the video 1354 if playback was in progress. In some implementations, additionally, when playback of the video 1354 is completed, the smart home application automatically collapses the video player interface 1354 back into event identifier 1322-E.

In some implementations, the set of event identifiers are displayed as a scrollable list of the event identifiers (1804). The event identifiers 1322 are displayed in a scrollable list (FIGS. 13A-13M).

In some implementations, a respective event corresponding to the displayed event identifier is a non-camera event, and a video associated with the respective event is captured by the remote camera during the non-camera event (1806). An event identifier 1322 may corresponding to a camera event where motion is not detected in the video itself, but one or more non-camera alert event(s) (e.g., hazard, sound, vibration, etc.) are detected, and video associated with the camera event is captured during the non-camera alert event(s).

In some implementations, each event identifier has a thumbnail image associated with the corresponding respective event (1808). Each event identifier 1322 includes a thumbnail 1328, which may be a frame of the associated video or the associated video in thumbnail-size.

In some implementations, a video associated with a respective event and captured by the remote camera is contemporaneous with the associated respective event (1810). For example, when the alert event(s) for a camera event are non-camera alert event(s), the associated video is video captured proximate in time with the alert event(s). Video captured proximate in time with the alert event(s) may be captured while the alert event(s) are detected or immediately after the alert event(s) is last detected (e.g., for instantaneous alert events such as sounds).

In some implementations, a video associated with a respective event is saved at the remote server system (1812). Video associated with camera events are saved and stored at the hub device server system 508 or video server system 552 (e.g., in video storage database 7320).

In some implementations, for the displayed event identifier, the client device displays one or more alert event icons, each alert event icon corresponding to a respective alert event triggered in response to a respective event corresponding to the displayed event identifier (1820). For example, when a filter is applied, icons 1350 may be displayed in event identifiers 1322 (FIGS. 13J-13K). The icons 1350 indicate alert events that have been detected for the camera event corresponding to the respective event identifiers 1322.

In some implementations, within the displayed event identifier, the alert event icons are visually distinctive from each other based on icon color (1822). In some implementations, within the displayed event identifier, the alert event icons are visually distinctive from each other based on icon shape (1824). The icons 1350 have distinctive shapes and/or colors mapped to alert event types; the user can identify the alert event types indicated by the icons 1350 based on the shapes and/or colors.

In some implementations, within the displayed event identifier, the alert event icons are ordered in accordance with a chronological order in which the triggered alert events were triggered in response to the respective event corresponding to the displayed event identifier (1826). Within an event identifier 1322, the icons 1350 are ordered by the chronological order of the instances of alert events to which the displayed icons 1350 correspond. For example, in FIG. 13K, in event identifier 1322-F the alert event corresponding to icon 1352-A is more recent than the alert event corresponding to icon 1352-B.

In some implementations, the client device displays in the displayed event identifier information regarding a most recently triggered alert event of the triggered alert events (1828). The activity type identifier 1330 of an event identifier identifies, in some implementations, the alert event type of the most recent alert event associated with the corresponding camera event. For example, in FIG. 13M, for event identifier 1322-Q the alert event type of the most recent alert event is "Motion Activity" 1330-Q, whereas for event identifier 1322-R the alert event type of the most recent alert event is "Sound Activity" 1330-R.

FIGS. 19A-19L illustrate example screenshots of user interfaces on a client device in accordance with some implementations. In some implementations, the user interfaces depicted in FIGS. 19A-19L are user interfaces for a smart home application on a client device (e.g., client device 504), such as a smart phone or a tablet computer.

Figure 19A:
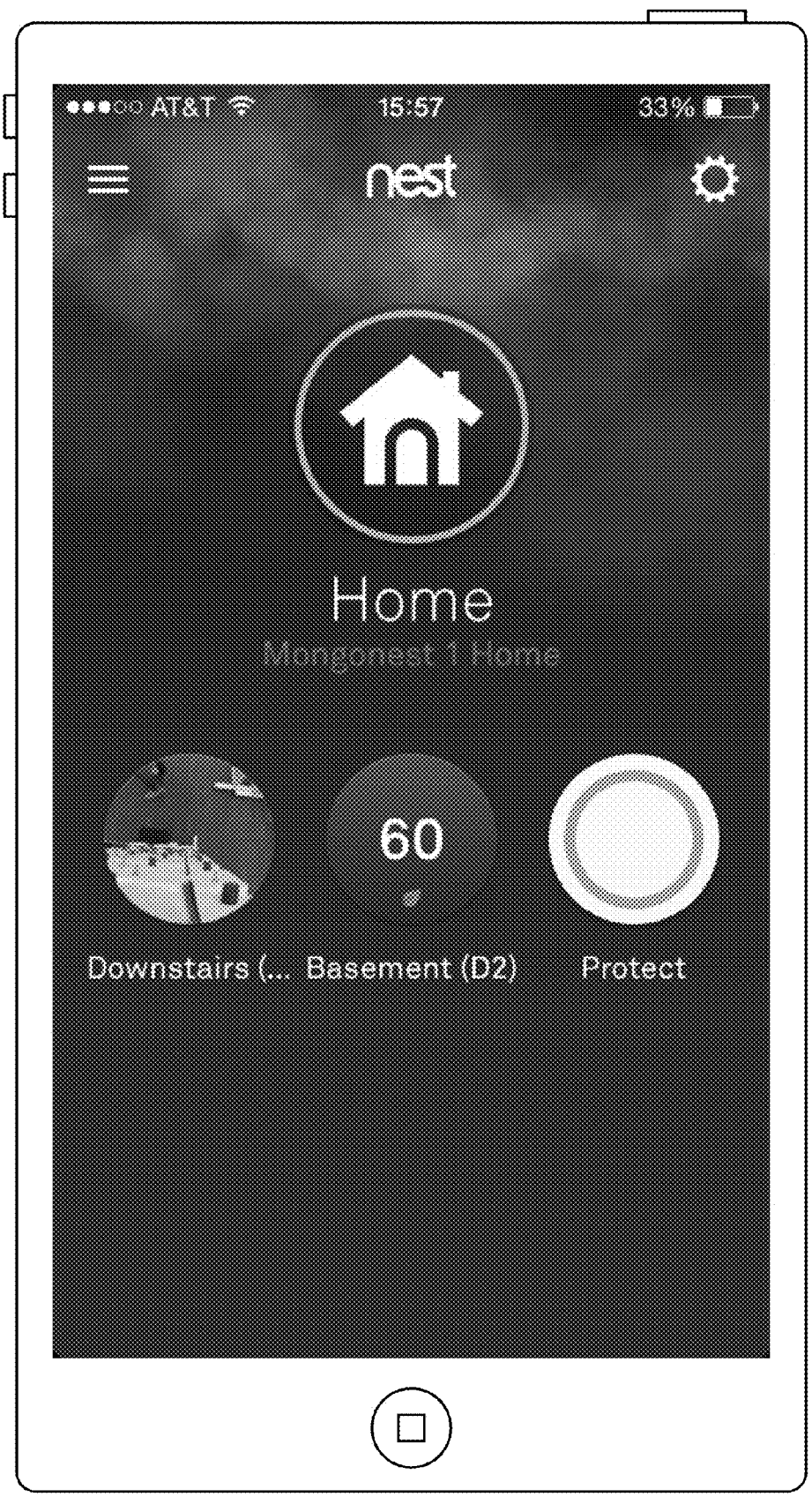
FIGS. 19A-19L illustrate example screenshots of user interfaces on a client device in accordance with some implementations.
Figure 19B:
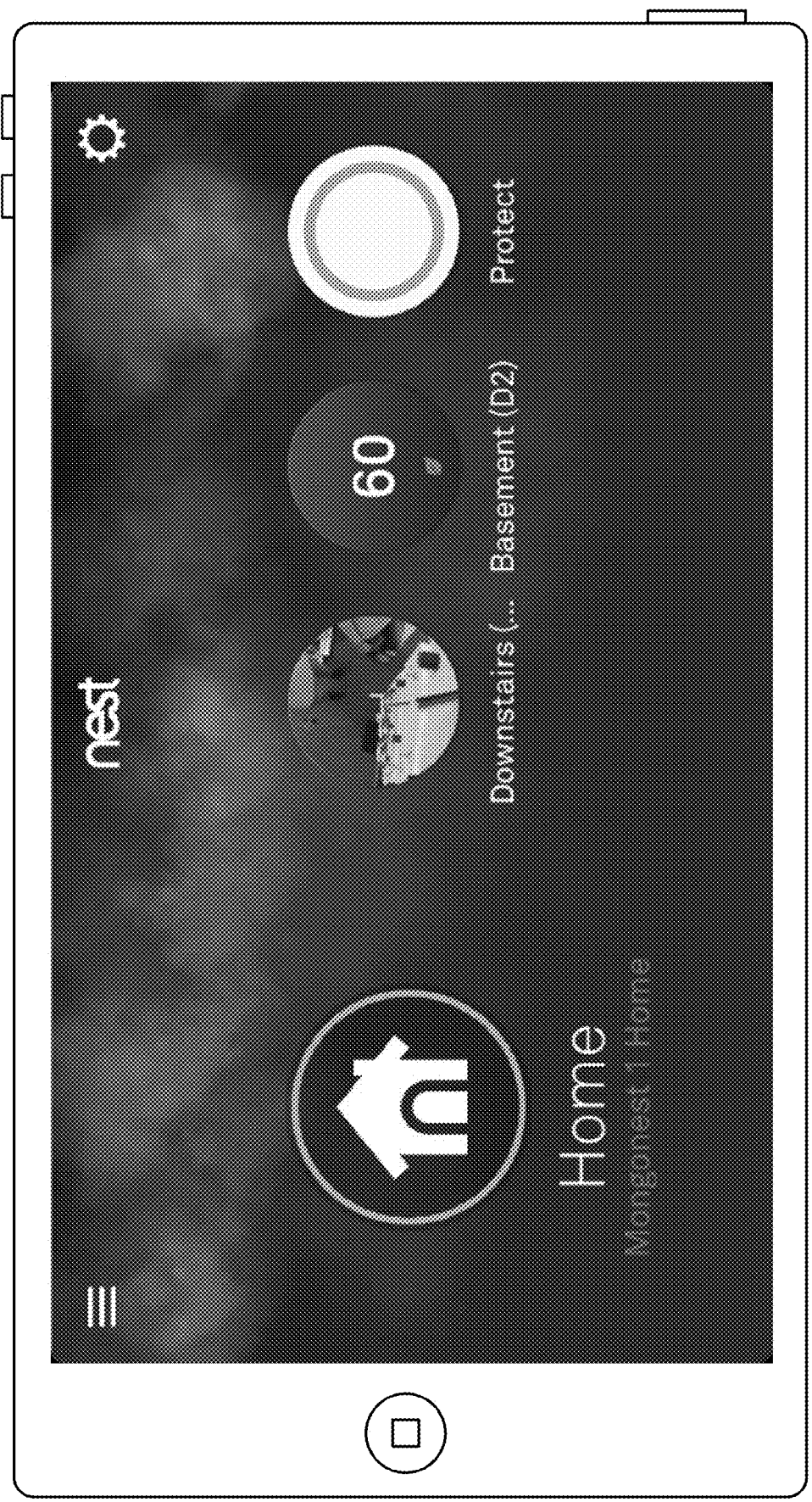

FIG. 19A shows a home page user interface analogous to user interface 1104 (FIG. 11A). The home page user interface in FIG. 19A includes a user interface element (the circular element with the label "Downstairs ( . . . " below) analogous to camera objects 1116; a video feed from a camera labeled "Downstairs (Q1)" is displayed with cropping in the user interface element. FIG. 19B shows the home page user interface in landscape orientation (the user interface as shown in FIG. 19A is oriented in portrait orientation). A user may activate the user interface element (e.g., by performing a single tap gesture on it) to access a video feed user interface analogous to user interface 1166 (FIG. 11T) for the "Downstairs (Q1)" camera.

Figure 19C:
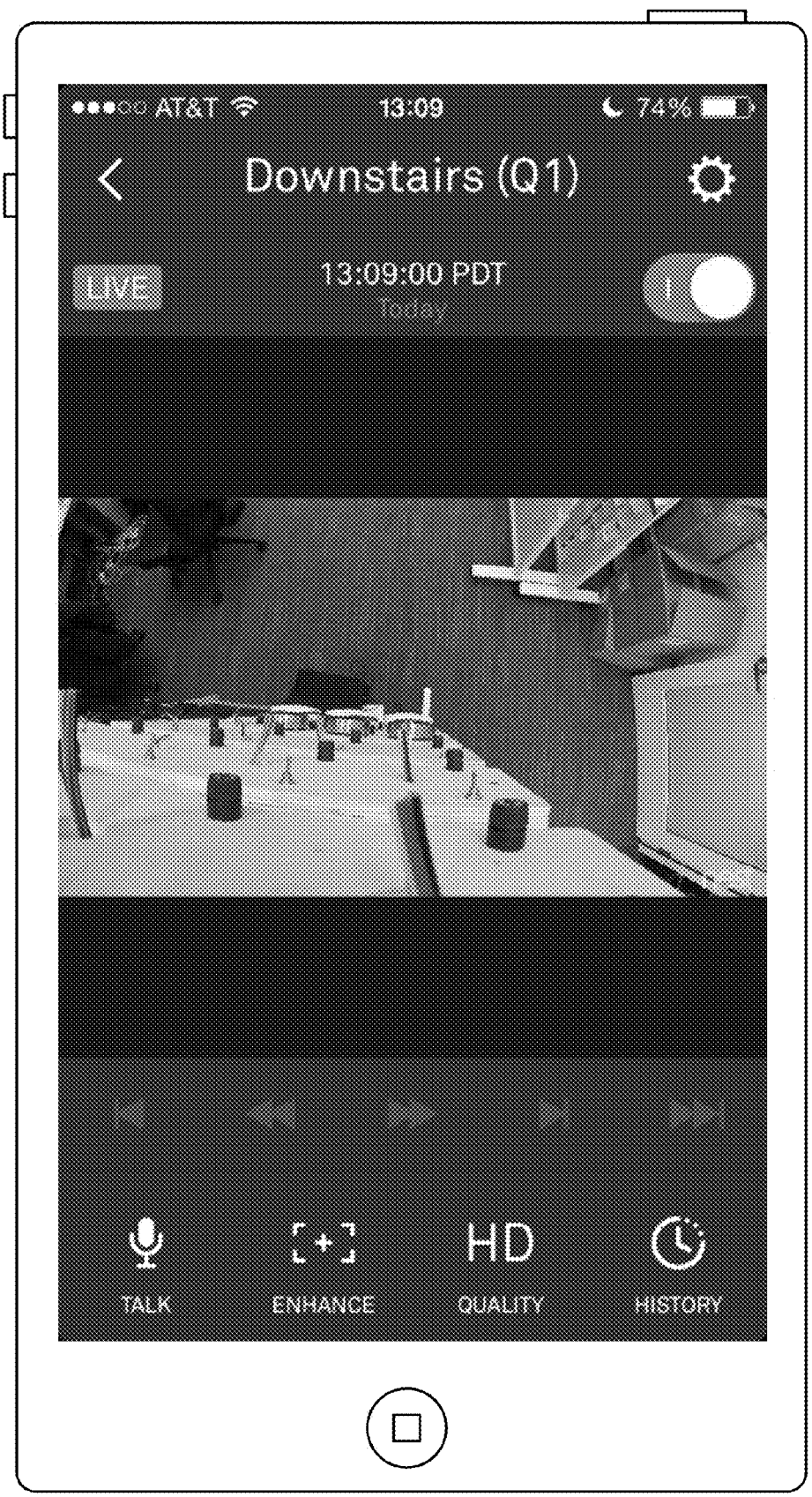
Figure 19D:
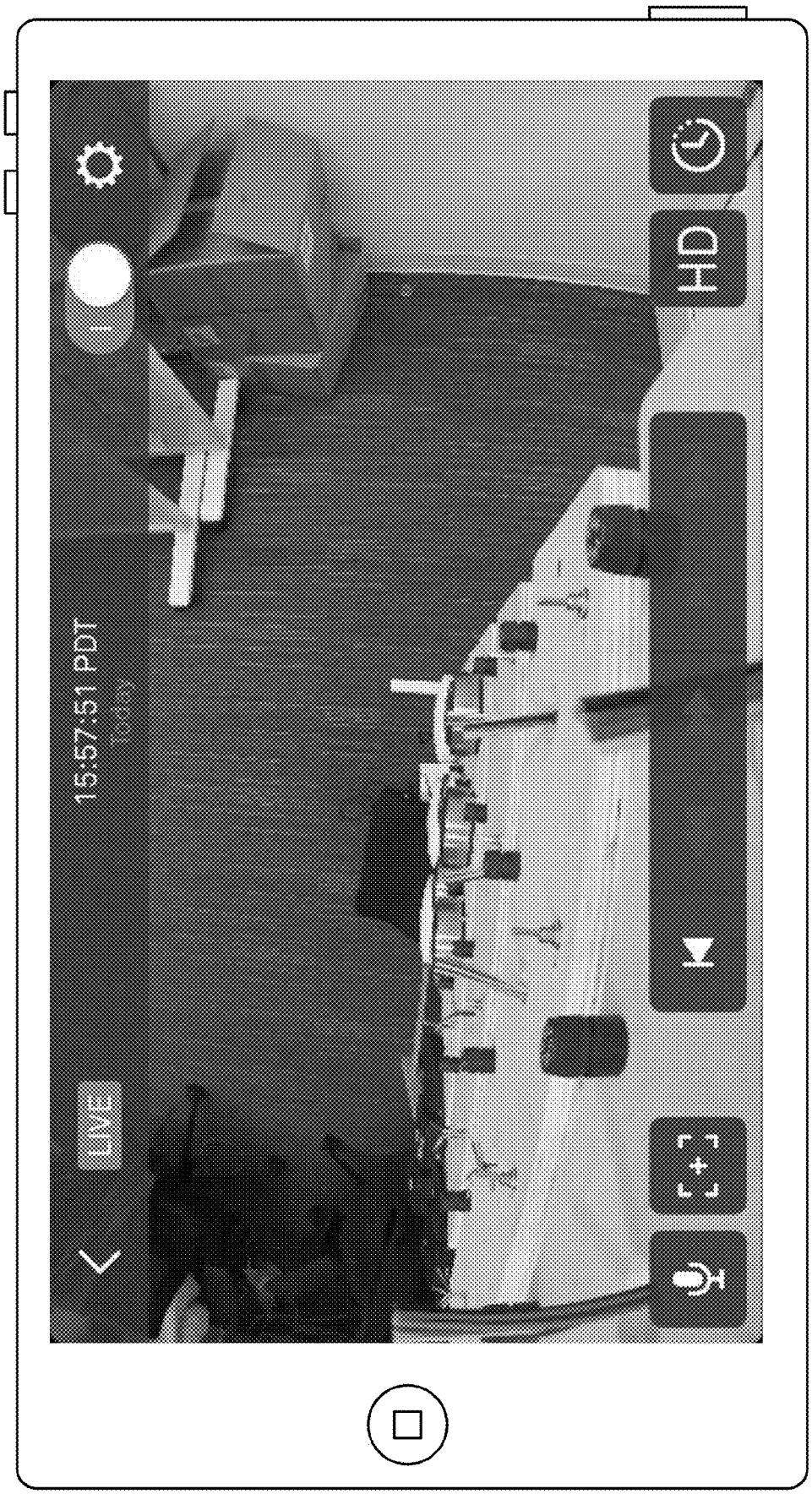

FIG. 19C shows a video feed user interface for the "Downstairs (Q1)" camera, in portrait orientation. The video feed user interface includes a label or identifier of the camera whose video feed is being shown; a date and time of the video being shown; a live feed indicator; a camera on/off switch, the video feed from the camera; and various controls and affordances, including an affordance to jump to a video corresponding to the next camera event chronologically (e.g., "Next Video," "Next Event"), an affordance to jump to a video corresponding to the previous camera event chronologically (e.g., "Previous Video," "Previous Event"), and a history affordance analogous to affordance 1190. FIG. 19D shows the video feed user interface in landscape orientation. In landscape orientation, the affordances and controls may be hidden by default and displayed when the user performs a gesture (e.g., a single tap gesture) on the displayed (playing or paused) video feed. A user may activate the history affordance to access a camera history user interface, analogous to user interface 1304 (FIG. 13A), for the "Downstairs (Q1)" camera.

Figure 19E:
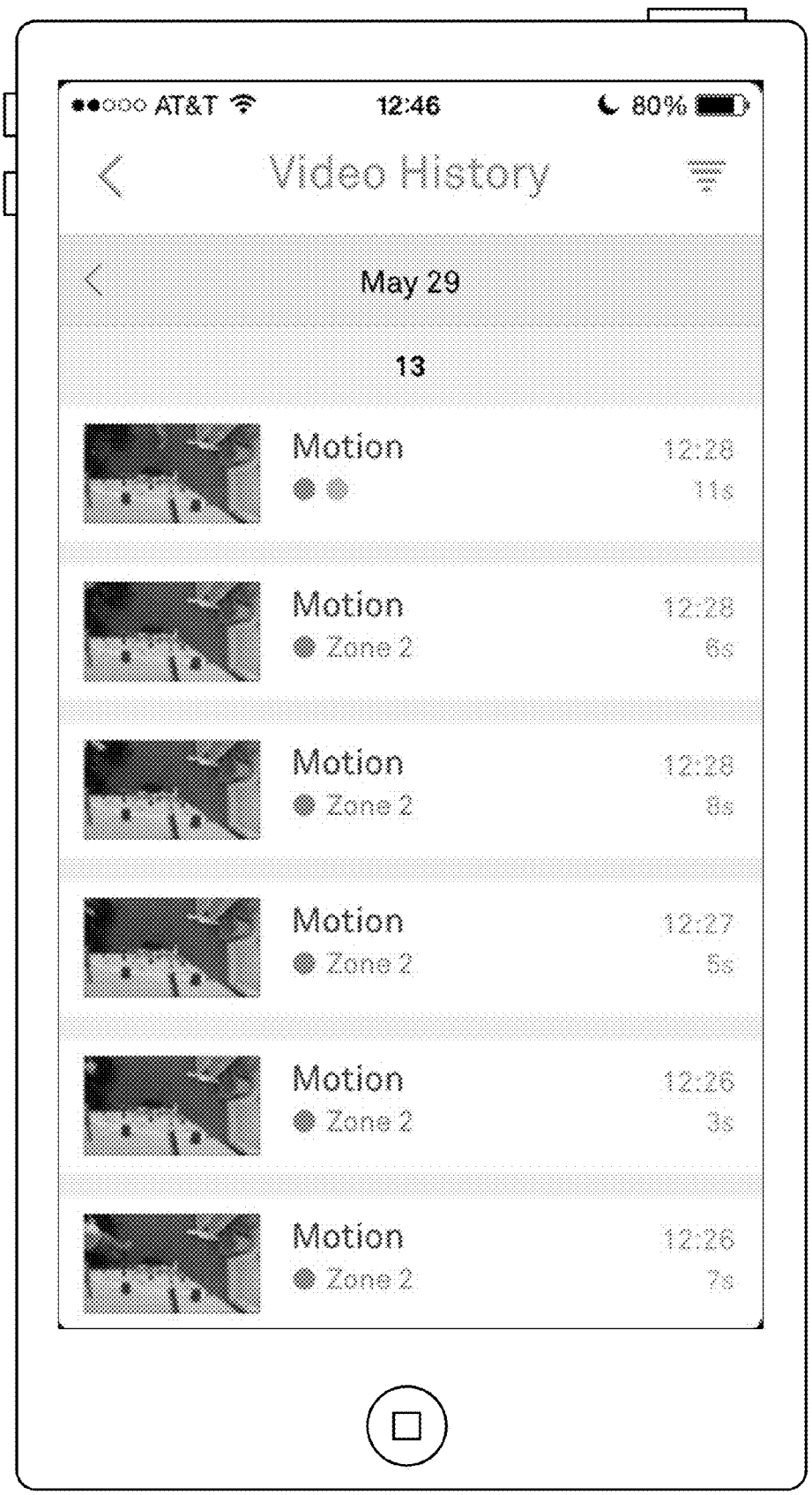
Figure 19F:
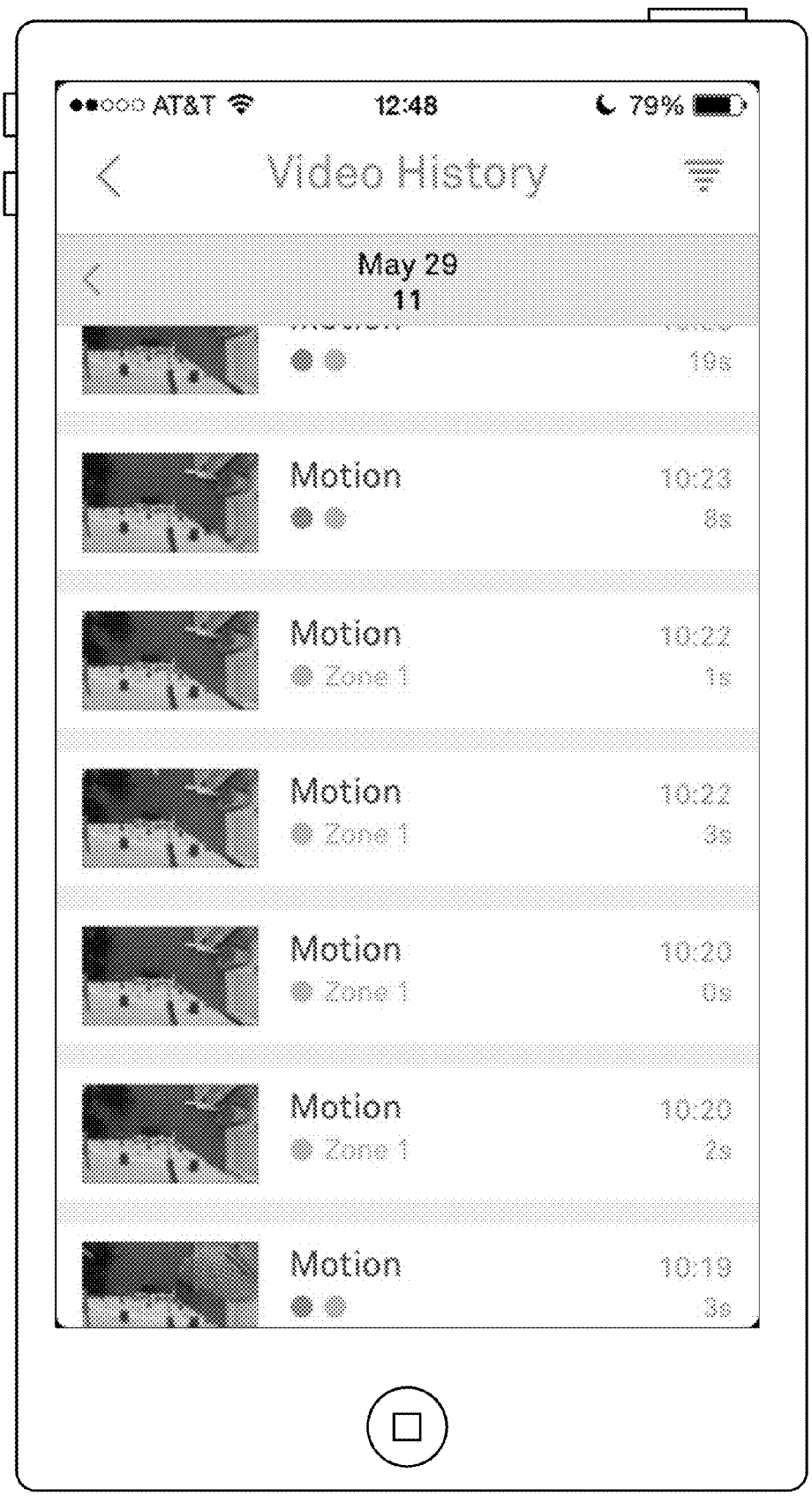

FIG. 19E shows a camera history user interface for the "Downstairs (Q1)" camera. The camera history user interface includes a scrollable list of camera events, which are analogous to camera events 1322. Each camera event includes a time and duration of the camera event, a thumbnail of an associated video (where the thumbnail may be a still image of a frame from the video, periodically refreshed frames from the video, or the video itself playing at the thumbnail size), a label indicating an alert event type associated with the camera event (e.g., the primary or preeminent or dominant or longest or most recent alert event type for the camera event), and indicators (e.g., respective icons and corresponding labels or identifiers) of alert event types associated with the camera event. The indicators, in FIG. 19E, are distinct by color (e.g., the color for "Zone 2" is different for the color for "Zone 1"). Additionally, the indicators are chronologically ordered based on the times of occurrence for those alert event types or zones of interest. FIG. 19F illustrates the scrollable list scrolled to reveal more camera events and remove from display camera events that have been scrolled off-display.

Figure 19G:
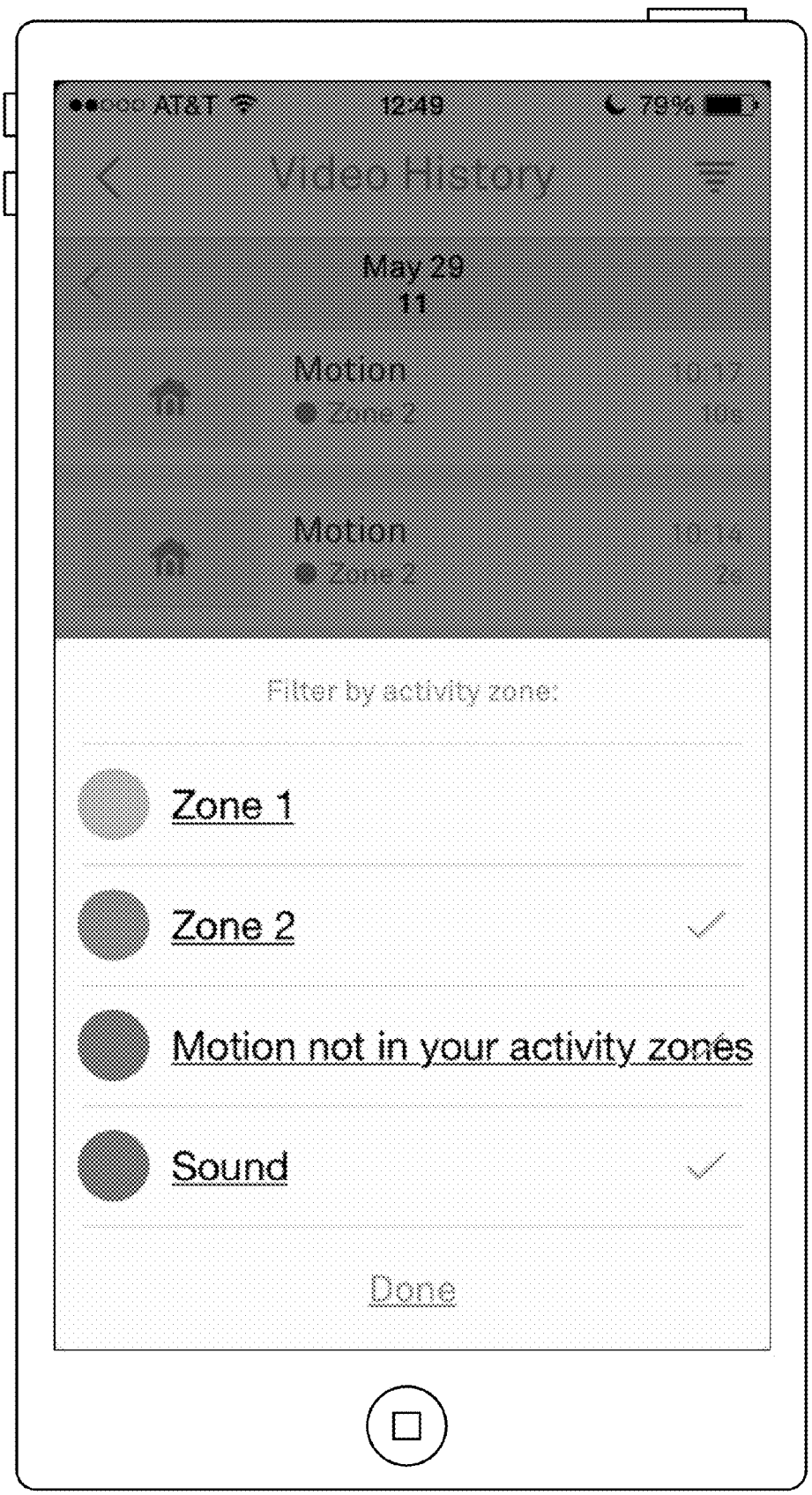
Figure 19H:
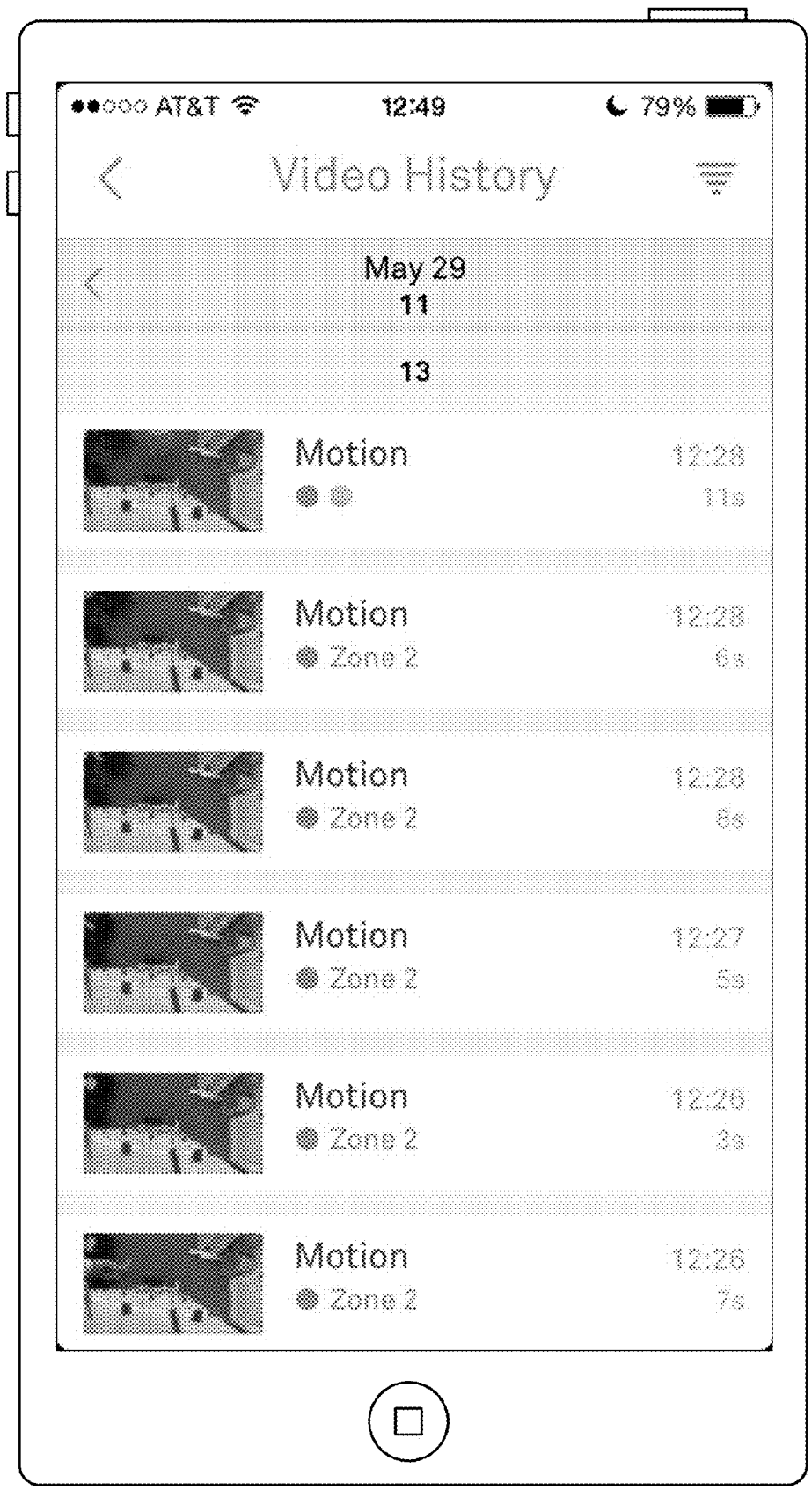

The scrollable list may be filtered to show just camera events that satisfy particular filtering criteria (e.g., camera events that have particular alert event types). FIG. 19G shows a menu, analogous to filtering menu 1378 (FIG. 13H-13I, 13L) to select particular alert event types and zones of interest for filtering. For example, in FIG. 19G, "Zone 2," "Motion not in your activity zones," and "Sound" are selected. FIG. 19H shows the result of the filtering in FIG. 19G, which includes any camera event that includes at least one of "Zone 2," "Motion not in your activity zones," and "Sound."

Figure 19I:
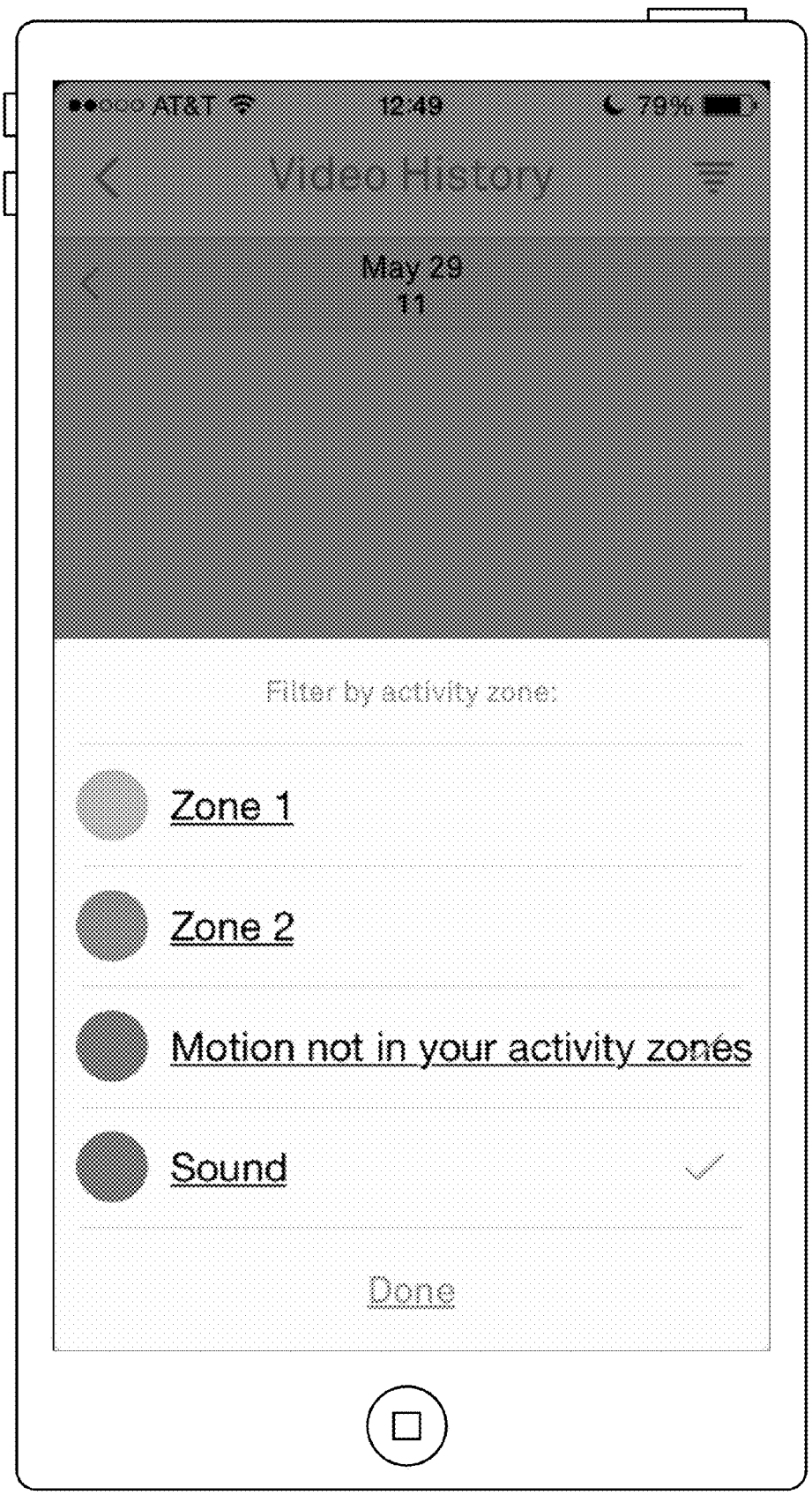
Figure 19J:
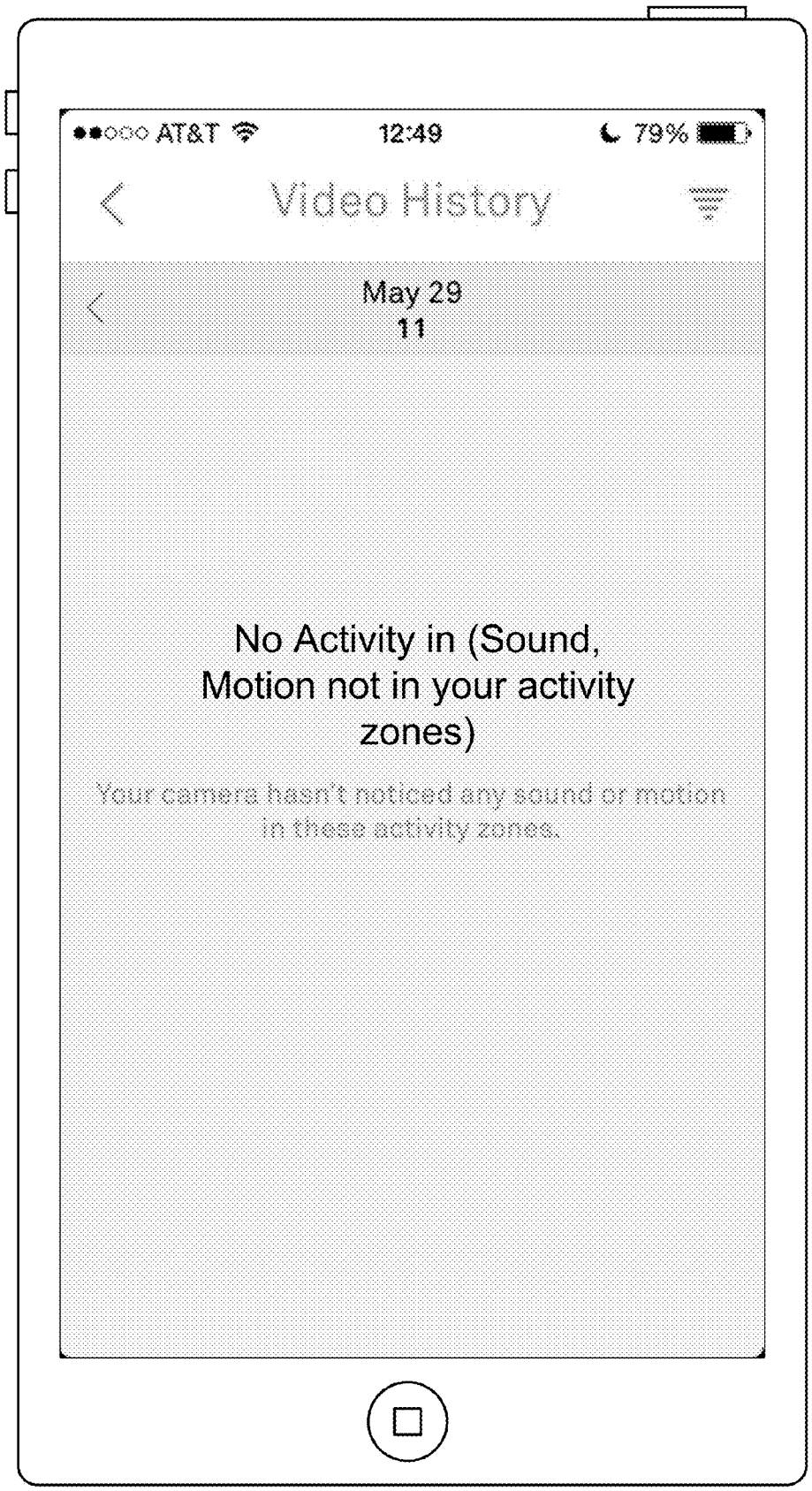

FIG. 19I shows the filtering menu with a different set of alert event types and zones selected for filtering. The user may select or deselect the listed zones and alert event types to filter by the selected zones and alert event types. In FIG. 19I, "Motion not in your activity zones" and "Sound" are selected. FIG. 19J shows the result of the filtering in FIG. 19I, which includes any camera event that includes at least one of "Motion not in your activity zones" and "Sound." No camera event has these alert event types, and thus no camera events are included in FIG. 19J. Instead, a message indicating that there are no camera events satisfying the filtering criteria is displayed.

Figure 19K:
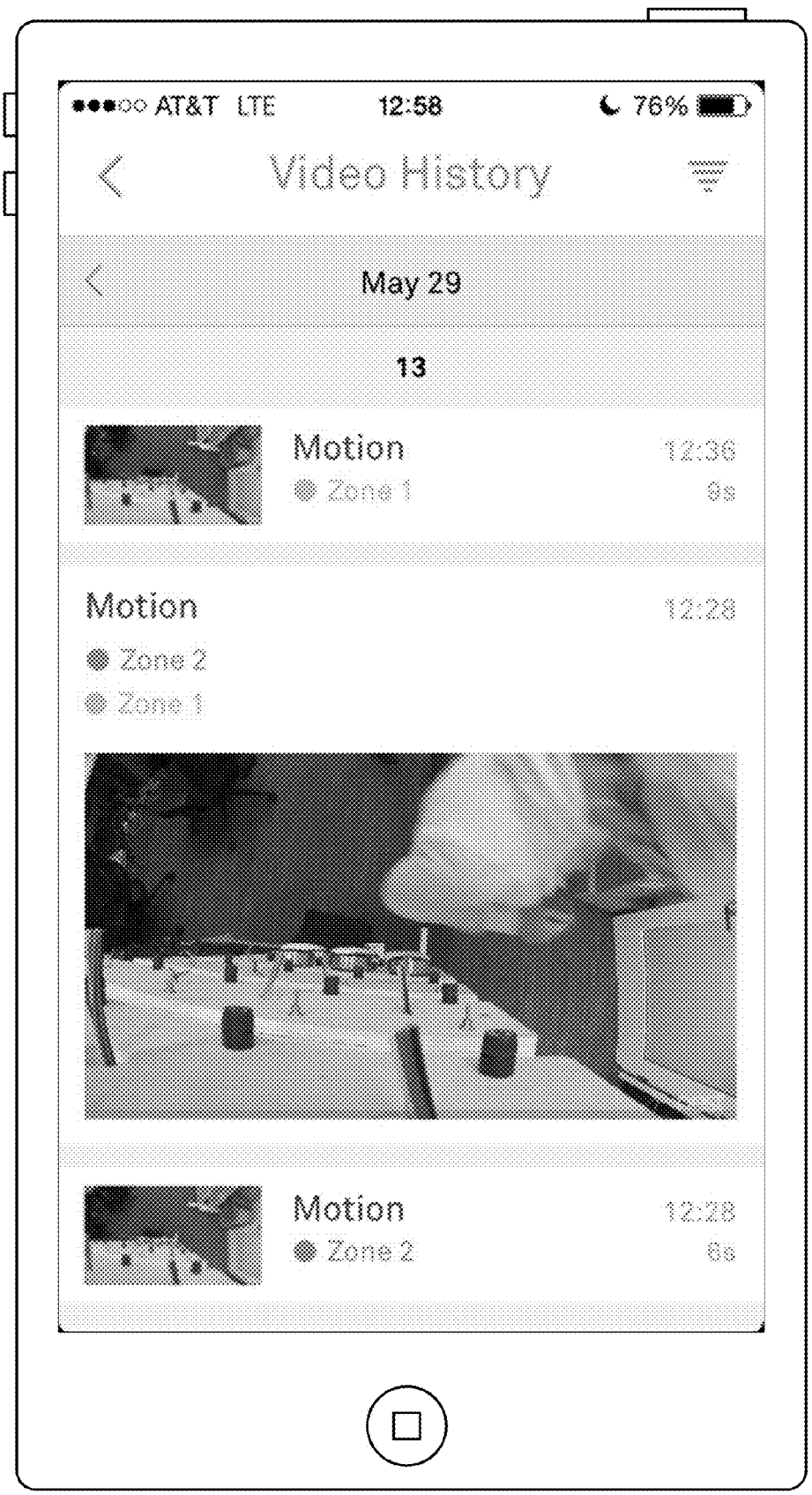

FIG. 19K shows the result of selecting a camera event from the scrollable list (e.g., by performing a single tap gesture on the camera event). The camera event expands, inline in the scrollable list, into a video player interface analogous to video play interface 1342 (FIG. 13C). In the video player interface, the video associated with the selected camera event is played; playback is started automatically. The video player interface continues to show the chronologically ordered and color-distinct indicators of alert event types and zones of interest associated with the camera event.

Figure 19L:
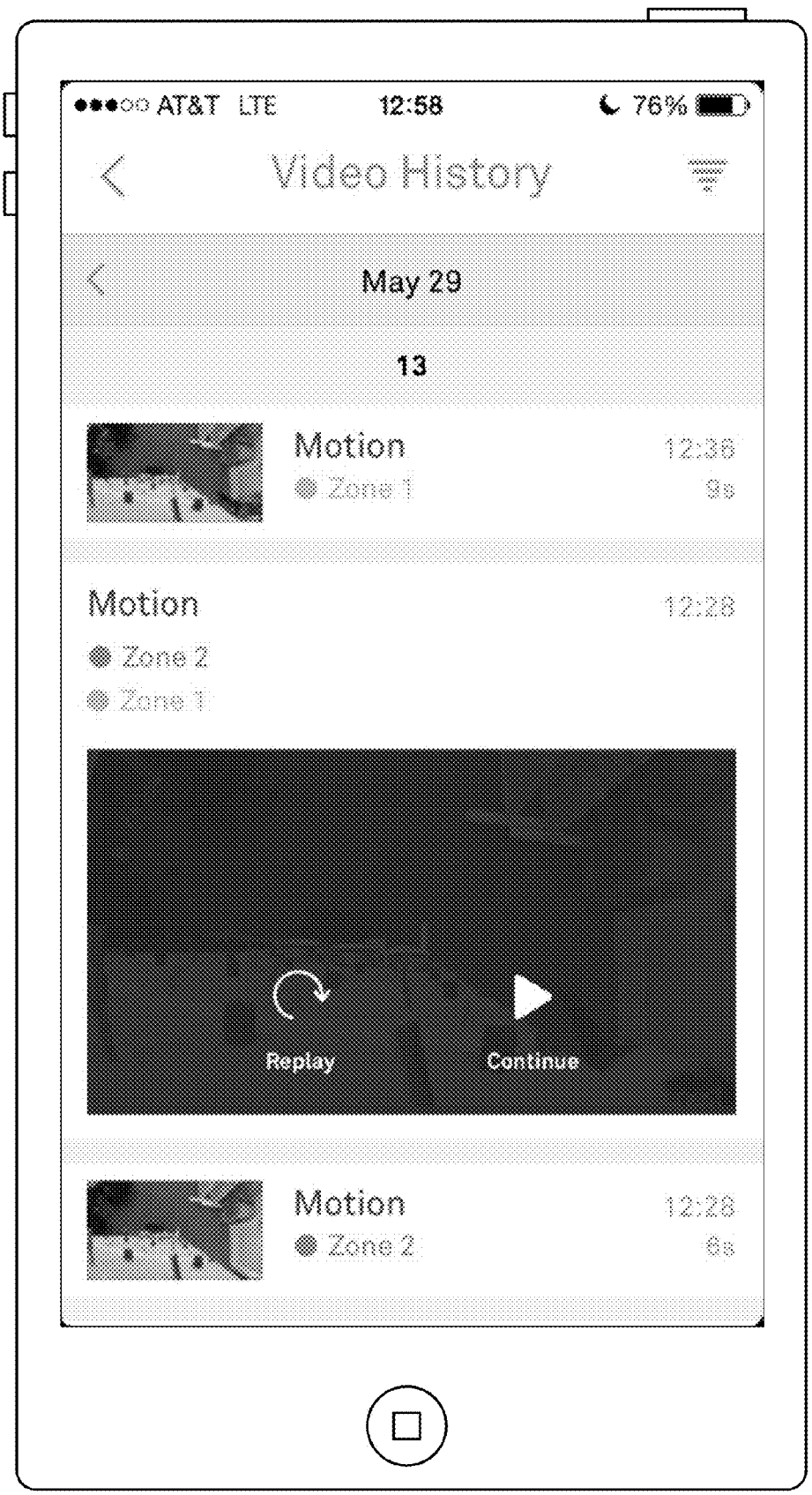

FIG. 19L shows the video in the video player interface having finished playing. A "Replay" affordance and a "Continue" affordance are displayed. The user may activate the "Replay" affordance to replay the video. Or, the user may activate the "Continue" affordance to access the video feed user interface for the associated camera (FIG. 19C or 19D, depending on the device orientation). In the video feed user interface, in some implementations, the video feed is played from the end of the video that ended playback in the video player interface. In some other implementations, the next saved video clip for the camera is played.

FIGS. 20A-20M illustrate example screenshots of user interfaces on a client device in accordance with some implementations. In some implementations, the user interfaces depicted in FIGS. 20A-20M are user interfaces for managing a smart home environment (e.g., smart home environment 100), displayed in one or more web pages in a web browser on a client device (e.g., client device 504), such as a desktop or laptop computer.

Figure 20A:
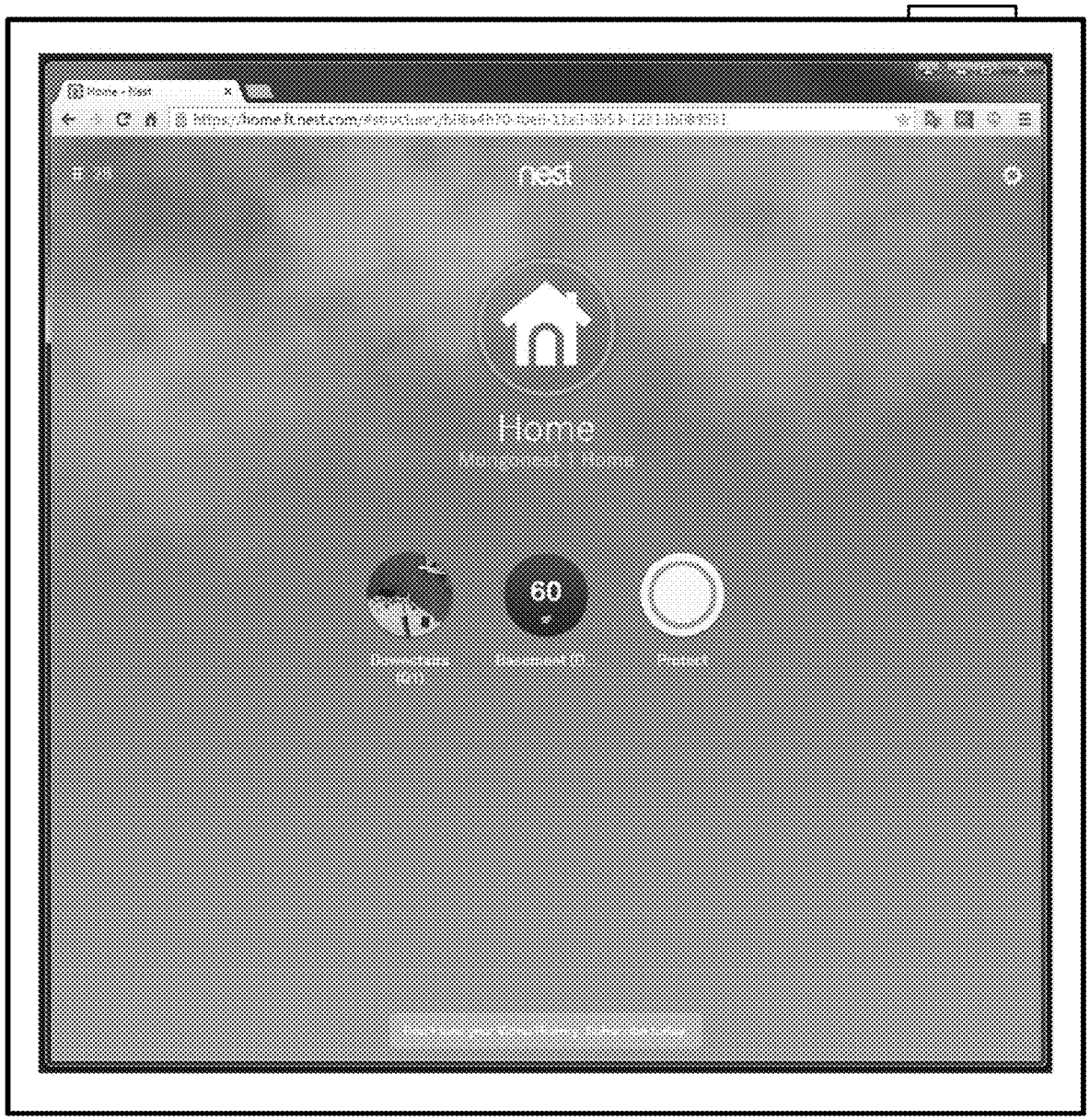
FIGS. 20A-20M illustrate example screenshots of user interfaces on a client device in accordance with some implementations.

FIG. 20A shows a home page user interface analogous to user interface 1104 (FIG. 11A). The home page user interface in FIG. 20A includes a user interface element (the circular element with the label "Downstairs (Q1)" below) analogous to camera objects 1116; a video feed from a camera labeled "Downstairs (Q1)" is displayed with cropping in the user interface element. A user may activate the user interface element (e.g., by clicking on the user interface element) to access a video feed user interface analogous to user interface 1204 (FIG. 12A) for the "Downstairs (Q1)" camera.

Figure 20B:
Figure 20C:
Figure 20D:

FIG. 20B shows a video feed user interface for the "Downstairs (Q1)" camera. The video feed user interface includes a label or identifier of the camera whose video feed is being shown; a date and time of the video being shown; a live feed indicator; a camera on/off switch, the video feed from the camera; various affordances, including an affordance to select a date, an affordance to access a zone filtering/editing menu (analogous to affordance 1229, FIG. 12A), a timeline, and affordance(s) to change the time interval scaling in the timeline. FIG. 20B shows the timeline at the minutes scale. FIG. 20C shows the timeline at the seconds scale. FIG. 20D shows the timeline at the hours scale. A camera event is displayed on the timeline as a bar or a dot in accordance with its duration and the scale of the timeline. The length of the bar/dot indicates the duration of the camera event; a camera event of sufficient duration "stretches" the dot into a bar in accordance with the time scale of the timeline. In FIGS. 20B and 20D, camera events are displayed as dots on the timeline, while in FIG. 20C there are no camera events displayed on the timeline for the time range shown (e.g., because there are no camera events for that time range).

Figure 20E:

In some implementations, additional controls and affordances are displayed when a mouse pointer is hovered over the video. For example, FIG. 20E shows the additional controls and affordances displayed. The additional controls and affordances include, for example zooming controls, a pause button, buttons to jump forward or backward by a predefined amount of time, a button to jump to the current live video feed, a volume control, and a button to expand the video to full-screen. In some implementations, the controls and affordances include, in addition to or in lieu of the buttons to jump forward or backward by a predefined amount of time, a button to jump forward to a video corresponding to the next camera event chronologically (e.g., "Next Video," "Next Event") and/or a button jump backward to a video corresponding to the previous camera event chronologically (e.g., "Previous Video," "Previous Event").

Figure 20F:
Figure 20G:

FIG. 20F shows a zone filtering/editing menu displayed in response to activation of the affordance to access the zone filtering/editing menu. The user may select or deselect the listed zones and alert event types to filter by the selected zones and alert event types. In the zone filtering/editing menu, there are also options to edit an existing user-defined zone of interest (e.g., "Zone 1" listed in the zone filtering/editing menu) and an option to create a new user-defined zone of interest. In FIG. 20F, the existing zones are displayed over the video in response to activation of the option to edit a zone of interest. The zones are displayed as bounded areas with respective boundaries and boundary handles. The zones are displayed so that the user may select the zone to be edited by clicking on the displayed zone. If there are multiple zones of interest, in some implementations, they are displayed with different colors (e.g., one zone, and its corresponding boundary, handles, and area, is displayed in yellow; another zone is displayed in blue; and so on).

Figure 20H:
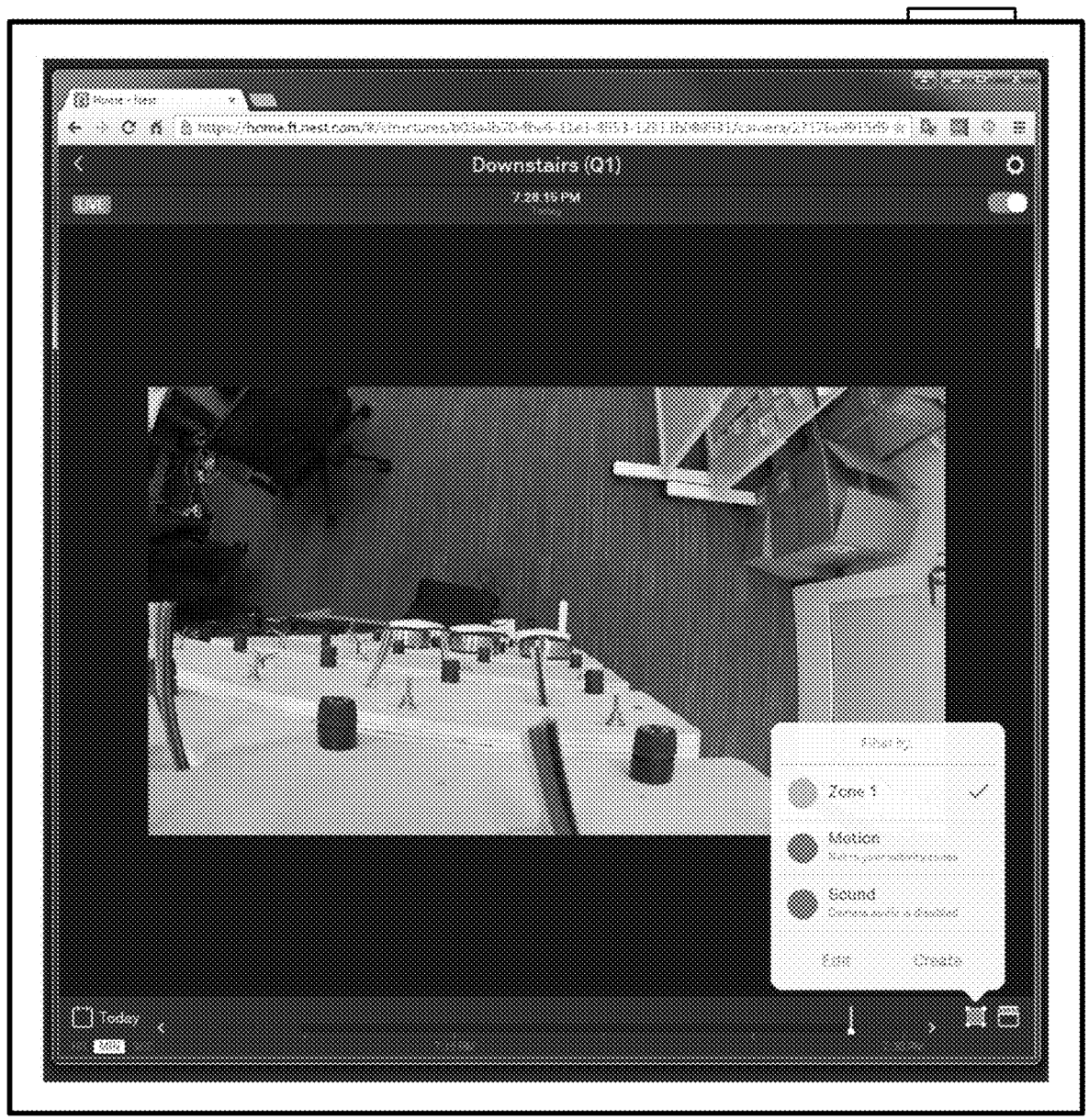

FIG. 20H shows filtering of the timeline. In FIG. 20H, "Zone 1" is selected in the zone filtering/editing menu, and "Motion not in your activity zones" and "Sound" are deselected. No camera events are displayed in the timeline, at last for the time range shown in the timeline, as there are no camera events in the shown time range that is associated with motion detected in "Zone 1."

Figure 20I:

FIG. 20I also shows filtering of the timeline. In FIG. 20I, "Motion not in your activity zones" is selected in the zone filtering/editing menu, and "Zone 1" and "Sound" are deselected. Camera events that include detected motion not in any user-defined zone are displayed in the timeline.

Figure 20J:
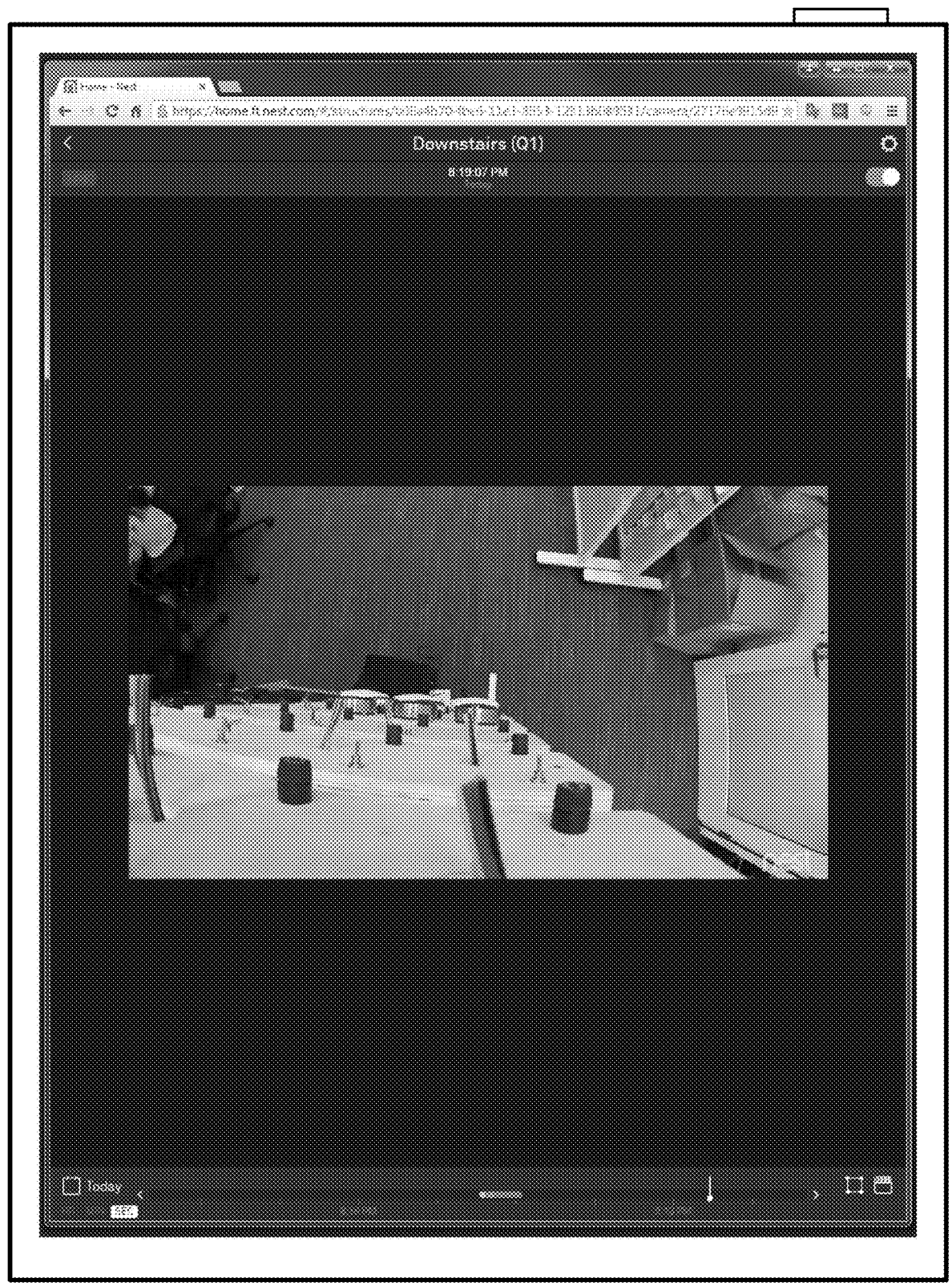

FIG. 20J shows a camera event displayed as a bar on the timeline, with two colored dots in the bar. The colored dots correspond to respective zones or alert event types associated with the camera event. The colored dots have different colors, each respective color being associated with a respective user-defined zone or alert event type. In some implementations, each user-defined zone and alert event type is associated with a distinct color. In some other implementations, each user-defined zone is associated with a distinct color, and one or more of the alert event types that are not user-defined zones are associated with a color distinct from the colors for the user-defined zones. In some implementations, the colored dots are chronologically ordered within the bar in accordance with the times of occurrence of the corresponding alert events.

Figure 20K:
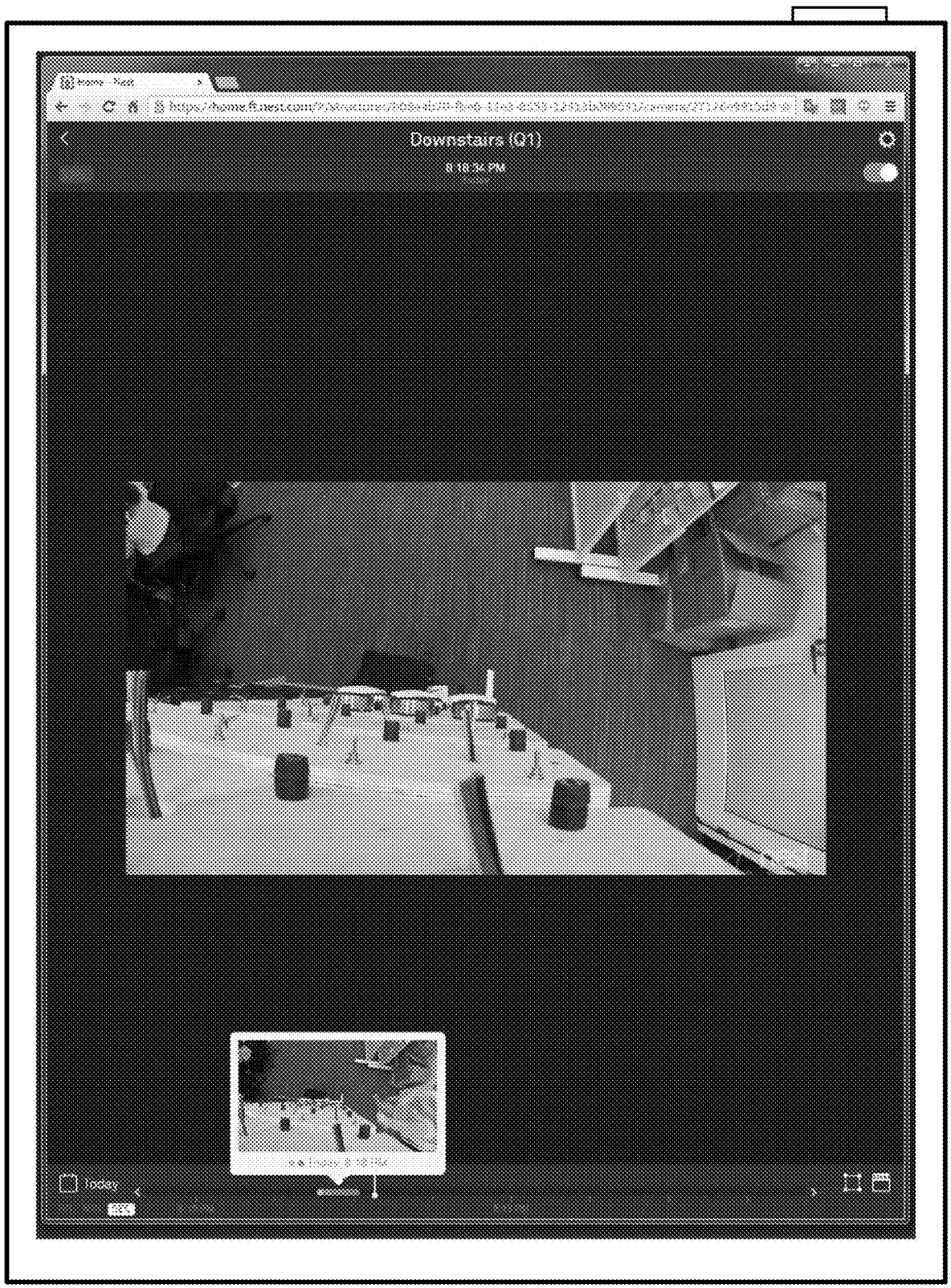

FIG. 20K shows an information pop-up displayed in response to a user clicking on (e.g., with a mouse) or tapping on (e.g., with a contact on a touch screen) or hovering over (e.g., with a mouse pointer) the camera event bar. The information pop-up (analogous to information pop-up 1242, FIG. 12B) includes a thumbnail of the video associated with the camera event; date and time information for the camera event; and colored dots that repeat the differently-colored dots displayed in the camera event bar.

Figure 20L:
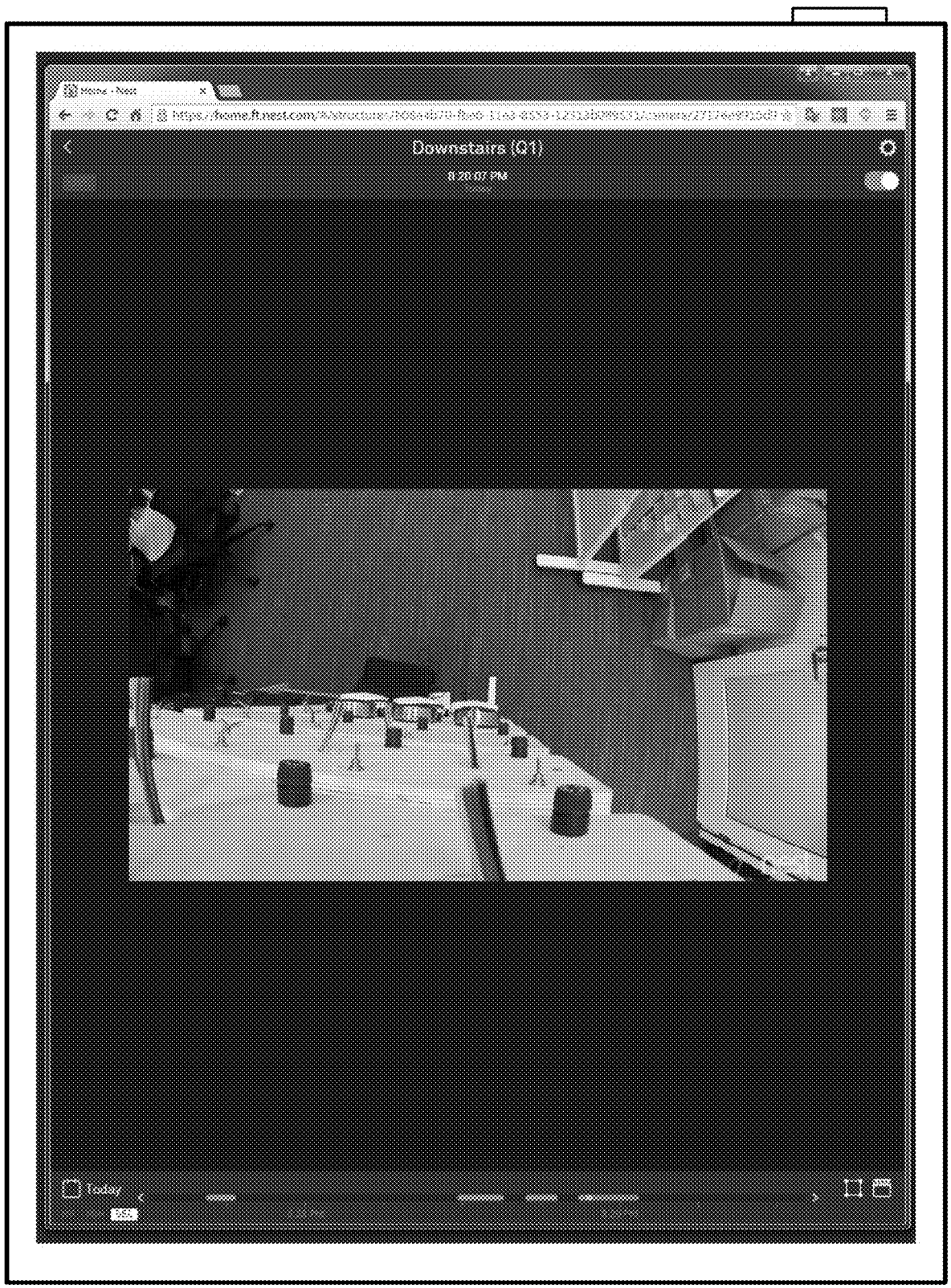
Figure 20M:
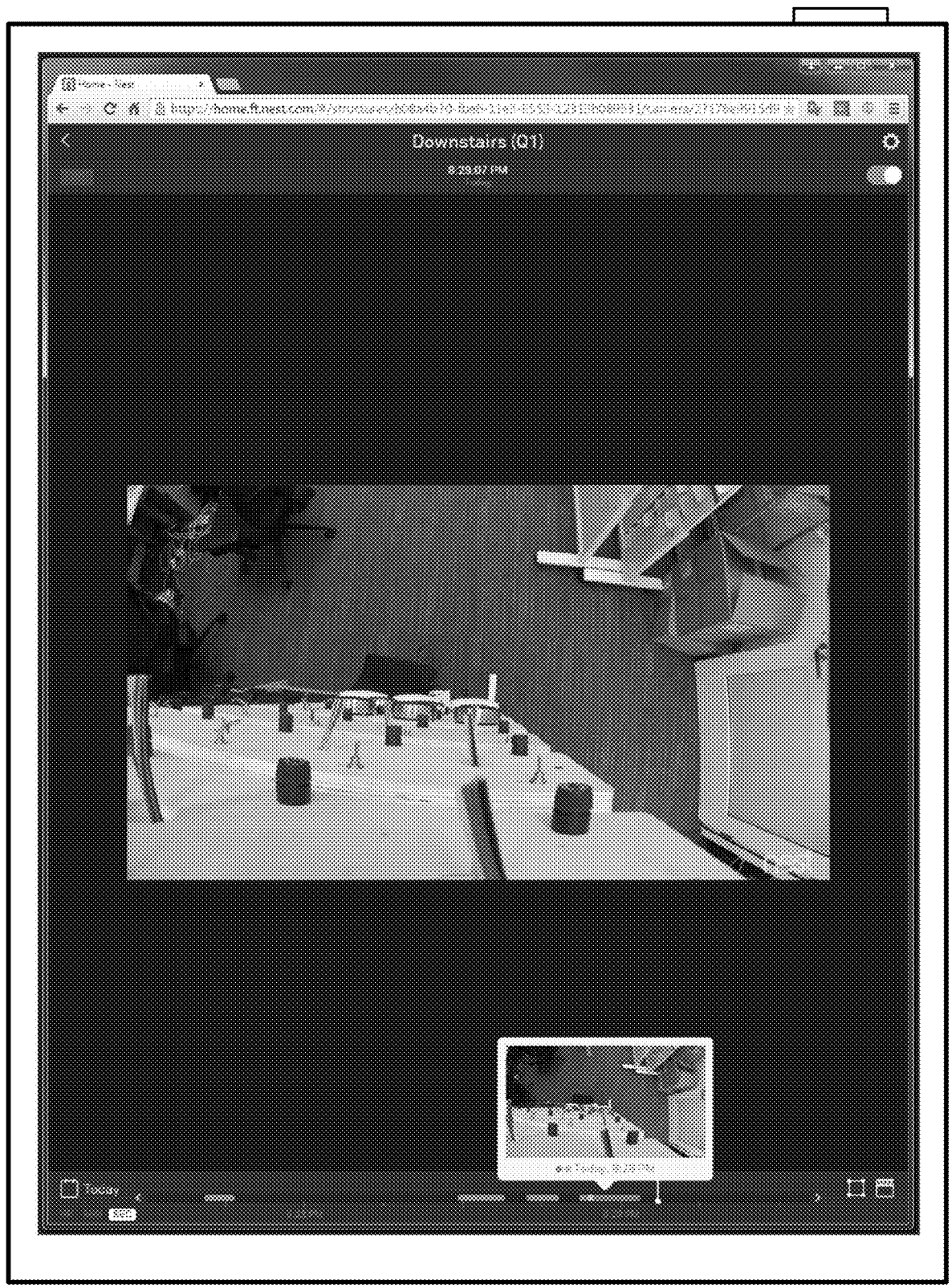

FIGS. 20L and 20M show another example of a camera event bar and an information pop-up. In FIGS. 20L and 20M, the differently-colored dots in the camera event bar have a different order than in FIGS. 20J-20K, indicating that the chronology of the alert events/motion detected in zones are different in the two camera events.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
at a client device having a display, one or more processors and memory storing one or more programs for execution by the one or more processors:
displaying a camera event history, wherein the camera event history is presented as a group of event items, each event item corresponding to a set of one or more alert events for which a remote camera has captured an associated video, wherein the event items are chronologically ordered;
for an event item of the group of event items, displaying:
a thumbnail image of the captured video associated with the event item, and
an alert event indicator indicating a type of alert event associated with the event item, wherein the type of alert event associated with the alert event indicator is defined according to a zone in a field of view of the remote camera;
receiving a user selection of at least one of the event items; and
causing the captured video associated with the at least one selected event item to be displayed.

2. The method of claim 1, wherein the group of event items is a list.

3. The method of claim 1, further comprising:
receiving a user de-selection of the at least one selected event item; and
in response to receiving the user de-selection of the at least one selected event, causing the captured video associated with the at least one selected event item to cease to be displayed.

4. The method of claim 1, wherein, within the event item, the alert event indicator is visually distinctive from a second alert event indicator.

5. The method of claim 1, further comprising: displaying, within the event item, information regarding an alert event corresponding to the event item.

6. The method of claim 1, wherein the event items are chronologically ordered in accordance with a chronology of the associated captured videos.

7. The method of claim 1, wherein the alert event indicator is chronologically ordered with a second alert event indicator in accordance with a chronology of alert events.

8. The method of claim 1, wherein:
the alert event is a non-camera event; and
the captured video associated with the event item comprises video captured by the remote camera during the non-camera event.

9. The method of claim 8, wherein the non-camera event is detected by a non-camera sensor selected from a hazard sensor, a vibration sensor, a motion sensor, and/or a sound sensor.

10. The method of claim 1, wherein the captured video associated with the event item is contemporaneous with the alert event.

11. An electronic device, comprising:
a display;
one or more processors;
memory storing one or more programs to be executed by the one or more processors, the one or more programs comprising instructions for:
displaying a camera event history, wherein the camera event history is presented as a group of event items, each event item corresponding to a set of one or more alert events for which a remote camera has captured an associated video, wherein the event items are chronologically ordered;
for an event item of the group of event items, displaying:
a thumbnail image of the captured video associated with the event item, and
an alert event indicator indicating a type of alert event associated with the event item, wherein the type of alert event associated with the alert event indicator is defined according to a zone in a field of view of the remote camera;
receiving a user selection of at least one of the event items; and
causing the captured video associated with the at least one selected event item to be displayed.

12. The device of claim 11, wherein, within the event item, the alert event indicator is visually distinctive from a second alert event indicator based on color.

13. The device of claim 11, wherein, within the event item, the alert event indicator is visually distinctive from a second alert event indicator based on shape.

14. The device of claim 11, further comprising instructions for: displaying, within the event item, information regarding a most recent alert event of the set of one or more alert events corresponding to the event item.

15. The device of claim 11, wherein the alert event indicator is chronologically ordered with a second alert event indicator in accordance with a chronology of alert events.

16. A non-transitory computer readable storage medium storing one or more programs, the one or more programs comprising instructions, which, when executed by an electronic device with a display and one or more processors, cause the electronic device to perform operations comprising:
displaying a camera event history, wherein the camera event history is presented as a group of event items, each event item corresponding to a set of one or more alert events for which a remote camera has captured an associated video, wherein the event items are chronologically ordered;
for an event item of the group of event items, displaying:
a thumbnail image of the captured video associated with the event item, and
an alert event indicator indicating a type of alert event associated with the event item, wherein the type of alert event associated with the alert event indicator is defined according to a zone in a field of view of the remote camera;
receiving a user selection of at least one of the event items; and
causing the captured video associated with the at least one selected event item to be displayed.

17. The computer readable storage medium of claim 16, wherein the alert event indicator is selected from a plurality of predefined and visually distinctive alert event indicators.

18. The computer readable storage medium of claim 16, wherein for the alert event indicator, a corresponding type of alert event associated with the event item is selected from a plurality of predefined types of alert event.

19. The computer readable storage medium of claim 16, wherein the alert event indicator is displayed with the event item in response to detection of motion inside a zone corresponding to the type of alert event associated with the alert event indicator.

20. The computer readable storage medium of claim 16, wherein the alert event indicator is displayed with the event item in response to detection of motion outside a zone corresponding to the type of alert event associated with the alert event indicator.

* * * * *